(12) United States Patent
Ridgard et al.

(10) Patent No.: US 8,621,025 B2
(45) Date of Patent: Dec. 31, 2013

(54) MOBILE DATA TRANSFER AND SYNCHRONIZATION SYSTEM

(75) Inventors: Leighton A. Ridgard, Ellenwood, GA (US); Robert E. Garner, Lawrenceville, GA (US); David L. Multer, Santa Cruz, CA (US); Liam J. Stannard, Lawrenceville, GA (US); Donald W. Cash, Dunwoody, GA (US); Richard M. Onyon, San Jose, CA (US); Brandon Huff, Bonny Doon, CA (US); Jason Burns, Roseville, CA (US); Bryan Taketa, San Jose, CA (US)

(73) Assignee: Synchronoss Technologis, Inc., Bridgewater, NJ (US)

( * ) Notice: Subject to any disclaimer, the term of this patent is extended or adjusted under 35 U.S.C. 154(b) by 188 days.

(21) Appl. No.: 13/007,070

(22) Filed: Jan. 14, 2011

(65) Prior Publication Data

US 2011/0269424 A1 Nov. 3, 2011

Related U.S. Application Data

(63) Continuation of application No. 12/228,978, filed on Aug. 18, 2008, now Pat. No. 8,442,943, which is a
(Continued)

(51) Int. Cl.
*G06F 15/16* (2006.01)

(52) U.S. Cl.
USPC ............ 709/207; 709/206; 709/217; 709/218

(58) Field of Classification Search
USPC .................. 434/118; 715/747, 781, 802, 810; 709/217, 207, 206, 218; 710/37
See application file for complete search history.

(56) References Cited

U.S. PATENT DOCUMENTS

| 4,887,212 A | 12/1989 | Zamora et al. |
| 5,111,398 A | 5/1992 | Nunberg et al. |

(Continued)

FOREIGN PATENT DOCUMENTS

| CN | 1202662 | 12/1998 |
| CN | 1313697 A | 9/2001 |

(Continued)

OTHER PUBLICATIONS

Advisory Action dated Sep. 26, 2011 in U.S. Appl. No. 12/037,609, filed Feb. 26, 2008.

(Continued)

*Primary Examiner* — Le H Luu
(74) *Attorney, Agent, or Firm* — Dentons US LLP

(57) ABSTRACT

The invention relates to the transference of data between two systems independent of the form in which the data is kept on the respective systems, and in particular to providing an efficient means of communicating data between systems and devices. It further relates to a system for allowing users to provide other individuals with a personalized representation of the user in a network environment, such as a cellular telephone network and the backup and restoration of data stored in a wireless telephone, and in particular a mobile telephone having data storage capabilities.

27 Claims, 58 Drawing Sheets

Related U.S. Application Data

(63) continuation of application No. 10/659,646, filed on Sep. 10, 2003, now Pat. No. 7,415,486, which is a continuation of application No. 09/491,694, filed on Jan. 26, 2000, now Pat. No. 6,671,757, application No. 13/007,070, which is a continuation of application No. 11/128,121, filed on May 12, 2005, application No. 13/007,070, which is a continuation of application No. 09/753,537, filed on Jan. 2, 2001, now abandoned, which is a continuation of application No. 09/490,550, filed on Jan. 25, 2000, now Pat. No. 6,694,336, application No. 13/007,070, which is a continuation of application No. 12/286,040, filed on Sep. 26, 2008, application No. 13/007,070, which is a continuation-in-part of application No. 12/151,440, filed on May 6, 2008, now Pat. No. 7,643,824, which is a continuation of application No. 10/789,816, filed on Feb. 27, 2004, now Pat. No. 7,505,762, application No. 13/007,070, which is a continuation-in-part of application No. 12/011,399, filed on Jan. 25, 2008.

(60) Provisional application No. 60/995,789, filed on Sep. 28, 2007, provisional application No. 60/937,314, filed on Jun. 26, 2007, provisional application No. 60/897,789, filed on Jan. 26, 2007, provisional application No. 60/570,409, filed on May 12, 2004.

(56) References Cited

U.S. PATENT DOCUMENTS

| | | |
|---|---|---|
| 5,115,466 A | 5/1992 | Presttun |
| 5,130,993 A | 7/1992 | Gutman et al. |
| 5,146,221 A | 9/1992 | Whiting et al. |
| 5,204,902 A | 4/1993 | Reeds, III et al. |
| 5,329,619 A | 7/1994 | Page et al. |
| 5,392,390 A | 2/1995 | Crozier |
| 5,418,854 A | 5/1995 | Kaufman et al. |
| 5,418,908 A | 5/1995 | Keller et al. |
| 5,425,079 A | 6/1995 | Noda et al. |
| 5,483,352 A | 1/1996 | Fukuyama et al. |
| 5,485,161 A | 1/1996 | Vaughn |
| 5,509,070 A | 4/1996 | Schull |
| 5,519,433 A | 5/1996 | Lappington et al. |
| 5,519,606 A | 5/1996 | Frid-Nielsen et al. |
| 5,543,789 A | 8/1996 | Behr et al. |
| 5,544,061 A | 8/1996 | Morimoto et al. |
| 5,561,446 A | 10/1996 | Montlick |
| 5,574,906 A | 11/1996 | Morris |
| 5,579,489 A | 11/1996 | Dornier et al. |
| 5,588,009 A | 12/1996 | Will |
| 5,592,470 A | 1/1997 | Rudrapatna et al. |
| 5,623,406 A | 4/1997 | Ichbiah |
| 5,623,661 A | 4/1997 | Hon |
| 5,628,005 A | 5/1997 | Hurvig |
| 5,630,081 A | 5/1997 | Rybicki et al. |
| 5,638,508 A | 6/1997 | Kanai et al. |
| 5,640,577 A | 6/1997 | Scharmer |
| 5,644,709 A | 7/1997 | Austin |
| 5,647,002 A | 7/1997 | Brunson |
| 5,649,195 A | 7/1997 | Scott et al. |
| 5,650,800 A | 7/1997 | Benson |
| 5,657,372 A | 8/1997 | Ahlberg et al. |
| 5,666,397 A | 9/1997 | Lamons et al. |
| 5,666,553 A | 9/1997 | Crozier |
| 5,682,524 A | 10/1997 | Freund et al. |
| 5,684,990 A | 11/1997 | Boothby |
| 5,694,596 A | 12/1997 | Campbell |
| 5,699,255 A | 12/1997 | Ellis et al. |
| 5,701,423 A | 12/1997 | Crozier |
| 5,706,509 A | 1/1998 | Man-Hak Tso |
| 5,710,922 A | 1/1998 | Alley et al. |
| 5,727,202 A | 3/1998 | Kucala |
| 5,727,950 A | 3/1998 | Cook et al. |
| 5,729,735 A | 3/1998 | Meyering |
| 5,729,739 A | 3/1998 | Cantin et al. |
| 5,729,743 A | 3/1998 | Squibb |
| 5,742,792 A | 4/1998 | Yanai et al. |
| 5,745,750 A | 4/1998 | Porcaro |
| 5,745,906 A | 4/1998 | Squibb |
| 5,757,920 A | 5/1998 | Misra et al. |
| 5,758,150 A | 5/1998 | Bell et al. |
| 5,758,354 A | 5/1998 | Huang et al. |
| 5,758,355 A | 5/1998 | Buchanan |
| 5,764,899 A | 6/1998 | Eggleston et al. |
| 5,768,480 A | 6/1998 | Crawford, Jr. et al. |
| 5,768,597 A | 6/1998 | Simm |
| 5,771,354 A | 6/1998 | Crawford |
| 5,778,346 A | 7/1998 | Frid-Nielsen et al. |
| 5,778,361 A | 7/1998 | Nanjo et al. |
| 5,778,367 A | 7/1998 | Wesinger et al. |
| 5,778,388 A | 7/1998 | Kawamura et al. |
| 5,781,901 A | 7/1998 | Kuzma |
| 5,787,247 A | 7/1998 | Norin et al. |
| 5,787,262 A | 7/1998 | Shakib et al. |
| 5,794,228 A | 8/1998 | French et al. |
| 5,804,803 A | 9/1998 | Cragun et al. |
| 5,809,497 A | 9/1998 | Freund et al. |
| 5,812,773 A | 9/1998 | Norin |
| 5,812,793 A | 9/1998 | Shakib et al. |
| 5,818,437 A | 10/1998 | Grover et al. |
| 5,826,245 A | 10/1998 | Sandberg-Diment |
| 5,832,489 A | 11/1998 | Kucala |
| 5,832,518 A | 11/1998 | Mastors |
| 5,832,519 A | 11/1998 | Bowen et al. |
| 5,832,520 A | 11/1998 | Miller |
| 5,845,283 A | 12/1998 | Williams et al. |
| 5,859,973 A | 1/1999 | Carpenter et al. |
| 5,864,864 A | 1/1999 | Lerner |
| 5,875,296 A | 2/1999 | Shi et al. |
| 5,884,323 A | 3/1999 | Hawkins et al. |
| 5,884,325 A | 3/1999 | Bauer et al. |
| 5,893,119 A | 4/1999 | Squibb |
| 5,896,321 A | 4/1999 | Miller et al. |
| 5,897,640 A | 4/1999 | Veghte et al. |
| 5,897,642 A | 4/1999 | Capossela et al. |
| 5,903,723 A | 5/1999 | Beck et al. |
| 5,907,793 A | 5/1999 | Reams |
| 5,923,756 A | 7/1999 | Shambroom |
| 5,923,848 A | 7/1999 | Goodhand et al. |
| 5,926,816 A | 7/1999 | Bauer et al. |
| 5,933,653 A | 8/1999 | Ofek |
| 5,933,778 A | 8/1999 | Buhrmann et al. |
| 5,933,816 A | 8/1999 | Zeanah et al. |
| 5,935,262 A | 8/1999 | Barrett et al. |
| 5,937,405 A | 8/1999 | Campbell |
| 5,941,944 A | 8/1999 | Messerly |
| 5,943,676 A | 8/1999 | Boothby |
| 5,944,787 A | 8/1999 | Zoken |
| 5,946,615 A | 8/1999 | Holmes et al. |
| 5,948,066 A | 9/1999 | Whalen et al. |
| 5,951,636 A | 9/1999 | Zerber |
| 5,961,572 A | 10/1999 | Craport et al. |
| 5,961,590 A | 10/1999 | Mendez et al. |
| 5,968,131 A | 10/1999 | Mendez et al. |
| 5,970,149 A | 10/1999 | Johnson |
| 5,970,490 A | 10/1999 | Morgenstern |
| 5,971,277 A | 10/1999 | Cragun et al. |
| 5,974,238 A | 10/1999 | Chase, Jr. |
| 5,974,563 A | 10/1999 | Beeler, Jr. |
| 5,987,381 A | 11/1999 | Oshizawa |
| 5,987,609 A | 11/1999 | Hasebe |
| 5,995,118 A | 11/1999 | Masuda |
| 6,000,000 A | 12/1999 | Hawkins et al. |
| 6,006,215 A | 12/1999 | Retallick |
| 6,006,274 A | 12/1999 | Hawkins et al. |
| 6,009,462 A | 12/1999 | Birrell et al. |
| 6,012,063 A | 1/2000 | Bodnar |
| 6,012,088 A | 1/2000 | Li et al. |
| 6,014,695 A | 1/2000 | Yamashita et al. |
| 6,016,394 A | 1/2000 | Walker |
| 6,016,478 A | 1/2000 | Zhang et al. |

(56) References Cited

U.S. PATENT DOCUMENTS

| | | | |
|---|---|---|---|
| 6,023,620 A | 2/2000 | Hansson | |
| 6,023,708 A | 2/2000 | Mendez et al. | |
| 6,023,723 A | 2/2000 | McCormick et al. | |
| 6,026,414 A | 2/2000 | Anglin | |
| 6,034,621 A | 3/2000 | Kaufman | |
| 6,038,665 A | 3/2000 | Bolt et al. | |
| 6,044,381 A | 3/2000 | Boothby et al. | |
| 6,049,776 A | 4/2000 | Donnelly et al. | |
| 6,052,735 A | 4/2000 | Ulrich et al. | |
| 6,058,399 A | 5/2000 | Morag et al. | |
| 6,061,790 A | 5/2000 | Bodnar | |
| 6,061,796 A | 5/2000 | Chen et al. | |
| 6,063,134 A | 5/2000 | Peters et al. | |
| 6,064,880 A | 5/2000 | Alanara | |
| 6,065,018 A | 5/2000 | Beier et al. | |
| 6,067,582 A | 5/2000 | Smith et al. | |
| 6,073,133 A | 6/2000 | Chrabaszcz | |
| 6,076,109 A | 6/2000 | Kikinis | |
| 6,078,960 A | 6/2000 | Ballard | |
| 6,081,900 A | 6/2000 | Subramaniam et al. | |
| 6,094,618 A | 7/2000 | Harada | |
| 6,101,480 A | 8/2000 | Conmy et al. | |
| 6,108,330 A | 8/2000 | Bhatia et al. | |
| 6,108,703 A | 8/2000 | Leighton et al. | |
| 6,112,024 A | 8/2000 | Almond et al. | |
| 6,115,797 A | 9/2000 | Kanda et al. | |
| 6,131,096 A | 10/2000 | Ng et al. | |
| 6,131,116 A | 10/2000 | Riggins et al. | |
| 6,141,011 A | 10/2000 | Bodnar et al. | |
| 6,141,621 A | 10/2000 | Piwowarski et al. | |
| 6,141,659 A | 10/2000 | Barker et al. | |
| 6,141,664 A | 10/2000 | Boothby | |
| 6,145,088 A | 11/2000 | Stevens | |
| 6,148,260 A | 11/2000 | Musk et al. | |
| 6,151,606 A | 11/2000 | Mendez | |
| 6,157,630 A | 12/2000 | Adler et al. | |
| 6,163,773 A | 12/2000 | Kishi | |
| 6,163,779 A | 12/2000 | Mantha et al. | |
| 6,163,844 A | 12/2000 | Duncan et al. | |
| 6,167,120 A | 12/2000 | Kikinis | |
| 6,173,310 B1 | 1/2001 | Yost et al. | |
| 6,173,311 B1 | 1/2001 | Hassett et al. | |
| 6,182,117 B1 | 1/2001 | Christie et al. | |
| 6,182,141 B1 | 1/2001 | Blum et al. | |
| 6,185,598 B1 | 2/2001 | Farber et al. | |
| 6,189,030 B1 | 2/2001 | Kirsch et al. | |
| 6,189,096 B1 | 2/2001 | Haverty | |
| 6,195,695 B1 | 2/2001 | Cheston et al. | |
| 6,195,794 B1 | 2/2001 | Buxton | |
| 6,196,846 B1 * | 3/2001 | Berger et al. | 434/118 |
| 6,202,085 B1 | 3/2001 | Benson et al. | |
| 6,205,448 B1 | 3/2001 | Kruglikov et al. | |
| 6,209,034 B1 | 3/2001 | Gladwin et al. | |
| 6,212,529 B1 | 4/2001 | Boothby et al. | |
| 6,212,556 B1 | 4/2001 | Arunachalam | |
| 6,216,131 B1 | 4/2001 | Liu et al. | |
| 6,219,680 B1 | 4/2001 | Bernardo et al. | |
| 6,219,694 B1 | 4/2001 | Lazaridis et al. | |
| 6,223,187 B1 | 4/2001 | Boothby et al. | |
| 6,226,650 B1 | 5/2001 | Mahajan et al. | |
| 6,233,565 B1 | 5/2001 | Lewis et al. | |
| 6,233,589 B1 | 5/2001 | Balcha et al. | |
| 6,243,743 B1 * | 6/2001 | Freeny | 709/217 |
| 6,243,760 B1 | 6/2001 | Armbruster et al. | |
| 6,246,889 B1 | 6/2001 | Boltz et al. | |
| 6,247,048 B1 | 6/2001 | Greer et al. | |
| 6,247,135 B1 | 6/2001 | Feague | |
| 6,249,690 B1 | 6/2001 | Mashiko | |
| 6,252,547 B1 | 6/2001 | Perry et al. | |
| 6,255,989 B1 | 7/2001 | Munson et al. | |
| 6,256,750 B1 | 7/2001 | Takeda | |
| 6,260,124 B1 | 7/2001 | Crockett et al. | |
| 6,263,363 B1 * | 7/2001 | Rosenblatt et al. | 709/217 |
| 6,272,545 B1 | 8/2001 | Flanagin et al. | |
| 6,275,831 B1 | 8/2001 | Bodnar et al. | |
| 6,278,941 B1 | 8/2001 | Yokoyama | |
| 6,282,435 B1 | 8/2001 | Wagner et al. | |
| 6,282,698 B1 | 8/2001 | Baker et al. | |
| 6,285,889 B1 | 9/2001 | Nykanen et al. | |
| 6,286,029 B1 | 9/2001 | Delph | |
| 6,286,053 B1 | 9/2001 | Van Peursem et al. | |
| 6,286,085 B1 | 9/2001 | Jouenne et al. | |
| 6,289,212 B1 | 9/2001 | Stein et al. | |
| 6,292,743 B1 | 9/2001 | Pu et al. | |
| 6,292,905 B1 | 9/2001 | Wallach et al. | |
| 6,295,502 B1 | 9/2001 | Hancock et al. | |
| 6,295,541 B1 | 9/2001 | Bodnar et al. | |
| 6,304,881 B1 | 10/2001 | Halim et al. | |
| 6,317,755 B1 | 11/2001 | Rakers et al. | |
| 6,321,236 B1 | 11/2001 | Zollinger et al. | |
| 6,324,467 B1 | 11/2001 | Machii et al. | |
| 6,324,526 B1 | 11/2001 | D'Agostino | |
| 6,324,544 B1 | 11/2001 | Alam et al. | |
| 6,327,533 B1 | 12/2001 | Chou | |
| 6,329,680 B1 | 12/2001 | Yoshida et al. | |
| 6,330,568 B1 | 12/2001 | Boothby et al. | |
| 6,332,158 B1 | 12/2001 | Risley et al. | |
| 6,333,973 B1 | 12/2001 | Smith et al. | |
| 6,338,096 B1 | 1/2002 | Ukelson | |
| 6,339,710 B1 | 1/2002 | Suzuki | |
| 6,341,316 B1 | 1/2002 | Kloba et al. | |
| 6,345,308 B1 | 2/2002 | Abe | |
| 6,349,336 B1 | 2/2002 | Sit et al. | |
| 6,353,448 B1 | 3/2002 | Scarborough et al. | |
| 6,356,910 B1 | 3/2002 | Zellweger | |
| 6,356,961 B1 | 3/2002 | Oprescu-Surcobe | |
| 6,360,252 B1 | 3/2002 | Rudy et al. | |
| 6,360,330 B1 | 3/2002 | Mutalik et al. | |
| 6,363,249 B1 | 3/2002 | Nordeman et al. | |
| 6,363,412 B1 | 3/2002 | Niwa et al. | |
| 6,374,250 B2 | 4/2002 | Ajtai et al. | |
| 6,381,700 B1 | 4/2002 | Yoshida | |
| 6,389,462 B1 | 5/2002 | Cohen et al. | |
| 6,396,482 B1 | 5/2002 | Griffin et al. | |
| 6,397,307 B2 | 5/2002 | Ohran | |
| 6,397,351 B1 | 5/2002 | Miller et al. | |
| 6,401,104 B1 | 6/2002 | LaRue et al. | |
| 6,405,218 B1 | 6/2002 | Boothby | |
| 6,418,309 B1 | 7/2002 | Moon et al. | |
| 6,434,621 B1 | 8/2002 | Pezzillo et al. | |
| 6,434,627 B1 | 8/2002 | Millet et al. | |
| 6,437,818 B1 | 8/2002 | Ludwig et al. | |
| 6,449,622 B1 | 9/2002 | LaRue et al. | |
| 6,453,371 B1 * | 9/2002 | Hampson et al. | 710/37 |
| 6,453,392 B1 | 9/2002 | Flynn, Jr. | |
| 6,457,062 B1 | 9/2002 | Pivowar et al. | |
| 6,460,036 B1 | 10/2002 | Herz | |
| 6,462,644 B1 | 10/2002 | Howell et al. | |
| 6,463,464 B1 | 10/2002 | Lazaridis et al. | |
| 6,466,967 B2 | 10/2002 | Landsman et al. | |
| 6,473,621 B1 | 10/2002 | Heie | |
| 6,480,896 B1 | 11/2002 | Brown et al. | |
| 6,484,143 B1 | 11/2002 | Swildens et al. | |
| 6,487,560 B1 | 11/2002 | LaRue et al. | |
| 6,490,655 B1 | 12/2002 | Kershaw | |
| 6,496,944 B1 | 12/2002 | Hsiao et al. | |
| 6,499,108 B1 | 12/2002 | Johnson | |
| 6,505,216 B1 | 1/2003 | Schutzman et al. | |
| 6,507,891 B1 | 1/2003 | Challenger et al. | |
| 6,516,314 B1 | 2/2003 | Birkler et al. | |
| 6,516,327 B1 | 2/2003 | Zondervan et al. | |
| 6,519,452 B1 | 2/2003 | Agostino et al. | |
| 6,523,063 B1 | 2/2003 | Miller et al. | |
| 6,523,079 B2 | 2/2003 | Kikinis et al. | |
| 6,532,588 B1 | 3/2003 | Porter | |
| 6,535,743 B1 | 3/2003 | Kennedy, III et al. | |
| 6,535,949 B1 | 3/2003 | Parker | |
| 6,539,494 B1 | 3/2003 | Abramson et al. | |
| 6,542,933 B1 | 4/2003 | Durst, Jr. et al. | |
| 6,546,425 B1 | 4/2003 | Hanson et al. | |
| 6,549,933 B1 | 4/2003 | Barrett et al. | |
| 6,553,375 B1 | 4/2003 | Huang et al. | |
| 6,553,410 B2 | 4/2003 | Kikinis | |
| 6,553,413 B1 | 4/2003 | Leighton et al. | |

(56) References Cited

U.S. PATENT DOCUMENTS

| | | |
|---|---|---|
| 6,564,336 B1 | 5/2003 | Majkowski |
| 6,567,850 B1 | 5/2003 | Freishtat et al. |
| 6,567,857 B1 | 5/2003 | Gupta et al. |
| 6,573,915 B1 * | 6/2003 | Sivan et al. ............... 715/781 |
| 6,581,065 B1 | 6/2003 | Rodkin et al. |
| 6,584,454 B1 | 6/2003 | Hummel, Jr. et al. |
| 6,589,290 B1 | 7/2003 | Maxwell et al. |
| 6,591,266 B1 | 7/2003 | Li et al. |
| 6,591,306 B1 | 7/2003 | Redlich |
| 6,591,362 B1 | 7/2003 | Li |
| 6,597,700 B2 | 7/2003 | Golikeri et al. |
| 6,601,143 B1 | 7/2003 | Lamparter |
| 6,609,005 B1 | 8/2003 | Chern |
| 6,611,850 B1 | 8/2003 | Shen |
| 6,621,508 B1 * | 9/2003 | Shiraishi et al. ............... 715/810 |
| 6,628,194 B1 | 9/2003 | Hellebust et al. |
| 6,636,894 B1 | 10/2003 | Short et al. |
| 6,640,302 B1 | 10/2003 | Subramaniam et al. |
| 6,643,707 B1 | 11/2003 | Booth |
| 6,647,399 B2 | 11/2003 | Zaremba |
| 6,654,746 B1 | 11/2003 | Wong et al. |
| 6,662,212 B1 | 12/2003 | Chandhok et al. |
| 6,665,721 B1 | 12/2003 | Hind et al. |
| 6,671,703 B2 | 12/2003 | Thompson et al. |
| 6,671,724 B1 | 12/2003 | Pandya et al. |
| 6,671,757 B1 | 12/2003 | Multer et al. |
| 6,684,206 B2 | 1/2004 | Chen et al. |
| 6,684,302 B2 | 1/2004 | Kershaw |
| 6,694,335 B1 | 2/2004 | Hopmann et al. |
| 6,694,336 B1 | 2/2004 | Multer et al. |
| 6,701,316 B1 | 3/2004 | Li et al. |
| 6,704,849 B2 | 3/2004 | Steegmans |
| 6,710,790 B1 * | 3/2004 | Fagioli ............... 715/802 |
| 6,714,987 B1 | 3/2004 | Amin et al. |
| 6,718,348 B1 | 4/2004 | Novak et al. |
| 6,718,390 B1 | 4/2004 | Still et al. |
| 6,725,239 B2 | 4/2004 | Sherman et al. |
| 6,728,530 B1 | 4/2004 | Heinonen et al. |
| 6,732,101 B1 | 5/2004 | Cook |
| 6,732,264 B1 | 5/2004 | Sun et al. |
| 6,738,789 B2 | 5/2004 | Multer et al. |
| 6,741,851 B1 | 5/2004 | Lee et al. |
| 6,745,040 B2 | 6/2004 | Zimmerman |
| 6,757,696 B2 | 6/2004 | Multer et al. |
| 6,757,698 B2 | 6/2004 | McBride et al. |
| 6,757,712 B1 | 6/2004 | Bastian et al. |
| 6,781,575 B1 | 8/2004 | Hawkins et al. |
| 6,795,848 B1 | 9/2004 | Border et al. |
| 6,799,214 B1 | 9/2004 | Li |
| 6,804,690 B1 | 10/2004 | Dysert et al. |
| 6,804,783 B1 | 10/2004 | Wesinger, Jr. et al. |
| 6,810,411 B1 | 10/2004 | Coughlin et al. |
| 6,812,961 B1 | 11/2004 | Parulski et al. |
| 6,813,487 B1 | 11/2004 | Trommelen |
| 6,816,481 B1 | 11/2004 | Adams et al. |
| 6,829,654 B1 | 12/2004 | Jungck |
| 6,836,657 B2 | 12/2004 | Ji et al. |
| 6,836,765 B1 | 12/2004 | Sussman |
| 6,839,022 B1 | 1/2005 | Benco et al. |
| 6,839,568 B2 | 1/2005 | Suzuki |
| 6,842,695 B1 | 1/2005 | Tu |
| 6,850,944 B1 | 2/2005 | MacCall et al. |
| 6,868,451 B1 | 3/2005 | Peacock |
| 6,870,921 B1 | 3/2005 | Elsey et al. |
| 6,886,013 B1 | 4/2005 | Beranek |
| 6,892,225 B1 | 5/2005 | Tu et al. |
| 6,892,245 B1 | 5/2005 | Crump et al. |
| 6,893,568 B1 | 5/2005 | Janson et al. |
| 6,904,449 B1 | 6/2005 | Quinones |
| 6,904,460 B1 | 6/2005 | Raciborski et al. |
| 6,920,488 B1 | 7/2005 | Le Pennec et al. |
| 6,925,476 B1 | 8/2005 | Multer et al. |
| 6,925,477 B1 | 8/2005 | Champagne et al. |
| 6,934,767 B1 | 8/2005 | Jellinek |
| 6,944,651 B2 | 9/2005 | Onyon et al. |
| 6,944,676 B1 | 9/2005 | Armbruster et al. |
| 6,954,660 B2 | 10/2005 | Aoyama |
| 6,954,783 B1 | 10/2005 | Bodwell et al. |
| 6,959,331 B1 | 10/2005 | Traversat et al. |
| 6,963,914 B1 | 11/2005 | Breitbart et al. |
| 6,973,299 B2 | 12/2005 | Apfel |
| 6,975,709 B2 | 12/2005 | Wullert, II |
| 6,996,617 B1 | 2/2006 | Aiken, Jr. et al. |
| 6,996,631 B1 | 2/2006 | Aiken, Jr. et al. |
| 7,003,555 B1 | 2/2006 | Jungck |
| 7,003,668 B2 | 2/2006 | Berson et al. |
| 7,007,041 B2 | 2/2006 | Multer et al. |
| 7,010,578 B1 | 3/2006 | Lewin et al. |
| 7,016,964 B1 | 3/2006 | Still et al. |
| 7,023,868 B2 | 4/2006 | Rabenko et al. |
| 7,024,491 B1 | 4/2006 | Hanmann et al. |
| 7,030,730 B1 | 4/2006 | Zondervan |
| 7,035,878 B1 | 4/2006 | Multer et al. |
| 7,039,656 B1 | 5/2006 | Tsai et al. |
| 7,051,275 B2 | 5/2006 | Gupta et al. |
| 7,054,594 B2 | 5/2006 | Bloch et al. |
| 7,054,952 B1 | 5/2006 | Schwerdtfeger et al. |
| 7,082,476 B1 | 7/2006 | Cohen et al. |
| 7,085,817 B1 | 8/2006 | Tock et al. |
| 7,096,418 B1 | 8/2006 | Singhal et al. |
| 7,099,915 B1 | 8/2006 | Tenereillo et al. |
| 7,103,794 B2 | 9/2006 | Malcolm et al. |
| 7,107,043 B2 | 9/2006 | Aoyama |
| 7,110,954 B2 | 9/2006 | Yung et al. |
| 7,116,681 B1 | 10/2006 | Hovell et al. |
| 7,133,503 B2 | 11/2006 | Revisky et al. |
| 7,146,161 B2 | 12/2006 | Chou |
| 7,158,805 B1 | 1/2007 | Park et al. |
| 7,159,032 B2 | 1/2007 | Jim et al. |
| 7,162,494 B2 | 1/2007 | Arellano |
| 7,167,728 B1 | 1/2007 | Wagner et al. |
| 7,181,628 B2 | 2/2007 | Sato et al. |
| 7,197,574 B1 | 3/2007 | Ishiyama |
| 7,225,409 B1 * | 5/2007 | Schnarel et al. ............... 715/747 |
| 7,233,791 B2 | 6/2007 | Gilbert et al. |
| 7,237,027 B1 | 6/2007 | Raccah et al. |
| 7,249,175 B1 | 7/2007 | Donaldson |
| 7,269,433 B2 | 9/2007 | Vargas et al. |
| 7,284,051 B1 | 10/2007 | Okano et al. |
| 7,289,964 B1 | 10/2007 | Bowman-Amuah |
| 7,293,074 B1 | 11/2007 | Jellinek et al. |
| 7,308,651 B2 | 12/2007 | Kling et al. |
| 7,315,826 B1 | 1/2008 | Guheen et al. |
| 7,317,907 B2 | 1/2008 | Linkert et al. |
| 7,328,341 B1 | 2/2008 | Eun et al. |
| 7,343,568 B2 | 3/2008 | Jiang et al. |
| 7,349,719 B2 | 3/2008 | Buniatyan |
| 7,356,559 B1 | 4/2008 | Jacobs et al. |
| 7,363,233 B1 | 4/2008 | Levine |
| 7,383,061 B1 | 6/2008 | Hawkins |
| 7,392,034 B2 | 6/2008 | Westman et al. |
| 7,415,486 B2 | 8/2008 | Multer |
| 7,440,746 B1 | 10/2008 | Swan |
| 7,447,743 B1 | 11/2008 | Jordan, Jr. |
| 7,454,500 B1 | 11/2008 | Hsu et al. |
| 7,499,888 B1 | 3/2009 | Tu et al. |
| 7,505,762 B2 | 3/2009 | Onyon et al. |
| 7,519,702 B1 | 4/2009 | Allan |
| 7,539,697 B1 | 5/2009 | Akella et al. |
| 7,587,398 B1 | 9/2009 | Fredricksen et al. |
| 7,596,609 B1 | 9/2009 | Refuah et al. |
| 7,643,824 B2 | 1/2010 | Onyon et al. |
| 7,663,652 B1 | 2/2010 | Reese |
| 7,707,150 B2 | 4/2010 | Sundararajan et al. |
| 7,853,664 B1 | 12/2010 | Wang et al. |
| 8,010,095 B2 | 8/2011 | Natsuno et al. |
| 8,073,954 B1 | 12/2011 | Tu et al. |
| 8,224,308 B1 | 7/2012 | Gavrylyako et al. |
| 2001/0014893 A1 | 8/2001 | Boothby |
| 2001/0044805 A1 | 11/2001 | Multer et al. |
| 2001/0047471 A1 | 11/2001 | Johnson |
| 2001/0051920 A1 | 12/2001 | Joao et al. |
| 2002/0007303 A1 | 1/2002 | Brookler et al. |
| 2002/0010868 A1 | 1/2002 | Nakashima et al. |

(56) References Cited

U.S. PATENT DOCUMENTS

| | | |
|---|---|---|
| 2002/0016818 A1 | 2/2002 | Kirani et al. |
| 2002/0016912 A1 | 2/2002 | Johnson |
| 2002/0032751 A1 | 3/2002 | Bharadwaj |
| 2002/0040369 A1 | 4/2002 | Multer et al. |
| 2002/0049852 A1 | 4/2002 | Lee et al. |
| 2002/0055909 A1 | 5/2002 | Fung et al. |
| 2002/0056011 A1 | 5/2002 | Nardone et al. |
| 2002/0059116 A1 | 5/2002 | Bulatovic et al. |
| 2002/0062365 A1 | 5/2002 | Nishikawa et al. |
| 2002/0067816 A1 | 6/2002 | Bushnell |
| 2002/0072350 A1 | 6/2002 | Fukuzato |
| 2002/0073212 A1 | 6/2002 | Sokol et al. |
| 2002/0078075 A1 | 6/2002 | Colson et al. |
| 2002/0082995 A1 | 6/2002 | Christie, IV |
| 2002/0083325 A1 | 6/2002 | Mediratta et al. |
| 2002/0087588 A1 | 7/2002 | McBride et al. |
| 2002/0091785 A1 | 7/2002 | Ohlenbusch et al. |
| 2002/0116444 A1 | 8/2002 | Chaudhri et al. |
| 2002/0120600 A1 | 8/2002 | Schiavone et al. |
| 2002/0128908 A1 | 9/2002 | Levin et al. |
| 2002/0138582 A1 | 9/2002 | Chandra et al. |
| 2002/0138765 A1 | 9/2002 | Fishman et al. |
| 2002/0162011 A1 | 10/2002 | Tanaka et al. |
| 2003/0021274 A1 | 1/2003 | Siikaniemi et al. |
| 2003/0028451 A1 | 2/2003 | Ananian |
| 2003/0028554 A1 | 2/2003 | Koskimies et al. |
| 2003/0037020 A1 | 2/2003 | Novak et al. |
| 2003/0061163 A1 | 3/2003 | Durfield |
| 2003/0065934 A1 | 4/2003 | Angelo et al. |
| 2003/0069874 A1 | 4/2003 | Hertzog et al. |
| 2003/0084121 A1 | 5/2003 | De Boor et al. |
| 2003/0093797 A1 | 5/2003 | Bazzaz |
| 2003/0115240 A1 | 6/2003 | Cho |
| 2003/0134625 A1 | 7/2003 | Choi |
| 2003/0135463 A1 | 7/2003 | Brown et al. |
| 2003/0139172 A1 | 7/2003 | Lampela et al. |
| 2003/0158831 A1 | 8/2003 | Zaremba |
| 2003/0172236 A1 | 9/2003 | Iyengar et al. |
| 2003/0204568 A1 | 10/2003 | Bhargava et al. |
| 2003/0208546 A1 | 11/2003 | Desalvo et al. |
| 2003/0224760 A1 | 12/2003 | Day |
| 2003/0229723 A1 | 12/2003 | Kangas et al. |
| 2003/0229898 A1 | 12/2003 | Babu et al. |
| 2003/0233383 A1 | 12/2003 | Koskimies |
| 2003/0236933 A1 | 12/2003 | Shigeta et al. |
| 2004/0003390 A1 | 1/2004 | Canter et al. |
| 2004/0054746 A1 | 3/2004 | Shibata |
| 2004/0093317 A1 | 5/2004 | Swan |
| 2004/0093342 A1 | 5/2004 | Arbo et al. |
| 2004/0093385 A1 | 5/2004 | Yamagata |
| 2004/0110497 A1 | 6/2004 | Little |
| 2004/0111465 A1 | 6/2004 | Chuang et al. |
| 2004/0120477 A1 | 6/2004 | Nguyen et al. |
| 2004/0128324 A1 | 7/2004 | Sheynman et al. |
| 2004/0132428 A1 | 7/2004 | Mulligan |
| 2004/0142711 A1 | 7/2004 | Mahonen et al. |
| 2004/0148408 A1 | 7/2004 | Nadarajah |
| 2004/0162830 A1 | 8/2004 | Shirwadkar et al. |
| 2004/0192260 A1 | 9/2004 | Sugimoto et al. |
| 2004/0192282 A1 | 9/2004 | Vasudevan |
| 2004/0193953 A1 | 9/2004 | Callahan et al. |
| 2004/0204120 A1 | 10/2004 | Jiles |
| 2004/0224665 A1 | 11/2004 | Kokubo |
| 2004/0224672 A1 | 11/2004 | Linkert et al. |
| 2004/0235523 A1 | 11/2004 | Schrire et al. |
| 2004/0267944 A1 | 12/2004 | Britt, Jr. |
| 2005/0021571 A1 | 1/2005 | East |
| 2005/0032527 A1 | 2/2005 | Sheha et al. |
| 2005/0038863 A1 | 2/2005 | Onyon et al. |
| 2005/0044404 A1 | 2/2005 | Bhansali et al. |
| 2005/0050117 A1 | 3/2005 | Seo et al. |
| 2005/0054354 A1 | 3/2005 | Roman et al. |
| 2005/0060392 A1 | 3/2005 | Goring et al. |
| 2005/0064859 A1 | 3/2005 | Kotzin et al. |
| 2005/0086296 A1 | 4/2005 | Chi et al. |
| 2005/0086318 A1 | 4/2005 | Aubault |
| 2005/0090253 A1 | 4/2005 | Kim et al. |
| 2005/0100150 A1 | 5/2005 | Dhara et al. |
| 2005/0102257 A1 | 5/2005 | Onyon et al. |
| 2005/0102328 A1 | 5/2005 | Ring et al. |
| 2005/0114470 A1 | 5/2005 | Bal |
| 2005/0131990 A1 | 6/2005 | Jewell |
| 2005/0191998 A1 | 9/2005 | Onyon et al. |
| 2005/0203971 A1 | 9/2005 | Koskimies et al. |
| 2005/0204001 A1 | 9/2005 | Stein et al. |
| 2005/0210101 A1 | 9/2005 | Janik |
| 2006/0021059 A1 | 1/2006 | Brown et al. |
| 2006/0035647 A1 | 2/2006 | Eisner et al. |
| 2006/0052091 A1 | 3/2006 | Onyon et al. |
| 2006/0129627 A1 | 6/2006 | Phillips et al. |
| 2006/0190626 A1 | 8/2006 | Bhogal et al. |
| 2006/0212482 A1 | 9/2006 | Celik |
| 2006/0288112 A1 | 12/2006 | Soelberg et al. |
| 2007/0005504 A1 | 1/2007 | Chen et al. |
| 2007/0043739 A1 | 2/2007 | Takai et al. |
| 2007/0050734 A1 | 3/2007 | Busey |
| 2007/0053335 A1 | 3/2007 | Onyon et al. |
| 2007/0056043 A1 | 3/2007 | Onyon et al. |
| 2007/0061331 A1 | 3/2007 | Ramer et al. |
| 2007/0082668 A1 | 4/2007 | Silver et al. |
| 2007/0094042 A1 | 4/2007 | Ramer et al. |
| 2007/0214149 A1 | 9/2007 | Bodin et al. |
| 2007/0226272 A1 | 9/2007 | Huang et al. |
| 2008/0009268 A1 | 1/2008 | Ramer et al. |
| 2008/0022220 A1 | 1/2008 | Cheah |
| 2008/0039020 A1 | 2/2008 | Eskin |
| 2008/0082421 A1 | 4/2008 | Onyon et al. |
| 2008/0089299 A1 | 4/2008 | Lindsley et al. |
| 2008/0104442 A1 | 5/2008 | Diao et al. |
| 2008/0127289 A1 | 5/2008 | Julia et al. |
| 2008/0201362 A1 | 8/2008 | Multer et al. |
| 2008/0208617 A1 | 8/2008 | Onyon et al. |
| 2008/0214163 A1 | 9/2008 | Onyon et al. |
| 2008/0268823 A1 | 10/2008 | Shalev et al. |
| 2008/0307345 A1 | 12/2008 | Hart et al. |
| 2009/0055464 A1 | 2/2009 | Multer et al. |
| 2009/0106110 A1 | 4/2009 | Stannard et al. |
| 2011/0107203 A1 | 5/2011 | Nash et al. |
| 2011/0269424 A1 | 11/2011 | Multer et al. |

FOREIGN PATENT DOCUMENTS

| | | |
|---|---|---|
| CN | 1455522 | 11/2003 |
| EP | 0801487 A2 | 10/1997 |
| EP | 0836131 A2 | 4/1998 |
| EP | 0836301 A1 | 4/1998 |
| EP | 0924917 A2 | 6/1999 |
| EP | 0930593 A1 | 7/1999 |
| EP | 0986225 A1 | 3/2000 |
| EP | 1024441 A2 | 8/2000 |
| EP | 1139608 A2 | 10/2001 |
| EP | 1180890 A2 | 2/2002 |
| EP | 1263244 A2 | 12/2002 |
| GB | 2366050 A | 2/2002 |
| JP | 7303146 A | 11/1995 |
| JP | 10-191453 | 7/1998 |
| JP | 11-242620 | 9/1999 |
| JP | 11-242677 | 9/1999 |
| JP | 2000-232680 A | 8/2000 |
| JP | 2000-316053 A | 11/2000 |
| JP | 2002-142254 A | 5/2002 |
| JP | 2002-185575 A | 6/2002 |
| JP | 2002-247144 A | 8/2002 |
| JP | 2002-314689 A | 10/2002 |
| JP | 2003-259011 A | 9/2003 |
| WO | WO 97/04391 | 2/1997 |
| WO | WO 97/39564 | 10/1997 |
| WO | WO 97/41520 | 11/1997 |
| WO | WO 98/03005 | 1/1998 |
| WO | WO 98/21648 | 5/1998 |
| WO | WO 98/29994 | 7/1998 |
| WO | WO 98/54662 | 12/1998 |
| WO | WO 98/56159 | 12/1998 |
| WO | WO 99/05813 | 2/1999 |

(56) References Cited

FOREIGN PATENT DOCUMENTS

| | | |
|---|---|---|
| WO | WO 99/06900 | 2/1999 |
| WO | WO 99/36870 | 7/1999 |
| WO | WO 99/40514 | 8/1999 |
| WO | WO 99/45451 | 9/1999 |
| WO | WO 99/45484 | 9/1999 |
| WO | WO 99/46701 | 9/1999 |
| WO | WO 99/50761 | 10/1999 |
| WO | WO 99/65256 | 12/1999 |
| WO | WO 00/11832 | 3/2000 |
| WO | WO 00/16222 | 3/2000 |
| WO | WO 00/29998 | 5/2000 |
| WO | WO 01/33874 | 5/2001 |
| WO | WO 01/71539 | 9/2001 |
| WO | WO 01/80535 | 10/2001 |
| WO | WO 02/17140 | 2/2002 |
| WO | WO 02/071219 | 9/2002 |
| WO | WO 03/056789 | 7/2003 |
| WO | WO 03/083716 | 10/2003 |
| WO | WO 2005/112586 | 12/2005 |

OTHER PUBLICATIONS

Agarwal et al., On the Scalability of Data Synchronization Protocols for PDAs and Mobile Devices, Jul. 2002, IEEE Network, pp. 22-28.
Anonymous, Download filter for MMS, Research Disclosure, Mason Publications, Hampshire, GB, May 2002, vol. 457, No. 28.
Batista et al., Mining Web Access Logs of an On-line Newspaper, A survey, SIGKKD Explorations, Jul. 2000, 8 pages.
Reed et al. Authenticating Network-Attached Storage. IEEE Jan.-Feb. 2000.
Business Wire, SyncML Announces 18 New Compliant Products, SyncML DM Engineering Event Held; 99 Devices No Certified SyncML Compliant, Press Release, Sep. 25, 2002.
BusinessWire, FusionOne Partners with WhitePages.com to Deliver Automatic Synchronization for Online Subscriber, press release, Oct. 11, 2000.
Chase, Taking Transactions Online, Target Marketing, Oct. 1998, pp. 124-132, vol. 21, No. 10.
Chinese Office Action dated Aug. 3, 2010 in Application No. 200580020480.7, 11 pages.
Office Action dated Nov. 28, 2011 in U.S. Appl. No. 12/037,609, filed Feb. 26, 2008, 27 pages.
Demaio, My MIPS Are Sealed, Chief Information Officer Journal, 1993, pp. 46-51, vol. 5, No. 7.
Final Office Action dated Mar. 9, 2010 in U.S. Appl. No. 11/437,554, 20 pages.
Office Action dated Jul. 8, 2010 in U.S. Appl. No. 11/437,553, 20 pages.
Advisory Action dated Jul. 8, 2009 in U.S. Appl. No. 11/437,554, 2 pages.
Non-final Office Action dated Sep. 22, 2009 in U.S. Appl. No. 11/437,554, 17 pages.
Final Office Action dated Dec. 13, 2011 in U.S. Appl. No. 11/906,586, filed Oct. 2, 2007.
Final Office Action dated Mar. 27, 2012 in U.S. Appl. No. 12/037,609, filed Feb. 26, 2008, 27 pages.
Finnigan, The Safe Way to Shop Online, Good Housekeeping, 1998, p. 162, vol. 227, No. 3.
FusionOne, FusionOne Unveils Integrated Carrier Product Suite to Deliver Mobility Solutions to Individuals and the Enterprise, Press Release, Mar. 18, 2002, 3 pages.
FusionOne, FusionOne Unveils Mighty Phone.TM.Wireless Service, Press Release, Nov. 18, 2002, 3 pages.
Gaskin, Messaging-Instant Enterprise—Once a Novelty item, IM is Becoming a More Serious Tool for Business Users, InternetWeek, 2000, p. 55, No. 810.
Gong, Increasing Availability and Security of an Authentication Service, IEEE Journal on Selected Areas in Communications, 1993, pp. 657-662, vol. 11, No. 5.
Intellisync Email Accelerator, A detailed guide to functionality-Product functionality paper, 2004, pp. 1-18.

Internate Mail Consortium, vCard The Electronic Business Card, downloaded from www.imc.org/pdi/vcardwhite.html on Jan. 1, 1997.
Internate Mail Consortium, vCard Overview, downloaded from www.imc.org/pdi/vcardoverview.html on Oct. 13, 1998.
Internate Mail Consortium, vCard The Electronic Business Card, downloaded from www.imc.org/pdi/vcardwhite.html on Jan. 1, 1997.
Internet Mail Consortium, vCard Overview, downloaded from www.imc.org/pdi/vcardoverview on Oct. 13, 1998, 3 pages.
Internet Mail Consortium, vCard The Electronic Business Card, downloaded from www.imc.org/pdi/vcardwhite.html on Jan. 1, 1997, 5 pages.
Japanese Office Action dated Nov. 1, 2010 in Application No. 2007-513357, pp. 4-7.
Jennings, SyncML DM: A SyncML Protocol for Device Management, slide presentation, downloaded from www.openalliance.org/tech/affiliates/syncml/syncmldm.sub.—28jan02.sub.—James.sub.—jenninqs.pdf, Jan. 28, 2002, 23 pages.
Korean Office Action dated May 24, 2011 in Korean Application No. 10-2006-7020060, including English translation, 6 pages.
Lamb et al., LAN-Based Office for the Enterprise, A Case Study, IEEE, 1994, pp. 440-447.
Lee et al. Monitoring Data Archives for Grid Environments, 11th IEEE symposium on high performance distributed computing, 2002, pp. 1-10.
Office Action dated May 19, 2011 in European Application No. 05748340.6, 6 pages.
Notice of allowance dated Apr. 8, 2008 in U.S. Appl. No. 10/659,646, filed Sep. 10, 2003.
Malone et al. Semi-Structured Messages are Surprisingly Useful for Computer-Supported Coordination, Proceedings of the Conference on Computer-Supported Cooperative Work, 1986, pp. 1-26.
Non-final Office Action dated Jun. 8, 2010 in U.S. Appl. No. 12/037,609, 33 pages.
Office Action dated Jul. 20, 2011 in U.S. Appl. No. 12/037,609, 24 pages.
Office Action dated Feb. 15, 2011 in U.S. Appl. No. 12/037,609, 26 pages.
Office Action dated Nov. 9, 2010 in U.S. Appl. No. 12/037,609, 37 pages.
Non-final Office Action dated Sep. 13, 2011 in U.S. Appl. No. 12/319,087, filed Dec. 30, 2008.
Office Action dated Oct. 9, 2012 in U.S. Appl. No. 13/479,216, filed May 23 2012.
Office Action dated Feb. 7, 2008 in U.S. Appl. No. 09/753,537, filed Jan. 2, 2001.
SyncML Intensive, downloaded from www-128.ibm.com/developerworks/wireless/library/we-syncm12 on Apr. 1, 2002.
Patel et al. The Multimedia Fax-MIME Gateway, IEEE MultiMedia, 1994, vol. 8440, No. 4, 7 pages.
Reed et al. Authenticating Network-Attached Storage, IEEE, 2000, pp. 49-57.
Response to Non-Final Office Action dated Dec. 14, 2007 in U.S. Appl. No. 10/659,646, filed Sep. 10, 2003.
Response to Office Action dated Jan. 28, 2008 in U.S. Appl. No. 09/753,537, filed Jan. 2, 2001.
Rou et al. Online File Storage System, 2002 Student Conference on Research and Development Proceedings, IEEE, 2002, pp. 83-86.
Secure Hash Algorithm, Wikipedia, downloaded from http://en.wikipedia.org/wiki/Secure_Hash_Algorithm on Feb. 28, 2012.
Specification and Drawings of U.U. Provisional dated Aug. 8, 2003 in U.S. Appl. No. 60/493,704.
Starfish, TrueSync Data Synchronization, Software, downloaded from http://www.starfishsoftware.com/solutions/data/data.html on Jan. 2003.
Torio, The SyncML Road Ahead—Application Development and Device Management, slide presentation, downloaded from www.openalliance.org/tech/affiliates/syncml/syncmldm.sub.—30jan02.sub.—teemu.sub.—Toroi.pdf on Jan. 30, 2002.
Office Action dated Dec. 26, 2008 in Chinese Application No. 2005800099497, pp. 1-7.

(56) References Cited

OTHER PUBLICATIONS

Supplementary Search Report dated Jan. 7, 2010 in Application No. EP 08724873, 13 pages.

* cited by examiner

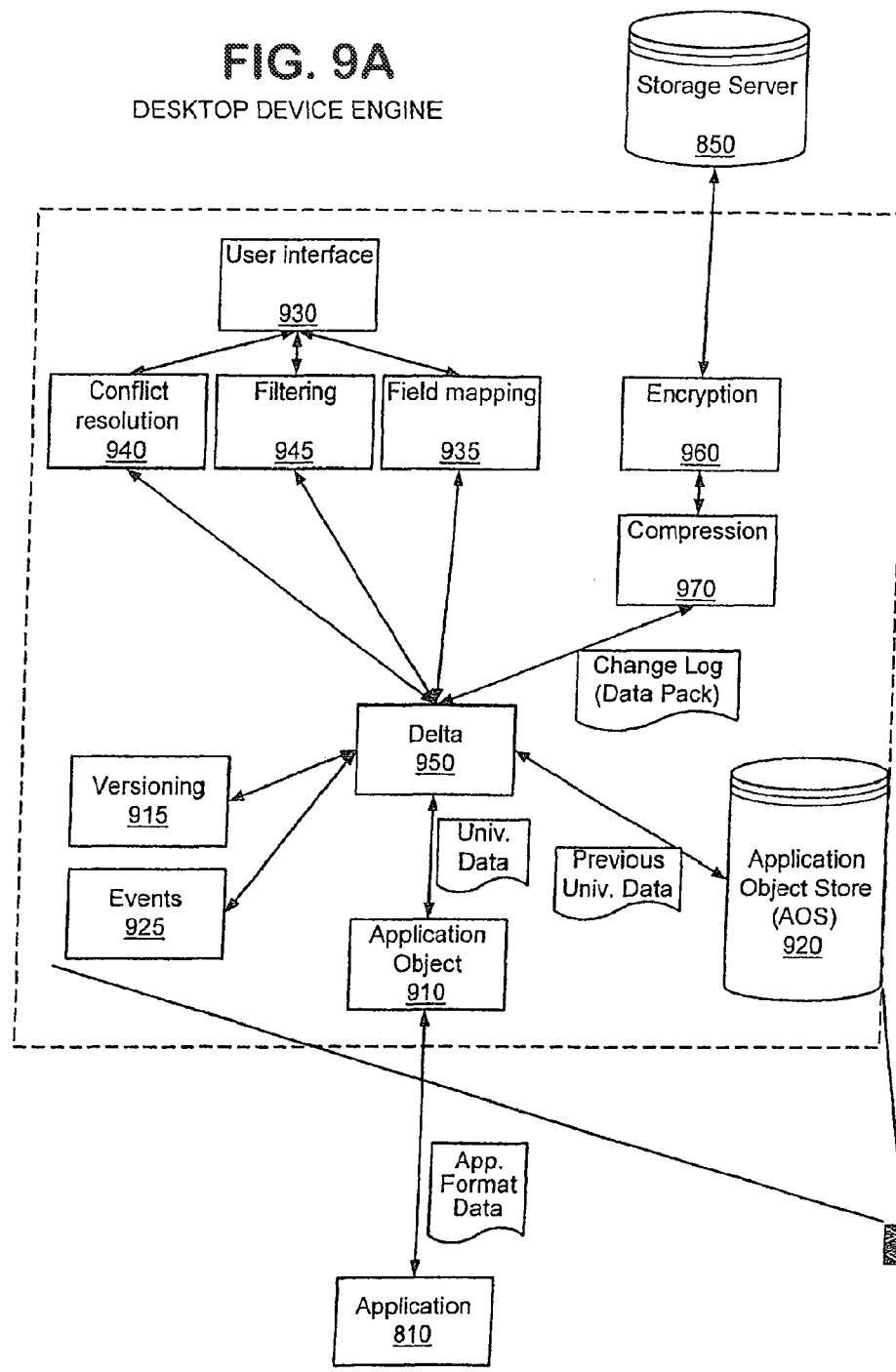

DEVICE ENGINE / WINDOWS

OBJECT HIERARCHY

| Note Item 1310 | Email Item 1320 | Task Item 1330 |
|---|---|---|
| Note Object<br>Categories<br>Color<br>Created<br>Do Not AutoArchive<br>Icon<br>In Folder<br>Message Class<br>Modified<br>Outlook Internal Version<br>Outlook Version<br>Read<br>Size<br>Subject | Account<br>Attachment<br>Bcc<br>Billing Information<br>Categories<br>Cc<br>Changed By<br>Conversation<br>Created<br>Defer Until<br>Do Not AutoArchive<br>Download State<br>Due By<br>Expires<br>Flag Status<br>Follow Up Flag<br>From<br>Have Replies<br>Sent To<br>Icon<br>Importance<br>In Folder<br>Junk E-mail Type<br>Message Class<br>Mileage<br>Modified<br>Outlook Internal Version<br>Outlook Version<br>Read<br>Received<br>Remote Status<br>Retrieval Time<br>Sensitivity<br>Sent<br>Size<br>Subject<br>To<br>Tracking Status | % Complete<br>Actual Work<br>Assigned<br>Attachment<br>Billing Information<br>Categories<br>Company<br>Complete<br>Contacts<br>Conversation<br>Created<br>Date Completed<br>Do Not AutoArchive<br>Due Date<br>Icon<br>In Folder<br>Message Class<br>Mileage<br>Modified<br>Outlook Internal Version<br>Outlook Version<br>Owner<br>Priority<br>Read<br>Recurring<br>Reminder<br>Reminder Override Default<br>Reminder Sound<br>Reminder Sound File<br>Reminder Time<br>Request Status<br>Requested By<br>Role<br>Schedule+ Priority<br>Sensitivity<br>Size<br>Start Date<br>Status<br>Subject<br>Team Task<br>To<br>Total Work |

FIG. 13 PART 1

FIG. 13

| Part 1 | Part 2 | Part 3 |

FIG. 13 PART 2

Calendar Item 1340

All Day Event
Attachment
Billing
Information
Categories
Conversation
Created
Do Not
AutoArchive
Duration
End
Icon
Importance
In Folder
Location
Meeting Status
Message Class
Mileage
Modified
Optional
Attendees
Organizer
Outlook Internal
Version
Outlook Version
Read
Recurrence
Recurrence
Pattern
Recurrence
Range End
Recurrence
Range Start
Recurring
Remind
Beforehand
Reminder
Reminder
Override Default
Reminder Sound
Reminder Sound
File
Required
Attendees
Resources
Response
Requested
Sensitivity
Show Time As
Size
Start
Subject

Bookmark Item 1350

Name
URL
Created
Modified
Icon
In Folder
Version
Size

Channel Item 1370

Name
URL
Created
Modified
Icon
In Folder
Version
Size

File Item 1360

Name
Type
Version
Size
Created
Modified
Accessed
Permissions
Parent
ID
Attributes
Icon
Shortcut key
Start in
Run type
Sharing

Folder Item 1380

Name
Type
Version
Size
Created
Modified
Accessed
Permissions
Parent
ID
Attributes
Icon
Sharing

| Contact Item 1390 | | |
|---|---|---|
| Account<br>Address Selected<br>Address Selector<br>Anniversary<br>Assistant's Name<br>Assistant's Phone<br>Attachment<br>Billing Information<br>Birthday<br>Business Address<br>Business Address City<br>Business Address Country<br>Business Address PO Box<br>Business Address Postal Code<br>Business Address State<br>Business Address Street<br>Business Fax<br>Business Home Page<br>Business Phone<br>Business Phone 2<br>Callback<br>Car Phone<br>Categories<br>Children<br>City<br>Company<br>Company Main Phone<br>Computer Network Name<br>Country<br>Created<br>Customer ID<br>Department<br>E-mail<br>E-mail 2<br>E-mail 3<br>E-mail Selected<br>E-mail Selector<br>File As<br>First Name<br>Flag Status<br>Follow Up Flag<br>FTP Site | Full Name<br>Gender<br>Government ID Number<br>Hobbies<br>Home Address<br>Home Address City<br>Home Address Country<br>Home Address PO Box<br>Home Address Postal Code<br>Home Address State<br>Home Address Street<br>Home Fax<br>Home Phone<br>Home Phone 2<br>Icon<br>In Folder<br>Initials<br>Internet Free/Busy Address<br>ISDN<br>Job Title<br>Journal<br>Language<br>Last Name<br>Location<br>Mailing Address<br>Mailing Address Indicator<br>Manager's Name<br>Message Class<br>Middle Name<br>Mileage<br>Mobile Phone<br>Modified<br>Nickname<br>Office Location<br>Organizational ID Number<br>Other Address<br>Other Address City<br>Other Address Country<br>Other Address PO Box<br>Other Address Postal Code<br>Other Address State<br>Other Address Street<br>Other Fax | Other Phone<br>Outlook Internal Version<br>Outlook Version<br>Pager<br>Personal Home Page<br>Phone 1 Selected<br>Phone 1 Selector<br>Phone 2 Selected<br>Phone 2 Selector<br>Phone 3 Selected<br>Phone 3 Selector<br>Phone 4 Selected<br>Phone 4 Selector<br>Phone 5 Selected<br>Phone 5 Selector<br>Phone 6 Selected<br>Phone 6 Selector<br>Phone 7 Selected<br>Phone 7 Selector<br>Phone 8 Selected<br>Phone 8 Selector<br>PO Box<br>Primary Phone<br>Private<br>Profession<br>Radio Phone<br>Read<br>Referred By<br>Reminder<br>Reminder Time<br>Reminder Topic<br>Send Plain Text Only<br>Sensitivity<br>Size<br>Spouse<br>State<br>Street Address<br>Subject<br>Suffix<br>Telex<br>Title<br>TTY/TDD Phone<br>User Field 1<br>User Field 2<br>User Field 3<br>User Field 4<br>Web Page.<br>ZIP/Postal Code |

FIG. 13 PART 3

PULL SYNCHRONIZATION

PUSH SYNCHRONIZATION

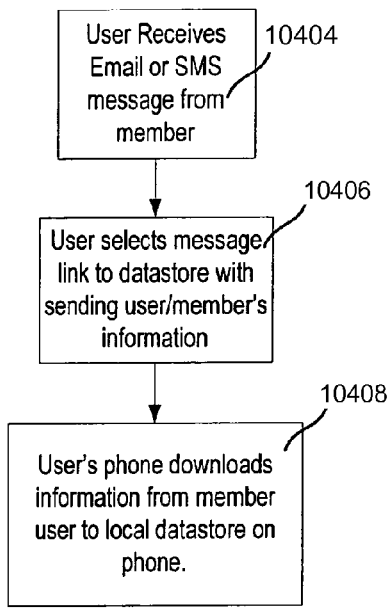

FIG. 22

User Receives Email or SMS message from member — 10404

↓

User selects message/link to datastore with sending user/member's information — 10406

↓

User's phone downloads information from member user to local datastore on phone. — 10408

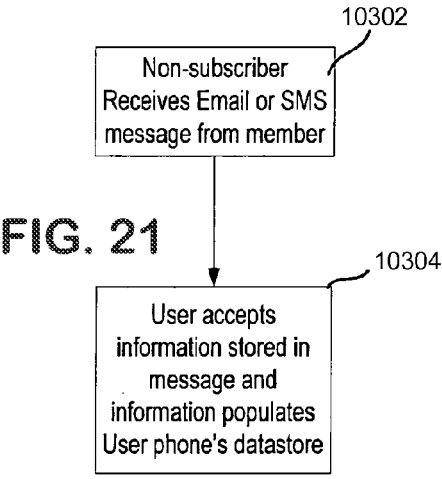

FIG. 21

Non-subscriber Receives Email or SMS message from member — 10302

↓

User accepts information stored in message and information populates User phone's datastore — 10304

FIG. 23

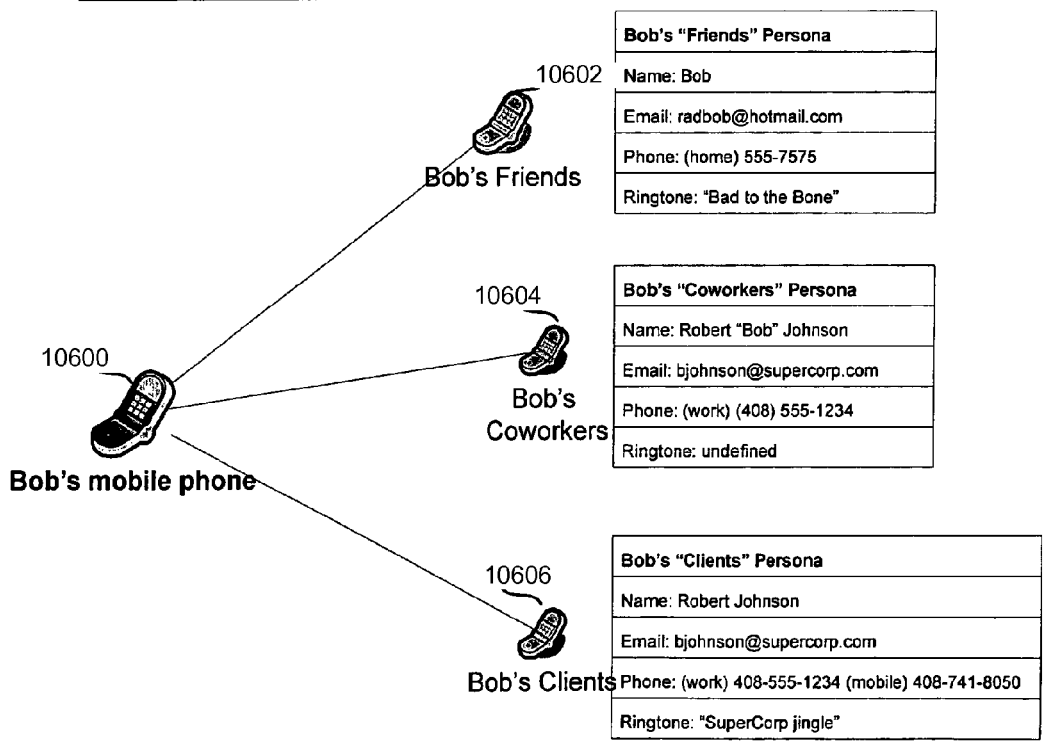

| Bob's "Friends" Persona |
|---|
| Name: Bob |
| Email: radbob@hotmail.com |
| Phone: (home) 555-7575 |
| Ringtone: "Bad to the Bone" |

| Bob's "Coworkers" Persona |
|---|
| Name: Robert "Bob" Johnson |
| Email: bjohnson@supercorp.com |
| Phone: (work) (408) 555-1234 |
| Ringtone: undefined |

| Bob's "Clients" Persona |
|---|
| Name: Robert Johnson |
| Email: bjohnson@supercorp.com |
| Phone: (work) 408-555-1234 (mobile) 408-741-8050 |
| Ringtone: "SuperCorp jingle" |

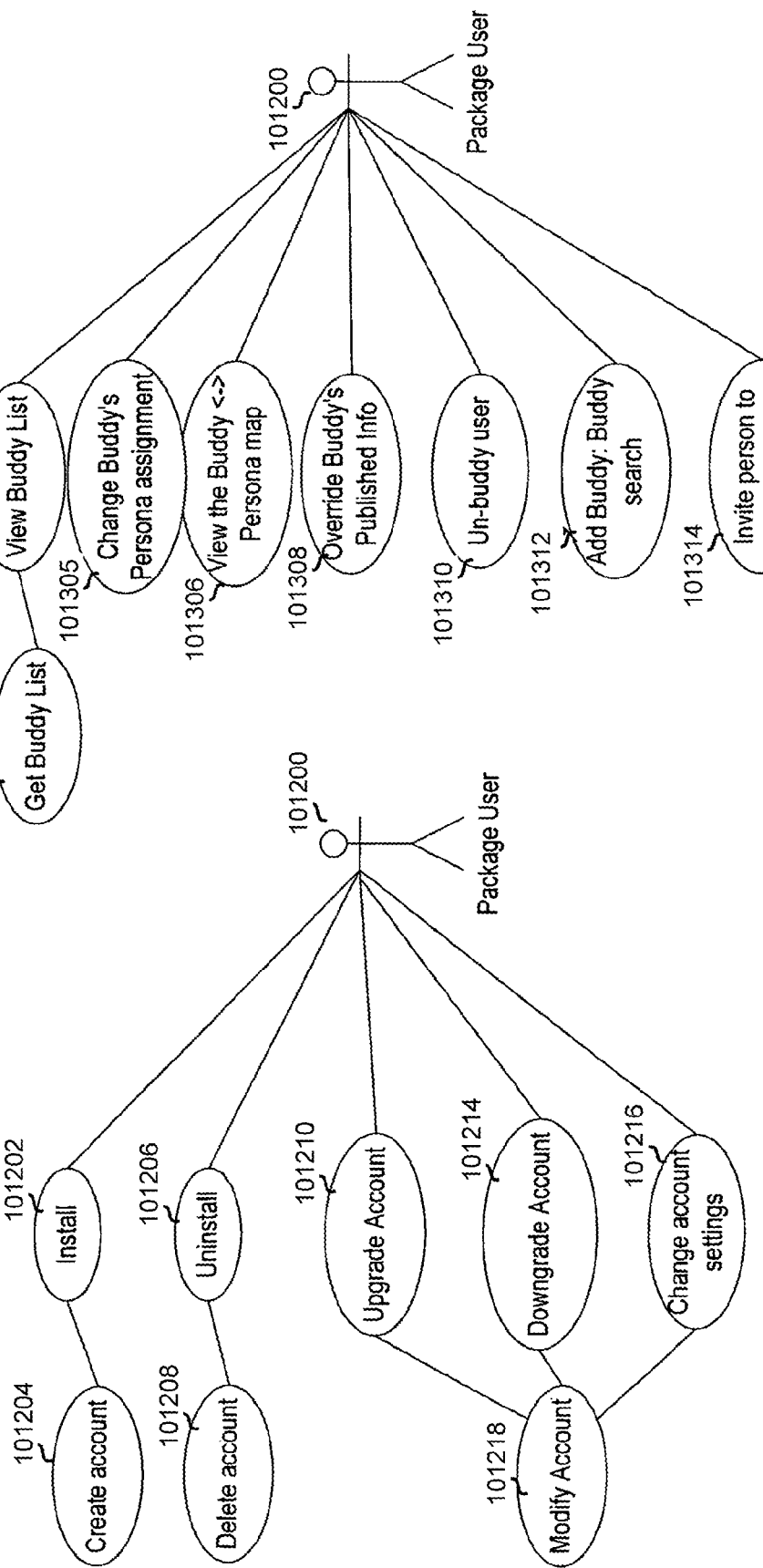

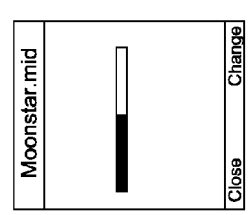
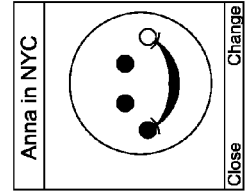
FIG. 37B, FIG. 37C, FIG. 37D, FIG. 37E, FIG. 37F, FIG. 37G, FIG. 37H, FIG. 37I, FIG. 37J, FIG. 37K, FIG. 37L, FIG. 37M

FIG. 38B

| Personas | 102130 |
|---|---|
| Default | |
| Friends | |
| Co-worker | |
| Family | |
| Girlfriend | |
| Blocked caller | |
| Options ▸ | Back |

FIG. 38C

| Personas |
|---|
| Default |
| Friends |
| 1 Open |
| 2 New |
| 3 Edit |
| 4 Delete |
| Close |

FIG. 38D

| Default (12) |
|---|
| ▪ Default |
| 🎵 F1 Logo |
| 🎵 moonster.mid |
| 👤 Richard M. Onyon |
| 📞 408-2221234 |
| 📞 408-2221235 |
| View ▸ Back |

FIG. 38E

| Persona Name |
|---|
| Default |
| |
| ▪ Press "Assigned" to view a list of assigned contacts with this Persona. |
| |
| OK Assigned |

FIG. 38F

| Contacts |
|---|
| 👤 Anna Kay |
| 👤 Andrew Hogg |
| 👤 Bill G |
| 👤 Jason Burns |
| 👤 Rebecca Zhu |
| 👤 Steven Taylor |
| Open ▸ Back |

FIG. 38G

| None |
|---|
| ▪ None |
| 🎵 None |
| 👤 None |
| 📞 408-2221234 |
| Add ▸ Back |

FIG. 38H

| Persona Name |
|---|
| Alumni |
| |
| |
| |
| Multitap Cancel |

FIG. 38I

| Text |
|---|
| 1 Multitap |
| 2 Numbers |
| 3 T9Word |
| 4 Symbols |
| |
| Close |

FIG. 38J

| Alumni |
|---|
| ▪ Alumni |
| 🎵 None |
| 👤 None |
| 📞 408-2221234 |
| Add ▸ Back |

FIG. 38K

| ‹ On Phone › |
|---|
| ▪ None |
| ▪ Bird |
| ▪ golf |
| ▪ monkey |
| ▪ poppy |
| ▪ sky |
| Select ▸ Cancel |

FIG. 38L

‹ Bird ›

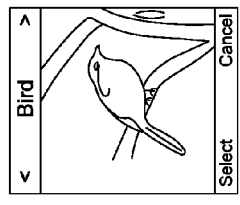

Select Cancel

FIG. 38M

| ‹ On Phone › |
|---|
| 🎵 None |
| 🎵 Moonstar |
| 🎵 oldfashionphone |
| 🎵 melody01 |
| 🎵 melody02 |
| 🎵 melody03 |
| Select ▸ Cancel |

FIG. 38N

| Delete Persona |
|---|
| Are you sure you want to delete "Default" persona? |
| Yes No |

FIG. 41

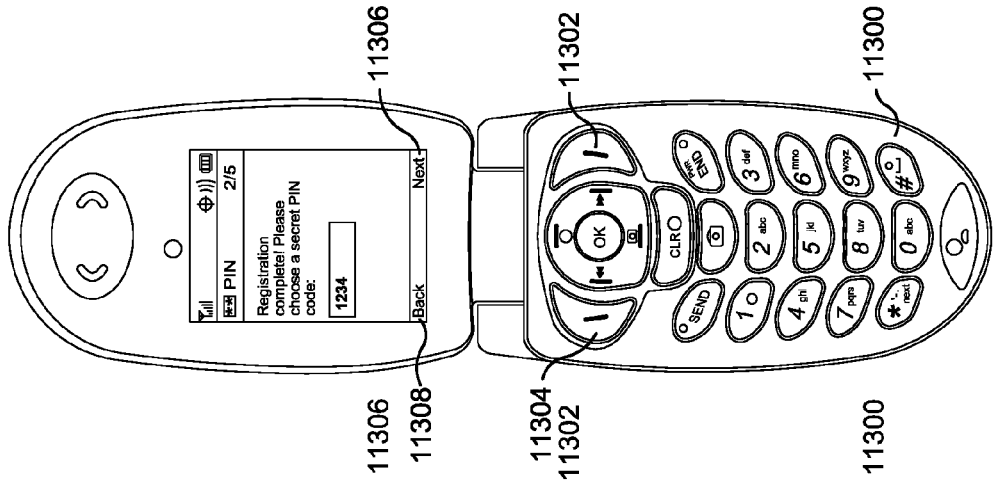
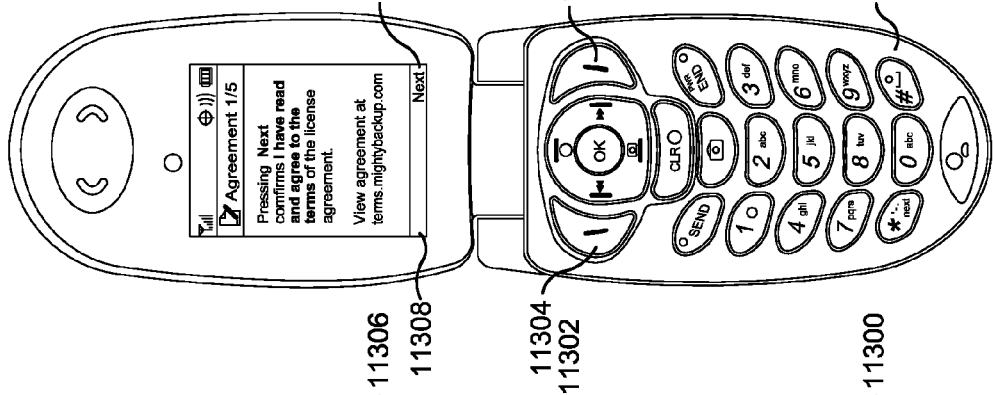
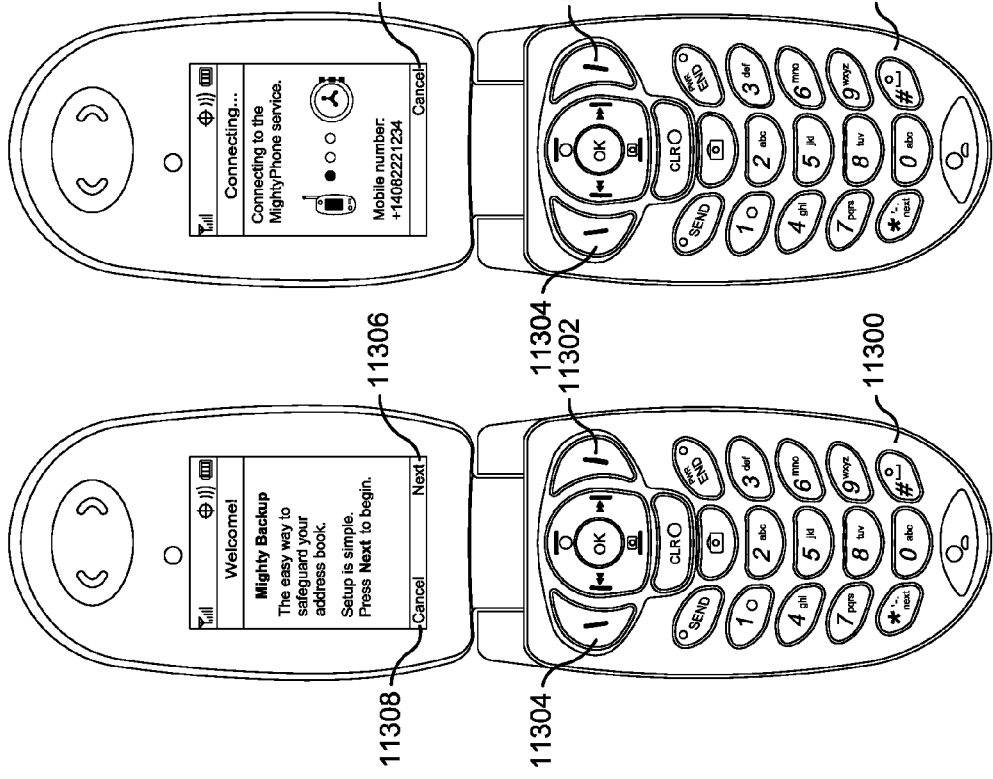

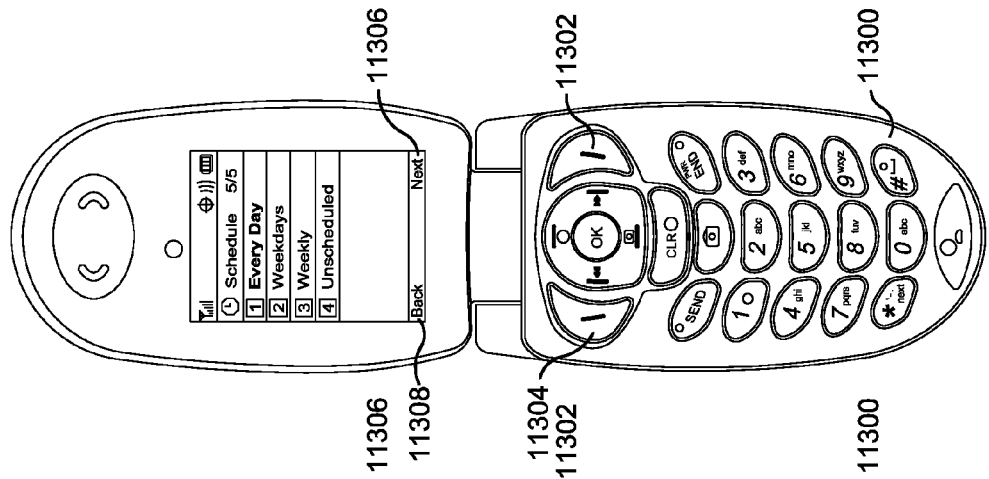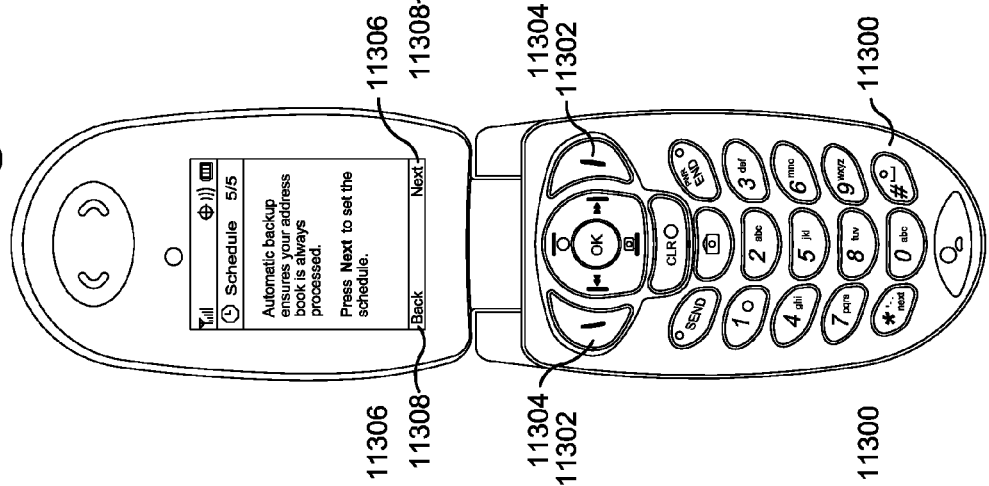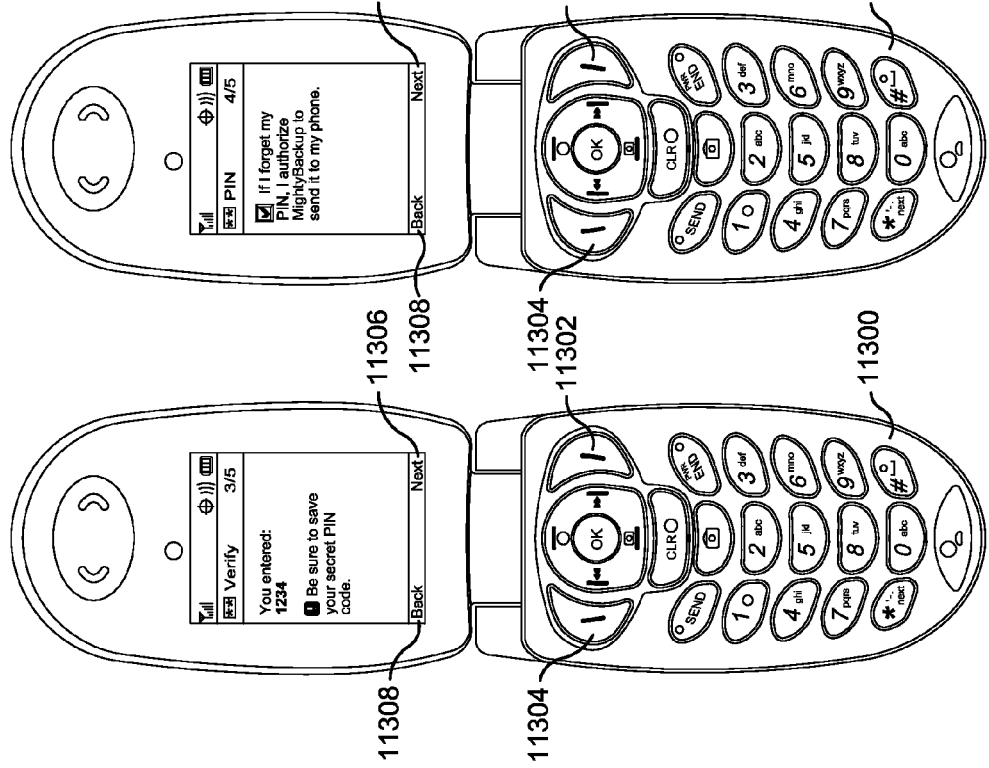

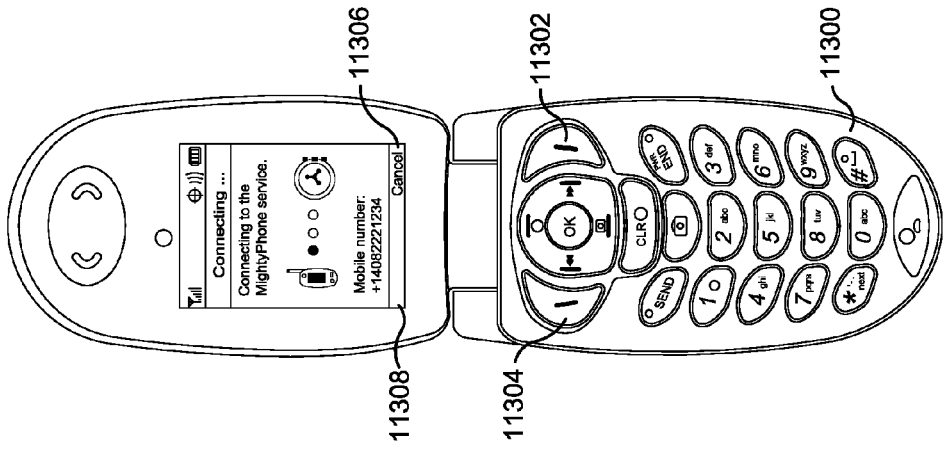
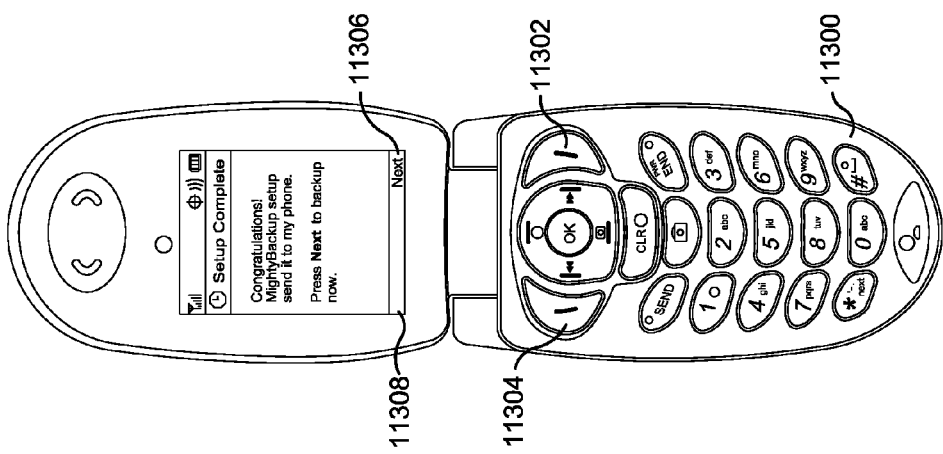
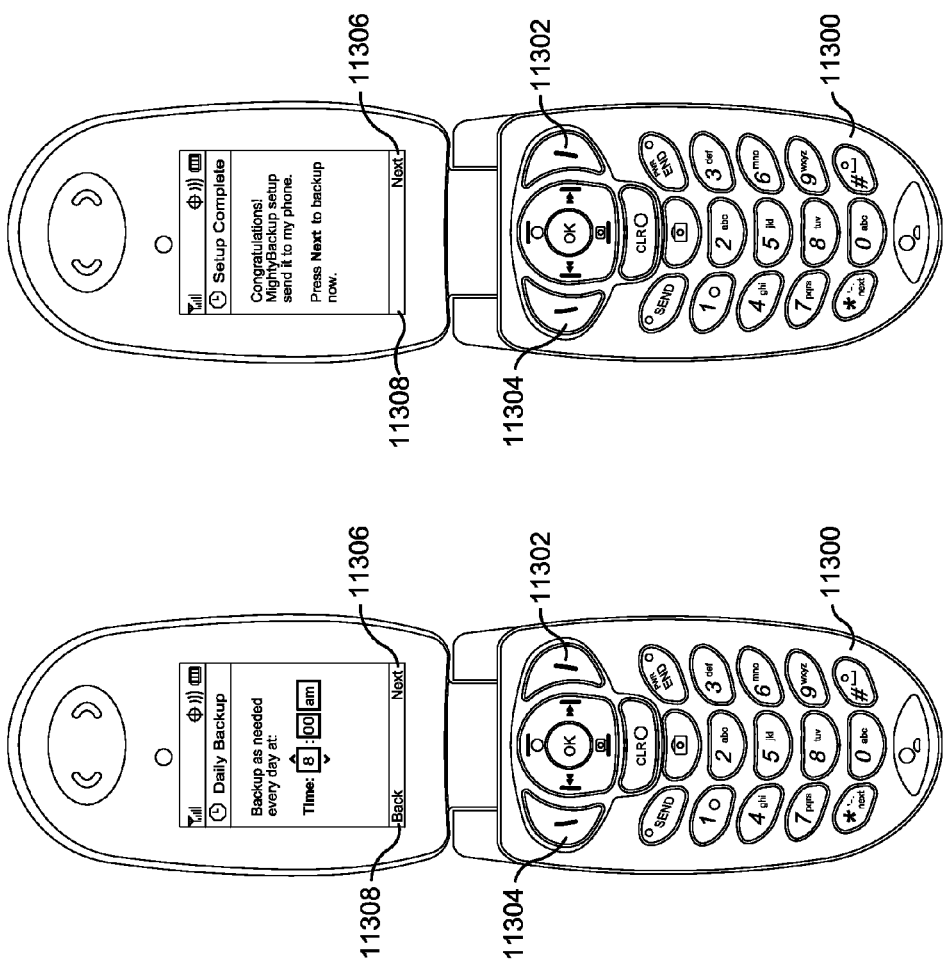

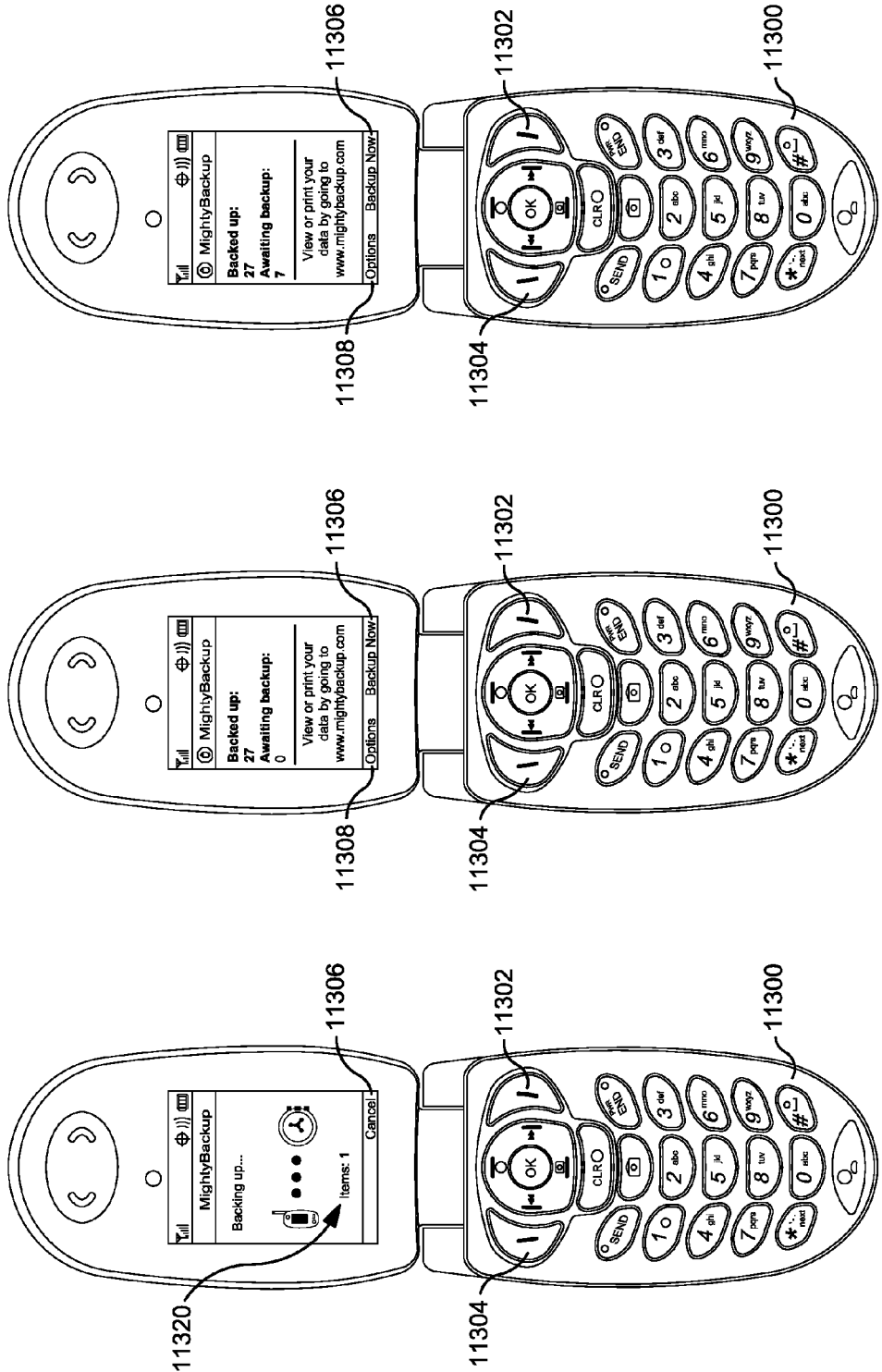

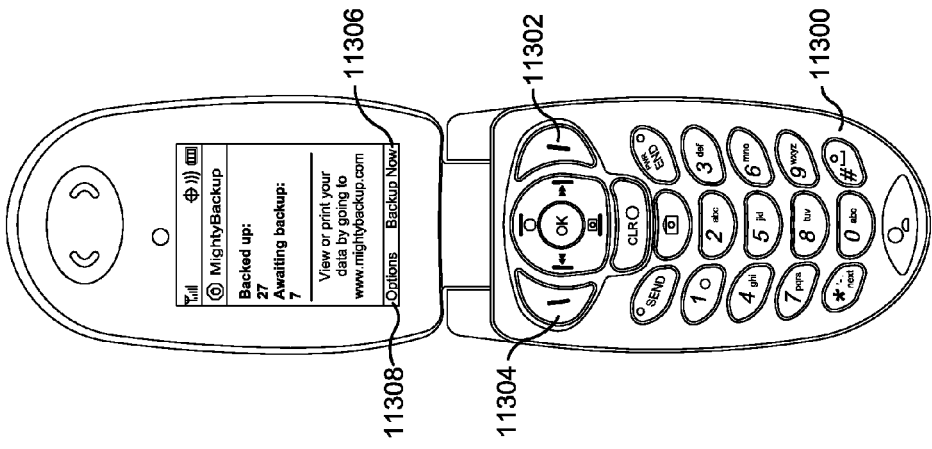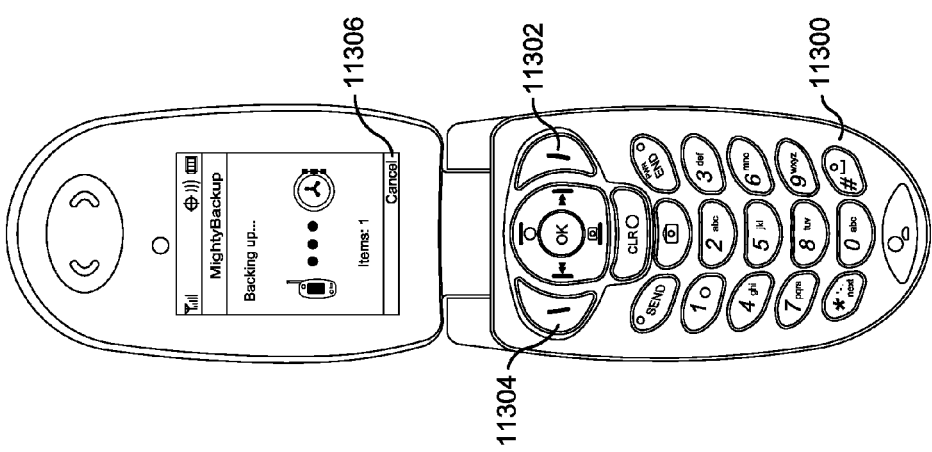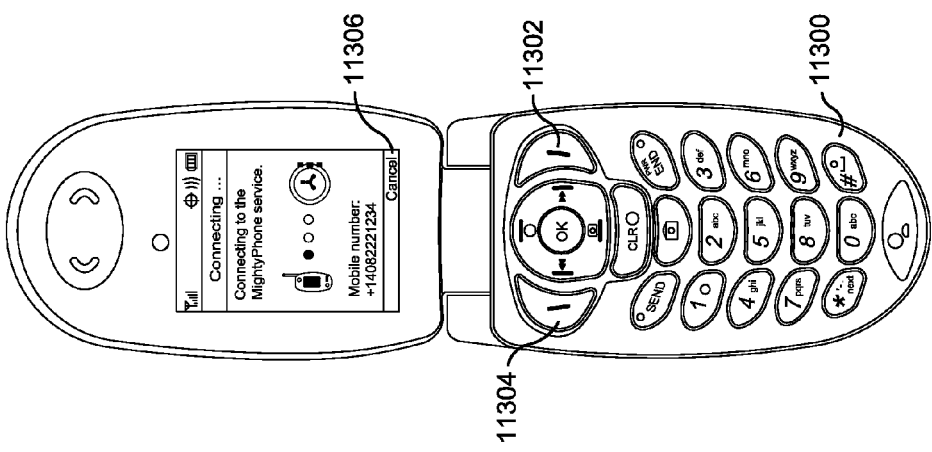

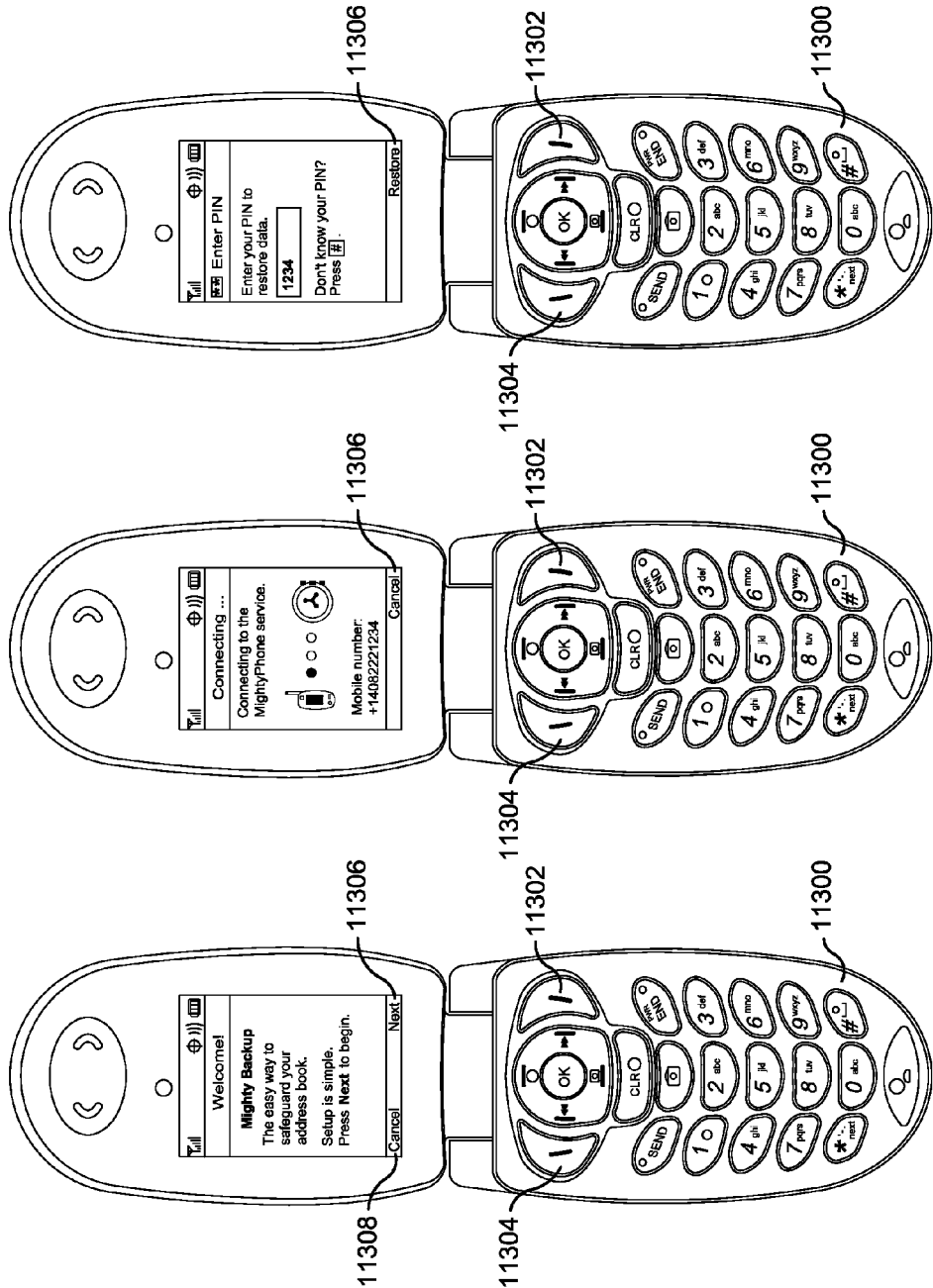

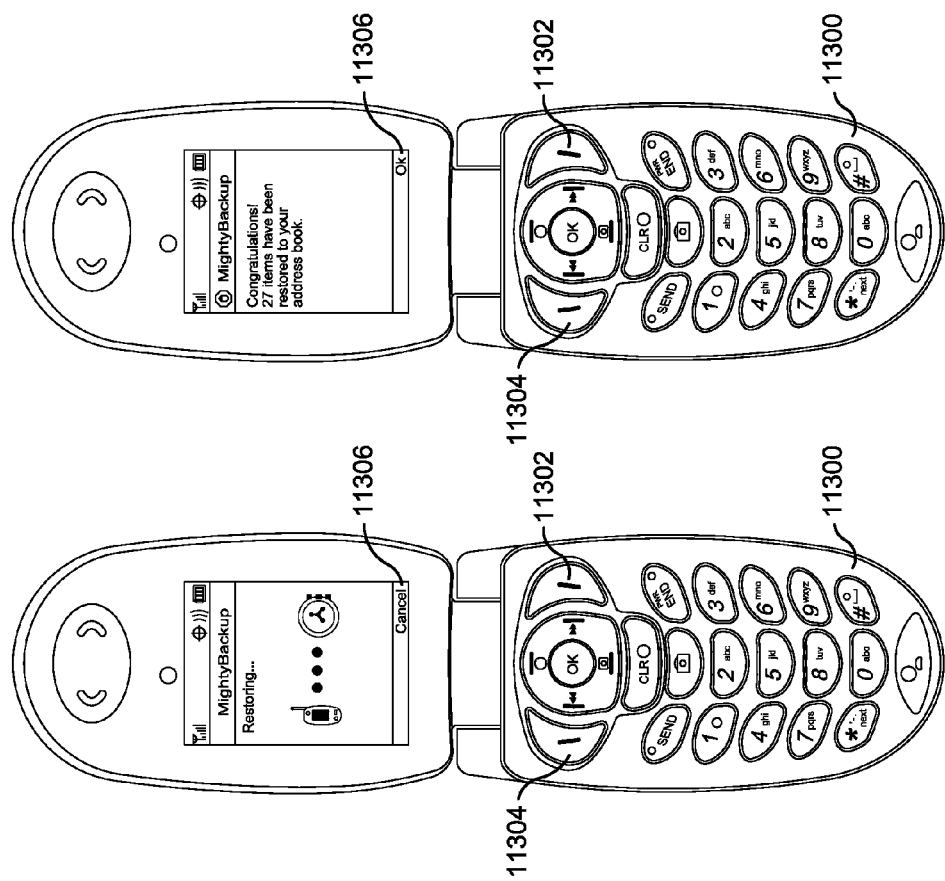

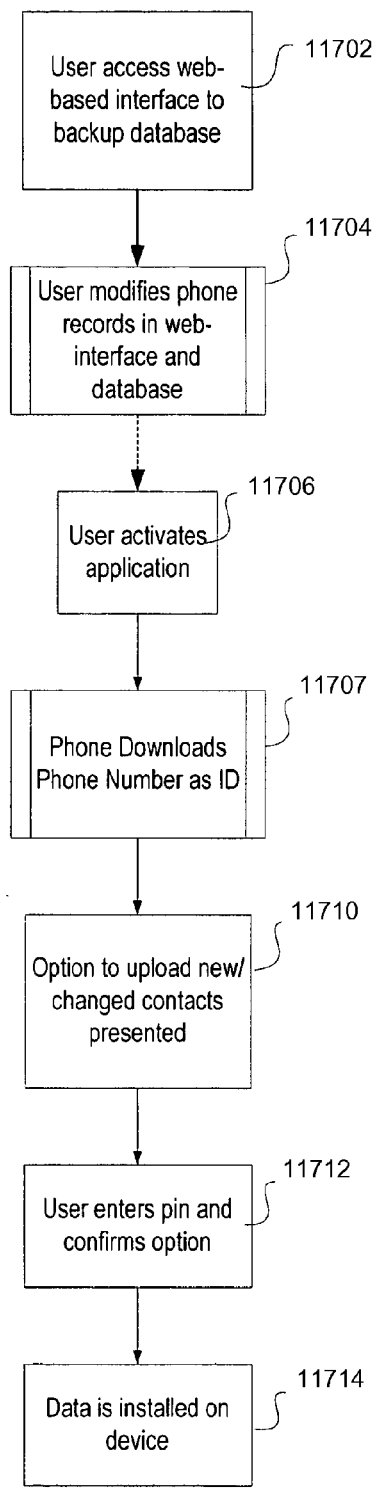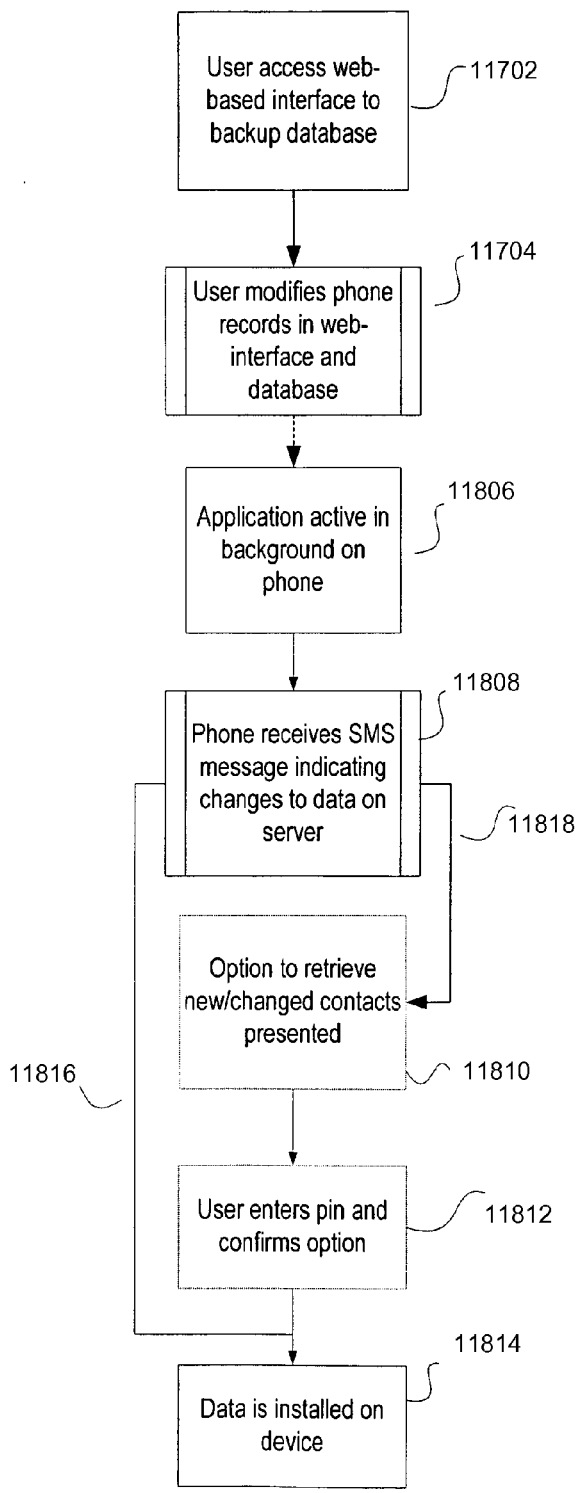

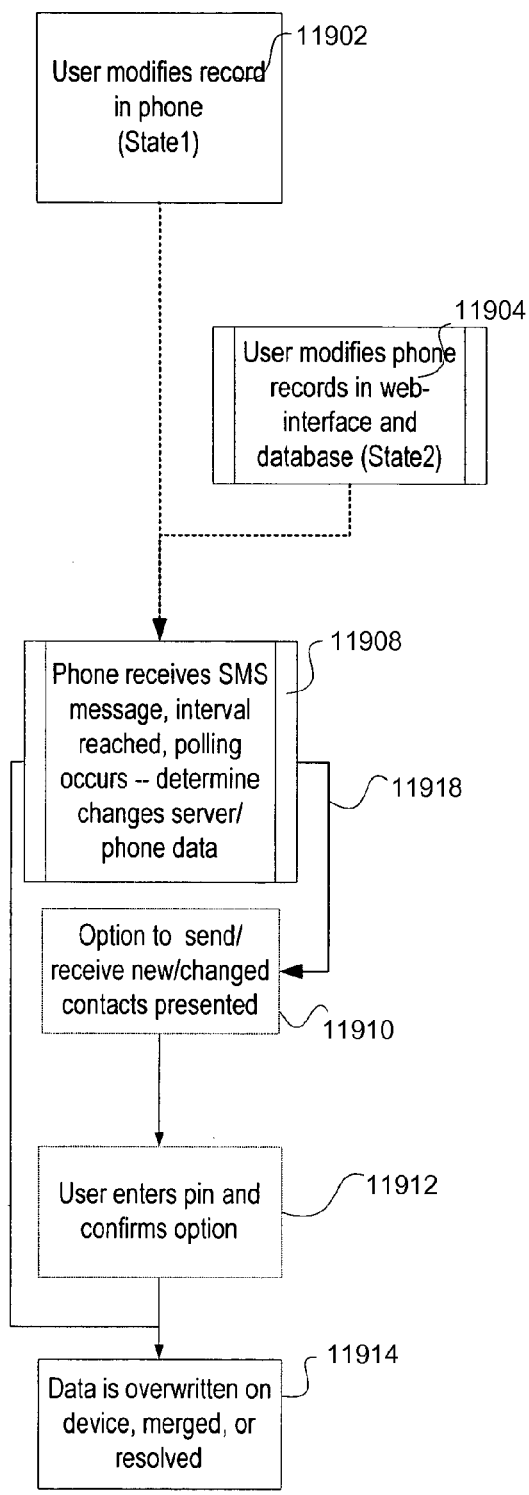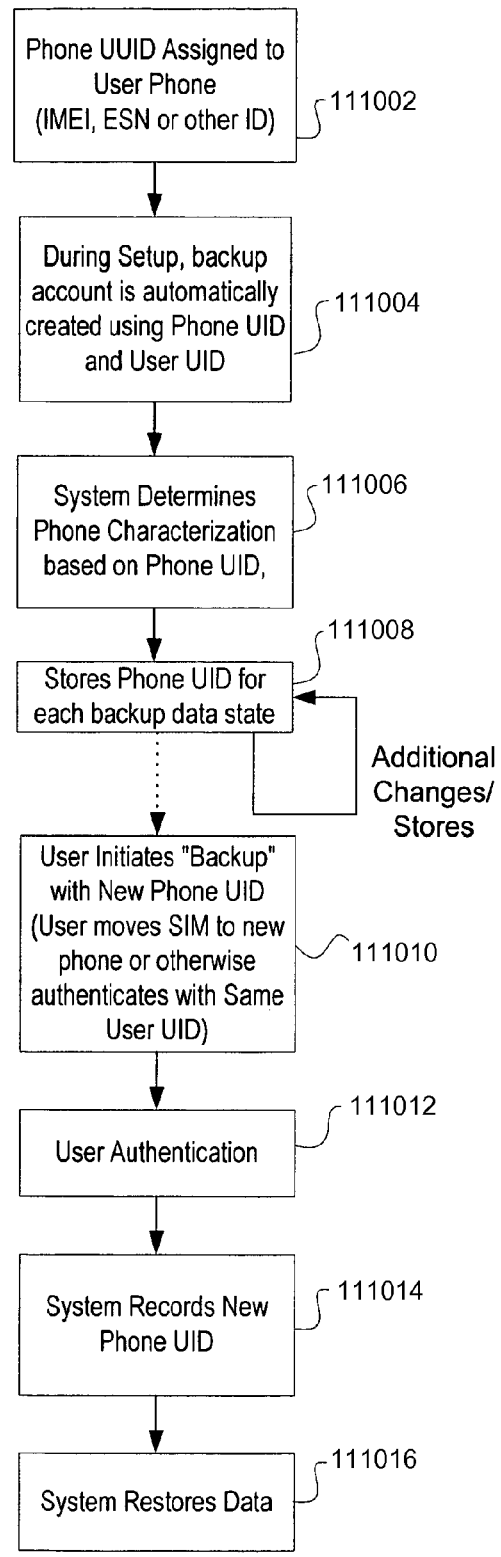

MOBILE DATA TRANSFER AND SYNCHRONIZATION SYSTEM

CROSS-REFERENCE TO RELATED APPLICATIONS

This application is a Continuation of U.S. patent application Ser. No. 12/228,978 filed Aug. 18, 2008 (published as U.S. Application Publication No. 2009-0055464), which is a Continuation of U.S. patent application Ser. No. 10/659,646 filed Sep. 10, 2003 (now U.S. Pat. No. 7,415,486), which is a Continuation of U.S. patent application Ser. No. 09/491,694 filed Jan. 26, 2000 (now U.S. Pat. No. 6,671,757).

This application is also a Continuation of U.S. patent application Ser. No. 11/128,121 filed May 12, 2005 (published as U.S. Application Publication No. 2006-0052091), which claims the benefit of U.S. Provisional Application Ser. No. 60/570,409 filed May 12, 2004.

This application is also a Continuation of U.S. patent application Ser. No. 09/753,537 filed Jan. 2, 2001 (published as U.S. Application Publication No. 2002-0040369), now abandoned, which is a Continuation of U.S. patent application Ser. No. 09/490,550 filed Jan. 25, 2000 (now U.S. Pat. No. 6,694,336).

This application is also a Continuation of U.S. patent application Ser. No. 12/286,040 filed Sep. 26, 2008 (published as U.S. Application No. 2009-0106110), which (i) claims the benefit of U.S. Provisional Application Ser. No. 60/995,789 filed Sep. 28, 2007, (ii) is a Continuation in Part of U.S. patent application Ser. No. 12/151,440 filed May 6, 2008 (now U.S. Pat. No. 7,643,824), which is a Continuation of U.S. patent application Ser. No. 10/789,816 filed Feb. 27, 2004 (now U.S. Pat. No. 7,505,762), and (iii) is a Continuation in Part of U.S. patent application Ser. No. 12/011,399 filed Jan. 25, 2008 (published as U.S. Application No. 2008-0214163), which claims the benefit of both U.S. Provisional Application Ser. No. 60/937,314 filed Jun. 26, 2007, and U.S. Provisional Application Ser. No. 60/897,789 filed Jan. 26, 2007.

All of these applications are incorporated herein by reference in their entireties.

COPYRIGHT AUTHORIZATION

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The invention relates to the transference of data between two systems independent of the form in which the data is kept on the respective systems, and in particular to providing an efficient means of communicating data between systems and devices.

The invention further relates to a system for allowing users to provide other individuals with a personalized representation of the user in a network environment, such as a cellular telephone network.

The invention relates to the backup and restoration of data stored in a wireless telephone, and in particular a mobile telephone having data storage capabilities.

2. Description of the Related Art

The growth of computing-related devices has not been limited to personal computers or work stations. The number of personal computing devices has grown substantially in both type and format. Small, hand-held computers carry a multitude of contact, personal, document, and other information and are sophisticated enough to allow a user to fax, send e-mails, and communicate in other ways wirelessly. Even advanced cellular phones carry enough memory and processing power to store contact information, surf the web, and provide text messaging. Along with the growth in the sophistication of these devices, the need to transfer information between them has grown significantly as well.

With a multitude of different device types on the market, keeping information between the different devices synchronized has become increasingly problematic. For example, if an individual keeps a calendar of information on a personal computer in his or her office using a particular personal information manager application, the individual would generally like to have the same information available in a cellular phone, hand-held organizer, and perhaps a home personal computer. The individual may additionally have a notebook computer which requires synchronizing file data such as presentations or working documents between the notebook and the office computer.

Until now, synchronization between both documents and personal information managers has occurred through direct connection between the devices, and generally directly between applications such as a personal information manager in one device and a personal information manager in another device or using an intermediary sync-mapping program.

One example of this is the prevalent use of the 3Com Palm® OS-based organizer, such as the 3Com Palm® series of computing devices, which uses its own calendaring system, yet lets users synchronize the data therein with a variety of different personal information manager software packages, such as Symantec's ACT!™, Microsoft's Outlook®, and other systems. In this example, an intermediary synchronization program such as Puma Technology, Inc.'s Intellisync® is required. Intellisync® is an application program which runs on both the hand-held device and the computer which stores the information data and maps data systems between non-uniform data records. In other cases, direct transfer between applications such as transfer between Microsoft's Outlook® computer-based client and Microsoft's Windows CE "Pocket Outlook" application, is possible. Nevertheless, in both cases, synchronization occurs through direct connection between a personal computer and the personal computing device. While this connection is generally via a cable directly connecting, for example, Palm.® device in a cradle to the personal computer, the connection may be wireless as well.

One component of these synchronization systems is that the synchronization process must be able to delineate between when changes are made to specific databases and must make a decision about whether to replace the changed field. Normally, this is measured by a change in one database, and no-change in a second database. In some cases, both databases will have changed between syncs. In this case, the sync operation must determine which of the two changes which has been made is to "win" and replace the other during the sync. Generally, this determinant of whether a conflict exists allows some means for letting the user resolve the conflict.

In a technical sense, synchronization in this manner is generally accomplished by the copying of full records between systems. At some level, a user is generally required to map data fields from one application to another and specify which data fields are assigned to which corresponding field in a different device. Less mapping is required where developers more robustly support various platforms of applications.

In many instances, the data to be synchronized is generally in the form of text data such as records of addresses, contact information, calendar information, notes and other types of contact information. In certain instances, data to be synchronized will be binary format of executable files or word processor-specific documents. In many cases where document synchronization is required, the synchronization routine simply determines whether or not the documents in question have changed, and uses a time-based representation to determine which of the two files is newer, and replaces the older file with the newer file to achieve synchronization, as long as the older of the two files was in fact not changed. This is the model used in the familiar "Briefcase" function in Microsoft Windows-based systems. If both files have changed, then the synchronization routine presents the option of conflict resolution to the user.

Such synchronization schemes are generally relatively inefficient since they require full band-width of the document or binary file to be transferred via the synchronization link. In addition, at some level the synchronization programs require interaction by the user to map certain fields between different programs.

One of the difficulties in providing synchronization between different computing devices is that the applications and platforms are somewhat diverse.

Nevertheless, all synchronization programs generally require certain functions in order to be viable for widespread usage. In particular, synchronization programs must work with popular applications on various platforms. Sync applications must allow for conflicts resolution when changes are made to the same information on different devices between syncing events. They must provide synchronization for all types of formats of data, whether it be text data in the form of contacts, e-mails, calendar information, memos or other documents, or binary data in the form of documents or programs in particular types of formats.

In a broader sense, applications which efficiently synchronize data between disparate types of devices can provide advantages in applications beyond synchronizing individual, personal information between, for example, a personal information manager hardware device such as a Palm. computing device, and a personal computer. The same objectives which are prevalent in developing data transfer between personal information management (PIM) devices and desktop systems lend themselves to furthering applications requiring data transfer between other types of devices, on differing platforms. These objectives include speed, low bandwidth, accuracy, and platform independence.

For example, current e-mail systems use a system which is somewhat akin to the synchronization methods used for disparate devices in that an entire message or file is transferred as a whole between different systems. When a user replies to an e-mail, generally the entire text of the original message is returned to the sender, who now has two copies of the e-mail text he/she originally sent out. The same is true if an e-mail attachment is modified and returned. All of the text which is the same between both systems is essentially duplicated on the originator's system.

Wireless telephones have become more powerful with the inclusion of such features as cameras, address books, calendars and games. Many now include microprocessors, operating systems and memory which allow developers to provide limited applications for the phones. Phones now include the ability to play multimedia files including polyphonic ringtones, MP3 files, MPEG, AVI and QuickTime movies, and the like, in addition to displaying pictures taken on or downloaded to the phone.

Wireless phones have long been able to access the Internet via a Wireless Access Protocol (WAP) browser, and receive messages via SMS. A user on a wireless telephone connects via the wireless network to a server which enables the phone to read WAP enabled content. Most providers enable a user to access an email message account via the WAP browser, and/or provide short message service (SMS) messages directly to the user's phone. SMS allows users to receive abbreviated text messaging directly on the phone. Messages can actually be stored on the phone, but the storage available is limited to a very small amount of memory. In addition, no provision for handling attachments in SMS is available.

More recently, phones themselves have become powerful enough to utilize data connections over a carrier's network to manipulate data. For example, users of a carrier's network can download multimedia content to their phone, shop and download phone specific applications, and send and receive more robust messaging. Devices which have been combined with wireless phones, such as Research In Motion's Blackberry device, provide a user with enhanced message capabilities and attachment handling. These devices are specifically configured to provide contact and message applications over a wireless network.

Still, the majority of phones provide limited native address and contact data storage, and only SMS messaging capability. Some phones do allow users to associate images and specific ringtones with users in their phone's address book. Most wireless phones support caller ID, which displays the number of an incoming caller. Using this information, phones having imaging and multiple ringtone capabilities display an incoming caller's address book associated picture (if available) when the incoming call is received, and play a specially designated ringtone (if specified).

With the numerous different types of wireless phones and other communications devices available, a system which will enable a user to provide a personalized representation of themselves on other user's phones would be useful in allowing the user to identify themselves to other users.

Wireless communication devices, such as mobile telephones, have expanded beyond merely mechanisms for communication. Many telephones include features enabling personal productivity, games and even digital cameras. Devices which include personal productivity applications may include data storage for storing the owner's personal information within the storage devices. In addition, phones now have the ability to run application programs specifically designed for phone-based runtime environments.

All of an individual's personal information operated on and stored by a user can be considered within that user's "personal information space." In this context, a "personal information space" is a data store of information customized by, and on behalf of the user which contains both public data the user puts into their personal space, private events in the space, and other data objects such as text files or data files which belong to the user and are manipulated by the user. The personal information space is defined by the content which is specific to and controlled by an individual user, generally entered by or under the control of the individual user, and which includes "public" events and data, those generally known to others, and "private" events and data which are not intended to be shared with others. It should be recognized that each of the aforementioned criteria is not exclusive or required, but defines characteristics of the term "personal information space" as that term is used herein. In this context, such information includes electronic files such as databases, text files, word processing files, and other application specific files, as well as contact information in personal information managers, PDAs and cellular phones.

One difficulty users face is that it can be time consuming to enter information into a telephone, and once entered, the information is subject to loss. If the phone is damaged or simply lost by the user, and the time and effort spent to enter the information into the phone is lost. Some phones come with software and data connection cables allowing users to enter and backup information stored on a telephone by physically connecting the telephone to a personal computer. Many of these applications are provided by the manufacturer of the phone and are customized to interact directly with the phone. That is, the application program generally specifically designed for the telephone to retrieve data from the telephone and store it in the application on a personal computer. In addition, some third party vendors have attempted to make more universal synchronization systems that interact with phones through the physical cable.

The trouble with these physical connection mechanisms is that the user must consciously remember to physically connect the phone to the computer on a regular basis in order to ensure that the information backed up on the computer is accurate. In addition, the computer itself is subject to volatility. The data on the computer may be lost or damaged due to hardware and software failures.

While phone users generally desire increased functionality in phone based applications, they also desire the applications be relatively easy to use. Even general computer based utility applications, such as data back-up applications, are advantageous if they are set to run without significant user intervention. An application which would allow wireless phone users to quickly and easily backup their personal information stored on the telephone would be of great commercial and technical value.

SUMMARY OF THE INVENTION

The invention, roughly described, comprises a difference information receiver, a difference information transmitter and a difference information synchronizer which cooperate in a system or device to update data in the device with data received from other systems, or provide data for other systems to use in updating themselves.

In one aspect, the invention comprises a system in a device having at least one application data destination having a format. The system includes a difference engine receiving difference information associated with a change to said at least one application data destination; and an application interface, applying said difference information to said at least one data destination.

The difference engine may comprise a data store reflecting application data at a state prior to receipt of said difference information; and a delta engine receiving difference information and comparing difference information to said data store to construct change information. Further, the difference information may comprises a data file containing change transactions which is combined with data in the data store.

In a further aspect, the method may comprise a method for updating data files in a system. The method may include the steps of: receiving difference information for a subset of said data files; and applying said difference information to said subset of said data files. In particular said step of receiving may comprise: receiving a change log detailing changes to data files on another system; and applying said changes to a data store containing data identical to said data files to generate changed data.

In a further unique aspect, the invention my comprise an application in a system having a data source in a source format. The application may include an application interface, extracting data from said data source; and a difference engine receiving said data and outputting difference information associated with changes to said data source. The application interface may includes a source format interface; and a converter to map said data from said source format into a universal format. In addition, the difference engine may include a data store reflecting a prior state of said data; and a delta generator comparing said data and said data store to provide change transactions.

In a still further aspect, the invention may comprise a method for updating a data source in a system. The method may include the steps of extracting difference information from at least a subset of said data source; and outputting difference information for at least the subset of said data source. The step of extracting may comprise determining whether changes have been made to the subset of data source in the system; and generating a change log detailing changes to the subset of data source on another system.

In yet another aspect, the application of the present invention includes: an extraction routine for extracting a first set of difference information resulting from changes to the data files; a differencing transmitter for transmitting said first set of difference information to an output; a differencing receiver for receiving a second set of difference information from an input; and a reconstruction routine for applying the second set of difference information to the data files.

A further method of the invention comprises a method for updating data files in a system. The method includes the steps of receiving first change transactions for a subset of said data files; applying said change transactions to said subset of said data files. subsequent to a change in said data files, generating second change transactions for said file; and outputting said second change transactions to an output.

In a particular embodiment, the invention comprises a device engine including an application object; an application object store; and a delta module.

The present invention, roughly described, further pertains to a system and method which allows advanced identification information to be created and distributed to users of wireless communication devices, such as mobile phones. Subscribers can define their own personas as collections of information which define the users. Subscribers can then publish their persona(s) to their friends' and associates' mobile phones, and update the others' address books with the subscriber's contact information. Users can specify different personas to be presented to different users.

In an embodiment, the invention is a system for providing personification information to users of a wireless phone.

In another embodiment, the invention is a method of identifying a service subscriber on a wireless device. The method may include the steps of: establishing a subscriber persona comprising information identifying a user to other users; and displaying at least a portion of the persona on a device when a call or other type of contact such as SMS, Push-To-Talk message, email, voiceclip, et al to the device is received from another subscriber whose personalization information has been provided to the user.

In another embodiment, the invention is a method of providing an advanced caller identification service. In this embodiment, the invention includes: maintaining a store of subscriber persona information provided by users, the persona information identifying the user to other users; and distributing persona information to others based on an established relationship between subscribers.

A still further embodiment of the invention includes an application on a subscriber phone. The application includes a store of personification information for at least one other subscriber; and a display interface providing personification information to a phone interface and an interface for managing the user's own personalization information, as well as any system or account preferences.

In another embodiment, the invention is an application server for a communication system. The sever includes a store of personification information for a plurality of subscribers; and a distribution system management application.

The invention also comprises a system for backing up data on a wireless telephone having a data store containing a user's personal information. A method and application are provided, and various aspects and variations of the system are described herein. The invention provides a convenient means for a user to ensure that information saved on a wireless phone, and the effort spent to ensure that information is entered and correct, are not lost if the phone itself is lost or damaged.

In one embodiment a method for backing up personal information stored in a telephone is disclosed. In this aspect, the method may include the steps of presenting a back-up system user account set-up interface on the phone; presenting a backup scheduling interface on the phone; and presenting a restore information interface on the phone.

In a further embodiment, the method may include transmitting phone data to the backup system at user-defined intervals, or upon receipt of an indication from backup store that changes to data on the data store have occurred. The indicator may a result of polling the backup store to determine if changes have occurred.

The method may further include the step of providing an interface to the store via the web to alter data in the data store.

The method may include further providing a roll-back interface and an undelete interface.

In yet another embodiment, the invention is a method for storing personal information in a wireless telephone in a backup storage database. In this aspect, the method may comprise the steps of: providing a phone agent including an automated phone data transmission method capable of regularly transmitting changes to a backup store via a communications link and a restore method; and responsive to said agent, providing changes from the backup store to the wireless telephone.

In a still further embodiment, the invention is a method for maintaining personal information in a wireless telephone. In this aspect, the method includes the steps of establishing a user account, the user account identifying the user by an unique designation; and transmitting phone data to a backup store via a wireless network at regular intervals.

In another embodiment, the invention is an application for a wireless telephone. The invention includes an automated backup process transmitting changes to the backup system at user defined intervals. In addition, the application may include a restore process activated by a user to restore information stored on the backup system to the phone.

The application may include a rollback phone information process which returns data on the wireless to a state existing on a specified date. The application may further include an undelete record process. The application may include one or more processes running on a server, a BREW agent and/or a JAVA agent or an application designed to operate on a proprietary device or operating system (e.g., a Symbian operating system.)

In yet another embodiment, the invention is an application for storing personal information in a wireless telephone having a data store to a backup system. The application includes an automated user account creation method accessing the backup system using a unique identifier for the user to create a user account on the backup system; an automated backup method transmitting changes to the backup system at user defined intervals; and a restore method providing user data to a phone.

In another embodiment, the invention comprises one or more processor readable storage devices having processor readable code embodied on said processor readable storage devices, said processor readable code for programming one or more processors to perform a method comprising the steps of: presenting a backup scheduling interface; transmitting an initial set of phone data and changes to the phone data over time to a backup system; and presenting a restore information interface.

In a still further aspect, the invention is a backup system using a unique phone identifier in conjunction with personal information stored for a user. In a further aspect, the backup system associates a unique phone identifier with a unique user identifier. In a still further aspect, the phone identifier, the user identifier or both are universally unique. In a further aspect; the invention includes using an existing SyncML client on the phone as the backup client and auto creating the user account info on the server.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

In one embodiment there is a method comprising receiving, by a service system, mobile device information of a mobile device, wherein the mobile device information was sent to the service system in response to the mobile device information being changed on the mobile device; and providing, by the service system, the mobile device information to a computing device, a user of the computing device being associated with the mobile device, to facilitate the user in viewing, interacting, or viewing and interacting with the mobile device information, wherein the mobile device, the service system, and the computing device are separate and distinct from the others.

The method requiring that the receiving comprises receiving the mobile device information from the mobile device.

In one aspect, the mobile device information includes at least one of emails, messages, a call history, photos, music, a calendar, and mobile device settings.

The method requiring, by the service system, authentication of the user before performing said providing.

The method further comprising receiving from the computing device, by the service system, an indication of one or more user interactions with the mobile device information.

The method further comprising, in response, performing, by the service system, an action on behalf of the mobile device.

The method wherein the action is one or more of initiating a Voice over IP (VoIP) call, sending an email, posting a photo for sharing, or sending a text message, on behalf of the mobile device.

The method further comprising, in response, updating, by the service system, the mobile device information or directing, by the service system, the mobile device to perform an action.

The method wherein the action is one or more of is one or more of initiating a VoIP call, sending an email, posting a photo for sharing, sending a text message, or changing a mobile device setting.

The method further comprising providing, by the service system, a mobile device client to the mobile device to facilitate the mobile device in providing the mobile device information to the service system.

A service system comprising: one or more processors; and a service to be operated by the one or more processors to: provide, to a computing device, mobile device information of a mobile device associated with a user of the computing device, wherein the mobile device information is provided to the service system in response to the mobile device information being changed on the mobile device and wherein the mobile device, the service system, and the computing device are separate and distinct from each other, receive, from the computing device, an indication of one or more user interactions with the mobile device information, and in response, update the mobile device information, perform a first action on behalf of the mobile device, or direct the mobile device to perform a second action.

The service system wherein the service is further to be operated to receive the mobile device information from the mobile device.

The service system wherein the mobile device information includes at least one of emails, messages, a call history, photos, music, a calendar, and mobile device settings.

The service system wherein the service is further to be operated to require authentication of the user before performing said provide.

The service system wherein the service is further to be operated to notify the mobile device of the updated mobile device information or the performed action.

The service system of wherein the first action is one or more of initiating a Voice over IP (VoIP) call, sending an email, posting a photo for sharing, or sending a text message, on behalf of the mobile device.

The service system wherein the second action is one or more of initiating a Voice over IP (VoIP) call, sending an email, posting a photo for sharing, sending a text message, or changing a mobile device setting.

The service system wherein the service is further to provide a mobile device client to the mobile device to facilitate the mobile device in providing the mobile device information to the service system.

A method comprising: receiving, by a computing device, from a service system, mobile device information of a mobile device, wherein the mobile device information was provided to the service system in response to the mobile device information being changed on the mobile device wherein the mobile device is associated with a user of the computing device, and wherein the mobile device, the service system, and the computing device are separate and distinct from each other; facilitating, by the computing device, the user in viewing, interacting or viewing and interacting with the mobile device information; receiving, by the computing device, one or more user interactions with the mobile device information; and in response, providing, by the computing device, an indication of the one or more interactions to the server system.

The method wherein at least one of said receiving, said facilitating, said receiving, and said providing is performed by a plug-in to a browser of the computing device.

The method wherein the mobile device information includes at least one of emails, messages, a call history, photos, music, a calendar, and mobile device settings.

The method wherein the facilitating includes providing, by the computing device, a user interface having icons/glyphs associated with modules for handling different categories of the mobile device information.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 9A is a block diagram of the desktop device engine of the present invention.

FIG. 13 is a listing of exemplary item objects used in accordance with the routines of the present invention.

FIG. 21 is a flow chart illustrating a first method for providing an invitation to a non-subscriber to join a service established by an enterprise service provider in accordance with the present invention.

FIG. 22 illustrates a second method for providing an invitation to a non-subscriber in accordance with the present invention.

FIG. 23 is an illustration of personas and persona groups relative to a subscriber in accordance with the present invention.

FIG. 29 use case diagram illustrating the functions available to a user/subscriber in accordance with the system of the present invention.

FIG. 30 is a use case diagram illustrating the contact management available to a user/subscriber in accordance with the system of the present invention.

FIGS. 37B-37M are exemplary user interface screens provided on a client device such as a phone to manage contacts providing the features shown with respect to FIG. 37A on a client device such as a phone.

FIG. 38B-38N are user interface screens which may be provided on a client device such as a cell phone to implement the features shown in FIG. 38.

FIG. 41 is an exemplary user interface provided in a web browser by a server in accordance with the present invention allowing a user to manage details of the user's account in accordance with the system of the present invention.

FIGS. 55a through 55q are screen shots illustrating how a user interface would allow a user to sign and initially backup data in the system of the present invention.

FIGS. 57a through 57e illustrate user interface for conducting your restore process in accordance with the present invention.

FIG. 59 is a flow chart illustrating user interaction with a web-based personal information manager to alter the data in the backup store and subsequently the information stored on the wireless telephone.

FIG. 60 is an alternative embodiment of the process shown in FIG. 59 illustrating user interaction with a web-based personal information manager which modifies user information stored on a wireless telephone.

FIG. 61 is a flow chart illustrating how two different states of data may occur and options for resolving those states.

FIG. 62 illustrates a method for implementing a backup system using a unique phone identifier associated with user data.

DETAILED DESCRIPTION

The present invention includes a system and a method for transferring data between two devices which require information to be shared between them. In accordance with the discussion herein, a "device" is defined as a collection of elements or components organized for a common purpose, and may include hardware components of a computer system, personal information devices, hand-held computers, notebooks, or any combination of hardware which may include a processor and memory which is adapted to receive or provide information to another device; or any software containing such information residing on a single collection of hardware or on different collections of hardware. Such software might include applications such as personal information managers, which include contact data and other such information, e-mail systems, and file systems, such as those utilized by Microsoft Windows NT operating systems, Unix operating systems, Linux operating systems, or other systems capable of storing file types having binary formats which translate to application formats of differing types.

In one embodiment, the invention comprises a set of programs specifically designed to transmit and/or receive differencing data from one device to another device, irrespective of the type of file system, data, content, or system hardware configuration.

In a further aspect, the system comprises store and forward technology which utilizes the differencing technology to implement services via a public or private network, such as the Internet.

The system of the present invention finds particular usages in synchronizing personal contact information between different systems, but it will be readily apparent to one of average skill in the art that the present invention provides advantages having broader applicability than merely synchronizing various types of systems. For example, replying and forwarding e-mail can be made more efficient by forwarding only the differences in e-mails between systems. As a further example, updates to systems software via a network can be made more efficient where, for example, instead of completely replacing different modules of an application, only the differences of the modules need be forwarded, resulting in more efficient use of existing bandwidth.

System Overview

FIGS. 1-7 show various configuration alternatives of the present invention.

Figure 1:
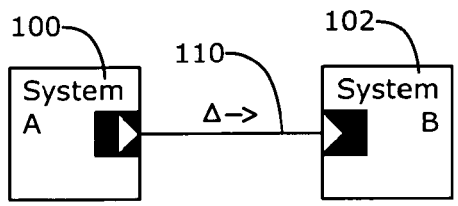
FIGS. 1-7 are block diagrams of various configurations of the system of the present invention utilizing the differencing routines of the present invention.

FIG. 1 shows an embodiment of the present invention in a basic configuration. In FIG. 1, a first system or device, system A, and a second system or device, system B, are coupled by a communication line 110. It should be readily understood that communication line may be any direct coupling of the two systems which allows data to pass between the systems such as, for example, by means of serial ports, parallel ports, an Ethernet connection or other type of network, or an infrared link; or the like. System A includes a functional block 100 representing a differencing transmitter in accordance with the present invention. System B includes a functional block 102 representing the differencing receiver in accordance with the present invention.

The differencing transmitter 100, upon receipt of a control signal enabling operation of the transmitter, examines a specified data structure of information which is to be transmitted to system B. Differencing transmitter 100 extracts such information from System A and converts the information extracted into difference information Δ. Difference information Δ comprises only the changes to System B's data which have occurred on System B and instructions for implementing those changes. Hence, if the data to be transferred is a change to a file which exists on system B, difference information Δ comprises only the differences in such file and where such differences occur. If the data does not exist at all on System B, the difference information Δ will be the entire file. Difference information Δ received by differencing receiver 102 at System B is reconstructed at System B, and the changes reflected therein are updated on System B.

For example, if System A and System B are two computers and an update for certain binary files on System A is required, the differencing transmitter on System A will extract the differences in the file known to exist on System B and any new files, and transmit only those differences (an instructions for where to insert those differences) to the differencing receiver 102. Differencing receiver 102 will interpret the difference information (Δ) and reconstruct the binary files on System B. In this manner, the information on System B is updated without the need to transfer the entire binary files between the Systems.

Figure 2:
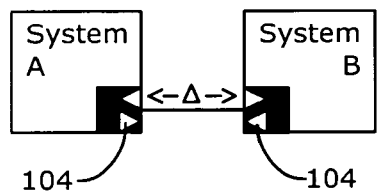

FIG. 2 shows a second example of the system of the present invention. In FIG. 2, both System A and System B include functional blocks 104, each representing a differencing synchronizer. The function of the synchronizer 104 is similar to that of the transmitter and receiver combined; the synchronizer will allow difference information Δ to be both transmitted and received. For example, System A and System B are a portable computer and a desktop computer, respectively, where information such as contact information needs to be synchronized between the two, the differencing synchronizer 104 will extract changes made to the contact information on either System A or System B and at predetermined times, transmit the information Δ between the systems, and reconstruct the data on the receiving system to update information from the sending system, in order to ensure that both systems contain the same data.

Figure 3:
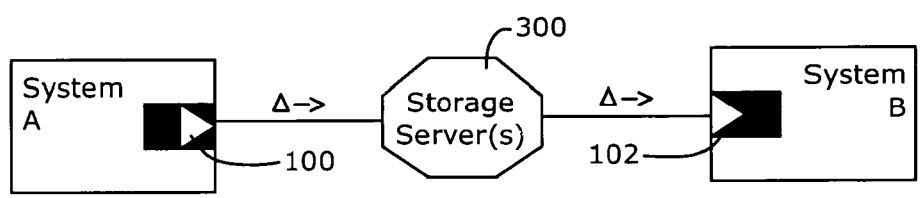

FIG. 3 shows yet another alternative embodiment of the system of the present invention. In FIG. 3, System A again includes a differencing transmitter and System B includes a differencing receiver 102. In this embodiment, a storage server 300 is coupled between System A and System B. Storage server 300 may store a separate database of the difference information Δ provided by System A, which allows System A to provide its difference information Δ to the storage server 300 at a first point in time, and storage server 300 to provide the same difference information Δ to System B at a second point in time, but not the same as the first point in time. In addition, multiple sets of difference information Δ may be provided at different points in time, and stored for later retrieval by System B. Still further, the difference information sets may be maintained on server 300 to allow data on either System A or System B to be returned to a previous state.

Once again, the storage server 300 is coupled by a direct connection 110 to both System A and System B. Storage server 300 may be a server specifically adapted to receive differencing information Δ from the receiver 100 and provide it to the transmitter 102. In one embodiment, server 300 includes specific functional routines for enabling this transfer. Alternatively, server 300 comprises standard information server types which respond to standard Internet communication protocols such as file transfer protocol (FTP), or hypertext transfer protocol (HTTP).

Figure 4:
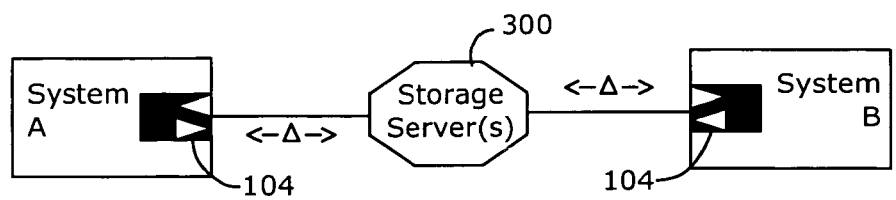

FIG. 4 shows yet another alternative embodiment of the system of the present invention wherein System A and System B, once again coupled directly to a storage server 300 by a direct connection line 110, each include a differencing synchronizer 104. Difference information Δ can be passed to and from System A through synchronizer 104 to and from the storage server 300 at a first point in time, and to and from System B at a second point in time. In this embodiment, storage server 300 may include routines, described below, for resolving conflicts between data which has changed on both System A and System B independently after the last point in times when the systems were synchronized.

Figure 5:
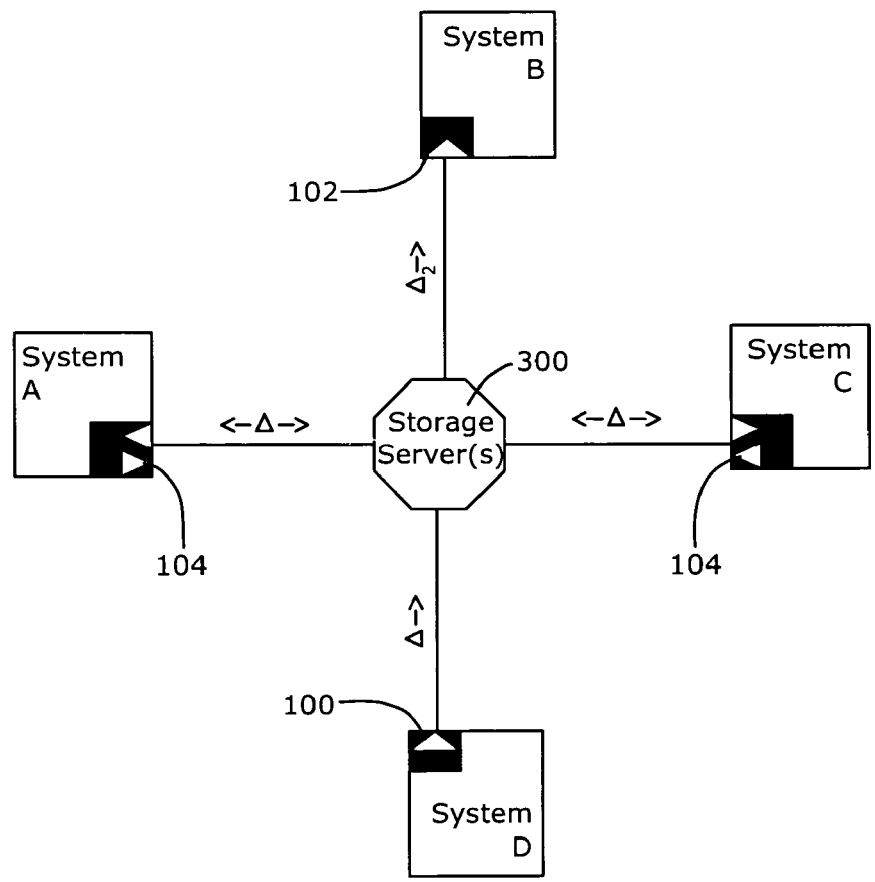

FIG. 5 shows yet another alternative embodiment of the present invention including four systems: System A which includes a differencing synchronizer 104; System B which includes a differencing receiver 102; System C which also includes a differencing synchronizer 104; and System D which includes a differencing transmitter 100. Each is directly coupled to a storage server 300, allowing control of transmission of differencing data Δ between the various systems. Server 300 may include routines, described in further detail below, to track the various types of systems which comprise System A through System D, and which control the transmission of various components of the difference information Δ to each of the various systems. For example, since System B includes only differencing receiver 102, the difference information $\Delta_2$ which is provided to it may be a subcomponent of that which is transferred between System A in the storage server 300, or may be simply receiving broadcast information $\Delta_4$ from System D. In one embodiment of the system of the present invention, server 300 does not itself route the difference information derived from each receiver/transmitter/synchronizer. Server 300 acts as a repository for the information, and the determination of which difference information Δ is attributed to which receiver/transmitter/synchronizer is made by each receiver/transmitter/synchronizer.

Figure 6:
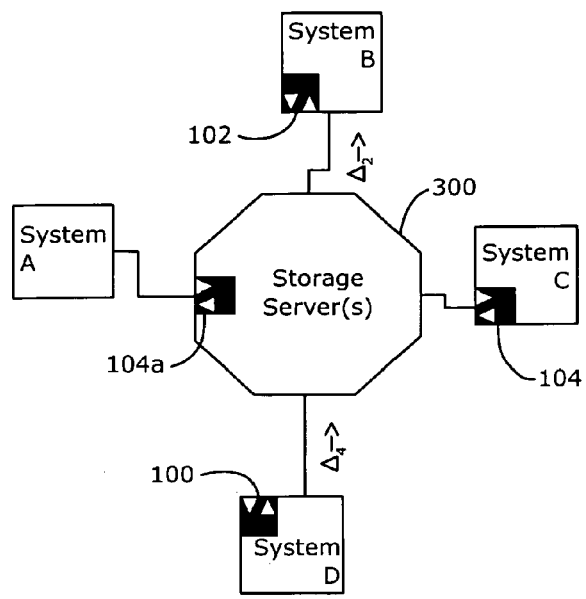

FIG. 6 shows yet another alternative embodiment of the present invention. In FIG. 6, a synchronizer is provided in storage server 300. It should be recognized that a forwarder and/or receiver may be provided in server 300 as well. The particular embodiment shown herein may be advantageous where device processing power and memory are limited, such as cases where the device is a cell phone. It should be noted that the data transferred between system A and the device engine 104a in such an embodiment may or may not be difference information, depending on whether System A has the capacity to detect and output difference information. Each of the devices may include a differencing receiver, a differencing transmitter, or a differencing synchronizer. It should be understood that a portion of the differencing synchronizer 104a may reside on System A and another portion may reside on server 300.

Figure 7:
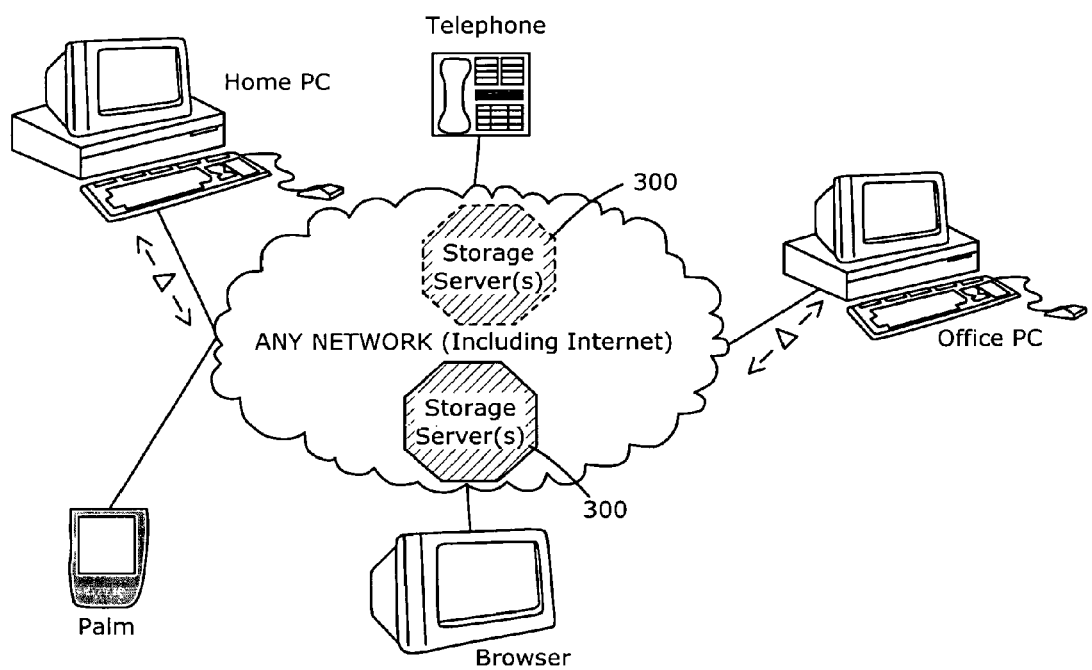

FIG. 7 shows yet another alternative embodiment of the present invention wherein the devices shown in FIG. 6 may be coupled to a combination of public or private networks 700 such as, for example, the Internet. The network 700 may include one or more storage servers 300₁,300₂, and in such cases the difference information A transmitted between each such device 602-610 via intermediate storage on one of such servers. Network 700 may couple the devices to one or more specialized function servers, such as servers specifically designed to include a differencing forwarder, receiver or synchronizer. Such devices may comprise, by way of example and without limitation, a personal office PC 602, a smart telephone 604, a user's office PC 606, a personal information Palm®. computing device 608, a telephone or cellular phone 604, a home personal computer 606, or a web browser 610. Each differencing receiver, differencing transmitter, or differencing synchronizer present in devices 602-610 includes means to poll the data stored on storage servers 300₁,300₂ to determine whether the data present at storage server 300₁, 300₂ includes difference information which the particular receiver or synchronizer is required to have to synchronize the data on the device on which it resides.

In the following description, an embodiment wherein the differencing receiver, transmitter, and synchronizer are described will be discussed with respect to its use in synchronizing contact information, calendar information, and binary file information between a plurality of different devices in the context of data synchronization. It will be readily understood that the system of the present invention is not limited to synchronization applications, or applications dependent upon specific types of data, such as contact information or scheduling information. In particular, it will be readily understood that the transmission of data comprising only the differences in data between two systems via routines which extract the data and reassemble data on the various systems, represents a significant advancement in the efficient transmission of data. The present invention allows for optimization in terms of a reduction in the bandwidth utilized to transmit data between two systems, since only changes to data are transferred. This consequently increases the speed at which such transactions can take place since the data which needs to be transmitted is substantially smaller than it would be were entire files transferred between the systems.

In a particular embodiment of the present invention, the ability of devices to connect to the Internet is leveraged to manage data transfer between the systems. In essence, each particular device which requires information access which can connect to the Internet may become part of the system of the present invention, and synchronize its data with other devices defined by a user as being part of the system.

Generally, the system comprises client software which provides the functions of the differencing transmitter 100, differencing receiver 102, and differencing synchronizer 104 in the form of a device engine. The device engine includes at least one component particular to the type of device on which the device engine runs, which enables extraction of information from the device and conversion of the information to difference information, and transmission of the difference information to the storage server. This allows the replication of information across all systems coupled to the system of the present invention. Although the storage servers 300 utilized in the system of the present invention may be any type of storage server, such as an Internet server or an FTP server, and may be provided from any source, such as any Internet service provider (ISP), particular aspects of a storage server which may be useful and which may be customized to optimize transfer of information between systems coupled as part of the present invention will be described below. Synchronization of devices utilizing the synchronization system of the present invention is possible as long as an Internet connection between the devices is available.

In a key aspect of the invention, the Internet connection between the devices or between the devices and a server, need not exist at the same point in time, and new devices may be added to the system of the present invention at any point in time without the loss of information. The system provides totally transparent access to information and the device engine on each device provides an operating system independent extension which allows seamless integration of the personal information services in accordance with the present invention.

In a particular unique aspect of the present invention, only those changes to the information which are required to be forwarded to other systems on the system of the present invention are transmitted to enable exceptionally fast response times. In a still further aspect of the invention, information which is transferred in this manner is encrypted to ensure security over the public portions of the Internet.

Architecture Overview

Figure 8:
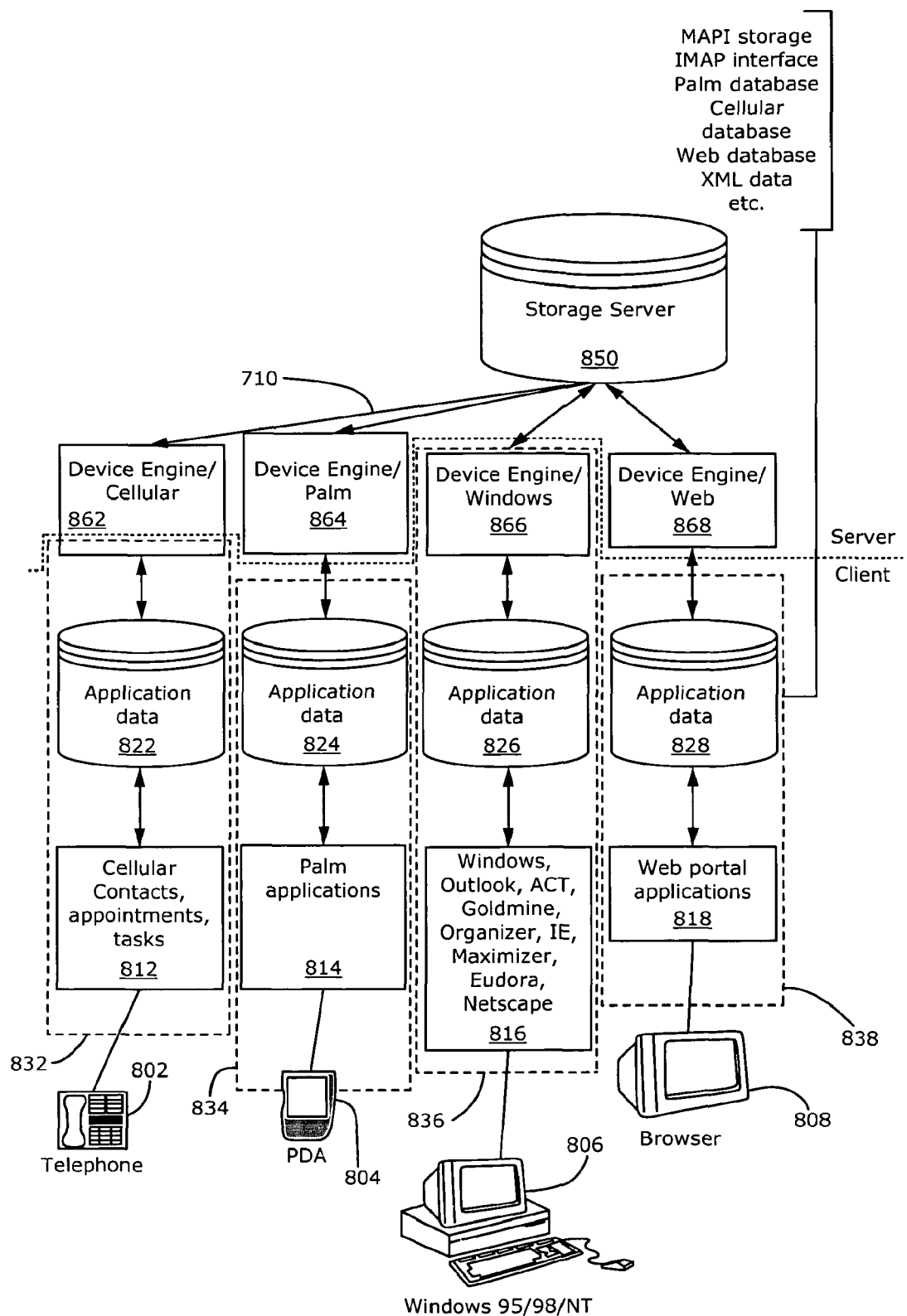
FIG. 8 is an overview of one embodiment of the system architecture in accordance with the present invention.

FIG. 8 shows an overview of the architecture of the system of the present invention utilized for synchronizing or "syncing" information on different types of devices. In the embodiment hereinafter described, the system of the present invention allows the coupling of a collection of personal devices and applications one uses when working with personal information. Nevertheless, the system may be used to broadcast public or private information to various device types. System software in the form of a device engine for each device which is declared a part of the system of the invention is distributed across the collection of devices to enable synchronization. Distribution of the device engines may occur via, for example, an installation package forwarded over an Internet connection. In essence, the device engine software of the present invention forms a distributed processing network which maintains consummate synchronization of all information in the system. The processing load associated with delivering this service is pushed to the end-point devices which provides for easy scaling of the system to ever-larger applications.

The present invention contemplates the use of two types of device engine: one totally embodied on the server which outputs change data to the server; and a second totally embodied on the server receiving device generated change information from the device. In addition, a hybrid of the two, having a portion of the device engine on the device and a portion on the server, is disclosed.

As shown in FIG. 8, any number and type of devices 802-808 may be utilized in accordance with the system of the present invention. A telephone 802 may comprise a cellular phone or a standard POTS-connected telephone. Telephone 802 may include contact information and, as is supported with a newer generation of cellular telephones, appointments and task data stored in a data structure 812. The application 812 which utilizes the application data 822 comprising such information is all stored in the telephone unit 802. Likewise, a personal digital assistant such as a Palm®. computing device 804 includes application 814 and application data 824 which may include information such as contacts, appointments and tasks, and may also include file information such as documents which are created and stored on the PDA 804. Device 806 is represented as a Windows personal computer running an operating system such as Microsoft Windows 95, 98, NT or 2000. Applications 816 which may be running on device 806 include the Windows operating system itself, Microsoft Outlook, Symantec's ACT Personal Information Manager, Goldmine Software's Goldmine, Lotus Organizer, Microsoft's Internet Explorer web browser, Netscape's Communicator Suite, Qualcomm's Eudora e-mail, and various other programs, each of which has its own set of application data 826 which is required to be synchronized not only with devices outside the system 806, but also between devices and applications within the system itself. Finally, a dedicated web browser client 808 is shown which couples via the Internet to web portal applications 816 which have their own set of application data 828. Unlike devices 806 which store the application and application data substantially in their own hardware, web portal applications are provided on a separate server and provided to browser 808 via an Internet connection. Nevertheless, the web portal application stored on the portal application provider includes a set of application data 828 which a user may wish to synchronize. For example, a large web portal such as Yahoo! and Snap.com provide services such as free e-mail and contact storage to their users. A user may wish to synchronize this with applications running on their cellular phone, PDA, or Windows devices.

In order to access the specific application data of each of the systems shown in FIG. 8, a device engine is associated with each type of device. A cellular device engine 862 communicates and incorporates itself with the application data 822 of the cellular phone. Likewise, a PDA device engine 864 is provided, which may be based on either the Palm®. operating system, Windows CE operating system, or other PDA-type operating systems as necessary. A Windows-based device engine 866 includes a mechanism, discussed below, for extracting application data 826 from supported Windows applications 816, and a web services device engine 868 incorporates to extract application data 828 from web portal applications 818.

Figure 9B:
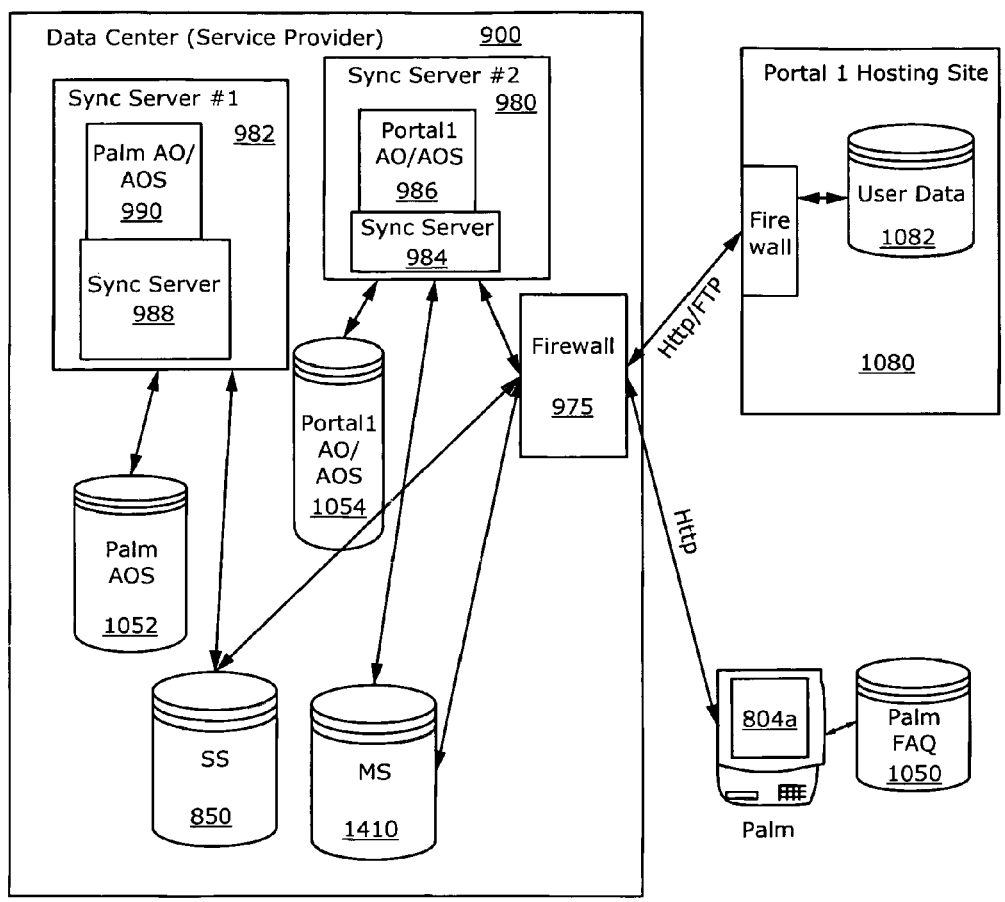
FIG. 9B is a block diagram of the configuration of server side device engines utilized in accordance with the present invention.

As shown in FIG. 8, some device engines are provided entirely on the device (and are referred to herein as desktop device engines), while others include components a the back end server (which may comprise storage server 850 or a specialized server, as shown in FIG. 9B.) This is illustrated generally by lines 832, 834,836, and 838 in FIG. 8. Also, in FIG. 8, elements above dashed line 855 are provided by an administrator or service provider of the system of the present invention. Each of the device engines 862, 864, 866 and 868 is configured relative to the type of device on which it resides. For example, the Cell phone device engine 862 includes one or more components arranged on the phone while others are on server 850. Conversely, device engine 866 resides entirely on the windows device 806.

Data from each of the devices is coupled via an Internet connection 710 with a storage server 850. As noted above, storage server 850 may be a generic storage server or it may be a storage server specifically adapted for use with the system of the present invention as discussed below. One or more of the storage servers 850 are used to communicate transactions amongst the collection of systems 802, 804, 806, 808. It should be readily recognized that any number of different types of systems 802, 804, 806, 808 may be provided in accordance with the present invention and incorporated into the system. However, for brevity, not all the different types of commercially available computing devices which are currently in use or in development, in which the system of the present invention may be incorporated, are listed.

In its simplest embodiment, the storage server 850 is simply a dumb storage server and each of the device engines transmits only difference information thereto to be stored in a particular location accessible by other device engines in the system. In one embodiment, each device engine implements all processing required to keep all the systems fully synchronized. Only one device engine needs to be coupled to the storage server 850 at one particular point in time. This permits synchronization of multiple systems in a disconnected fashion. Each device engine will download all transactions encapsulating changes that have occurred since the last synchronization from the server and apply them to the particular device.

The change or difference information ($\Delta$) is provided in one or more data packages, the structure of which is described herein. Each data package describes changes to any and all transfer information across all device engines, including but not limited to application data, files, folders, application settings, and the like. Each device engine can control the download of data packages that include classes of information that apply to the specified local device 802, 804, 806 or 808 attached to that specific device engine. For example, device engine 862 will only need to work with changes to information describing contact names and phone numbers in application data 822, while device engine 866 will be required to work with changes to e-mail, changes to document files, notes, as well as contact and address information since the application data 826 is much more extensive than application data 822.

Each device engine includes compression/decompression and encryption/decryption components which allow encryption and/or compression of the data packages transmitted across Internet connection 710. It should be recognized that compression and encryption of the data packages may be optionally provided. It is not required in accordance with the present invention. Each device engine performs mapping and translation steps necessary for applying the data packages to the local format required for that type of information in the application data stores 822-828. The device engine also includes components which allow it to track ambiguous updates in cases where users have changed data to a particular data field on two different systems simultaneously since the last update. In this case, the device engine includes a mechanism for drawing this to the attention of the user and allowing the user to resolve the conflict.

Device Engine Architecture

FIG. 9A illustrates a single device engine utilized with a generic application 810 and a generic storage server 850. FIG. 9A illustrates a desktop device engine, since all processing occurs on the device and only difference information is transmitted to server 850. Nevertheless, an understanding of the desktop device engine will aid in understanding server side devices engines, hereinafter described. Shown in FIG. 9 are the functional components of a device engine in block form and their interrelationship to each other. The device engine 860 is equivalent to the functional block of a differencing sequencer 104 shown in FIGS. 1-7.

While the invention will be described with respect to the embodiment of the invention as a differencing synchronizer 104, it will be readily understood that portions of the functionality are utilized as needed in a forward-only (a differencing transmitter) or a receive-only (a differencing receiver) capacity as required by the particular application.

As noted above, a device engine exists for each and every device that makes up a user's personal information network of devices in the system. As shown in FIG. 9A, each device engine 860 includes an application object 910. The application object is specific to each particular application 810 and provides a standard interface between the device engine and the balance of the data transmission system of the invention, and the application 810. Details of the application object will be described in further detail below. The application object is a pluggable architecture which supports a wide variety of vendor-unique applications. The job of the application object is to map data from the application into a temporary or "universal" data structure by connecting to the application via any number of standard interfaces to gain access to the applications data. The data structure of the application object puts the data in a generic or "universal data" format which may be used by the device engine components to generate data packages for provision to the storage server.

Also provided is an application object store (AOS) 920 which includes a copy of the device's data at a point just after the previous data extraction and synchronization occurred. Application object store 920 is a mirrored interface which stores a snapshot of the previous state of the data from the application object 910 in the device engine. The size of the AOS will depend on the data being collected by each device engine.

The generic output of the application object is provided to a delta module 950. Delta module 950 is a differencing engine which calculates differences in data between the output of the application object 910 and the copy of the data which is provided in an application object store (AOS) 920. The actual differencing and patch routine can comprise a routine such as XDelta or YDelta. The delta module 950 will be referred to herein alternatively in certain portions of the description as "CStructuredDelta." In addition, the difference information is alternatively referred to herein as a "change log." Each change log (or set of difference information) is a self describing series of sync transactions. As described below, the change log may be encrypted and compressed before output to the network.

Hence, during a sync, the Application Object will, using a mechanism discussed below, extract the data of each application in the device and convert it to a universal data format. The delta module will then generate a difference set by comparing the output of the Application Object and the AOS. This difference information is forwarded to the encryption and compression routines for output to the storage server 850 in the form of a data package. Alternatively, the data from one application can be used to synchronize to data in another application in, for example, a windows environment, as shown by arrow 1050 in FIG. 10.

It should be specifically noted that the application object may interface directly unstructured binary data or with structured application data. The differencing routine supports both uses of the delta module 950 in comparison generation.

In some cases, operation of the application object and delta module is simplified by the fact that some applications, such as PDA's, have the ability to output changes to its data. In such cases, the delta module 950 need only provide the data into the data package, since comparison to an AOS is not required—the application already includes a mechanism for tracking changes made to its own data. However, in many cases the applications provide, at most, a standard interface to access the data, such as Microsoft's OBDC interface, the Microsoft standard Application Programming Interface (API), or other similar standard interfaces.

Device engine 860 further includes a versioning module which applies a version number per object in the data package. As explained further below, each object in the data package is assigned a universally unique ID (UUID). Hence, unlike many prior synchronization systems, the system of the present invention does not sync data solely by comparing time stamps of two sets of data. Versioning module 915 allows each device engine to check the state of the last synchronization against data packs which have been provided to the storage server to determine which data packages to apply. This allows the device engine to sync itself independently of the number of times another device engine uploads changes to the storage server. In other words, a first device engine does not care how many times a second device engine uploads data packages to the server.

An events module 925 controls synchronization initialization events. Items such as when to sync, how to sync, trigger the delta module 950 to perform a synchronization operation.

A user interface 930 is provided to allow additional functional features to a system user of the particular device to which the device engine 860 is coupled. The user interface is coupled to a conflict resolution module 940, a filtering module 945, and a field mapping module 935. Each of the modules provides the functionality both necessary for all synchronization programs, and which users have come to expect.

Filtering module 945 allows filtering for types of content based on, for example, a field level content search. The field mapping module 935 allows for the user to re-map certain interpretations of items which were provided in the document stream. For example, if the device engine 860 is operating on a personal computer, and a synchronization is occurring between the personal computer and a notebook computer, and the user has a "my documents" directory on the personal computer which he wishes to map to a different directory on the notebook computer, the field mapping module 935 allows for this re-mapping to occur. It should be recognized that the field mapping module allows for changes in directing the output of the data package. The field mapping module 935 is not necessary to map particular data fields of, for example, contact information from one application, such as Microsoft Outlook, to a different application, such as Symantec's ACT, as is the traditional use of field mapping and synchronizing applications.

Delta module 950 is further coupled to a compression module 970 and an encryption module 960. It should be recognized that the compression encryption modules need not be enabled. Any type of compression module 970, such as the popular PK Zip or Winzip modules, or those available from HiFn Corporation may be utilized in accordance with the invention. Moreover, any type of encryption algorithms, such as MD5, RCH 6, Two Fish, or Blowfish, or any other symmetric encryption algorithm, may be utilized. In one embodiment of the invention, encryption without compression is used. In a second embodiment of the invention, compression without encryption is used. In a third embodiment of the invention, neither compression or encryption is used, and in a fourth embodiment of the invention, both compression and encryption are used.

Versioning module 915 also allows the device engine 860 to support multiple users with distinct synchronization profiles. This allows multiple users accessing the same machine to each synchronize their own data set using the same device engine. For example, if the application 810 on a particular device comprises Microsoft Outlook on a personal computer, coupled to a Microsoft Exchange server, and Outlook is configured to have multiple user profiles, versioning module 915 will track the data applied through the device engine when a sync request occurs. This allows two users of the same Outlook client software which access different data sets, either in the client computer or on a separate server, to utilize the same device engine and the system of the present invention via the same machine. In a further embodiment, a particular device engine supports the use of foreign devices accessing the system via the same connection. Palm® devices, for example, use a cradle to connect to a computer and/or Internet connection. If a particular user wishes to allow another user to use his Palm® pilot cradle connection to synchronize the other user's Palm® pilot, the device engine can generate data packages to update the local application object store for the foreign device. The application object store can therefore be used as a temporary storage for cases allowing synchronization of foreign devices.

The output of the device engine 900 comprises a data package which is output to storage server 850. As noted above, only one device engine need be connected to the storage server 850 at a given time. The data package can be stored on the storage server 850 until a request is made to a particular location of the storage server by another device engine. Likewise, delta engine 900 can query alternative locations on the storage server for access to synchronized data within the system of the present invention. Access to areas of the storage server is controlled by a management server (MS) described more fully below. In one embodiment, each sync operation requires that the device engine for each device login to the management server to authenticate the device and provide the device engine with the location of the individual device's data packages on the storage server.

Data packages may be advantageously provided to the device engine from the storage server in a streaming format, allowing processing to occur using a minimum of bandwidth and storage in the devices. The device engine 860 and particularly the delta module 950 interpret data packages based on the versioning information and the mirrored data present in the application object store 920. When data is returned to the delta module 950 from the storage server 850, the delta module returns differenced data to the application object 910 for the particular application which then translates the delta information into the particular interface utilized for application 810. Once a device engine has been fully applied all data packages from an input stream, it generates a series of data packages that describe the changes made on the local system. The device engine uses the local application object store 920 to keep track of the last synchronized version of each application's actual data, which is then used for the next data comparison by the delta module on the next sync request. Generated data packages can include operations and encode changes generated from resolving ambiguous cases as described above.

FIG. 9B depicts how server based device engines may be provided in the system of the present invention. The Palm® device example is shown in this embodiment, where the Palm® device has the capability of connecting directly to the Internet and a service provider's data center 900. The data center includes a firewall 975 to prevent unauthorized communications with servers resident in the data center 900 and protect integrity of the data. The storage server 850 may communicate directly through the firewall as may the management server (MS) 1410.

Shown therein are two sync servers 982 and 984 each of which is dedicated to syncing one particular type of application. Sync server 982 is dedicated to the Palm® device, while sync server 980 is dedicated to, for example, a portal application (Portal1).

Since the Palm® Device 804a includes a mechanism for transmitting changes to its data directly, data may be transmitted using HTTP request and response via the firewall 975 to the sync server 982 where differencing and updating of data in the AOS can occur, after which changes can be downloaded to the Palm® 804a.

The synchronization server is an application handles concurrent synchronization of user's data. Each Sync Server includes plug-in support for multiple devices to be synchronized using the same sync server executable. Each device type has it's own device name that identifies which AO/AOS components will be used during the sync.

The sync server uses the concept of a universal data record in its internal sync differencing engine and when sending data to and retrieving from external entities such as the AOS and AO. Hence, in the Palm® application, the job of a server AO is simply to take the device-specific format of its record and convert into a universal record format.

The Sync Server has a plug-in architecture so that 3rd party application partners can easily add their services into the server. Currently, if the server is operated in a Microsoft Windows NT Server, the sync server discovers the sync components via the Windows NT registry. In alternative embodiments, this function is performed in a Component Manger which operates on each sync server to manage processing by each of the AO and AOS on the server. Each AO and AOS are implemented as a stand-alone DLL that the Sync Server loads at initialization time, or when adding a new component via the Component Manager.

Each sync server is shown as dedicated to a single application. However, a sync server may handle multiple device types.

In the embodiment of FIG. 9B, it should be noted that, depending on the device type, there are different configurations for the AOS and AO's. For example, the Palm®'s AO data store 1050 resides on the Palm® device 804a itself and a separate AOS data store 1052 exists for this configuration (an Oracle database). In the case of Portal 1, the AOS and AO use the data store 1054.

Device engines can generate additional data packages intended to resolve synchronization problems in other systems. For example, interfacing with the conflict resolution module 940, if the user makes a change to a particular data store on an application object on his Palm® pilot, then makes an additional change to a personal information manager (PIM) application on his personal computer, the user can specify that the change made on the personal computer will "win" when the conflict is detected by the A engine and the versioning information between the two devices. This is essentially a definition that one particular set of data is correct and should replace the second set of data.

Figure 10:
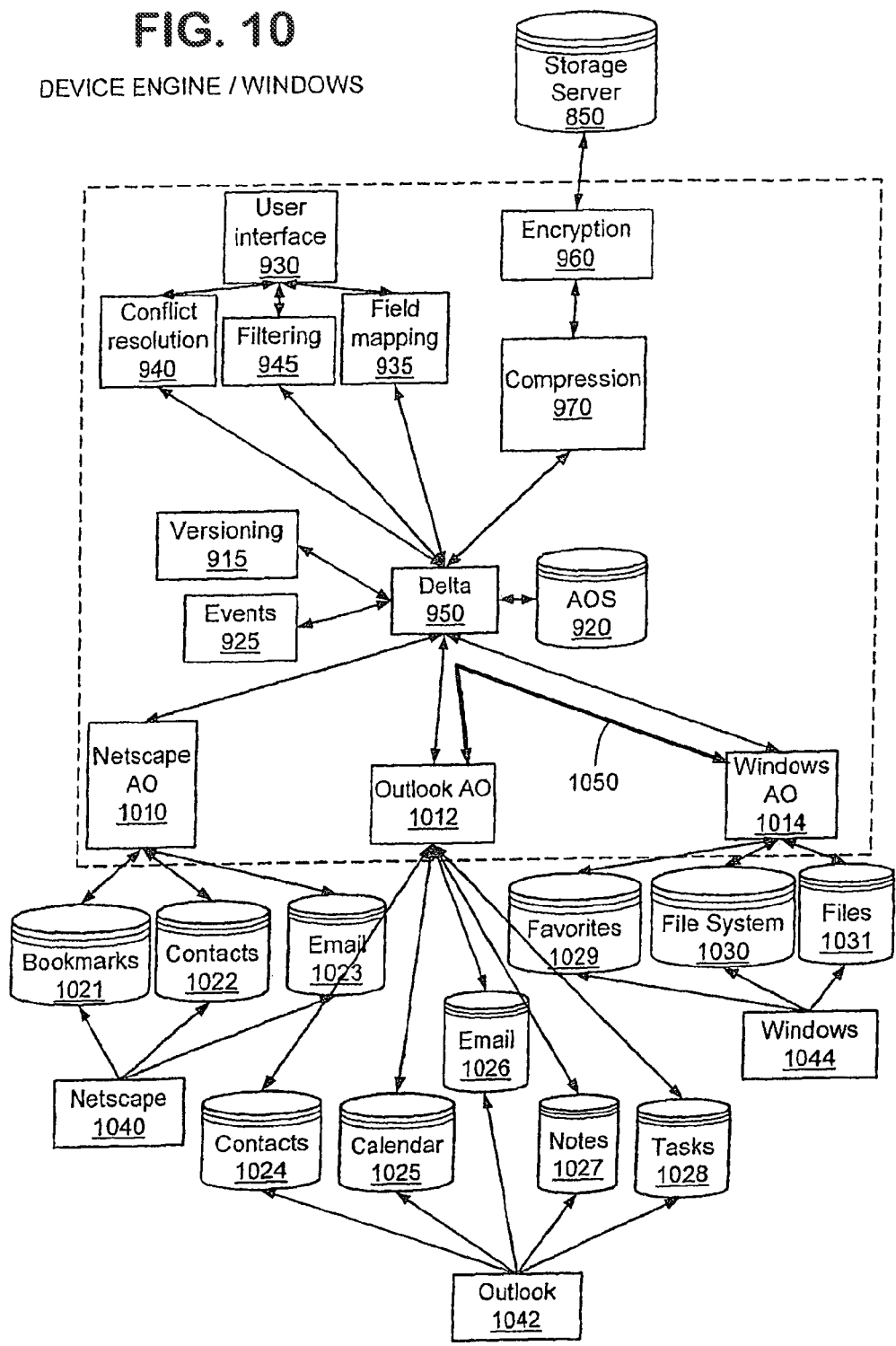
FIG. 10 is a block diagram of one embodiment of the device engine in an operating system such as Windows.

FIG. 10 shows a specific embodiment of a desktop device engine utilized in, for example, a Microsoft Windows-based operating system environment.

As shown in FIG. 10, a Windows operating system may have at least three specific applications which may require synchronization. In FIG. 10, the system includes Netscape Communicator application 1040 having data such as bookmarks 1021, contacts 1022, and e-mail 1023; a Microsoft Outlook application 1042 which includes contact information 1024, calendar information 1025, e-mail information 1026, note information 1027, and tasks information 1028; and Windows operating system 1044 information including Favorites data 1029, file system information 1030, and individual files 1031.

Each particular application 1040, 1042, 1044 has an associated application object 1010, 1012, 1014. Each of the respective application objects provides data back to delta module 950 in a generic format which is usable by the delta module in accordance with the foregoing description of the apparatus shown in FIG. 9A. From FIG. 10, it will be additionally seen how the delta module 950 may be utilized to synchronize data between applications running on the same particular server. The device engine hence does an intrasystem sync such as, for example, between the contact information 1022 from Netscape and the contact information 1024 from Outlook.

FIG. 10 further illustrates the modularity of the system of the present invention allowing the device engine to include any number of different application objects to be provided on a single device to incorporate all applications run on that device.

In operation, during an installation of a device engine into a particular system, the installation program may be tailored to provide application objects which may be present on a given system. For example, and with reference to FIG. 10, the installation program for a Windows machine will carry any number of application objects for systems and applications which may be present on a Windows machine. The installer will check for the presence of given applications, and allow the user to add additional applications which may be installed in locations that are not the normal default installation areas for application support by the application objects which the installer is carrying, or de-select certain applications which, for one reason or another, the user may not wish to install an application object for and render a part of the system of the present invention.

Application Object Structure

Figure 11:
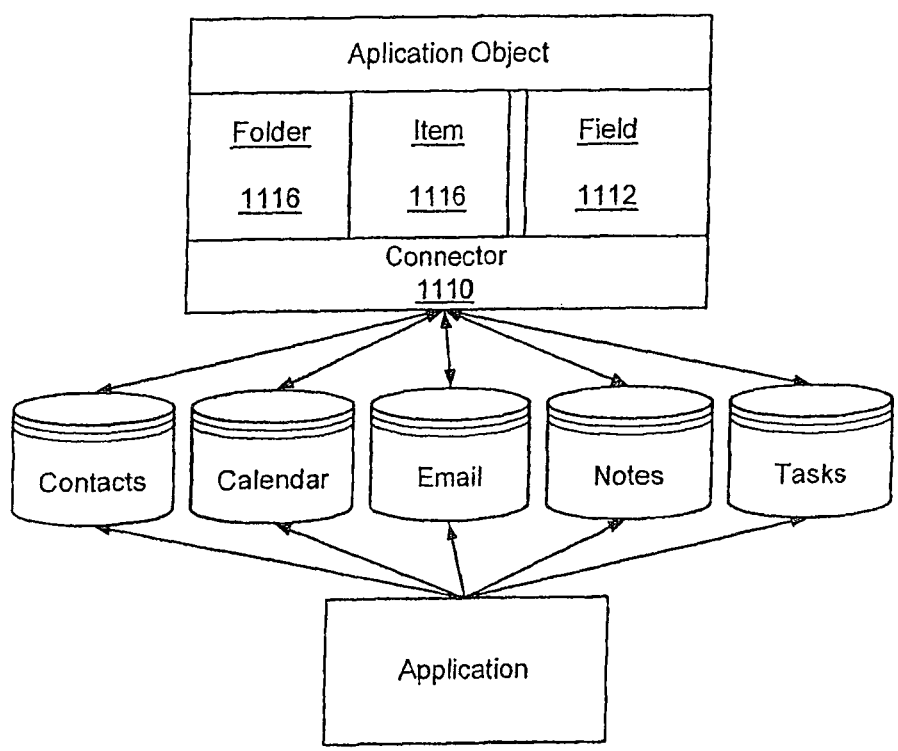
FIG. 11 is a block diagram of an application object incorporated into the device engine of the present invention.

FIG. 11 is a conceptual depiction of the structure of an application object. As noted above, the application object is a pluggable architecture which supports a wide variety of vendor-unique applications. The consistent and scalable architecture of the system of the present invention for device engines is maintained by encapsulating system-dependent knowledge in a single component, i.e. the application object. As noted above, every application object supports a standard set of interfaces that every device engine understands. Each application object maps these standard interfaces of the capabilities of a particular vendor application. Hence, there will be as many application objects as there are application types.

As noted above, there are different types of server and desktop device engines, some having application objects entirely on the server, while others have application objects entirely on the desktop.

Each application object will include a connector 1110 which may comprise a generic interface to the particular application for which the application object store has been designed. For example, when connecting to a Palm® device, the connector will be an HTTP protocol request routine which interfaces with the Palm® device's own built-in synchronization manager, which provides an output of records which have been changed on the Palm® device. As in FIG. 9B, since the Palm® outputs all the changes to its data via its own sync manager, in the Palm® application, the job of a server AO is simply to take the device-specific format of its record and convert into a universal record format.

The connector provides access for the application object to remove the data field from a particular application and convert it to a universal record structure. In the desktop AO, where, for example the application object is designed for a Windows interface, the connector may be the Windows API and the job of the AO will be to translate data from, for example, the windows file system to a universal data format. This universal data structure is then used by the delta module 950 to build data packages to be used in synchronization between components of the systems provided in the network system of the present invention.

Universal data structure mapping, used on desktop application objects, and universal data record mapping, used by the server device engines, is further detailed below.

Desktop Application Object

Each Application Object (AO) is a software component that interfaces with the third party application APIs (Application Programming Interface) to provide the programming services to the delta module for extraction and deposition of information data from and to the third party application domain during synchronization. In addition, the AO maps the third party application data fields to system's domain.

The AO service is a collection of COM (Component Object Model) objects that can be developed in conjunction with the third party Windows application APIs as a form of a DLL (Dynamic Linked Library) in C or C++. The DLL is loaded on demand at runtime during synchronization. It should be recognized that the application object need not be implemented using the COM model, but may be developed with other distributed object models.

There are a number of the related subsystems and documents that the developer must be familiar with and this document has made many references to those subsystems during the course of presenting the AO.

Change Log (CL) (or differencing information), a data file which contains a series of synchronization transactions.

DataPack, a compacted and encrypted Change Log.

Structured Delta, the delta module differentiation engine that generates differences between Application Objects and Change Log and AOS.

AOS, a database which resides locally on, for example, a windows machine. [0110] MS, a management server that manages users' accounts.

SS, an FTP or storage server that manages data packs.

User Manager, a standalone Windows client UI program that manages the synchronization process.

ePortal, a web-based PIM portal site.

pio_types.h, a header file which contains the definitions of the system's supported data fields known as tags.

Def.h, a header file contains the definitions of the system's constants.

interfaces.h, a COM interface file contains AO interface definitions.

Each AO has a COM interface-based design built-in. That is, instead of providing a set of traditional APIs as programming services, it provides a set of interface-based objects as programming services.

Structured Delta, the delta module, the primary intended user of each AO. StructuredDelta instantiates these COM objects and uses them throughout the synchronization session exclusively through the COM interfaces on those objects to interface with the third party application database.

Each AO component consists of a set of objects that translate the third party application data into the universal data middle format which underpins the entire spectrum of PIM data regardless of which third-party application the data comes from. The objects in universal data format are device, (application) data class, store, folder, item, and data fields. The AO digests the third party application data of any kind and reduces it into a few handful simple objects and field types. These objects and field types are fed into StructuredDelta engine and are compared by StructuredDelta in order of their hierarchy. The resulting differences (add, delete, modify) are logged as transactions in the difference information. The data packs are transported to a storage server that may be actively managed by a management server for each individual user account and devices.

StructuredDelta uses AO objects to access and modify the individual AO objects and data fields. AO objects serve as a buffer between individual application data and StructuredDelta so that StructuredDelta does not require knowledge of each application and database. All AO objects are temporary and created in the space of each AO by StructuredDelta through COM interfaces. AO objects are referenced when they are in use and they are freed when StructuredDelta stops using them. One can think of AO objects as merely placeholders of each application objects for StructuredDelta to access. Once StructuredDelta has a particular Application's data, StructuredDelta would free AO objects immediately without storing them internally.

AppObj

AppObj is a root object of each AO component and there is one and only one per AO. AppObj provides an entry point into the individual application's database. StructuredDelta instantiates it and holds it on during the entire synchronization session and releases it afterward. AppObj offers a number of services such as what class of data it supports. The C++ example of AppObj's definition is shown below:

TABLE 1

| class CMyF1 AppObj: | |
|---|---|
| public | Item, |
| public | AppObj, |
| protected | ModuleIdentity, |
| protected | DataClassInfo, |
| protected | ItemTypeInfo, |
| protected | ItemFieldMap, |
| protected | FolderInfo, |
| protected | DataFileInfo, |
| protected | SynchNotify, |
| protected | ErrorMsg, |
| protected | EnumItems, |
| protected | FindItem, |
| protected | ModifyItem |
| { | |
| public: | |
| CMyAppObj( HWND hWndParent ); | |
| ~CMyFppObj( ); | |
| }; | |

AppObj can contain children objects. They are Store objects. EnumItems interface is used to enumerate Store objects. FindItem interface is used to find the contained objects. ModifyItem interface enables AppObj to create a new Store object. AppObj is created by StructuredDelta calling CreateAppObject(HWND hWndParent, AppObj **ppObj).

Store

The Store object represents a database of the individual application information. If the individual application can handle multiple databases at same time, one needs multiple Store objects. One can think of Store object as a specialized Folder object, the root folder of each particular application data domain. The C++ example of Store's definition is shown below:

TABLE 2

| class CMyStore : | |
|---|---|
| public | Item, |
| public | ItemContainer, |
| protected | EnumItems, |
| protected | FindItem, |
| protected | FindItemByData, |
| protected | ModifyItem, |
| protected | ReadWrite |
| { | |
| CMyStore( ); | |
| ~CMyStore( ); | |
| }; | |

Store is a container of Folder objects. EnumItems interface enables the enumeration of its contained folders while Find Item and Find ItemByData interface is used to find contained Folders or Item objects. ModifyItem and ReadWrite interface enables the modification of each application database.

Folder

Folder object is a specific data class of each individual application such as a table in the relational database or a collection of data records in each application. For example, the applications contact collection can be thought as a Folder object. The C++ example of Folder's definition is shown below:

TABLE 3

| class CMyFolder : | |
|---|---|
| public | Item, |
| public | ItemContainer, |
| protected | EnumItems, |
| protected | FindItem, |
| protected | FindItemByData, |
| protected | ModifyItem, |
| protected | ReadWrite |
| { | |
| public: | |
| CMyFolder( ); | |
| ~CMyFolder( ); | |
| }; | |

Folder object is also container. It can contain Item objects as well as Folder objects. EnumItem interface allows the enumeration of either Folder objects or Item objects or both. FindItem and FindItemByData interface is used to find contained Folder objects or Item objects. ModifyItem and ReadWrite interface enables the modification of an application's data tables.

Item

Item object represents an individual entity of each application's domain specific data. Item object can be thought as a record of each application's relational table. For example, a contact, email, calendar, to-do item in the particular application can be thought of as an Item object. The C++ example of Item's definition is shown below:

TABLE 4

```
class CMyItem :
public              Item,
protected           EnumItems,
protected           FindItem,
protected           ModifyItem,
protected           ReadWrite
{
public:
CMyItem( );
~CMyItem( );
};
```

Item can contain Attachment objects only, EnumItems interface enables the enumeration of Attachment objects if any. ModifyItem and ReadWrite interface enables the modification of an application's records or data fields.

Attachment

Attachment object is a specialized Item object that encapsulates an attachment data or relationship. Only Item can have Attachment objects. Attachment object can be thought as attachment data such as attached-email files. Attachment can also be thought as attachment relationship to other Item objects. The example of that is the distribution list (Item object) can contain contacts (Item objects). The C++ example of Item's definition is shown below:

TABLE 5

```
class CMyItemAttachment :
public Item,
protected ReadWrite,
protected ModifyItem
{
public:
CMyItemAttachment( );
~CMyItemAttachment( );
};
```

Variant

Variant object represents a data field of each particular application data. For example, a 'first name' of a contact or the birthday date of a contact can be thought as Variant object. StructuredDelta only understands Variant object and the types of data fields it encapsulated. Variant object can contain any one of the following data field type:

TABLE 6

| struct Variant | | |
|---|---|---|
| { | | |
| enumFieldTag | tag; | |
| enumFieldDataFlag | flag; | // flags item fields as not known or otherwise special |
| union | | |
| { | | |
| short int | i; | // eFieldType_WORD |
| LONG | l; | // eFieldType_LONG |
| DWORD | dw; | // eFieldType_DWORD v |
| unsigned_int64 | qw; | // eFieldType_QWORD |
| UUID | uuid; | // eFieldType_UUID |
| DATE | time; | // eFieldType_DATE |
| LPTSTR | psz; | // eFieldType_String |
| Binary | bin; | // eFieldType_Binary |
| Float | flt; | // eFieldType_Float |
| Double | dbl; | // eFieldType_Double |

TABLE 6-continued

| F1Collection | coll; | // eFieldType_Collection |
|---|---|---|
| }Value; | | |
| Stream* | strm; | // eFieldType_Stream |
| }; | | |

Variant::tag is an identification tag of data field and variant::flag specifies the type of data field while Variant::value member variable stores each application's field value. One data field type is Collection. Collection object is an array of Variant objects. It can be used to represent a compound data fields.

TABLE 7

| struct Collection | | |
|---|---|---|
| { | | |
| ULONG | cValues; | |
| struct_Variant** | aVar; | //This array really contains cValues entries |
| }; | | |

Another data field type that is worth exploring is Binary. Binary object can be used to represent a binary data as it is.

TABLE 8

| struct Binary | |
|---|---|
| { | |
| ULONG | cb; |
| LPBYTE | lpb; |
| }; | |

AO Interfaces

Each AO object has an AO COM interface. Each object must implement some of those interfaces to create certain capability or desired behavior that are expected by StructuredDelta.

IItem

This is the base interface of all application objects. It provides the identification service to StructuredDelta. Every object must have a unique ID, parent unique ID, display name, and item type information (eItemType_FOLDER, eItemType_CONTACT, etc). The unique ID is a unique string only in a given device. It is not persistent cross the Internet to other devices. The ID usually comes from the third party application database domain such a unique ID of a record.

TABLE 9

```
interface IItem : IUnknown
{
STDMETHOD_(LPCTSTR, GetUniqueID) ( ) const PURE;
STDMETHOD_(LPCTSTR, GetParentUniqueID) ( ) const PURE;
STDMETHOD_(LPCTSTR, GetDisplayName) ( ) const PURE;
STDMETHOD_(enumItemType, GetItemType) ( ) const PURE;
STDMETHOD_(BOOL, IsContainer) ( ) const PURE;
STDMETHOD_(DATE, GetLastModificationTime) ( ) const PURE;
STDMETHOD_(QWORD, GetSize) ( ) const PURE;
STDMETHOD_(DWORD, GetFlags) ( ) const PURE; };
```

IItemContainer

This is the base interface of all application container objects (store, folder). These container objects must have this interface implemented so that StructuredDelta would recursively descend in them if they have IItemContainer capability.

TABLE 10

```
interface IItemContainer : IItem
{
STDMETHOD_(BOOL, ContainsItemType)( enumItemType eItemType )
PURE;
STDMETHOD_(BOOL, ContainsDataClass)( enumDataClass eDataClass )
PURE;
STDMETHOD_(enumSpecialFolderType, GetSpecialFolderType) ( ) PURE;
STDMETHOD_(GUID, GetMappingGUID) ( ) PURE;
};
```

IErrorMsg

This is an error-reporting interface for every application object. It is used by StructuredDelta to query the error string after a failure. The AO should implement this on every object after the error occurs and before returning the control to StructuredDelta.

TABLE 11

```
interface IErrorMsg : IUnknown
{
STDMETHOD(GetErrorString) ( LPTSTR pszError, int iBufLen ) const
PURE;
};
```

IEnumItems

This is an interface for collection enumeration, used by StructuredDelta to enumerate the objects of the third party application database. IEItemEnumFlags (eItemEnumFlags_FOLDER, eItemEnumFlags_ITEM, and eItemEnumFlags_ATTACHMENT) is used to enumerate only the requested type of objects.

TABLE 12

```
interface IEnumItems : IUnknown
{
STDMETHOD(ItemQueryStart) ( enumItemType type, long &lCount,
eItemEnumFlags dwFlags ) PURE;
STDMETHOD(ItemQueryNext) ( Item **ppItem ) PURE;
STDMETHOD(ItemQueryFinish) ( ) PURE;
};
```

IFindItem

This is an interface for recursively finding object within the third party application database, used by StructuredDelta to find application object by its unique ID.

TABLE 13

```
interface IFindItem : IUnknown
{
STDMETHOD(FindStoreByID) ( LPCTSTR pszUniqueID, ItemContainer
**ppFolder ) PURE;
STDMETHOD(FindFolderByID) ( LPCTSTR pszUniqueID, ItemContainer
**ppFolder ) PURE;
STDMETHOD(FindItemByID) ( LPCTSTR pszUniqueID, Item **ppItem )
PURE;
};
```

IFindItemByData

This is an interface for recursively finding the object that matches the search criteria data. The search criteria are represented as Collection that allows the multiple search field keys to be used during the search. The multiple objects may be found that match the search criteria. The interface also provides enumeration capability of the search results.

TABLE 14

```
interface IFindItemByData : IUnknown
{
STDMETHOD(FindByDataStart) ( enumItemType type, Variant*
pSearchKey, int* pnFound ) PURE;
STDMETHOD(FindByDataNext) ( LPTSTR pszEntryID, int cbBufSize )
PURE;
STDMETHOD(FindByDataFinish) ( ) PURE;
};
```

IModifyItem

This is an interface for Structured Delta to add, delete, and re-parent application data in the third party database during synchronization.

TABLE 15

```
interface IModifyItem : IUnknown
{
STDMETHOD(Add) ( BOOL bFolder, enumItemType type,
Item **ppItem ) PURE;
STDMETHOD(Delete) ( ) PURE;
STDMETHOD(Move) ( ItemContainer * pDestFolder ) PURE;
};
```

IReadWrite

This is an interface for accessing, writing, and mapping the third party application data fields by StructuredDelta. It provides the capability of read and write data fields from and to the third party application database and the capability of mapping data field of the third party application to universal data format of the system of the present invention. Any object that has data fields and require field level synchronization must implement this interface.

TABLE 16

```
interface IReadWrite : IUnknown
{
STDMETHOD(Read) ( ) PURE;
STDMETHOD(Commit) ( ) PURE;
STDMETHOD(GetFieldData) ( enumFieldTag fieldTag,
Variant **ppVariant ) PURE;
STDMETHOD(ReleaseFieldData) ( Variant *pVariant ) PURE;
   STDMETHOD(SetFieldData) ( const Variant *pVariant ) PURE;
};
```

IAppObj

This is an AppObj only interface. It provides the capability of logon and logoff to the third party applications during synchronization. The data class filter mechanism is used by StructuredDelta to filter the enumeration of contained data classes (eDataClass_CONTACT, eDataClass_CALENDAR, etc).

TABLE 17

```
interface IAppObj : IUnknown
{
STDMETHOD(Logon) ( HWND hWndParent ) PURE;
STDMETHOD(Logoff) ( ) PURE;
STDMETHOD(SetFilter) ( const VOID* pFilter, int BufLen ) PURE;
STDMETHOD_(int, GetFilter) ( VOID* pFilter, int BufLen ) PURE;
};
```

IModuleIdentity

This is an AppObj only interface. It provides DLL module identification information to the Manager object such as the name of the third party application, enum ID of this application, and the application installation detection support.

TABLE 18

```
interface IModuleIdentity : IUnknown
{
    STDMETHOD(GetName) ( LPTSTR pszName, int iBufLen ) const
    PURE;
    STDMETHOD(GetAppl) ( Appl *pAppl ) const PURE;
    STDMETHOD(IsInstalled) ( BOOL *bIsInstalled ) const PURE;
};
```

IItemTypeInfo

This is an AppObj only interface. It provides the information on the number of item types supported by AO, what type items are supported and the capabilities for a specific item type. This returns a DWORD containing bits set.

TABLE 19

```
interface IItemTypeInfo : IUnknown
{
STDMETHOD(GetSupportedTypesCount) ( int &iCount ) PURE;
STDMETHOD(GetSupportedTypeInfo) ( int iIndex,
enumItemType &type, LPTSTR pszTypeName, int iBufLen ) PURE;
STDMETHOD(GetItemTypeCaps) ( enumItemType type, DWORD
&dwFlags ) PURE;
};
```

IDataClassInfo

This is a CAppObj only interface. It provides the information on the number of data classes that are supported by the application object and what the data classes are supported

TABLE 20

```
interface IDataClassInfo : IUnknown
{
    STDMETHOD(GetCount) ( int *piCount ) PURE;
    STDMETHOD(GetDataClass) ( int iIndex, enumDataClass
    *peDataClass ) PURE;
};
```

IDataFileInfo

This is a CAppObj only interface, it provides information on the number of database files and database filenames supported by AO to avoid being synched twice by application sync and file-set sync.

TABLE 21

```
interface IDataFileInfo : IUnknown
{
    STDMETHOD(GetDataFileCount) ( int *piCount ) PURE;
    STDMETHOD(GetDataFilePath) ( int iIndex, LPTSTR
    pszFilePath, int iBufLen ) PURE;
};
```

IItemFieldMap

This is a CAppObj only interface that is used by StructuredDelta to query the data fields of given application object. For example, what are data fields in application object called eItemType_CONTACT?

TABLE 22

```
interface IItemFieldMap : IUnknown
{
STDMETHOD(FieldQueryStart) ( const enumItemType &type,
int &iCount) PURE;
STDMETHOD(FieldQueryNext) ( enumFieldTag &field, LPTSTR
pszName, int iBufLen, LPTSTR pszType, int iTypeBufLen )PURE;
STDMETHOD(FieldQueryFinish) ( ) PURE; }
};
```

IFolderInfo

This is a CAppObj only interface, used by StructuredDelta to obtain the special and default folders' unique IDs and UUIDs.

TABLE 23

```
interface IFolderInfo : IUnknown
{
    STDMETHOD(GetSpecialFolderID) ( enumSpecialFolderType
    eFolder, LPTSTR pszUniqueID, int iBufLen ) PURE;
    STDMETHOD(GetDefaultFolderID) ( enumItemType type,
    LPTSTR pszUniqueID, int iBufLen ) PURE;
    STDMETHOD(MapFolderGUID) ( UUID uuidFolder, LPTSTR
    pszUniqueID, int iBufLen ) PURE;
};
```

IFastSync

This is a CAppObj only interface that is used by StructuredDelta to query if the given AO also provides FastSync service or not. FastSync is a DLL component that is written using the third party APIs and loaded into the third party application to receive the changes in database while users are operating the application. It is used to speed up the synchronization performance by syncing only the objects that are known to IFastSync component.

TABLE 24

```
interface IFastSync : IUnknown
{
STDMETHOD(GetFastSync) ( enumDataClass eDataClass, BOOL*
pbFastSync ) PURE;
};
```

Synch Notify

This is a CAppObj only interface that is called by Manager to notify the third party application the state of synchronization: start, finished, or reset so that the application can prepare itself accordingly.

TABLE 25

```
interface ISynchNotify : IUnknown
{
    STDMETHOD(SynchNotify) ( enumSynchNotify eNotify ) PURE;
};
```

Server AO

Server Application Objects share many characteristics with desktop application objects, including support for reading and mapping to the universal record structure set forth above.

Nevertheless, among various devices incorporated into the system of the present invention, each application object database will be quite different. For example, the Palm® database on the device is really just a memory space with records laid out sequentially in memory. In a web portal-type application, the application object may be an Oracle database. Server application objects may generally have less difficult tasks since the applications supported are generally either devices providing their own change data output, (such as Palm® type PDA's), or which do not have a great deal of data to export (such as cell phones, having only name and number information).

Nevertheless, each application object must support all calls defined in a class interface definition as follows:

TABLE 26

| FUNCTION | DESCRIPTION |
| --- | --- |
| Open | Perform an initialization of the device before data retrieval functions are called. |
| Close | Done with database calls, cleanup if necessary. |
| Get First Modified Record | Get the first modified record from the device and insert into application object. |
| Get Next Modified Record | Get the next modified record from the device and insert into the application object. |
| Add Record | Add a record into the application object database. |
| Update Record | Update a record. |
| Delete Record | Delete a record in the application object database. |
| Set Device Records | A function called during the synchronization manager to send a bytestream to the application object for interpretation. The bytestream will contain a list of records to add to the application object modified records list. At a later point in time, such records will be retrieved by the Get First Modified Record/Get Next Modified Record functions. |
| Get Device Records | For records bound to the device, this call gets a bytestream that contains a list of records to add back to the device. There is an outbound record list that is saved until this call is finished, at which time the sync server will be finished with the application object. |
| Set Device Response | A function used to modify or repair a record input saved in the application |

TABLE 26-continued

| FUNCTION | DESCRIPTION |
| --- | --- |
| | object store that was sent to the device in the Get Device Records call, such as a record ID for a record. If 10 records were sent to the device during the Get Device Records call, one would expect to see 10 records coming back in during this function call. |

As noted above, because each application object database is different, the calling convention and the application object itself will likewise be different. The calling convention for a Palm® device's sync manager application object is given in the following pseudo-code:

TABLE 27

```
Call AO::Open
Call AO::WriteRecords
Start synchronization process
While more records in AO Data Object
    Call AO::GetFirstModifiedRecord( )
    Call AO::GetNextModifiedRecord( )
END
IF new records THEN
    Call AO::AddRecord( )
IF deleted records THEN
    Call AO::DeleteRecord( )
IF update record THEN
    CALL AO::UpdateRecord( )
Call AO::Close
```

As shown therein, the calling convention is designed to be integrated with the Palm's® own sync manager.

A second example provided below shows mapping of a portion of a web portal's contact database:

TABLE 28

```
MappingItem CContactTable::m_FieldMap[ ] =
{
{1,    eFieldTag_Contact_FirstName,            "firstname"},
{1,    eFieldTag_Contact_MiddleName,           "middlename"},
{1,    eFieldTag_Contact_LastName,             "lastname"},
{1,    eFieldTag_Contact_Title,                "title"},
{1,    eFieldTag_Contact_Suffix,               "suffix"},
{1,    eFieldTag_Contact_Anniversary,          "anniversary"},
{1,    eFieldTag_Contact_Birthday,             "birthday"},
{1,    eFieldTag_Contact_AssistantName,        "assistantname"},
{1,    eFieldTag_Contact_Children,             "children"},
{1,    eFieldTag_Contact_CompanyName,          "companyname"},
{1,    eFieldTag_Contact_Department,           "department"},
{1,    eFieldTag_Contact_FTPSite,              "ftpsite"},
{1,    eFieldTag_Contact_Gender,               "gender"},
{1,    eFieldTag_Contact_JobTitle,             "jobtitle"},
{1,    eFieldTag_Contact_ManagerName,          "managername"},
{1,    eFieldTag_Contact_NickName,             "nickname"},
{1,    eFieldTag_Contact_Office,               "office"},
{1,    eFieldTag_Contact_Profession,           "profession"},
{1,    eFieldTag_Contact_Spouse,               "spouse"},
{1,    eFieldTag_Contact_SelectedMailingAddress, "selectedmailingaddress"}
};
int CContactTable::m_nNumFields =
sizeof(m_FieldMap)/sizeof(MappingItem);
HRESULT CPortalAddrOCI::InsertRecord( MappingItem theMap[ ], int numFields,
CDataAccessor *pInsertItem, CF1ItemUniversal *pUnivItem, bool bForceCreate )
{
bool bHasData = SetRecordFields( theMap, numFields, pInsertItem, pUnivItem );
    f( bHasData || bForceCreate )
    {
    // Insert the record into the database and execute the command
        pInsertItem->InsertRow(0);
        pInsertItem->Exec( );
    }
```

TABLE 28-continued

```
    return S_OK;
}
```

The above example of mapping the contact field files maps contact fields from a particular web contact information database to fields in the universal record format from the master list header file (pio_types.h) in the system of the present invention. This mapping is for a specific contact table and it should be understood that other information, such as phone numbers, e-mail addresses, and other contact information may be stored in a separate table.

Once data is extracted from a particular application, the server application object must then convert the information into the universal record format which can be utilized by other server device engines to take content information into their own particular application.

Universal Record Format

The universal record format is used by each server device engine to handle various tasks of encapsulating records in a common format, comparing records, creating and holding differences between records, and other tasks of synchronization.

The universal record format allows the application objects to support a wide range of extensible application item types such as contacts, calendar, mail, bookmarks, and the like. Flexible type name and value associations permit synchronization without regard to individual vendor application information formats. Each application object encapsulates mapped knowledge from the vendor unique format to the universal format of the present invention. As such, an application object can be designed to support any combination of application and binary information types. In essence, application objects can be designed to support a vendor application using only binary file synchronization if the internal format of the application is not known.

Server application objects can also be designed to create collections. For example, if the user wishes to create a "my pictures" collection which consists of some collection of information and synchronize this collection of information, such an arbitrary grouping of classes of information into appropriate representations is supported.

Because the connector layer of the interfaces to the actual storage with a vendor application varies with application type, application access methods can include, but are not limited to, disk or database access, network protocols, wireless device protocols, and the like.

The Universal Records Format and the Universal Field Format class definitions are given below:

TABLE 29

```
typedef map < enumFieldTag, CUniversalField, less_enumFieldTag >
UniversalRecordMap;
typedef UniversalRecordMap::value_type UniversalRecordPair;
typedef UniversalRecordMap::iterator UniversalRecordIterator;
typedef UniversalRecordMap::const_iterator
ConstUniversalRecordIterator;
class CUniversalRecord
{
private:
UniversalRecordMap recordMap_;
public:
    bool conflicts(const CUniversalRecord& rhs);
    bool add(const CUniversalRecord &rhs);
    bool subtract(const CUniversalRecord& rhs);
    CUniversalRecord( );
```

TABLE 29-continued

```
    CUniversalRecord( const CUniversalRecord& rhs );
    virtual ~CUniversalRecord( );
    // add this element
    HRESULT insert( enumFieldTag eId, long value,
enumFieldDataFlag flag = eFieldDataFlag_Normal);
    HRESULT insert( enumFieldTag eId, LPCTSTR value,
enumFieldDataFlag flag = eFieldDataFlag_Normal);
    HRESULT insert( enumFieldTag eId, DATE value,
enumFieldDataFlag flag = eFieldDataFlag_Normal);
    HRESULT insert( enumFieldTag eId, string value,
enumFieldDataFlag flag = eFieldDataFlag_Normal);
    HRESULT insert( UniversalRecordPair p );
    CUniversalRecord exclusiveLeftWins( CUniversalRecord& rhs );
    CUniversalRecord inclusiveLeftWins( CUniversalRecord& rhs );
    bool removeSame(const CUniversalRecord &rhs);
    bool Find( const enumFieldTag eId, CUniversalField &field );
    UniversalRecordMap::iterator find( const enumFieldTag eId ) {
    return recordMap_.find(eId); }
    UniversalRecordMap::iterator begin( ) { return
recordMap_.begin( ); }
    UniversalRecordMap::iterator end( ) { return
recordMap_.end( ); }
    bool empty( ) { return
recordMap_.empty( ); }
    long size( ) { return
recordMap_.size( ); }
    UniversalRecordMap::iterator erase(UniversalRecordMap::iterator&
it) { return recordMap_.erase(it); }
    void clear( ) { recordMap_.clear( ); }
};
```

The UniversalField Structure

TABLE 30

```
class CUniversalField
{
public:
    enum eUniversalField
    {
        eUF_Unknown,
        eUF_Long,
        eUF_String,
        eUF_Date,
        eUF_Blob
    };
protected:
    eUniversalField typeId_;
    enumFieldTag fieldId_;
    enumFieldDataFlag flag_;
    size_t len_;
    union
    {
        long l;
        DATE d;
        TCHAR* pCh;
    } value_;
public:
    CUniversalField( );
    CUniversalField( const CUniversalField& rhs );
    CUniversalField( enumFieldTag itemId, long value,
enumFieldDataFlag flag = eFieldDataFlag_Normal);
    CUniversalField( enumFieldTag itemId, DATE value,
enumFieldDataFlag flag = eFieldDataFlag_Normal);
    CUniversalField( enumFieldTag itemId, LPCTSTR value,
enumFieldDataFlag flag = eFieldDataFlag_Normal);
    CUniversalField( enumFieldTag itemId, string blob,
enumFieldDataFlag flag = eFieldDataFlag_Normal);
    ~CUniversalField( );
    bool operator==( const CUniversalField& rhs ) const;
    bool operator!=( const CUniversalField& rhs ) const { return
```

TABLE 30-continued

```
        !operator==(rhs); }
    CUniversalField& operator=( const CUniversalField& rhs);
    eUniversalField getType( ) const { return typeId_; }
    enumFieldTag getFieldID( ) const { return fieldId_; }
    enumFieldDataFlag getFlag( ) const { return flag_; }
    size_t getLength( ) const { return len_; }
    LPCTSTR getString( ) const { ASSERT( eUF_String ==
typeId_); return value_.pCh; }
    long getLong( ) const { ASSERT( eUF_Long ==
typeId_); return value_.l; }
    DATE getDate( ) const { ASSERT( eUF_Date ==
typeId_); return value_.d; }
    string getBlob( ) const { ASSERT( eUF_Blob ==
typeId_); return string(value_.pCh,len_); }
    void get( LPCTSTR& p ) const { ASSERT( eUF_String ==
typeId_); p = value_.pCh; }
    void get( long& l ) const { ASSERT( eUF_Long ==
typeId_); l = value_.l; }
    void get( DATE& d ) const { ASSERT( eUF_Date ==
typeId_); d = value_.d; }
    void get( string& b ) const { ASSERT( eUF_Blob ==
typeId_);
    b.assign(value_.pCh,len_); }
        bool isString( ) const { return typeId_ == eUF_String; }
        bool isLong( ) const { return typeId_ == eUF_Long; }
        bool isDate( ) const { return typeId_ == eUF_Date; }
        bool isBlob( ) const { return typeId_ == eUF_Blob; }
};
```

EXAMPLE

An example of how data is removed from one particular application data type and converted into the universal record format is given below for an Oracle database:

TABLE 31

```
#include "stdafx.h"
#include <string>
using namespace std;
#include "F1ItemUniversal.h"
#include "oci.h"
#include "OCIDefs.h"
#include "OCIConnect.h"
#include "OCISession.h"
#include "OCIColumn.h"
#include "OCICursor.h"
#include "DataAccessor.h"
#include "UniversalMapper.h"
#include "UniversalRecord.h"
#include "F1Util.h"
#include "BaseAOSTableOCI.h"
/*
* Function: MapFields
* Description: Map fields from an Oracle database record into an UniversalRecord
format.
*/
void CBaseAOSTableOCI::MapFields ( CDataAccessor *pAccessor, MappingItem
theMap[ ], int numFields, CUniversalRecord &univRec )
{
    string sValue;
    DATE dtValue;
    LONG lValue;
    double dValue;
    for( int inx=0; inx<numFields; inx++ )
    {
        enumFieldTag fieldID = theMap[inx].m_universalFieldID;
        switch( F1PropType( fieldID ) )
        {
            case eFieldType_Binary:
            {
// to fill properly, 1st name and last name should already be assigned
                CUniversalField emailField;
                string sValue;
                if ( SUCCEEDED(BuildEmailField( pAccessor, sValue,
emailField )) )
                    univRec.insert ( fieldID, emailField.getBlob( ) );
                break;
            }
            case eFieldType_String:
                if( pAccessor->GetFieldvalue( fieldID, sValue ) )
                {
                    if ( 0 == ::_tcslen(sValue.c_str( )) )
                        continue;
                    univRec.insert( fieldID, sValue.c_str( ) );
                }
                break;
            case eFieldType_DATE:
                if( pAccessor->GetFieldValue( fieldID, dtValue ) )
                    univRec.insert( fieldID, dtValue );
                break;
            case eFieldType_DWORD:
                if( pAccessor->GetFieldValue( fieldID, lValue ) )
                    univRec.insert( fieldID, lValue );
```

TABLE 31-continued

```
                break;
            case eFieldType_Double:
                if( pAccessor->GetFieldValue( fieldID, dValue ) )
                    univRec.insert( fieldID, dValue );
                break;
        }
    }
}
HRESULT CBaseAOSTableOCI::InsertRecord( MappingItem theMap[ ], int numFields,
CDataAccessor *pInsertItem, CF1ItemUniversal *pUnivItem, bool bForceCreate )
{
    bool bHasData = SetRecordFields( theMap, numFields, pInsertItem, pUnivItem
);
    if( bHasData || bForceCreate )
    {
        pInsertItem->InsertRow(0);
        pInsertItem->Exec( );
    }
    return S_OK;
}
/*
* Function: SetRecordFields
* Description: Map fields from an UniversalRecord format into an Oracle database
record (pInsertItem)
*/
bool CBaseAOSTableOCI::SetRecordFields( MappingItem theMap[ ], int numFields,
CDataAccessor *pInsertItem, CF1ItemUniversal *pUnivItem )
{
    bool bHasData = false;
    CUniversalField field;
    for( int inx=0; inx<numFields; inx++ )
    {
        enumFieldTag fieldID = theMap[inx].m_universalFieldID;
        BOOL bExists = pUnivItem->m_record.Find( fieldID, field );
        if( bExists )
        {
            bHasData = true;
            if( field.isBlob( ) )
            {
                string blob = field.getBlob( );
                LPCTSTR szEmailAddr =
GetAddressFromRecipients((F1RECIPIENTS*)blob.c_str( ));
                if( szEmailAddr && *szEmailAddr != NULL )
                    pInsertItem->SetFieldValue( fieldID, (string)szEmailAddr );
                else
                {
                    bHasData = false;
                    continue;
                }
            }
            else if( field.isString( ) )
            {
                string sValue = field.getString( );
                if( !sValue.empty( ) )
                    pInsertItem->SetFieldValue( fieldID, sValue );
            }
            else if( field.isLong( ) )
            {
                LONG nValue = field.getLong( );
                pInsertItem->SetFieldValue( fieldID, nValue);
            }
            else if( field.isDate( ) )
            {
                DATE dValue = field.getDate( );
                if( dValue )
                    pInsertItem->SetFieldValue( fieldID, dValue );
            }
        } // if( bExists )
    } // For all fields
    return bHasData;
}
```

While the above-identified code is specific to, for example, an Oracle database, one of average skill in the art will readily recognize that the technique utilized above may be adapted to other types of databases containing records and fields of interest. In the above code examples, all fields which are mapped from a particular application are mapped to fields in the master mapping file.

Management Server

In order to provide security and identification of particular users in an Internet-implemented synchronization system, a management server may be provided in the system of the present invention. The management server is a centralized server which controls behavior and characteristics of the entire network of device engines across all users.

Figure 14:
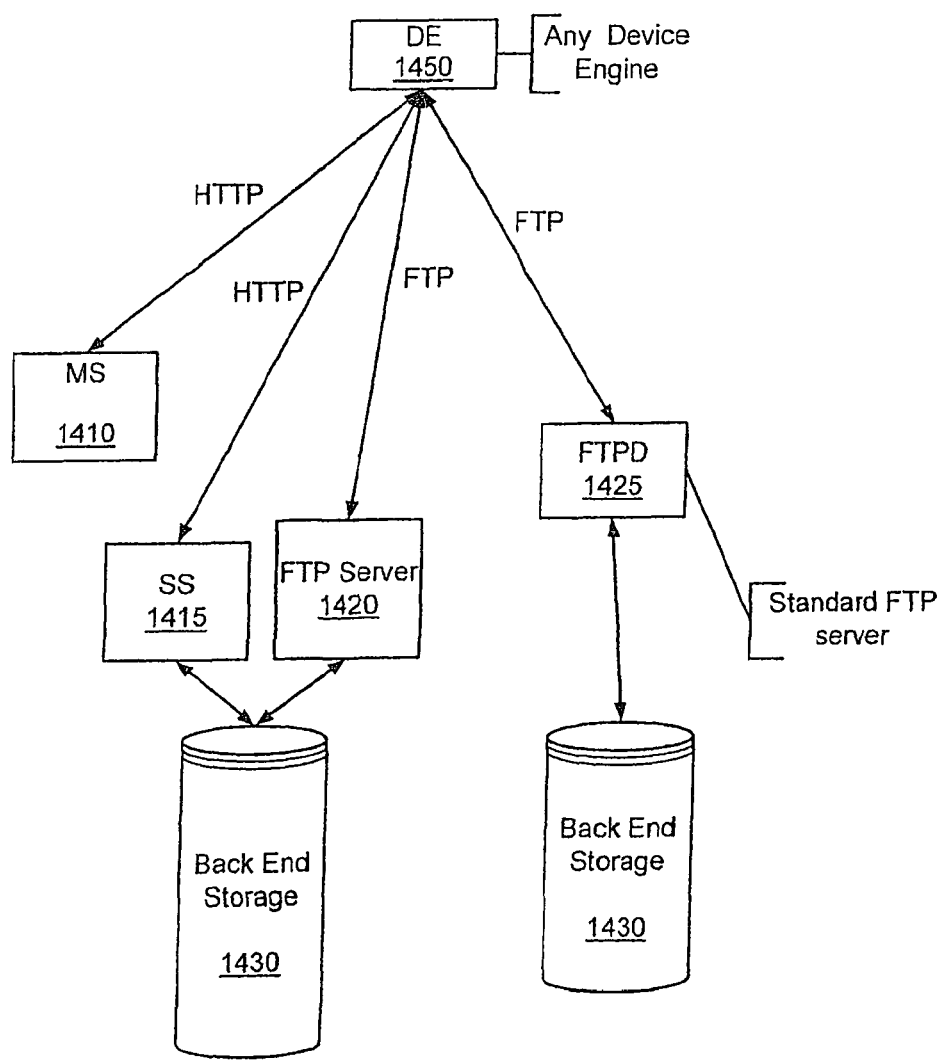
FIG. 14 is a block diagram of a management storage server architecture for used in the system of the present invention.

FIG. 14 shows the general representation of how a management server 1410 integrates itself into the system of the present invention. Shown in FIG. 14 is an exemplary device engine 1450 which has HTTP links to both a management server 1410, a storage server 1415, and a generic FTP server 1420. As will be discussed hereinafter with reference to the process of the present invention, and the specific implementation of the data below shown in FIGS. 15-17, the management server interacts with the device engine to control authorized access to information on the storage server, or a generic FTP server 1420,1425 to access device-specific information storage 1430 in accordance with the system of the present invention. This allows any device coupling to the Internet to have access to management protocols and to retain user information across all platforms which the data which is being synched by the system of the present invention must access.

The management server communicates using hypertext transfer protocol (HTTP) which may be implemented with a secure sockets layer (SSL) to ensure security.

In particular, the management server supports an authentication interface that requires each device engine to authenticate with the management server before performing synchronization. Certain storage server implementations may utilize locking semantics to control read and write access to storage for multiple device engines. For example, in a generic FTP request, if two device engines attempt to connect to the same data at the same time, there must be some form of locking control to prevent device engines accessing the same data at the same time. In this instance, the management server controls the device engine acquisition, renewal, and releasing of locks against data stored in the network.

Each device engine is uniquely identified and tracked by the management server. This allows for tailoring behavior between the management server and specific types of storage systems and device engine components. All device engine components are tagged and version stamped for management via the management server.

Device actions can request updated copies of individual device engine components, permitting self-update and configuration of device engine systems. This permits minimal download designs for device engines that are on low bandwidth connections enabling the device engines to download additional required components at a later time.

In a further aspect of the system, a value added component may be provided where the management server can support client's advertising mechanisms, enabling the display of banner or similar advertising on a device engine system without the need for a web browser. Cycling of advertisements, statistic collection, and the like, are managed via management server protocols. Online purchase and subscription mechanisms are also supported using the management server protocol.

The management server further supports the accounting, sign-up registration, device edition, storage server selection, and similar functions for each user in the system. In one embodiment, the management server may retain password and encryption information for a given user account. In a second embodiment, such information is not retained. The second embodiment provides the advantage that users may feel more secure if the maintainer of the management server is not in possession of the password to access data in the user's account.

Figure 15:
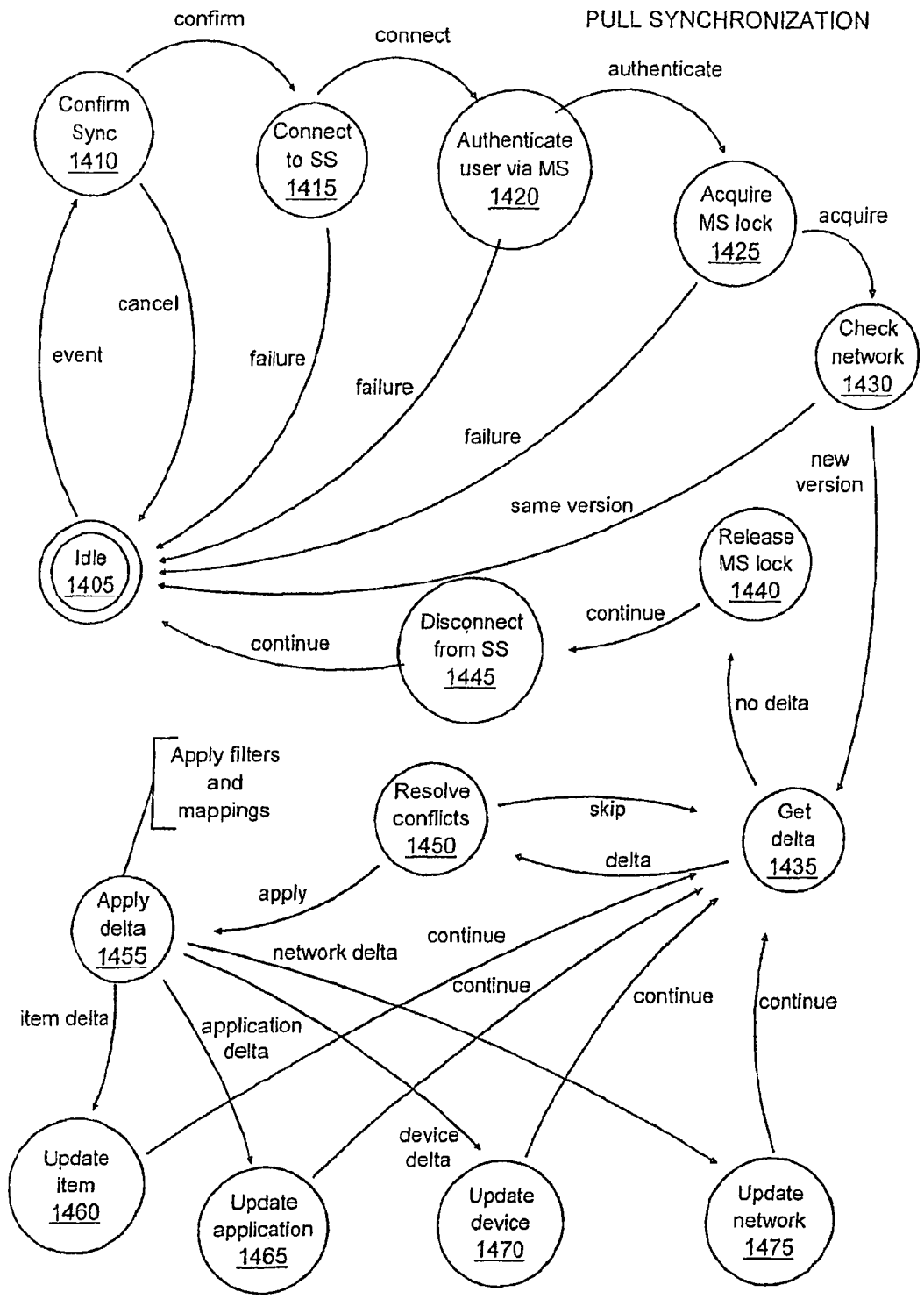
FIG. 15 is a flow diagram illustrating a pull synchronization in accordance with the system of the present invention.
Figure 16:
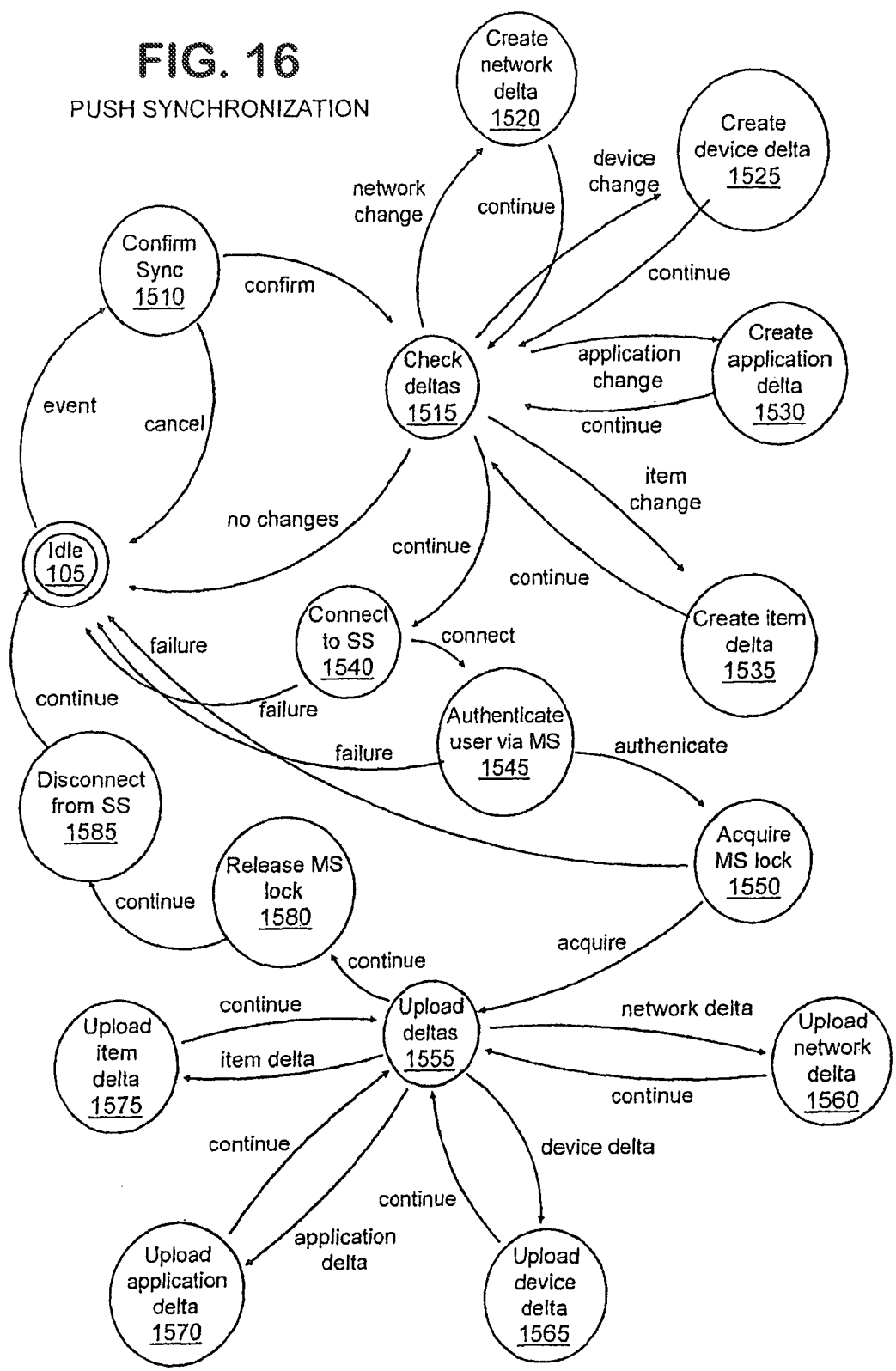
FIG. 16 is a flow diagram illustrating a push synchronization in accordance with the system of the present invention.
Figure 17:
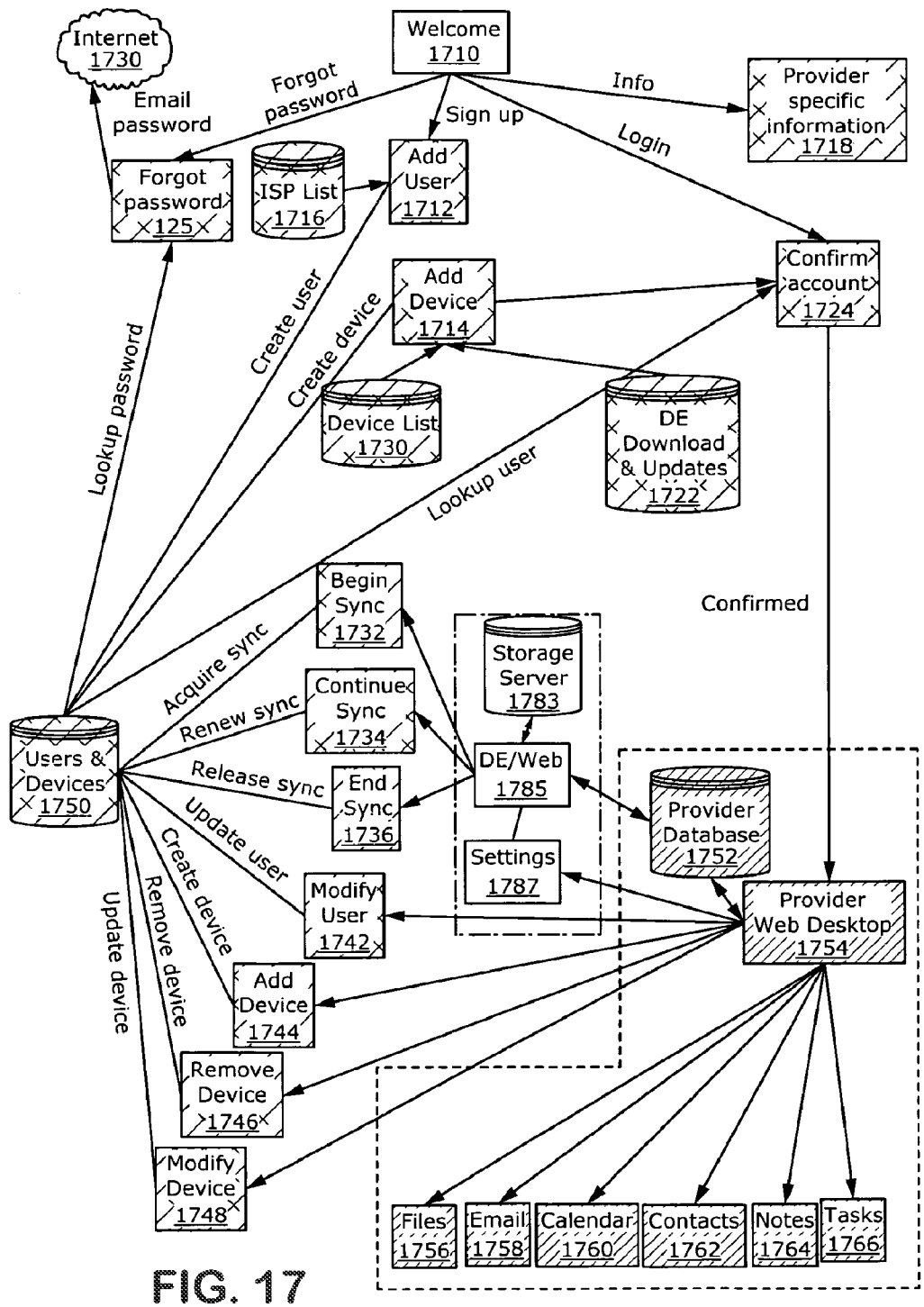
FIG. 17 is a diagram of the management server architecture in accordance with the present invention.

Further information with respect to the management server and the data flow from the management server to other components of the system of the present invention will become apparent with respect to the discussion of the process flow and data flow diagrams in FIGS. 15-17.

FIG. 17 shows a general depiction of the data flow and the functional specification of the management server utilized in accordance with the present invention.

As shown in FIG. 17, following a welcome request 1710, a user is allowed to sign out which enables an add user module 1712, and subsequently enables an add device module 1714. If sign-up is not requested, information may be provided via module 1718.

As indicated in FIG. 17, the add user module 1712 adds user records to the user in device database 1750. Additionally, the add device module 1714 adds users and devices to the user device database 1750. A device list 1720, and a device engine download and update database 1722, provide selection data for the add device module 1714. The account authentication module 1724 receives input both directly from a user log-in from the welcome screen at 1710 and from the add device module 1714.

Once an account is authenticated and confirmed, the administrator of the system of the present invention having a private data store at 1770 may choose to provide a web desktop 1754 which allows access to a user's records such as file 1756, e-mail 1758, calendar 1760, contacts 1762, notes 1764, and tasks 1766. The information will be culled from a provider database 1752 which will be synched in accordance with the system of the present invention as previously described. In essence, the provider database 1752 accesses data from the device engines 1780, which include, as discussed above, the storage server, each individual device engine 1785, and a settings database 1787.

Other portions of the management server include the locking modules for beginning a sync 1732, continuing a sync 1734, and ending a sync 1736, and for updating user information including modifying a user 1742, adding devices 1744, removing devices 1746, and modifying devices 1748.

Storage Server

Shown in FIG. 14 is the storage server 1415. While storage server 1415 may include a generic storage model accessible through any number of standard Internet protocols, in accordance with the present invention, a flexible storage architecture is provided that permits various standard implementations of the system of the present invention. This allows deployment of network services without installation of new server applications and can be responsible for communicating change information between multiple device engines in a consistent fashion.

One or more storage servers 1415 may be used to communicate transaction amongst a collection of devices. Each user's personal information network is represented by a unique account within its own data package storage section. The storage server 1415 maintains persistent store collection of data packages which is, at a minimum, enough data packages to be capable of synchronizing the most out-of-date system in a user's given information network or add information to new devices which are provided in the network. Additional data packages can be maintained to permit rollback of previous versions of information. The storage server can automatically dispose of older data package storage and can support aging of an inactive accounts.

Each storage server 1415 may be implemented using a variety of implementations including a standard FTP server for any operating system platform. The storage server can be implemented using HTTP protocols for increased efficiency and firewall avoidance. The storage server may be implemented using techniques for local storage such as database access or single file storage of a user's entire file system tree. The storage server 1415 may utilize the stored foreign protocol model for moving copies of data packages to other storage servers in the system. In one embodiment, the storage server can allow tunneling of information using an alternative protocol to other storage servers in cases where firewall prevents originating protocol. For example, a storage server can relay an FTP traffic inside an HTTP protocol. Storage servers may include their own locking semantics to arbitrate multiple device engine access to the same server without the need for a separate management server. Each device engine can access only a specific user's data package storage area even though the storage server 1415 may maintain a larger number of data packages across a large number of users. This allows for increased scaling when the storage server is implemented using file system techniques.

In one aspect, the storage server is implemented using standard FTP or HTTP connections for each operation. HTTP is composed of request response pairs. All requests are supposed to be posting commands. Parameters can be set in the form known as "application/X-WWW-form-URLEN-CODED". The encoding is specified as in RFC1866. Functions for the storage server include testing if the storage server can reach other users which will retrieve a simple text string, a "get" command which transfers the contents of a file as in a binary stream of byes; a put command as a binary stream of data to the storage server, a directory listing command, a remove command, a rename command, an exist command, and the like.

Pull Synchronization

FIG. 15 represents a "pull" synchronization process in accordance with the present invention. Both the pull synchronization illustrated in FIG. 15 and the push synchronization illustrated in FIG. 16 are done from the perspective of the device engine.

A pull synchronization as illustrated in FIG. 15 is always performed prior to a push synchronization. This allows the device engine to know whether synchronization of its own data is necessary.

Each device has its own triggering mechanism for initiating synchronization. Some devices, such as Windows clients and Palm® pilots are triggered manually when the user presses a "sync" button. Other devices, such as a cellular telephone, may be triggered automatically after another device completes a sync. Regular, time-based triggers are supported as well. A web-based application portal will sync when a user logs into the website security authorization mechanism, and may optionally sync on a log-out of the user or on the session time-out, but only if the user has changed data during the session.

For each sync, the triggering event specifies which application types are to sync for the device. This enables a triggering event to trigger only a sync for a particular application type. The management server can specify that no sync is needed for a particular type of application to minimize traffic to the storage server. Syncs may be triggered via an HTTP request to the server. This request holds information about which device to sync and the user log-in information is bounced to the management server for authorization and validation. Syncs may be triggered by sending an HTTP request to the server and passing the authentication information in the data portion of the request to the management server. Each device may include a servlet that is responsible for retrieving the request and ensuring its proper format before passing the synchronization request on to the server.

The device name and device class uniquely identify a particular device type that is being synchronized, and is contained in the management server. Each user has one or more device entries in the management server authorization records and each device name is unique for this user's space. For example, if a user has five devices with his or her own personal identification number, there will be five authorization records. There may be two Windows devices, two different Palm® devices and a web service portal, each having their own personal identification number.

As shown in FIG. 15, the pull synchronization process starts at an idle state 1405 when the triggering event, described above, triggers a synchronization request. The synchronization request is confirmed at 1410 and if the request is verified, a connection is made to the storage server at step 1415. Once a connection is established, the connection to the management server is made at step 1420 to authenticate the user identification via the management server. If authentication is successful, the management server may initiate a management server lock on the storage server so that no conflicting device engines may couple to the same data at the same time. A failure at any of the steps 1410-1425 will return the system to its idle state 1405. Once the engine server lock is acquired, the storage server will be checked to determine whether a new version of the data exists on the storage server at step 1430. If no new version exists, the synchronization process ends.

If a new version of the data exists, the device engine will retrieve the difference information at step 1435 "to get Δ."

Once a Δ is retrieved, conflicts are resolved at step 1450. The resolve conflicts step allows a user to resolve conflicts to multiple types of data which have been changed on both the server portion of the device and in the local data.

Once the conflicts have been resolved at step 1450, the Δ's are applied at step 1455. The apply Δ step 1455 allows for filters and mappings to be accounted for on the local device engine side of the system. As shown at steps 1460, 1465, 1470, and 1475, the Δ may include updates at the item level 1460, application level 1465, device level 1470, or network level 1475. In each of the aforementioned steps, a loop back to the Δ retrieval step 1435 is provided. When no further Δ's are available, the management server lock is released at step 1440.

The foregoing description of a pull synchronization is further described in the following pseudo-code:

TABLE 32

```
*SymbolicSyncEngine::Sync
    Download Remote File System
    For each Symbolic app in the file system's list of symbolic apps
        CFDESymbolicSyncEngine::SyncSymbolicApp
            Create a structured delta object -- CStructuredDelta
            delta(...)
            Compare local and remote versions of deltas SODs),
            if not the same then
                while localVersion != remoteVersion
                    download remote version
                    // apply delta (change log)
                    delta.ApplyChangeLog
                    // See details below
                    increment local version
                end while
            else
                nothing to do
            end if
            if any local items (change logs) are unsent then
                delta->ApplyUnsentItems (Reads the changes
[JCL where applied?]
            end if
```

TABLE 32-continued

```
        // Generate a new change log for the device:
        delta->delta.GenerateChangeLog(... strChangeLogFile
        ...)
        // See details below
            FTP it back up to Storage Server
            Update the local version number
        end // SymbolicSyncEngine::SyncSymbolicApp
    end // CFDESymbolicSyncEngine::Sync
    CStructuredDelta::ApplyChangeLog
        Set up m_pAppObj; // IFAO pointer
        Set up m_pAOS; // IAOS pointer
        Other set up (statistics, time to complete, etc.)
        Read the change log and ...
        ApplyChangeListToAOS(f1Changes)
            for each item in list
                ApplyItemToAOS // (Does
m_pAOS...AddRecord/UpdateRecord/DeleteRecord)
            end for
        end for end // ApplyChangeListToAOS
        If not doing a full sync, also add changes from this file to
apply these to m_F1Changes
    end //CStructuredDelta::ApplyChangeLog
    CStructuredDelta::GenerateChangeLog
        Set up m_pAppObj; // IFAO pointer
        Set up m_pAOS; // IAOS pointer
        Other set up (statistics, time to complete, etc.)
        // Set up m_deviceChanges by call to:
        CStructuredDelta::CreateDeviceChangeList
            Create a CF1Item* pItem
            // Iterate FAO modifications:
                for (m_pAppObj->GetFirstModified(pItem),
m_pAppObj->GetNextModified(pItem))
                    cast pItem to --> CF1ItemUniversal* pUnitItem
                    // Do certain things based on whether the operation
is an add, delete, or update.
                    // Then in each case, call:
                        CStructuredDelta::GetMatchingItemFromAOS
                            // First get by F1ID
                            m_pAOS->GetRecordByF1ID
                            // See if we have an AppID, if so:
                            m_pAOS->GetRecordByAppID
                            // If we can build search key on it
                            iterate m_pAOS->GetFirstMatchingRecord
/ m_pAOS->GetNextMatchingRecord
                        end //
CStructuredDelta::GetMatchingItemFromAOS
            end for
    end // CStructuredDelta::CreateDeviceChangeList
    if m_deviceChanges is not empty
        // reconcile (compare) change lists while writing to AOS
        CStructuredDelta::ReconcileChangeLists
            For each item in m_deviceChanges...
                If we can find it in m_F1Changes
                    Reconcile the device item and the f1 item
                end if
                ApplyItemToAOS // (Does
m_pAOS...AddRecord/UpdateRecord/DeleteRecord)
            end for
        end // CStructuredDelta::ReconcileChangeLists
        // Create a new change log (F1 delta package)
        ApplyChangeListToF1(m_deviceChanges)
            m_deviceChange.Store
                // Fires off its own whole world, see
                F1ItemList.cpp
            end // m_deviceChange.Store
        end // ApplyChangeListToF1(m_deviceChanges)
        report stats
    end if
    // Switch (SyncMode)
    If SyncMode == full
        ApplyAOSToDevice
            iterate
m_pAOS->GetFirstRecord...m_pAOS->GetNextRecord
                Add or update the corresponding FAO record.
    Note. Never delete based on what's in AOS, apparently).
            (end // ApplyAOSToDevied
        else
            ApplyChangeListToDevice(m_f1Changes);
    End // CStructuredDelta::GenerateChangeLog
```

Push Synchronization

FIG. 16 shows a push synchronization in accordance with the system and method of the present invention. Beginning at idle state 1505, a synchronization event occurs and if confirmed at step 1510, Δ's are checked at step 1515. Depending on which type of changes occurred, a network Δ 1520, device Δ 1525, location Δ 1530, or item Δ 1535 will be created.

Once the Δ's for a given application have been created, the method of the present invention continues at step 1540, which enables a connection to a storage server. Upon connection to the storage server, a further connection to management server 1545 will occur to authenticate the user in the system. Failure at any of the aforementioned points will result in returning to idle state 1505. Upon authentication, a management server lock is enabled to ensure that multiple device engines do not connect to the same data at the same time.

Once a lock is acquired at step 1555, Δ's are uploaded to the system. As shown, this may include uploading an item Δ 1575, an application Δ 1570, uploading a device Δ 1565, or a network Δ 1560. Once Δ's have been uploaded to the server, management lock server 1580 is released, and the connection to the storage server is terminated at step 1585.

It should be recognized that such a push synchronization need not occur directly to a server, but may occur directly to a second device engine in accordance with the depiction of the multiple embodiments of the invention in FIGS. 1-7.

Data Package Specification

Once information is provided into the universal data format, the device engine organizes the format into a data package. Each data package thus includes a description of changes to any and all information for particular application, and a collection of data packages describes changes across all device engines including all different types of data. With encoding and compression, data packages can become very compact to minimize bandwidth and storage requirements across the system of the present invention.

In one particular aspect of the present invention, encoding of the data packages may be provided in a streaming format to allow processing by the device engines with minimal storage and memory configuration at the device engine level.

The device engine can read the stream and determine which records from which applications it needs to update the particular information present on the system on which it resides.

Data packages can be provided in a binary data format. This allows data packages to encode changes to non-application data at a bite level. Hence, if a single bit on a system changes, the system of the present invention allows synchronization of that bit on another system. Changes are described as a sequence of bite-level change operations. One such encoding is using a sequence of insert and copy operations. Insert and copy operations generally define a particular "insertion" of a number of bites from a source file, then how many bites of a changed source file must be inserted to a particular file, then how many bites to insert from a particular new file, with a differencing engine taking the bites in the stream and inserting them into the new file to create the new version of the file.

As will be readily understood by one of average skill in the art, this allows a user to, for example, change a binary file such as a word processing document or other type of attachment, and synchronize such an attachment at the binary level. Specifically, if one forwards an e-mail of a word document to a second individual, the second individual modifies it and wishes to return this document with modifications to the first individual, because the first individual has the original file on his system, if both systems are enabled in the system of the present invention, the second system need only send the changes or the difference information back to the first system in order for the first system to reconstruct the document on the second system using this change data to create the document as intended by the second user.

Multiple caching of both the generation and application of data packages can be utilized to deal with communication issues in accordance with the system of the present invention. It should be further recognized that data packages can be merged into larger meta-data packages. Such meta-data information, such as the organization of multiple device packages, may be encoded into a larger system package. Each system package is essentially an encoded sequence of data packages.

Figure 12:
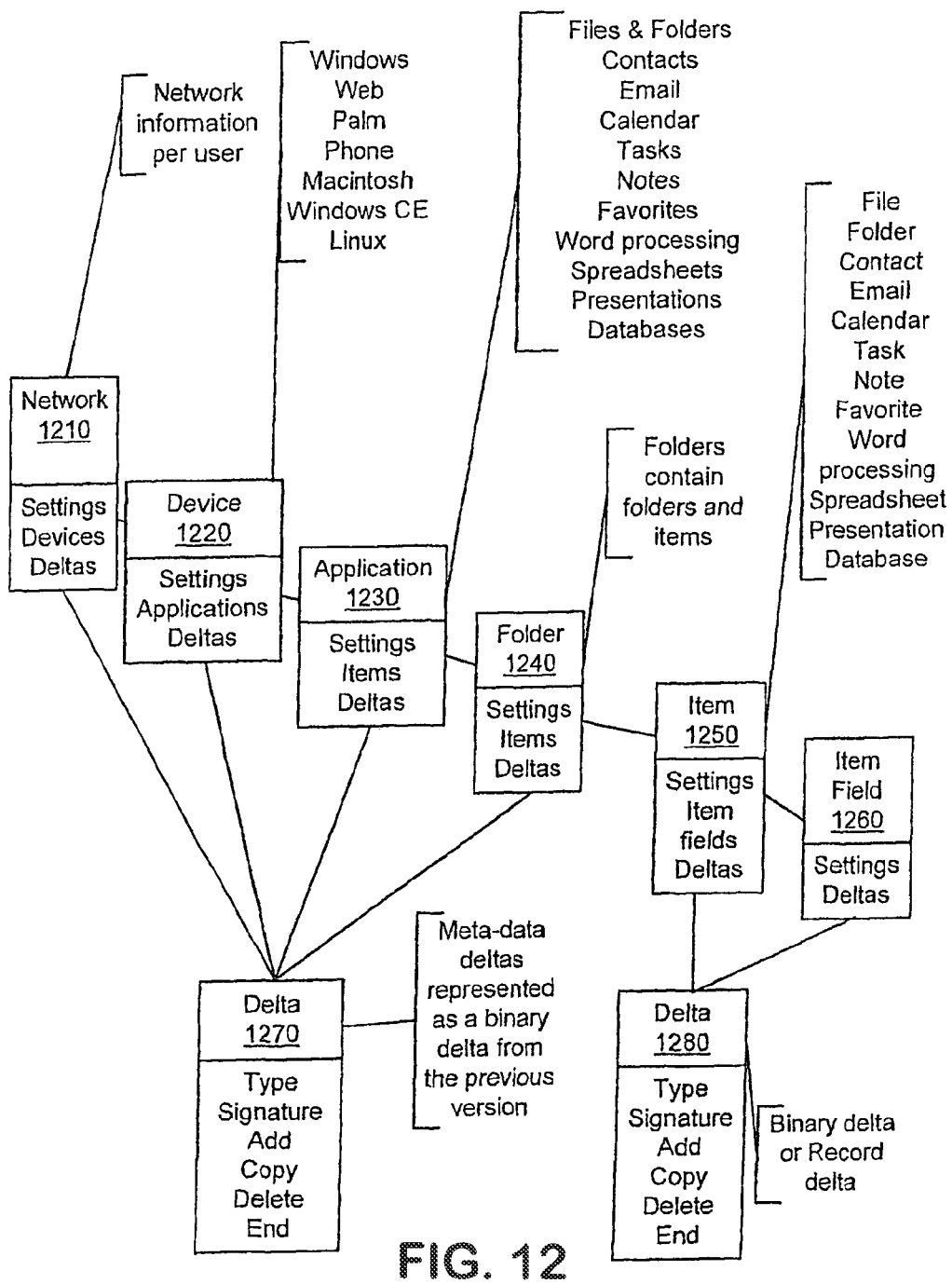
FIG. 12 is a diagram of storage object hierarchy of a universal data format utilized with the system of the present invention.

FIG. 12 shows the general format of the data package and universal data format an object stream hierarchy used in accordance with the present invention. With reference to FIGS. 11 and 12, one will note that each item in a particular application data structure will have a particular classification, such as a file, folder, contact, e-mail, calendar, etc. as shown in FIG. 13. The universal data structure contains a mapped item field for each type of data possible from each application supported by the system. Hence a "master" list of every data field mapping possible will contain a large number of items. Each application object requires a subset of such fields. One exception is an application object used for a Web portal application which provides access to all information available on all devices, including other Web portals.

Particular examples of item fields 1260 which may be included for any given item 1250 are shown in FIG. 13. These exemplary item objects may, for example, be from an application such as Microsoft Outlook. Outlook allows for note items 1310, e-mail items 1320, task items 1330, calendar items 1340, bookmark items 1350, file items 1360, channel items 1370, folder items 1380, and contact items 1390, all of which have fields such as those represented in FIG. 13.

The data format also contains folder information 1240 which allows the classification of items and consequently their associated item fields into particular categories.

Application objects 1230 include information on the types of applications from which information in the stream is included. Device objects 1220 include information on the origin type of device which the information is originating from. Network objects 1210 include information on a user level to define that the information in the data stream is coming from a particular user.

As detailed above, each application object supports a folder store interface that permits management of collections of information on a folder level, and permits management of folder hierarchies of information. The application object also includes an item interface that permits management of individual information entries such as records or files or components of information entries such as fields within records. Each application object further supports an interface for detection of a vendor application.

A DataPack essentially contains a sequence of transactions describing changes to information. This information can span two basic types: structured or application data, and unstructured or binary file data.

Transactions are encoded using an efficient streaming format with tags to represent the actual content objects. This technique permits the continuous extension of the DataPack format as new content is supported.

The general architecture of the package provides for transactions, application data, file data, files, objects and identifiers to be carried in the data package. Generally, transactions, application data, file data, and files have previously been described.

The first portion of the data package will be the data package identifier. Each transaction has a basic architecture of objects and operations. Each piece of content is referred to as an object and is uniquely represented with a Universally Unique Identifier (UUID). Objects typically are represented by a dynamically generated UUID, but more common objects are represented by static UUIDs. The following static UUIDs are defined:

TABLE 33

| |
|---|
| UUID_GenericDefaultFolder |
| UUID_DefaultContactFolder |
| UUID_DefaultInboxFolder |
| UUID_DefaultOutboxFolder |
| UUID_DefaultDraftsFolder |
| UUID_DefaultTrashFolder |
| UUID_DefaultSentFolder |
| UUID_DefaultCalendarFolder |
| UUID_DefaultTaskFolder |
| UUID_DefaultNoteFolder |
| UUID_DefaultJournalFolder |
| UUID_DefaultFavoriteFolder |
| UUID_DefaultCookieFolder |
| UUID_DefaultHistoryFolder |
| UUID_DefaultChannelFolder |
| UUID_DefaultFileFolder |
| UUID_DefaultCallFolder |

Each UUID has a unique 128 bit value which may be assigned by the system provider.

Transactions are broken down into manageable blocks in the form of individual files. These files are then optionally compressed and encrypted and prefixed with appropriate headers. Transactions are grouped into specific files based on the following rules: [0240] Transactions related to account information are grouped into a DataPack file. [0241] Transactions related to a specific data class are grouped into a DataPack file. [0242] Transactions referring to binary data are grouped into separate DataPack files for each file object.

A DataPack file is identified using specific rules based on the file name. The file name is of the form "UUID.VER" where UUID is the identifier for the specific object and VER is the transaction version number. The version number is of the form "D0001" with additional digits used for large version numbers. The "D000" value may be reserved for the base version for the object.

The UUID for the user account is generated by the Management Server (MS). The MS also maintains a current table of UUID values and version numbers that provides the root structure for understanding the DataPack files within a user account. The MS also provides necessary locking semantics needed to maintain consistency when multiple device engines attempt to synchronize.

All DataPacks are prefixed with a standardized header that provides basic content information regarding the DataPack. Compression and encryption headers follow the DataPack header if needed.

The data package header information will include version signature, applied versioning information, content type, A engine type, compression type, encryption type, applied size, encrypted size, compressed size, raw data size, and other data useful for the device engine in decrypting the data stream to provide the data into a format usable for the application.

The header may optimally have the format:

TABLE US-00034

| Type | Bytes |
|---|---|
| Version | 4 |
| Signature | 4 |
| AppliedVersion | 8 |
| ContentType | 4 |
| DeltaType | 4 |
| CompressionType | 4 |
| EncryptionType | 4 |
| AppliedSize | 4 |
| EncryptedSize | 4 |
| CompressedSize | 4 |
| RawSize | 4 |
| Reserved | TBD |

The following ContentType values are permissible:

TABLE 35

| Field | Comment |
|---|---|
| DP_CONTENT_RAW | Raw |
| DP_CONTENT_COMPRESSED | Compressed |
| DP_CONTENT_ENCRYPTED | Encrypted |

The DeltaType encodes the type of binary file differencing used. The following DeltaType values are permissible using DataPackageDeltaType:

TABLE 36

| Field | Comment |
|---|---|
| PackageDeltaTypeUninitialized | Uninitialized |
| PackageDeltaTypeRawData | Raw binary data |
| PackageDeltaTypeDeltaXDelta | Xdelta binary difference |
| PackageDeltaTypeDeltaBDiff | Bdiff binary difference |

The compression type specifies whether the DataPack has been compressed. A DataPack compression header follows the DataPack header if a compression type is specified. The following CompressionType values are permissible using DataPackageCompressionType:

TABLE 37

| Field | Comment |
|---|---|
| PackageCompressionTypeUninitialized | Uninitialized |
| PackageCompressionTypeNone | None |
| PackageCompressionTypePK | PKZip format |
| PackageCompressionTypeLZS | LZS format |

The encryption type specifies whether the DataPack has been encrypted. A DataPack encryption header follows the DataPack header if an encryption type is specified. The following EncryptionType values are permissible using DataPackageEncryptionType:

TABLE 38

| Field | Comment |
|---|---|
| PackageEncryptionTypeUninitialized | Uninitialized |
| PackageEncryptionTypeNone | None |
| PackageEncryptionTypeXORTest | XOR masked data |
| PackageEncryptionTypeBlowFish | Blowfish |
| PackageEncryptionTypeTwoFish | Twofish |

All DataPack compression headers are encoded using the following format:

TABLE 39

| Field | Size (bytes) | Comment |
|---|---|---|
| Size | 4 | Size of data including this header |
| Version | 4 | Version (1) |
| Signature | 4 | Signature (4271) |
| HeaderType | 4 | Header type (HeaderTypeCompression) |
| Reserved | 12 | Reserved |
| DecompressedSize | 4 | Decompressed size |
| Reserved | 50 | Reserved |
| Reserved | 12 | Reserved |

The following HeaderType values are permissible using Data PackageHeaderType:

TABLE 40

| Field | Comment |
|---|---|
| HeaderTypeUninitialized | Uninitialized |
| HeaderTypeEncryption | Encryption header |
| HeaderTypeCompression | Compression header |
| HeaderTypeRaw | Raw header |

All DataPack encryption headers are encoded using the following format:

TABLE US-00041

| Field | Size (bytes) | Comment |
|---|---|---|
| Size | 4 | Size of data including this header |
| Version | 4 | Version (6) |
| Signature | 4 | Signature (4270) |
| HeaderType | 4 | Header type (HeaderTypeEncryption) |
| Reserved | 12 | Reserved |
| DecryptedSize | 4 | Decrypted size |
| InitValue | 16 | TBD |
| KeyLength | 4 | TBD |
| ClearTextKeyBits | 4 | TBD |
| Salt | 4 | TBD |
| PadBytes | 4 | TBD |
| HMAC | 20 | TBD |
| Reserved | 12 | Reserves |

The data package transaction format may take a number of forms. One example is the following:

TABLE US-00042

```
DataPack transaction format - header - info - objects and operations
Diagram
  transaction ::= fileData | Header + InfoList + TransactionList
  fileData::= raw binary file data | binary difference data
  Header ::= ID + DataPackID + DataPackVersion
  ID ::= FUSE
  DataPackID ::= CLOG
  InfoList ::= FieldList
  TransactionList ::= Operation + [ItemInfo + [FieldList]]
  Operation ::= see table below
  ItemInfo ::= ItemType + ItemFlags + EntryID + ParentEntryID
  ItemType ::= same as enumItemType
  ItemFlags ::= same as enumF1ItemFlags
  EntryID ::= UUID
  ParentEntryID ::= UUID
  UUID ::= 128-bit UUID as defined by standard
  FieldList ::= {FieldTag + FieldData} + ListEnd
  FieldTag ::= same as enumFieldTag
  FieldData ::= FieldDataType + [FieldDataLen + [FieldDataData]]
  FieldDataType ::= see below
```

TABLE US-00042-continued

FieldDataLen ::= length as required by FieldDataType
FieldDataData ::= data as required by FieldDataType
ListEnd ::= DWORD(0)

The following Operation values are permissible using the Operation class:

TABLE 43

| Field | Comment |
| --- | --- |
| clNop | None |
| clAdd | Add |
| clDelete | Delete |
| clChange | Change |
| clMove | Move |
| clRename | Rename |
| clForceChange | Force change without conflict |

The following FieldDataType values are permissible using clDataType:

TABLE 44

| Field | Comment |
| --- | --- |
| clInvalidType | TBD |
| clString | Unicode String bytes with a 32-bit length prefix |
| clString8 | Unicode String bytes with an 8-bit length prefix |
| clString16 | Unicode String bytes with a 16-bit length prefix |
| clEmpty String | TBD |
| clBlob | 32-bit length followed by a byte stream |
| clBlob8 | 8-bit length followed by a byte stream |
| clBlob16 | 16-bit length followed by a byte stream |
| clEmptyBlob | TBD |
| clByte | 8-bit value |
| clShort | 16-bit value |
| clDword | 32-bit value |
| clQword | 64-bit value |
| clDate | DATE type (double) |
| clDouble | 8 byte real |
| clFloat | 4 byte real |
| clUuid | 16 byte uuid |
| clZero | Zero value |
| clOne | One value |
| clUnspecified | Unspecified value |
| clDefault | Default value |
| clCollection | Collection with 32-bit length |
| clCollection8 | Collection with 8-bit length |
| clCollection 16 | Collection with 16-bit length |
| clEmptyCollection | Collection with no length |

Data package objects are organized into a hierarchy as follows:

TABLE 45

Account::= DeviceList + DataClassList
DeviceList::= {Device}
DataClassList::= {DataClass} + ProviderList
ProviderList::= {Provider} + DataStoreList
DataStoreList::= {Folder} + ItemList
ItemList::= {Item} + FieldList
FieldList::= {Field}

An account is the root structure, which identifies information about the user's account. It may have exemplary field tags (eFieldTag_[NAME]) such as Name, Password, User-Name and Version. The FieldTag ItemType value is specified as ItemType_PIN using enumItemType.

A device is a system identified as part of an account. Examples include PCs, handhelds, Web sites, and so on. It may have tags (eFieldTag_[Name]) such as: "name" and "type" and item type values (eDevice_[Name]) such as Portal, Palm, Windows, CellPhone.

A data class is a grouping of similar information types. Many data classes may be represented for a particular account. The data class may contain field tags (eFieldTag_[Name]) such as: Name; ItemType; SubType; IsManaged; Provider; Filter and Version.

The following ItemType values are permissible using enumDataClass (eDataClass_[Name]):

TABLE 46

| Tag | Description |
| --- | --- |
| UNKNOWN | Unknown |
| CONTACT | Contact/address book |
| EMAIL | Electronic mail |
| CALENDAR | Calendar |
| TASK | Task/to do |
| NOTE | Note/memo |
| JOURNAL | Journal |
| BROWSER | Web browser favorites, cookies, etc. |
| FILESET | Collection of files |
| PIN | Account information |
| DEVICE | Device information |
| FILEBODY | Contents of file |

A Provider is the application that maintains specific information within a data class. There can be more than one provider for a particular data class. Field tags include: Name, AppObjID, Password, Username and Version. Examples of provider tags permissible for the provider (eProvider[Name]) include: Portal, Palm®, MicrosoftOutlook®., Lotus Organizer, Microsoft Internet Explorer, Microsoft Windows, and so on.

Data stores are the containers for storing information within a provider. There can be more than one data store for a particular provider. Folders represent structural organization of information within a data store. Data stores are not required to support folders. Tags (eFieldTag_[Name]) supported for each data store include: Name, ItemType, IsManaged and OriginalPath. Item types permissible for the data store include: unknown; Folder; MAPI; Database and Store File.

Folders represent structural organization of information within a data store. Data stores are not required to support folders. A folder is represented by a UUID and may contain any of the following field tags (eFieldTag_[Name]): Name; ItemType; IsManaged; FileAttributes; CreationDate; ModificationDate; AccessDate; Special FolderType.

The eFieldTag_ItemType value is specified as eItemType_FOLDER using enumItemType.

Items are individual informational components consisting of the actual user data. They may contain field tags such as: Name, ItemType, IsManaged, and Version.

File items typically have the following additional field tags (eFieidTag_[Name]):

TABLE 47

FileAttributes
CreationDate
ModificationDate
AccessDate
FileSize
FileBody
DeltaSize
Hash Item types may take the format (eItemType_[Name]) and may include: extended; folder; attachment; contact; distlist; email; calendar; task; call; note; post; journal; form; script;

rule; favorites; subscription; common_favorites; desktop; common_desktop; startmenu; common_startmenu; channels; cookies; programs; common_programs; startup; common_startup; sendto; recent; internet_cache; history; mapped_drives; printers; docs; doctemplates; fonts; window_ settings; app_data_folder; app_settings; fileset; pin; device; data_store; file; provider; and data_class; internal.

A field is based on one of a set of base type definitions. All field tag information is encoded using the following format:

TABLE US-00048

| Field | Size (bits) | Comment |
| --- | --- | --- |
| FieldTag | 16 | Unique tag number |
| FieldType | 6 | Field base type |
| FieldSubType | 10 | Field sub-type |

A number of Field types are possible, including: unknown; long; dword; date; string; binary; float; double; collection; uniqueid; qword; uuid; file; invalid. LONG is a four byte value encoded in big-endian format. FieldType DWORD is a four byte value encoded in big-endian format. FieldType String is a sequence of Unicode characters followed by a single NULL byte. Interfaces are provided with an MBCS value. FieldType Binary is a sequence of bytes. FieldType UniqueID is a sequence of bytes as defined by the Universally Unique Identifier (UUID) standard. AO interfaces are provided with a Locally Unique Identifier (LUID) value FieldType QWORD is an eight byte value encoded in big-endian format. FieldType File is a UUID that references a separate DataPack containing the file body data. AO interfaces are provided with a sequence of Unicode characters followed by a single NULL byte that describes the full path name for the file.

Any number of filed sub types are possible. Each of the sub-types includes all of the possible data types from all of the supported user applications. As should be well understood, the possibilities in the number of sub-types is quite large, and dynamic as each new application supported by the system of the present invention is added. Examples of sub-types include:

TABLE 49

| SubField Description | Description |
| --- | --- |
| Base | No sub-type specified |
| EmailAddress | Email address |
| EmailAddressList | Email address list |
| SearchKey | Search key |
| CategoryList | Category list |
| StringList | String list |
| DistributionList | Distribution list |
| Gender | Gender (enumGender) |
| TimeZone | Time zone (enumTimeZone) |
| Boolean | Boolean (TBD) |
| NonZeroBool | Boolean with non-zero value (enumNonZeroBool) |
| Priority | Priority |
| Sensitivity | Sensitivity (enumSensitivity) |
| Importance | Importance (enumImportance) |
| SelectedMailingAddr | Selected mailing address (enumSelectedMailingAddr) |
| TaskStatus | Task status (enumTaskStatus) |
| FlagStatus | Flag status (enumFlagStatus) |
| RecurrenceType | Recurrence type (enumRecurrenceType) |
| DayOfWeek | Day of week (enumDayOfWeek) |
| DayOfMonth | Day of month (1 through 31) |
| InstanceOfMonth | Instance of month (enumInstanceOfMonth) |
| MonthOfYear | Month of year (enumMonthOfYear) |
| BusyStatus | Busy status (enumBusyStatus) |
| AttachmentType | Attachment type (enumAttachmentType) |

TABLE 49-continued

| SubField Description | Description |
| --- | --- |
| MailBodyType | Mail body type (enumMailBodyType) |
| RGB | RGB color value |
| ManagedState | Managed state (enumManagedState) |
| FaoId | FAO ID for provider |
| SpecialFolderType | Special folder type (enumSpecialFolderType) |
| ResponseState | Response state (TBD) |
| ResponseStatus | Response status (TBD) |
| JournalStatus | Journal status |
| PageStyle | Page style |
| PageNumberMethod | Page number method |
| DelegationState | Delegation state |
| MeetingStatus | Meeting status |
| MeetingInvitation | Meeting invitation |
| CalendarType | Calendar type |
| DateOnly | Date only |
| TimeOnly | Time only |
| PhoneNumber | Phone number |
| URL | URL |
| FilePath | File path |
| PopMessageID | POP message ID |
| MIMEType | MIME type |
| INVALID | All values must be below this |

The aforementioned invention provides a user-centric model of communication to deliver personal information via network services. This model accommodates devices that are disconnected from the network, such as the Internet, at various times. Personal information can continue to exist locally rather than imposing a server-centric model on existing information.

In accordance with the foregoing, a store and forward information broadcast is utilized. Changes to existing information are replicated to an Internet storage server and changes are then retrieved by other devices on the network at device-specific times. In this manner, direct client communication is accomplished without requiring one-to-one communication. While one communication is supported by the system of the present invention, it need not be required.

Although the present invention has been presented in the form of an Internet store and forward broadcast for the purposes of synchronizing personal information amongst various types of devices, it will be readily recognized that synchronization need not be accomplished as the only application for the aforementioned system. In particular, the system can be utilized to efficiently broadcast changes to information in so-called "push" type information applications where only portions of the data need to be changed on a client application. For example, in a system where information such as changes in a stock price need to be broadcast to a plurality of users, a client application implementing the aforementioned technology can be updated by only changing specific portions of the data in the client application relative to that particular stock price. This can be done using a smaller bandwidth than has previously been determined with other devices.

The present invention also allows advanced identification features to be provided to a phone or other mobile device by allowing the user to provide personification information for other users of advanced wireless communication devices. Each user can create one or more individualized representations of themselves and push this information to other users. The service is generally enabled by an enterprise service provider or cellular network carrier via one or more servers. Users can subscribe to the service, allowing them to create and distribute sub-sets of personification information or "personas", or merely participate in the system, receiving personification information from subscribers. Since devices have different capabilities, the system will vary in its ability to provide personification information to each device, and in one embodiment, the type of user device and its capabilities are stored for each member of the system. The method and implementing systems and applications of the present invention provided by the enterprise service provider may be subject to a service fee to maintain the personification information in the data store, and provide functionality associated with the system.

In general, a user creates a personification of themselves which may include the user's contact information, signature, photo, multimedia information and a specific ringtone identifying them to other phone users. Many cellular phones include the ability to download specific ringtones and use them to identify incoming callers by associating the ringtone and picture with the contact information in the phone and triggering it using caller ID functions. The system of the present invention allows the user to specify their own ringtone and picture, and use it to identify them to other users. In addition to the static information in the personification information a user may provide dynamic information such as GPS location, timezone, availability, and event-relevant information (e.g., a reminder it's the caller's birthday, or a summary of calendar events or tasks assigned to or by the caller) or control information to other users or participants.

Figure 18:
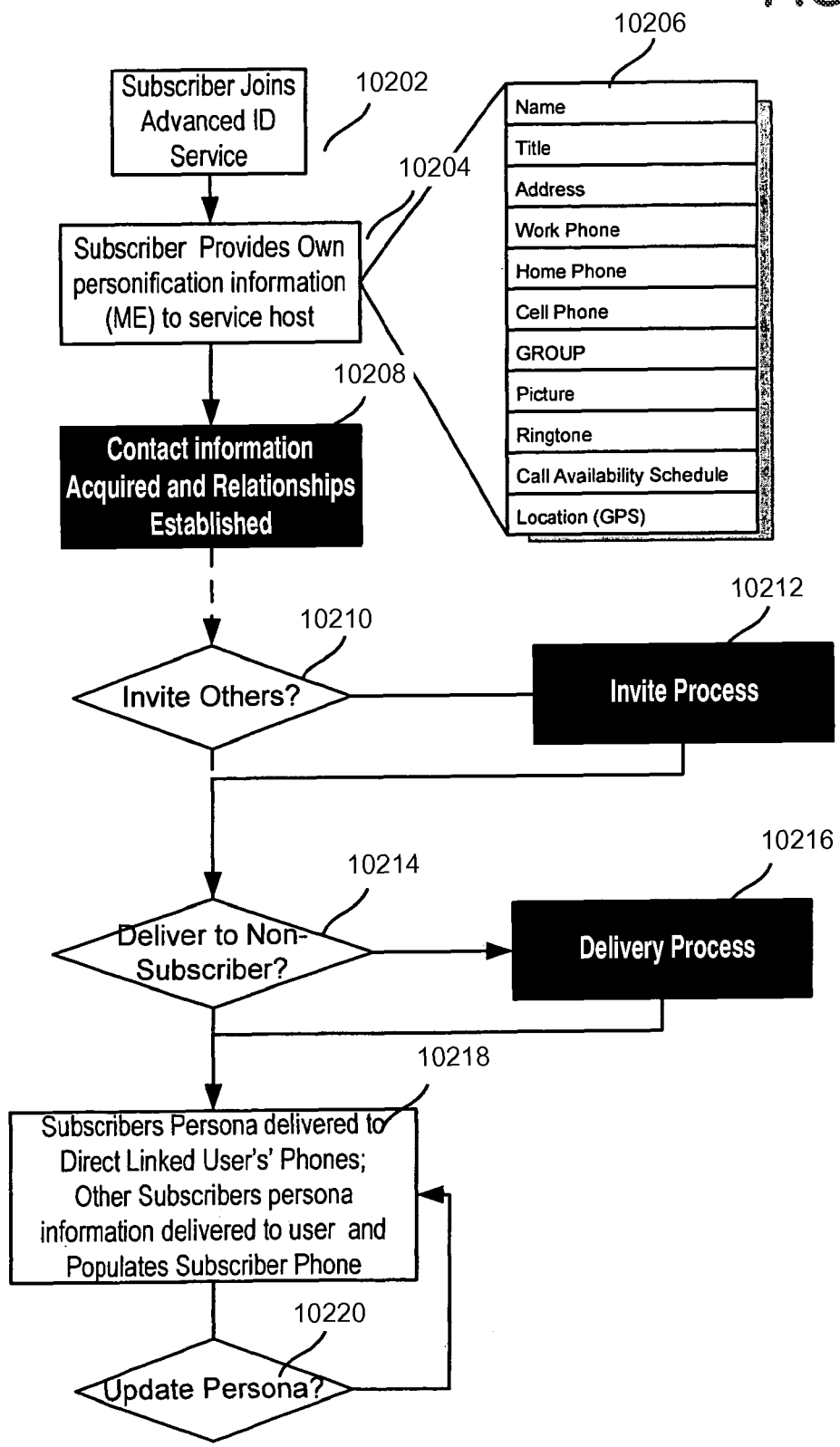
FIG. 18 is a flow chart illustrating a method in accordance with the present invention.

FIG. 18 illustrates a general method in accordance with the present invention. At step 10202, a subscriber joins the system by providing account creation information. At step 10202, the user may establish an account using a user name, a secure password, and provide other configuration information. This step may be performed via a phone based interface or via a web based interface, or any other suitable interface means.

At step 10204, the user may set the user's own personification information. This is referred to in Figures occasionally as creating or updating "me". As shown at table 10206, the user personification data may include the user's name, address, phone number and any other contact information, a picture of the user, a specific ringtone for the user, and a schedule of available times that the user may be contacted in various manners. In addition, the user may input user location information. Location information may be of varying specificity, and may initially input manually or through a connection with a GPS system in a GPS enabled phone. Information in the location section of a user's system may be updated by an agent on the phone using the phone's GPS agent. The ringtone may be uploaded by the user or may be selected from tones provided by the system administrator as part of the service, or the user may use the device's microphone (if equipped) to author a new audio clip which will be used as a ringtone. Optionally, a value added media distributor may provide phones, and digital rights management incorporated in the system to ensure proper control of copyrighted material within the system of the present invention. The phone manufacturer, the mobile phone carrier, or another entity may add DRM functionality as well, which may determine which protected content may be redistributed (and how). It should be recognized that step 10204 is optional, and a user may decide not to provide personification information, but only participate in the system to acquire personification information of others. In another embodiment, subscription to the advanced ID service provided by the ESP is not required to receive personification information.

As discussed in further detail below, different sets (or "personas") of personification information may be provided for different groups of individuals in the users' contact information. For example, a user may wish one group of contacts to receive one set of personification information (such as business contacts), while another set (such as personal friends) to receive a different set of information. The group definition allows the user to define recipients who receive the particular version of contact information. The user may assign one or more users to a particular group using an interface provided on the mobile device, or alternatively via some other interface, such as a webpage or an administrative configuration console. Additionally, the user can specify a "public" persona which anyone may download (and will be automatically assigned to new contacts in the user's devices). The system or agent maintains group assignments in persistent storage. The system or agent transmits the information appropriate for each group to the members of the group using the above described techniques. An enterprise service provider can allow a user to have a default persona upon establishing an account with the system. For example, the system can establish default public friends, family, co-workers, business associates, and blacklist persona templates, allowing the user to input certain information and have established personas once the user joins the system. The blacklisted persona is intended to be assigned to buddies to whom the user does not want to publish information.

At step 10208, the new subscriber's contact records are provided to the ESP in one of a number of ways, and relationships detected between the subscriber's contact records and other subscribers. This input may be as simple as downloading phone numbers that the user has stored in his phone, or may include additional contact information which allows the system to determine whether individuals are members of the system. In addition, the subscriber may manually input contacts during account creation, or download contact information from another source, such as a personal information manager on a personal computer or personal digital assistant. A search mechanism may also be provided, allowing the user to input information on individuals to determine whether an individual is part of the system. For example, if a user does not have a stored resource of personal information, the user may, via the web browser, access a form provided by the system administration which provides name and other contact fields which the system can use to search for other users participating in the system. Once, found, this information can then be provided to the user.

In accordance with the system of the present invention, different types of links may be established between users. Generally, a user's contact list is found in the user address book in the datastore of the phone. Due to the nature of human communication, it is likely that a contact in a person's address book can likewise be found in that contact's own address book. For example, assuming Bob and Alice are both friends, they will likely have each other's contact information in their respective address books. This reciprocal link between people can be utilized to recognize and distinguish different types of links. In accordance with the invention "half" linked users occur when one user has the other user's contact information in their address book, but the other user does not reciprocate. These users are not connected for purposes of data exchange and the invitation functions provided in FIGS. 21 and 22 may be offered to the unlinked user giving them the opportunity to subscribe to the system and establish a true link with the inviter. "True"— or "direct" linked users exist when both users have each other's contact information in their mobile device's phone book. These users have established some level of relationship outside of the service provided by the enterprise service provider or via system's "Invitation" function, and will automatically exchange and maintain any information each user has configured. Within a context of the foregoing description a "buddy" is any user who has established a true link with an individual user. For privacy as well as practicality, information exchange in the system occurs only between true linked users. Users who possess only a half-link to one another may invite the half-linked user to join the system and establish a true link.

When the user provides their own personification information to the service host at step 10204, step 10208 may include a step of detecting links between users by examining the contents of their address books which are provided to the server. In order to identify each user from the pool of all users of the system, the system uses telephone numbers and in one embodiment e-mail addresses as unique keys. In a further embodiment, the system of the present invention can use telephone number equivalence algorithms to match phone numbers regardless of formatting, country and area codes.

Users who wish to remove their information and "unlink another user" simply remove that user from their mobile device's address book. Using the rules of the system, the two users are no longer linked and no further updated information between them occurs. No information is deleted from the unlinked party's address book in this process. To accomplish this, instead of unlinking users may wish to assign another user to a "blacklisted" persona.

At step 10208, once the contacts have in acquired, relationships between the subscriber's contracts and other subscribers are established. This can occur automatically by an algorithm run by the ESP, may be set manually by the user, or may occur by some combination of the two.

Optionally, at step 10210, the subscriber may be offered the opportunity to invite other people to become subscribers. The user may be prompted to determine if the user wishes to invite contacts stored in the users phone to become subscribes to obtain additional benefits attributable to subscription. If the user wishes to invite others, an invite process is performed at step 10212.

Optionally, at step 10214, the subscriber may be given the option to allow their persona to be provided to non subscribers. If the user desires their information to be delivered, a delivery process 10216 transmits personification information to non-subscriber users. This may occur in any number of ways, such as for example via SyncML, or via SMS messages, as described below.

At step 10218, personification information from other subscribers in the subscriber's contact list are delivered to the new subscriber, and the new subscriber's information sent to other subscribers. As discussed below, contacts who are also subscribers are true-linked users 10210 and automatically populate the new subscriber's phone. The information may be transmitted to the user in a data stream directly to the agent, which then populates the user's phone data. Alternatively, the information may be provided in a series of messages. Preferentially, the information will be transmitted via SyncML.

Included in persona information is whether the subscriber's contacts should be alerted to the subscriber's location based on system subscriber's GPS or manually entered location information in their own record. Also included may be, for example, the level of granularity available to the subscriber's contact. For example, one may be allowed to know the country, city or a more specific location. Once received, the receiving member may further configure the subscriber's persona information based on the information received. For example, suppose another member provides location information in their member record. The user may specify that the user wishes to be notified when the member with location information moves to a particular location or within a particular distance from the specifying member. Other criteria may also be configured, such as group information. For example, the user may specify which groups each member belongs to so that if such member requests personification information about the specifying user, the correct group information is provided to the requesting member.

Finally, at step 10220, the new subscriber may update information in their persona. When the new subscriber does so, the information is re-transmitted to true linked subscribers and, if enabled, non-subscriber participants in the system. Updates may be started on the device by the client application as a result of data changes on the device. This may occur because of user interaction with the device, or changing transient information such as time zone. Updates can occur in one of two ways. Server-initiated updates are triggered by time intervals, or a change in data which is to be sent to the user's device. Server-initiated updates are handled via direct socket connection to the client or via SMS messages sent from the server to the client application on the device. Each advanced ID account supports a configurable "server initiated sync on/off" setting which controls whether SMS messages are automatically sent when a client is out of date. The SMS message from the server may be sent to the text port (or configured data port, if appropriate).

Figure 19:
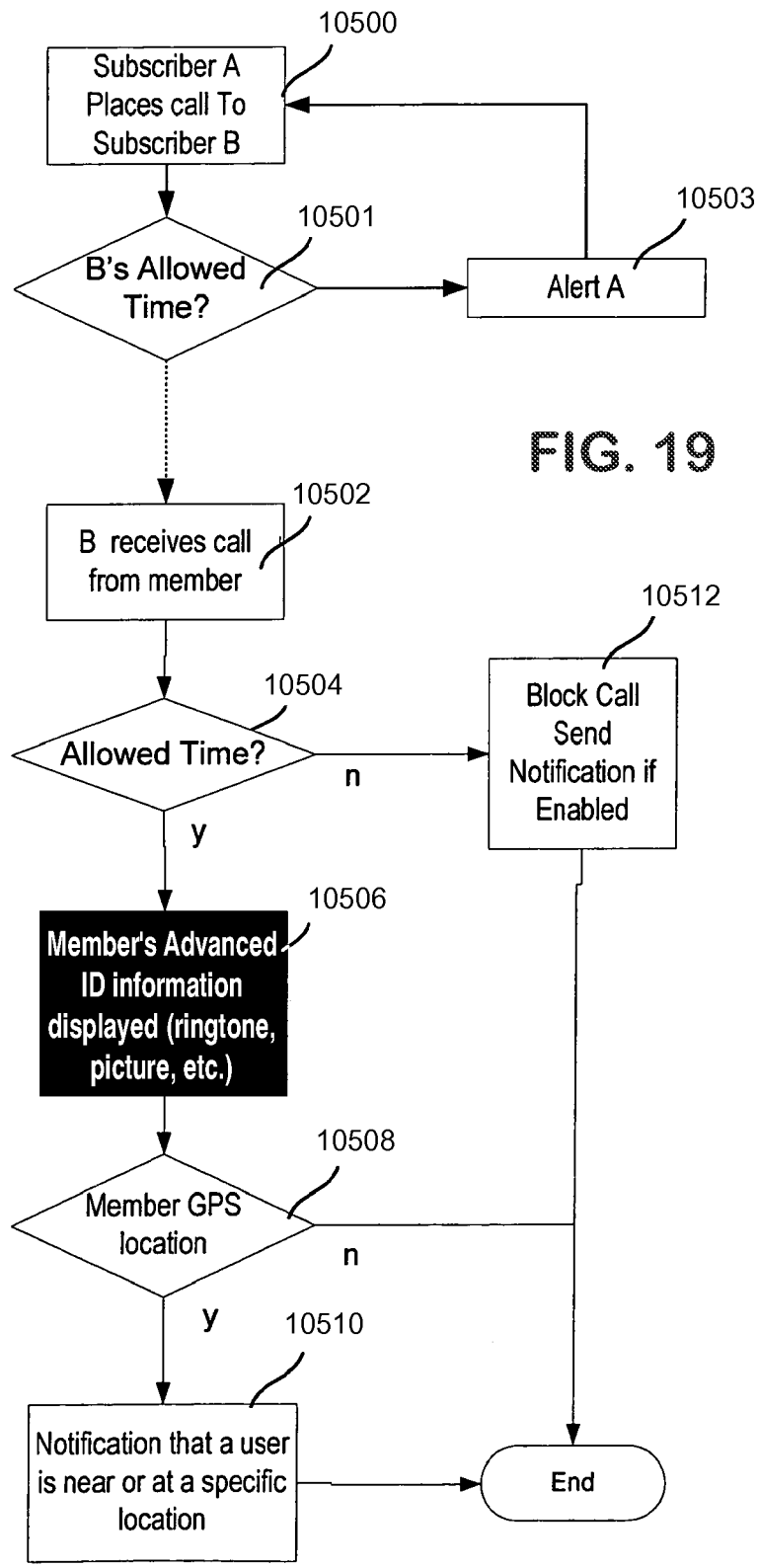
FIG. 19 is a flow chart illustrating a second method in accordance with the present invention.

FIG. 19 shows the method of the present invention once a subscriber has established a relationship with the enterprise service provider in accordance with the present invention and installed the application 10140 on the user's phone 10100. At step 10500, when a Subscriber b receives a call from another member (subscriber A) who has downloaded the user's information into the user's phone, advanced caller identification features can provide a member's information at step 10506 on the user's phone.

In one aspect, the system supports controlling both the calling user's phone and the called user's phone. At step 10501, if subscriber B has configured his persona (which is downloaded to subscriber A) to prevent calls during a certain period of time, the client application on the calling user's phone can prevent subscriber A from connecting to subscriber B during this period. Hence at step 10501, the method may check (on subscriber A's phone) whether a call to Subscriber B is allowed based on Subscriber B's configuration. If not, an alert 10503 may be provided to Subscriber A.

At step 10502, if the call is initiated by subscriber A and received by subscriber B, optionally, at step 10504, the receiving user can configure the phone to prevent calls during a specific period of time. Hence, at step 10504 the method may check to determine whether a call is allowed during a specific period by the receiving user. If the call is not allowed, the method may block the call at step 10512. If the call is not blocked, the user's advanced ID information (persona) is displayed on the receiving caller's phone. If the call is blocked, it may be directed to the receiver's voicemail system. The advanced ID or persona is a collection of information which defines the user, such as a phone number, e-mail address, picture, geo location information and other data. This allows subscribers to manage their own "personal brand" controlling how they are represented on other user's phones specifying a ringtone or the picture associated with their contact. As discussed herein, one can have a "friends" persona and a "co-workers" persona which contain different information or different sets of information. Additional features such as geo location information provided by GPS information capable phones is also provided, as is information about the caller which is transient in nature—such as whether it's the caller's birthday or anniversary, or information concerning phone calls, meetings, or tasks assigned to or by the caller. The system may be implemented by using a direct push system from a server via a SyncML server to a SyncML client, or may be operated on by a specific client application resident in the phone which communicates with the service-side implementation. SyncML is an Extensible Markup Language (XML) protocol under development as an open standard for the universal synchronization of data between devices. Synchronization of data allows changes made to data on one device (such as a smartphone or a laptop computer) to be instantly reflected in data on another device (such as a networked computer).

Optionally, at step 10508, if the member has chosen to provide the member's GPS information, at step 10508 the GPS can be provided in a notification at step 10510 provided to show that the user is at or near a specific location.

The present invention supports two different types of data: static and dynamic. Static data can include a user's ringtone, name and image. The static info is provided by the calling subscriber to the receiving subscriber's client on phone 10100 at step 10506. Step 10501 indicates a feature of the present invention which allows subscribers to define their own personification information to control another user's phone—this dynamic or "active control" information can be updated more often than the static persona information. Dynamic information such as GPS or timezone information is updated regularly based on the needs of the sending subscriber. Due to the interaction of the client 10140 with the phone, the subscriber may actually prevent (or merely warn) a calling subscriber from calling a receiving subscriber's phone and may instead provide them a user-configurable message which may direct the caller to use some other mechanism to contact the intended receiving subscriber (e.g., SMS, email, etc). As with all other similar information, this preferred availability information is stored users' personas.

Figure 20:
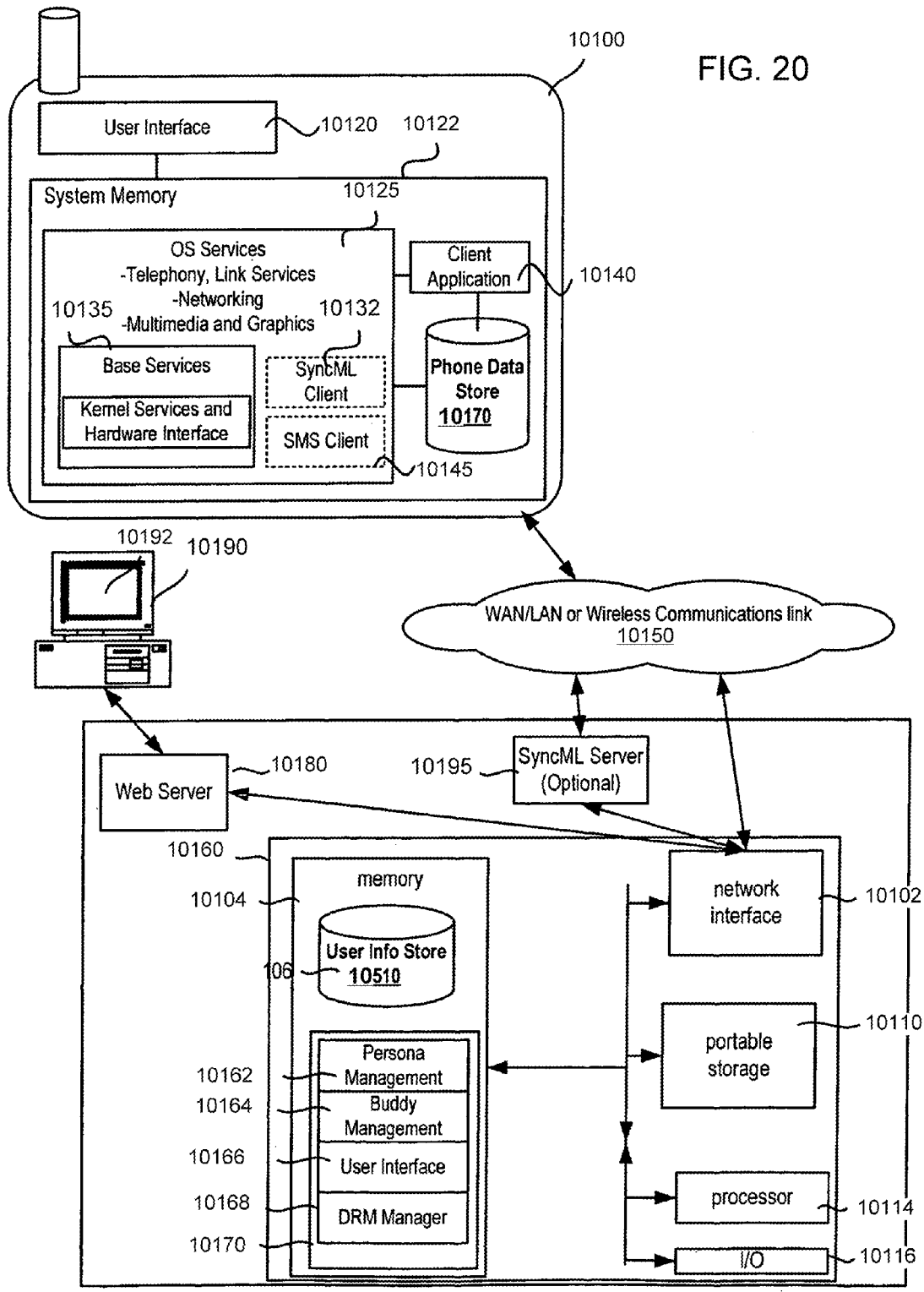
FIG. 20 is a block diagram of a system suitable for implementing the identification system of present invention.

FIG. 20 illustrates a general overview of a system for implementing the present invention. As shown in FIG. 20, a wireless communication device, such as a phone 100, is connected to a wireless communications link, such as a cellular network 10150, to transmit voice and data communications to other devices coupling to the wireless network. It will be understood that the wireless link may be a wireless internet link or a cellular network maintained by a cellular carrier, a GSM or CDMA network, or some other wireless communications link. The carrier may comprise the enterprise service provider or may be separate from the enterprise service provider. Data may be transmitted over the network in any number of known formats.

An advanced ID service server 10160 is also provided which communicates with the telephone via wireless network 10150 directly over a data connection or via a SyncML server 10195. Various embodiments of a system for implementing the advanced ID service are discussed herein. In FIG. 20, the ID server 10160 communicates directly with the phone 10100. In alternative embodiments, discussed below, the ID system is implemented on top of a synchronization system such as that described in U.S. Pat. No. 6,671,757, 6,694,336 or 6,757,696.

Phone 10100 may be provided with a system application or agent 10140. System agent 10140 can include a SyncML communication client designed to interact with a SyncML server 10195 in accordance with approved and proposed versions of the SyncML OMA DS specification, including proposed extensions, (available at http://www.openmobilealliance.org). Alternatively, agent 10140 can be an application designed to communicate with server 10160 using an existing SyncML client on the phone provided by the phone's manufacturer (as well as any custom extensions supported by such client), or an application specifically designed to communicate with server 10160 via another protocol, including a proprietary protocol. In one embodiment, the agent 10140 is a fully implemented SyncML client and server 10160 includes a SyncML server. In another embodiment, the application 10140 is a client application device sync agent such as that disclosed in U.S. Pat. No. 6,671,757. Various embodiments of the client application 10140 are set forth below.

In accordance with the present invention, a phone 10100 includes a system memory 10122 which may further include an operating system 10124 having operating system service including telephony and linking services, networking services, multimedia and graphics display services all provided to a user interface 10120. OS 10125 my be the phone's proprietary OS, BREW, or any other device or operating system suitable for a phone (such as the Symbian Operating system). Additional base services 10135 and an operating system kernel may also be provided. The operating system may additionally provide an SMS client 10145 built into the operating system allowing short messages to be provided across the wireless communications line 10150 to other users. Still further, a SyncML client 10132 may be provided and supported by the operating system services 10124. The phone 10100 includes a native phone data store 10170 which contains address book contact and other information which may be provided by a subscriber. Such information can further include ringtones, pictures, sounds, and movies, all dependent on the functional capabilities of the phone 10100, the space allowed in the system memory, and the services provided by the operating system 10124.

A client application 10140, various embodiments of which are discussed herein, is also loaded into phone 10100. As will be well understood by one of average skill in the art, client application 10140 can be provided by the phone manufacturer or downloaded by a user at a later time. To download and install the application, the user selects a download area of the phone operating system services 10124, selects the application from offerings provided by the service provider or carrier who maintains the wireless communications line 10150, or an enterprise service provider who maintains the system server 10160, and installs the application onto phone 10100. In an alternative embodiment, agent 10140 is a self-supporting application designed to run as a JAVA or BREW agent, or any other device or operating system specific agent (such as an agent operable on the Symbian Operating system). This agent can either include its own SyncML client, or interact with an existing SyncML client on the telephone. Changes can occur at field level or byte level. Alternative embodiments can communicate via alternative protocols via the wireless communications link to store information on the System data base 10510.

Client 10100 includes at least a user interface 10120, the application 10140 having a communication or sync engine and data store manager, a SyncML client 10132 and a local database 10150. The client application 10140 provides an appropriate graphical user interface to UI 10120 which provides the user an alternative point of interaction with the system and service provided by the enterprise service provider. The user interface allows the user to define and manage personas and buddies as well as other tasks as specified in the case definition described herein. Interaction with the system can be via this client user interface or via the server user interface provided by the web server 10180. The engine and data store manager is responsible for maintaining the user settings and options in the device's persistent storage as well as automatically pushing and retrieving changes to those object to the system server. The client datastore includes account information, persona data, buddy information, data for other users who have true links with the subscriber, and multimedia content The storage server 10160 is a centralized storage location for all system service information, including buddy, persona, relationship, and user data. Clients 10140 can connect to and synchronized with the server information to update their local copy of this data as well as publish any changed information or retrieve any new available information from the server. In the mobile device, the persona information belonging to a user's buddy is primarily stored in the native address book or a separate address book provided by the client. As some devices will not support all the published buddy information including the extended information such as geo location and presence information, the client can store this information in a local database and provide access to it via the phone interface.

In general, a hardware structure suitable for implementing server 10160, webserver 10180 or SyncML server 10195 includes a processor 10114, memory 10104, nonvolatile storage device 10106, portable storage device 10110, network interface 10112 and I/O device(s) 10116. The choice of processor is not critical as long as a suitable processor with sufficient speed is chosen. Memory 10104 could be any conventional computer memory known in the art. Nonvolatile storage device 10106 could include a hard drive, CDROM, CDRW, flash memory card, or any other nonvolatile storage device. Portable storage 10108 could include a floppy disk drive or another portable storage device. The computing system may include one or more network interfaces 10102. An example of a network interface includes a network card connected to an Ethernet or other type of LAN. I/O device(s) 10116 can include one or more of the following: keyboard, mouse, monitor, display, printer, modem, etc. Software used to perform the methods of the present invention are likely to be stored in memory 104 which include nonvolatile storage and volatile memory as well as, portable storage media 10110.

The computing system also includes a database 10106. In alternative embodiments, database 10106 is stored in memory 10104, portable storage 10110 or another storage device that is part of the system of FIG. 20 or is in communication with the system of FIG. 20. Other alternative architectures can also be used that are different from that depicted in FIG. 20. Various embodiments, versions and modifications of systems of FIG. 20 can be used to implement a computing device that performs all or part of the present invention. Examples of suitable computing devices include a personal computer, computer workstation, mainframe computer, handheld computer, personal digital assistant, pager, cellular telephone, smart appliance or multiple computers, a storage area network, a server farm, or any other suitable computing device. There may be any number of servers 10160n, n+1 managed by a system administrator providing a back up service in accordance with the present invention.

Also provided on server 10160 is a system data store 10310. The System data store is provided in the non-volatile memory space of server 10160. While only one System data store computer is shown, it should be recognized that the store may be replicated to or stored over a plurality of computers to ensure that the data thereon is protected from accidental loss. It should be understood that the representation of the SyncML server 10195 and web sever 10180 need not require that such servers be provided on different physical hardware than the System server 10160.

The system of FIG. 19 illustrates one server and client system suitable for use in the present invention. In an alternative embodiment of the invention, the advanced ID system can be constructed using a synchronization server described in U.S. Pat. No. 6,671,757, 6,694,336 or 6,757,696.

A synchronization system described with respect to U.S. Pat. No. 6,671,757, 6,694,336 or 6,757,696 comprises client software which provides the functions of a differencing transmitter/receiver/engine, and differencing synchronizer in the form of a device engine. The device engine may include at least one component particular to the type of device on which the device engine runs, which enables extraction of information from the device and conversion of the information to difference information, and transmission of the difference information to the storage server. The storage servers utilized in the may be any type of storage server, such as an Internet server or an FTP server, and may be provided from any source, such as any Internet service provider. In a key aspect of the sync system, the Internet connection between the devices or between the devices and a server, need not exist at the same point in time. In addition, only those changes to the information which are required to be forwarded to other systems on the system of the present invention are transmitted to enable fast response times.

Data from each of the sync client devices is coupled with a storage server. In one embodiment, each device engine implements all processing required to keep all the systems fully synchronized. Only one device engine needs to be coupled to the sync server at one particular point in time. This permits synchronization of multiple systems in a disconnected fashion. Each device engine will download all transactions encapsulating changes that have occurred since the last synchronization from the server and apply them to the particular device. The change or difference information (termed a "data package" or "change log") is provided in one or more data packages. Each data package describes changes to any and all transfer information across all device engines, including but not limited to application data, files, folders, application settings, and the like. Each device engine can control the download of data packages that include classes of information that apply to the specified local device. For example, contact names and phone numbers while another needs only changes to e-mail, changes to document files.

Compression and encryption of the data packages may be optionally provided. Each device engine performs mapping and translation steps necessary for applying the data packages to the local format required for that type of information in the application data stores. The device engine also includes components which allow it to track ambiguous updates in cases where users have changed data to a particular data field on two different systems simultaneously since the last update. The output of the device engine comprises a data package which is output to sync server database. As noted above, only one device engine need be connected to the storage server 10850 at a given time. The data package can be stored on the storage server until a request is made to a particular location of the storage server by another device engine. Access to areas of the storage server is controlled by a management server (MS). In one embodiment, each sync operation requires that the device engine for each device login to the management server to authenticate the device and provide the device engine with the location of the individual device's data packages on the storage server.

When data is returned to the delta module from the storage server, the delta module returns differenced data to the application object for the particular application which then translates the delta information into the particular interface utilized for application. Once a device engine has been fully applied all data packages from an input stream, it generates a series of data packages that describe the changes made on the local system. The device engine uses the local application object 10920 to keep track of the last synchronized version of each application's actual data, which is then used for the next data comparison by the delta module on the next sync request. Generated data packages can include operations and encode changes generated from resolving ambiguous cases as described above.

The sync server uses the concept of a universal data record in its internal sync differencing engine and when sending data to and retrieving from external The management server supports an authentication interface that requires each device engine to authenticate with the management server before performing synchronization. Certain storage server implementations may utilize locking semantics to control read and write access to storage for multiple device engines. For example, in a generic FTP request, if two device engines attempt to connect to the same data at the same time, there must be some form of locking control to prevent device engines accessing the same data at the same time. In this instance, the management server controls the device engine acquisition, renewal, and releasing of locks against data stored in the network.

Each device engine is uniquely identified and tracked by the management server. This allows for tailoring behavior between the management server and specific types of storage systems and device engine components. All device engine components are tagged and version stamped for management via the management server.

Also shown in FIG. 20 is a server-side application ID service controller application 10170 which includes a persona management component 10162, a buddy management component 10164, a user interface 10166, and a digital rights manager 10168. It will be understood in various implementations of the present invention, the functional components operating within the service-side application 10170 can come in one case, push information maintained by the system of the present invention directly into phone 10100 via a SyncML server 10195 interacting with a fully robust SyncML client. Optionally, certain aspects of the control are handled by either the server-side application 10170 or the client-side application 10140, as described herein.

In accordance with the invention, application agent 10140 communicates personification information and changes made to the personification information stored in the data store of the telephone 10100 to server 10160 via the wireless network. Communication of user data from the device may take several forms. Where the client utilized SyncML communications with the server 10160, communication may take place using the standards set forth in the SyncML specification. Changes are transmitted on a record-by-record basis or field-by-field basis. Alternatively, communication may occur via another protocol. The SyncML client is utilized to update the phone's native address book with buddy published information as well as to retrieve persona and link information from the server. Information can be exchanged via the SyncML protocol, or via a direct data link with the server 10160. The system server stores and maintains each user account, link personal and buddy information as well as multimedia content, both system provided and user created. The server is a stand alone server and may be incorporated with the features of a synchronization system such as that described in U.S. Pat. No. 6,671,757. Details of this integration are described in further detail below. As noted above, a management interface is provided via the web server 10180. Description of this interface is shown below.

The server 10160 stores user data in the personification store 10150 in a manner which associates the data with the user of the phone. In one embodiment the data is stored in bulk—that is all records and information for the user are stored in simple text form, (or binary form, depending on the type of data in use). This information is stored in the data store using a unique identifier (UID) associating the personification data with the individual user. The identifier may be any randomly selected identifier, so long as the user is uniquely identified, and the data is associated with the user. In a further aspect, this user UID may be a universally unique identifier (UUID), created in a manner described in the aforementioned U.S. Pat. No. 6,671,757, 6,694,336 or 6,757,696 or other manners to create a single ID for a given user. In yet another embodiment, user data and changes to the user data are stored in a change logs in a manner described in the aforementioned U.S. Pat. No. 6,671,757, 6,694,336 or 6,757,696.

A web server 10180 allowing a user on a computer or other device 10190 having a web browser may optionally be provided to allow a user to configure aspects of the system of the invention. Server 10180 may have a hardware configuration similar to computer 10160 and may comprise one or more physical computers. Additionally, web server 10180 may be integrated with server 10160.

In one embodiment, aspects of the system of the present invention are configured via a phone interface. The system can alternatively be configured by a user via a web interface provided by the web server 10180 via the user device 10190.

FIG. 21 one process for implementing an invitation (step 10212) from a subscriber to a non-subscriber or participant. At step 10302, a non-subscriber may receive an SMS message from another subscriber. The SMS message may contain all the information necessary for the user to publish the information into their current data book. In one aspect, this can include all persona information itself in a format which can be read by a native or non-native application such as a SyncML client, a vCard parser, or other application and incorporated into the local data store of the phone. If the user accepts the information at step 10304, the information can be populated into the user's data book and the next time the subscriber calls, information will be displayed on the user's phone.

In another embodiment, shown in FIG. 22, a user may receive an SMS message from a subscriber, at step 10404 and at step 10406, the user can select a link stored in the SMS message to connect the user's phone with a server side data store which sends the subscriber's information directly to the phone. At step 10408, the user's phone downloads the information from the subscriber to the local data store in the phone.

FIG. 23 illustrates the concept of different personas for different groups of users. FIG. 23 shows a linkage example of different users linked to a central user 10600. User 10600 "Bob" has a mobile phone which is linked to other users 10604, 10606, and 10602. For each group of users 10602, 10604, and 10606, user 10600 can establish a different persona. A friend's persona may show Bob's personal address and home phone number and provide a first type of ringtone. A co-worker's persona 10604 provides a more formalized name setting, a work e-mail address, and a work phone number with an undefined ringtone, a client's persona 10606 shows an even more formal name, and includes different work and mobile phone numbers as well as a different ringtone more suitable to provide to Bob's clients.

As shown in FIG. 23, people usually have distinct groups with whom which they communicate including friends, co-workers, and clients. The establishment of different personas allows the publication of different information to each individual. As illustrated in FIG. 18, personas can include names, e-mail addresses, phone numbers, physical addresses, corporate information, a picture, ringtones, URLs, personal physical characteristics (eye/hair color, et al) and birthday information. This information handling is flexible and extensible and can accommodate any additional permanent as well as transient information such as a current time zone, digital certificates, a physical location, including GPS coordinates, and availability.

Figure 24:
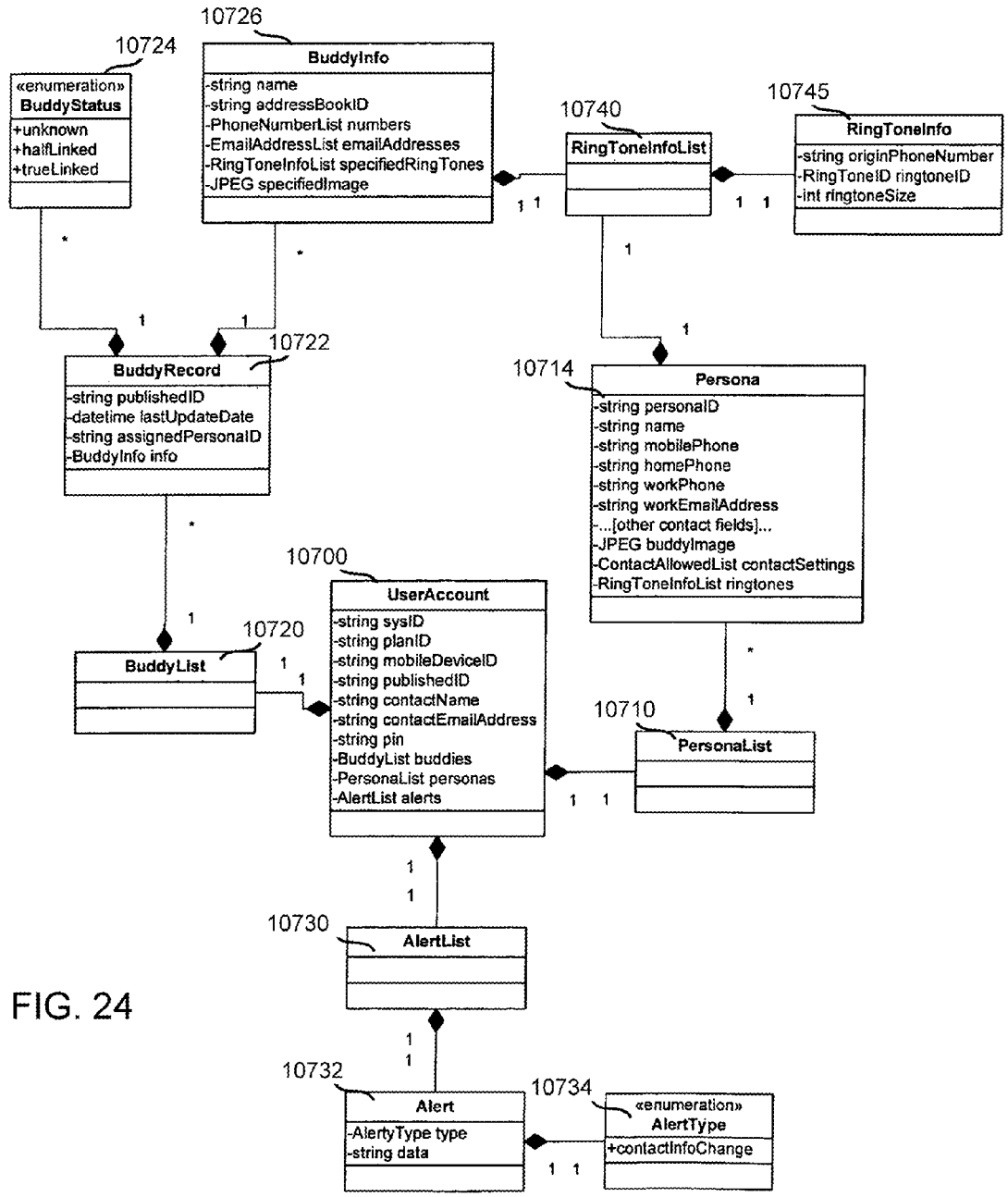
FIG. 24 is an illustration of the structure of a system database store on a server in accordance with the present invention.

FIG. 24 depicts a static structure of the records maintained for an individual user and the server of the present invention. For an individual user account 10700, each account will include a system ID, a plan ID (indicating a service level description), a mobile device ID, a published ID, a contact name, a contact e-mail address, and a user security pin. The user account will also contain a buddy's persona list 10710, a buddy list 10720, and an alert list 10730. The persona list will define a number of personas 10712, each including, for example, a personal ID, a name, a mobile phone, a home phone, work phone and other information as specified above with respect to FIG. 18. Other information can include a buddy image, contact list allowed settings, and ringtone information. The ringtone information 10740 may be a list of information which links to specific ringtone records 10745. Each buddy in buddy list 10720 has a buddy list record 10722 which includes a published identifier, a last update date (indicating when the buddy record was last updated), a personal identifier, a status identifier 10724, and information 10726. Buddy information 10726 includes a name, address book identifier, phone list numbers, e-mail address lists, and ringtone information.

Figure 25:
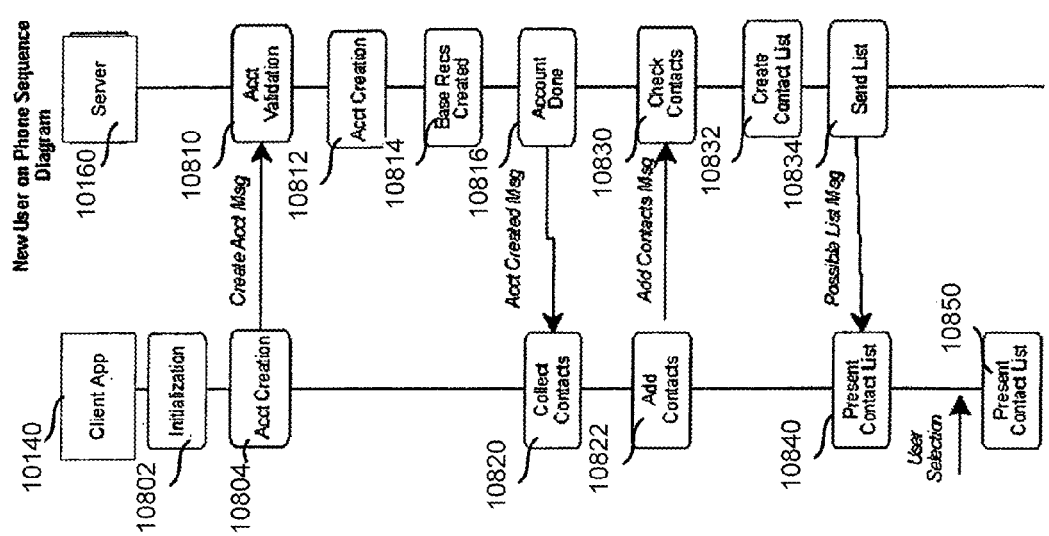
FIG. 25 is a sequence diagram illustrating the actions which occur on a client device, server, and server interface to allow a new user to subscribe to the advanced identification service in accordance with the present invention from a phone.

FIG. 25 is a sequence diagram illustrating how a new user can sign up for the system service provided by an enterprise service provider in accordance with the present invention. FIG. 25 shows the sequence of steps which occur on a phone 10100 and on the server 10160. Upon initialization of the application at step 10802, an account creation message is generated at step 10804. A create account message is sent to the server and at step 10810, an account validation process begins. The account creation step occurs at step 10812, and basic records are generated at step 10814. The account creation step 10804 will prompt the user at step 10810 to provide certain basic information such as name and e-mail contact information to the phone system. The account validation step 10810 will acquire required information from the user via the phone interface, and an account will be created at step 10812 once the required information is provided. Basic account records, including for example, base persona's from the information provided in the validation step 10810, are created at step 10814. Once the account creation step is finished, at step 10816, an account created message will be sent to the user's phone. At step 10820, contacts in the user's phone which are present in the user's native address book are collected at step 10820, and at step 10822 an add contacts message or data transmission will be sent to the server 10160. These contacts will be checked and evaluated at step 10830 to determine links between known users in the system already, and users who are not linked in the system. A contact list is created at step 10832, and the list of potential true links generated at step 10834. Note that true links can be created and maintained automatically, without user intervention or approval. However, in this embodiment, at step 10834, this list is returned to the user and presented to the user at step 10840. The user can then select which of those contacts the user wishes to establish links with, and these links will be established at step 10850. Optionally the system can establish links with any user who has already established themselves with the system service as a subscriber, who already appears in the new subscriber's local address book.

Figure 26:
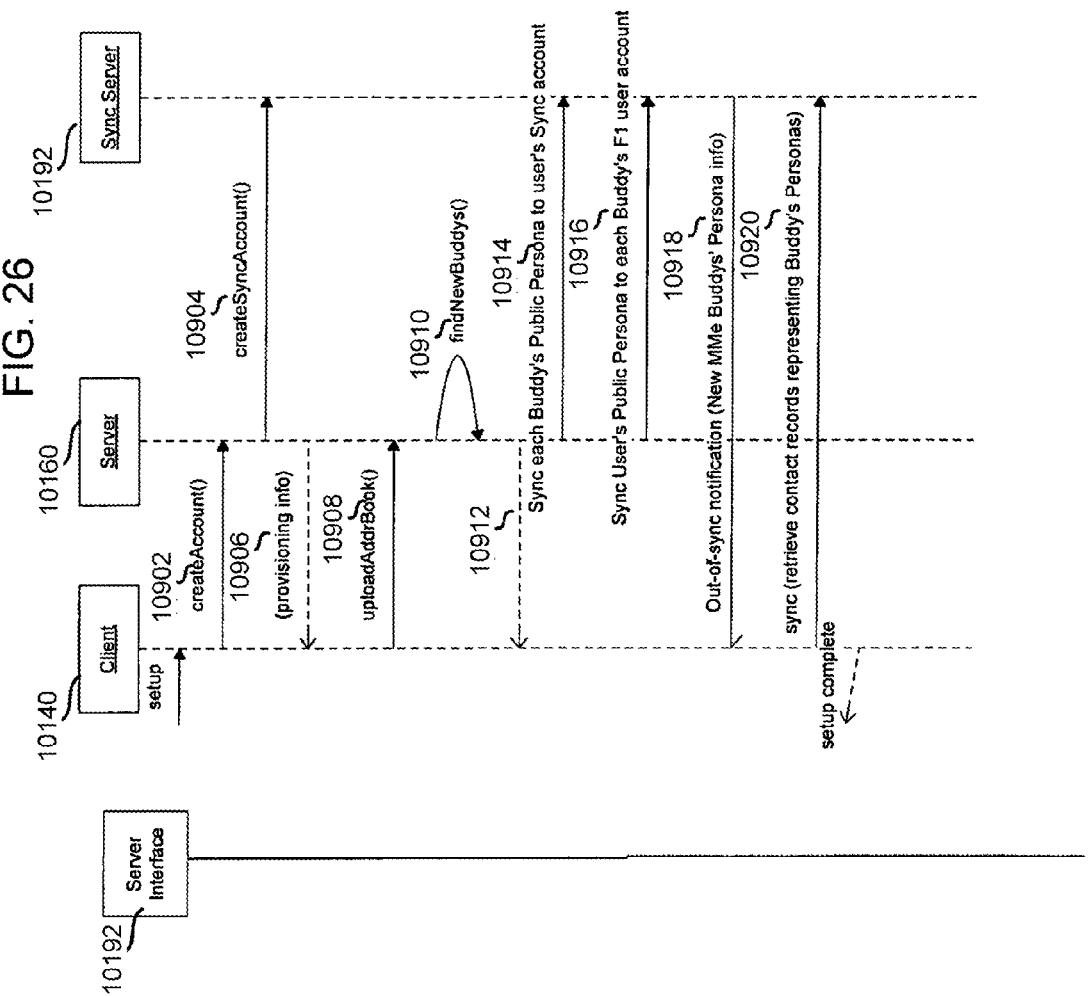
FIG. 26 is a sequence diagram illustrating how a user account is created when the system is used with a synchronization server in accordance with U.S. Pat. No. 6,671,757.

FIG. 26 is an alternative method for establishing an account with the enterprise service provider wherein a synchronization system of U.S. Pat. No. 6,671,757, 6,694,336 or 6,757,696 is used. This sequence illustrates that account creation for such a system requires creation of an underlying sync account with the synchronization server, but such account can be created through the advanced ID interface.

At step 10902, an account creation step is initiated on the server 10160. Server 10160 will also create an account with the application server 10185 at step 10904. Server 10160 will provide provisioning information 10906 to the client 10140, which will then upload its address book at step 10908 to server 10160. Server will attempt to establish whether direct links are present at step 10910 and return those true links to the user at step 10912. Concurrently, the system will attempt to perform a synchronization with the user's contact information on the synchronization server 10185. At step 10916, the user's public persona is synced to each user's synchronization account and if there's any problem with the synchronization at step 10918 an out of sync notification message is returned to the client 10140. At step 10920, records are retrieved regarding the records representing the buddy's personas at step 10920. Persona records are thereafter synced as other records are synced in accordance with the description in U.S. Pat. No. 6,671,757.

Figure 27:
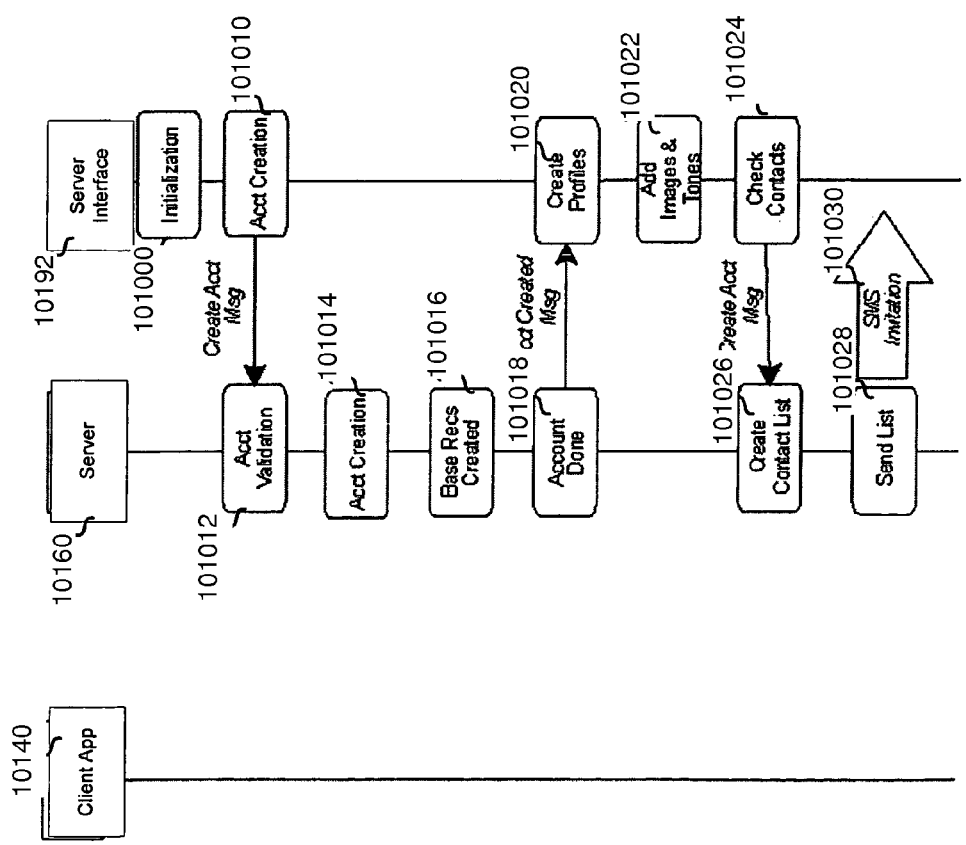
FIG. 27 is a sequence diagram illustrating how a new subscriber is established on a server provided interface in accordance with the present invention.

FIG. 27 is a sequence diagram illustrating the establishment of a new subscriber account on server 10160 via the server's user interface provided via the web server 10180. At the initialization step 101000 in the user interface 10192, account creation interface 101010 is provided to the server user interface 10192. The user provides information into the interface and the information is transmitted via a create account message to the server 10160. An account validation step will occur at step 101012 after the user has provided sufficient information to establish an account with the enterprise service provider. Once this occurs, an account creation will occur at step 101014 and base records will be created at step 101016. When the account has been established at step 101018, an account created message will be returned to the user offering the user the opportunity to create personas and providing the user with a set of default personas at step 101020. The user will be provided with an initial opportunity to add images and multimedia at step 101022. Next, at step 101024, the user will be provided with the opportunity to check "buddies" which have been created during the contact link establishment steps 10208. Once the user has selected which contacts the user wishes to establish connection with, a contact list will be created at step 101026. The list will be sent back to the user at step 101028 and may be used to initialize SMS invitations to those users who are not already established as subscribers with the enterprise service provider.

Figure 28:
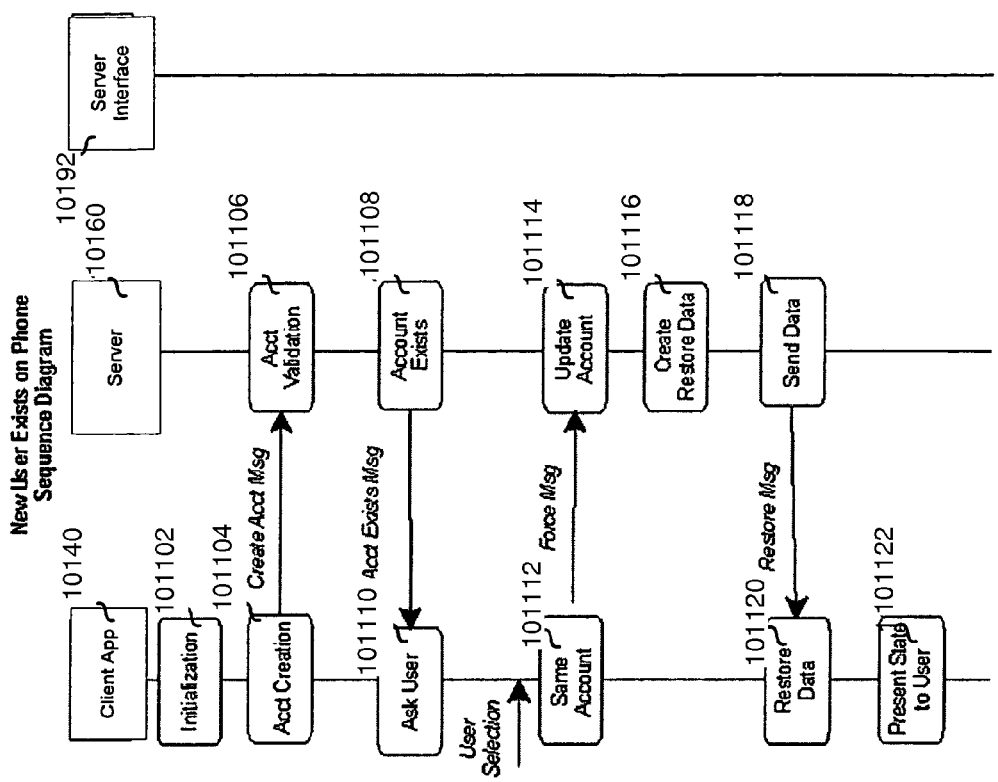
FIG. 28 is a sequence diagram illustrating how a user already having an account with the system, but utilizing a new phone, would interact with a server in accordance with the present invention.

FIG. 28 illustrates the interaction between a phone client and the server application in a situation where a subscriber may have lost their phone but already has an existing account with the system. Hence, the user merely needs to reestablish connection with the account using the user's new phone. At the initialization step 101102, an account creation routine run on the phone application 10140 at step 101104 will send an account creation message to the server 10160. When the account attempts to validate the user information at step 101106, a determination that the account already exists will occur at step 101108. This will prompt a message returning to the phone application to ask the user at step 101110 whether the account which has been entered is in fact the user's account. Once the user selects a prompt indicating that it is the same account at step 101112, message will be returned to the server and the account will be updated at step 101114 with the user's new device information. The system may be utilized to restore information to the user's new phone by creating a restored data set at step 101116, which may be returned to the user at step 101118, and the data restored in the phone device at step 101120. This restores the user's information in the user's new phone to the state it was when the user last updated the user's information on the system's server.

As noted above, the client application 10140 and server application 10180 provide the user with a number of functions to create and manage accounts with the ESP and the advanced ID system.

FIG. 29 illustrates functional use cases for a particular subscriber. A user 101200 can install the application 101202, such as for example by downloading the application to the phone via the phone interface, and create accounts at 101204 in accordance with the foregoing description. Likewise, the user can uninstall the application 101206 delete accounts with the enterprise service provider. The user can also use the application to upgrade accounts at 101210, downgrade accounts at 101214, and change account settings at 101216 in order to modify an account 101218.

FIG. 30 illustrates the functions a user 101200 can implement to perform tasks linking to other subscribers. The user can review a buddy list 101302, requiring the buddy list to be retrieved at 101304. Likewise, the user change a particular buddy's persona assignment at 101305, view a mapping of buddy and personas 101306, override the buddy's published information 101308 in their own phonebook, such as, for example, where a "buddy" had downloaded a ringtone which is not desired to user 101200, remove the buddy from the list of buddies at step 101310, add a buddy by performing a search function at 101312, or invite another person who is not a subscriber to be the user's buddy by subscribing to the system.

Figure 31:
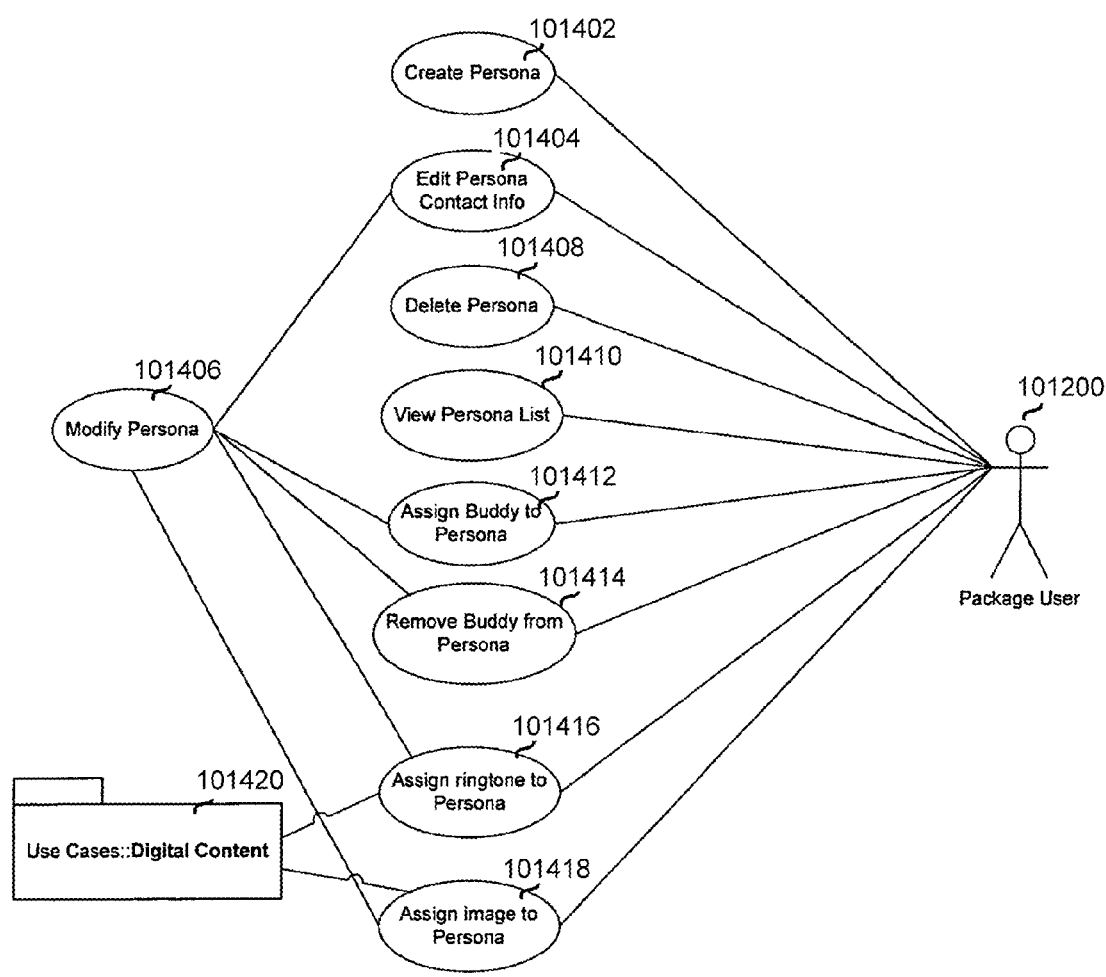
FIG. 31 is a use case diagram illustrating the persona control functions available to a user/subscriber in accordance with the system of the present invention.

FIG. 31 illustrates use cases for the subscriber 101200 with respect to persona manipulation. The user can create persona 101402, edit personas 101404 (which results in a modify persona 101405) delete a persona at 101408, or view a persona list at 101410. Other instances which result in modifying a persona included assign a buddy to a persona at 101412, removing a buddy from a persona at 101414, assigning a ringtone to a persona at 101416 or assigning an image to a persona at 101418. Assigning a ringtone or image also gives rise to the modification of the digital content at 101420, illustrated in FIG. 32.

Figure 32:
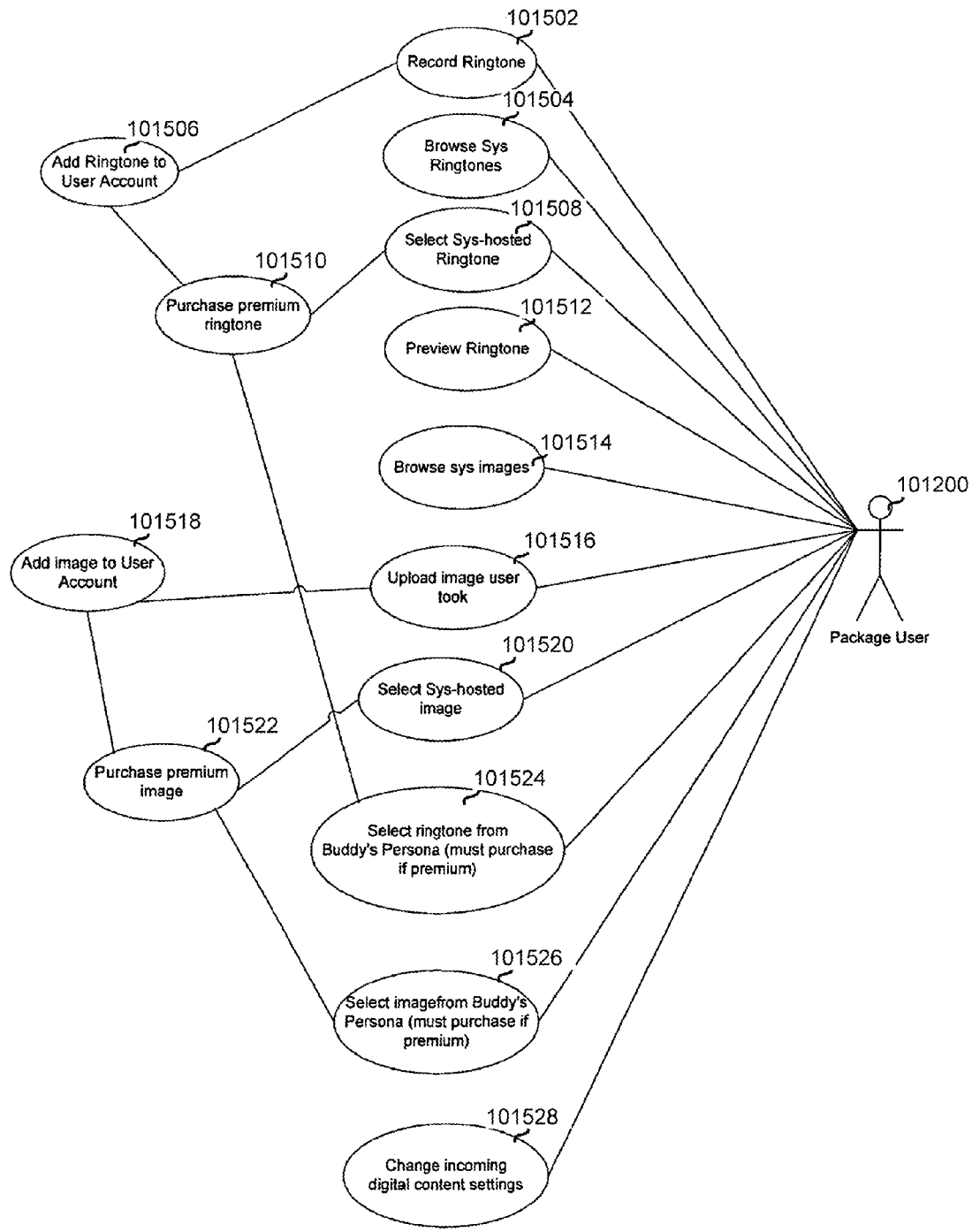
FIG. 32 is a use case diagram illustrating the multimedia control functions available to a user/subscriber in accordance with the system of the present invention.

FIG. 32 illustrates the use cases for an application user 101200 interacting with multimedia content. The user can record a user's own ringtone at 101502, or browse system ringtones provides by a value added service provider via the enterprise service provider at 101504. Recording a ringtone at 101402 results in a ringtone being added to the user's account at 101506. The user can also browse system hosted ringtones at 101508 and may choose to purchase premium ringtones at 101510. The user can also preview ringtones at 101512, and browse system provided images at 101514. The user is allowed to upload images 101516 to and from the user's phone when, for example, the user's phone supports taking pictures, and adding the phone to the user's account at 101518. The user can also choose to select system hosted images at 101520 and purchase premium value added images at 101522. Where a user has purchased a ringtone, at 101524, the user may choose to share this ringtone with buddies. When a buddy selects the ringtone, digital rights management provider rights in the ringtone may require that the second user utilizing the ringtone purchase a license to use that ringtone for themselves. Step 101524 allows a prompt where the system asks the user requesting a buddy's ringtone for their own use to purchase the ringtone from the enterprise service provider. Likewise at 101526, a buddy's image can be utilized by the subscriber 101200, and if such image is premium content, a prompt requiring the user to purchase the image is provided at 101526, at 101528, the user is allowed to change digital content settings in their own phone. If for example a buddy has provided an image and/or ringtone that are unsuitable for the user 101200, the user is allowed to override those settings in their own phone using the application interface.

Figure 33:
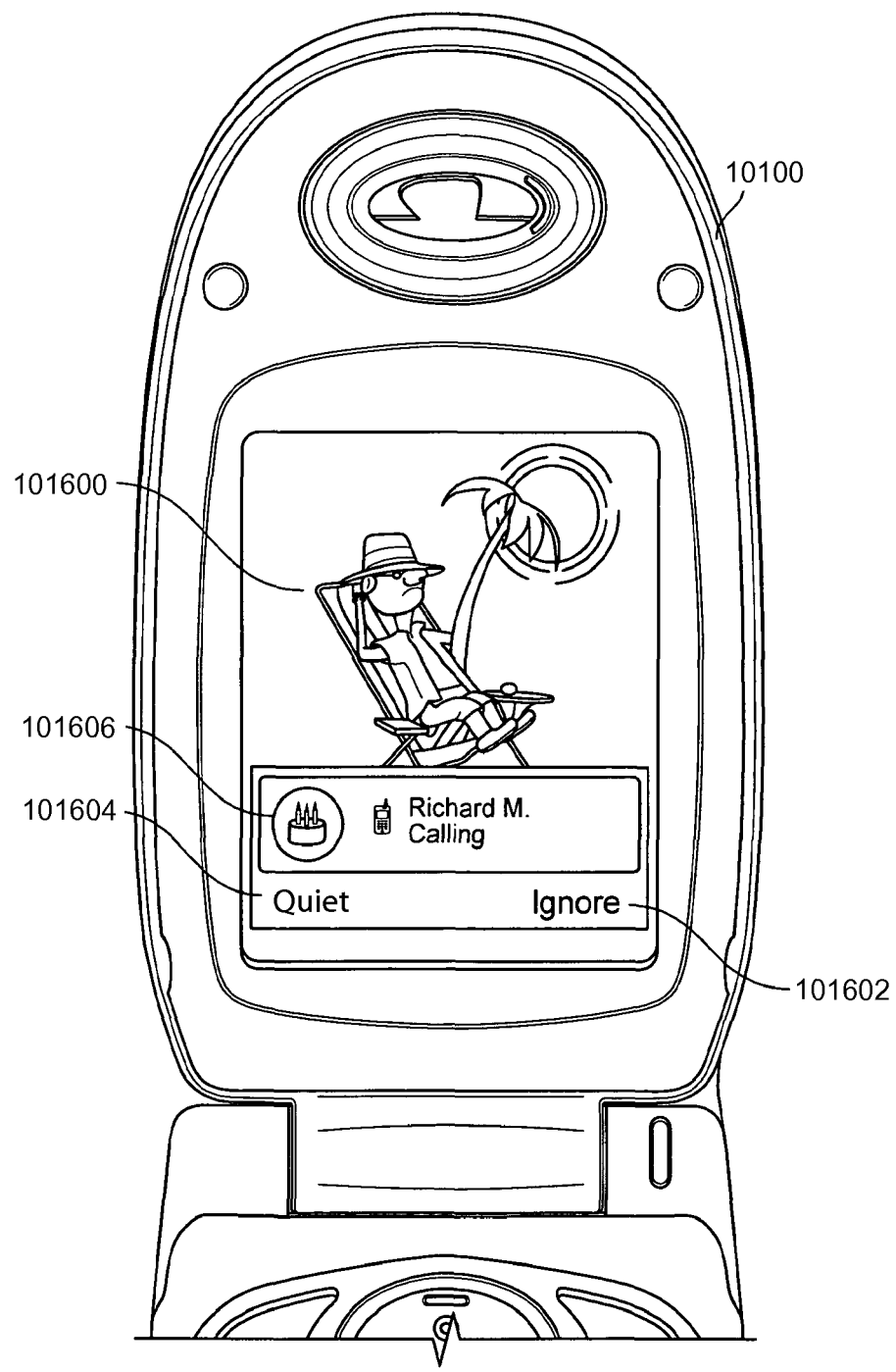
FIG. 33 is an exemplary advanced ID screen provided on a phone in accordance with the present invention.
Figure 34:
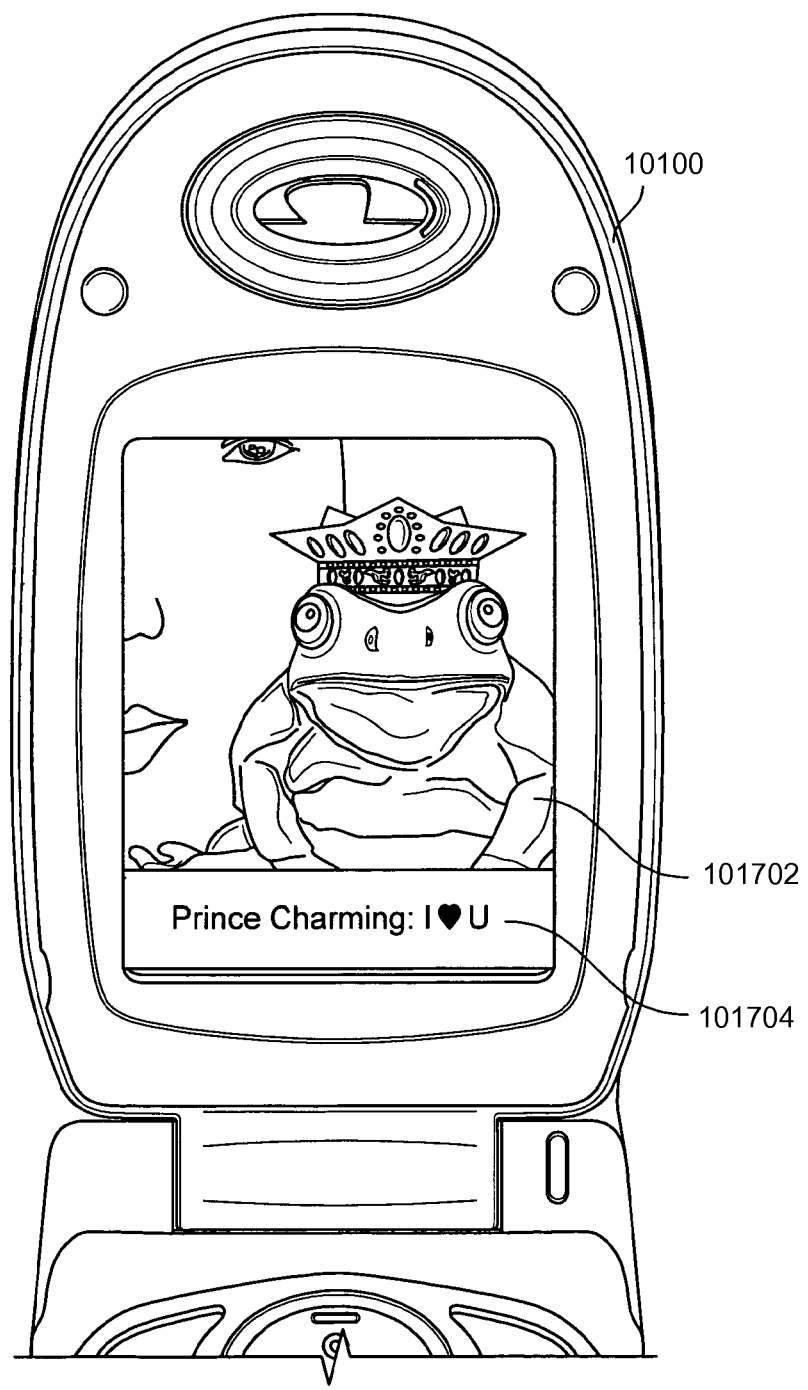
FIG. 34 is an exemplary advanced ID screen with metadata provided on a phone in accordance with the present invention.
Figure 35:
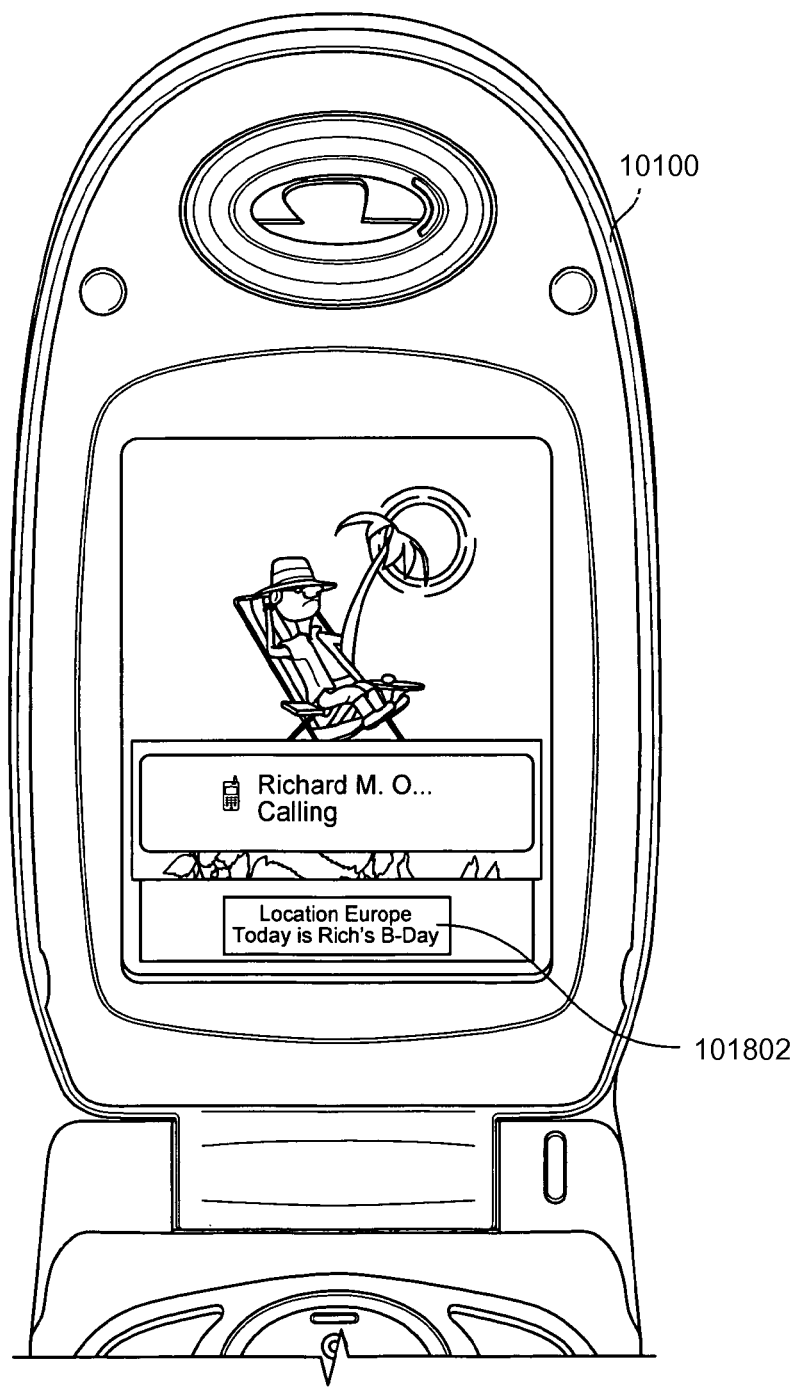
FIG. 35 is an exemplary advanced ID screen with control functions provided on a phone in accordance with the present invention.

FIGS. 33, 34, and 35 illustrate different aspects of an advanced caller ID function as displayed on a phone 10100. Once the subscriber information for other users is downloaded to phone 10100, displays such as those set forth in FIGS. 33, 34, and 35 may appear.

FIG. 33 shows a first example of a subscriber display. When a calling subscriber "Richard" phones device 10100, a display 101600 of the user's name and an image that Richard has provided is displayed on the phone. Even if the native display of the phone 10100 includes only support for a thumbnail image (or an image that does not occupy the entire display area of the phone) client 10140 can cause the OS services in the phone 10100 to display a full screen image along with soft-key enabled function menus 101602, 101604. The display can include an icon 101606 indicating additional information for the user. In this example, a birthday cake indicates it is Richard's birthday. As will be understood by those of average skill in the art, many phones include "soft-keys" which activate variable commands in a menu display in a phone. Selection of the soft keys (generally directly under an interface screen) in the example of FIG. 33 provide ignore prompt 101602 and a quiet prompt 101604.

FIG. 34 shows a depiction of a movie display 101702 on a phone device 10100 with a text message 101704 displayed underneath. It will be understood that the image in FIG. 33 is, for example, an AVI, MPEG, QuickTime, or other sample video image supported by the playback features of phone 10100.

FIG. 35 is another example of a display for "Richard" wherein additional meta data is provided. This information is depicted in a text message at the bottom portion 101802 of the screen, and includes location information as well as information indicating that today is Richard's birthday.

In a further embodiment, a subscriber display may be provided which incorporates data from sources other than the address book. If, for example, the user has populated a phone's native calendar with information concerning meetings with a contact, the client application can extract this information and display, for example, the user's last or future meetings with the contact. Alternatively, this information can be extracted from a sync user account when a synchronization server is utilized as described herein.

Figure 36:
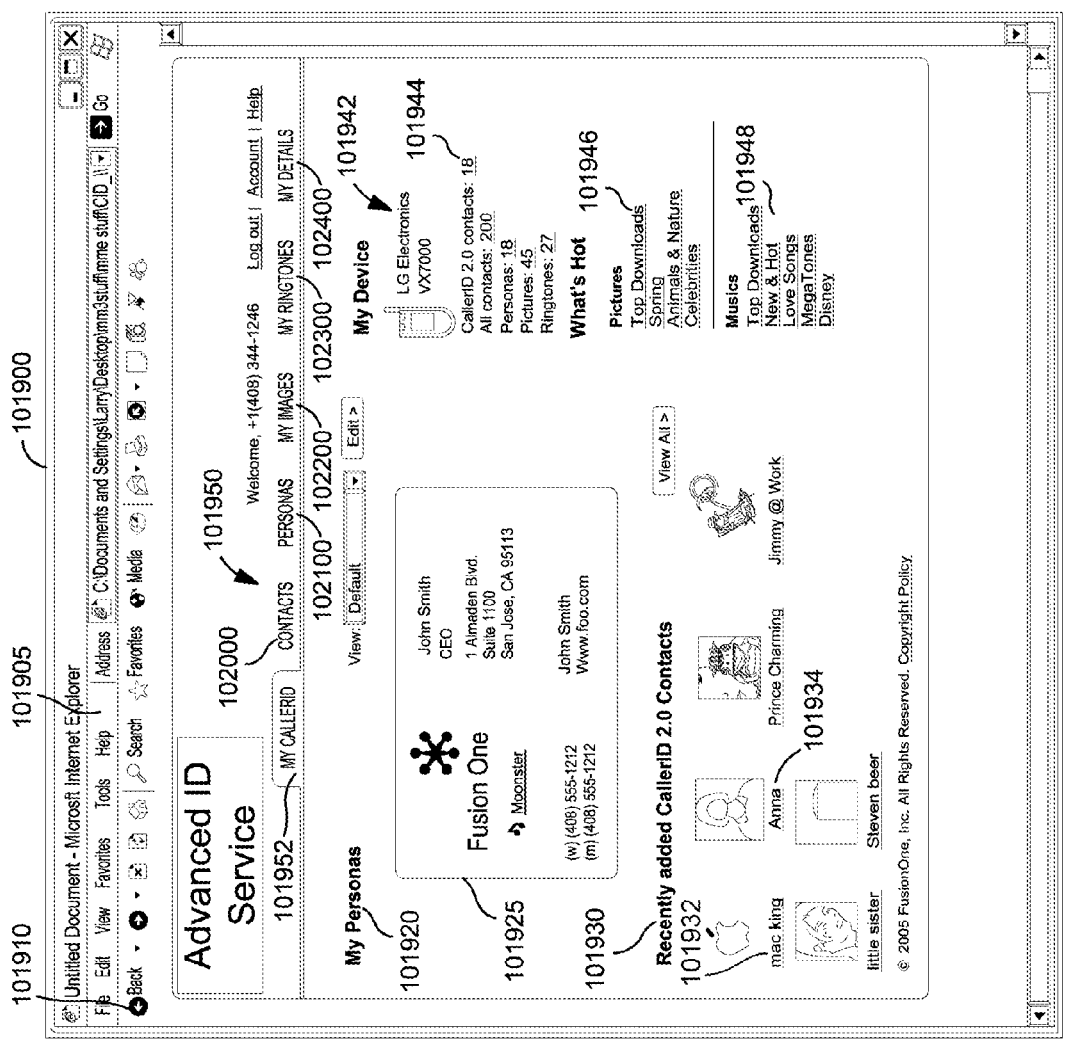
FIG. 36 is an exemplary user interface home screen for a user managing an advanced ID system in via a web browser in accordance with the present invention.

FIG. 36 is a depiction of a user interface 101900 which may be provided by server 10160 via web browser 10180 to a client device 10190. A typical web browser 101910 includes the menu bar 101905 having a number of standard features well recognized to those of average skill in the art. Likewise a menu bar 101910 which includes navigation features for the world wide web is provided. User interface 101900 may be accessed via URL supplied by web server 10180. Interface 101900 includes a menu bar 101950 having a "caller ID" "home" menu option 101952, a contacts menu option 102000, a personals menu option 102100, a my images menu option 10220, a my ringtones menu option 102300 and a my details menu option 102400. The welcome screen includes a logout account and help link and displays a welcome message to a user based on the user's telephone number. The my device window 101940 displays the system's understanding of the user's current type of device at 101942, status information 101944 including the number of contacts the user has specified as direct link contacts "caller ID 2.0 contacts", the number of total contacts the user has, the number of personas the user has, the number of pictures the user has, and the number of ringtones the user has. An additional section labeled "What's hot" can be utilized by a value added reseller to display digital content such as picture 101946 and music 101948 which allow the user to download this information from the value added service provider and provided to the user's account. A My Personas window 101920 includes a depiction of an address card for the user John Smith and the user's general information in the form of a contact card. A recently added contact section 101930 displays links to user's contacts as hyperlinks 101932 along with a graphic depiction associated with that user's contact. It will be understood that each of the terms on the page highlighted by underlining can provide a hyperlink to more detailed information about the links content.

Figure 37A:
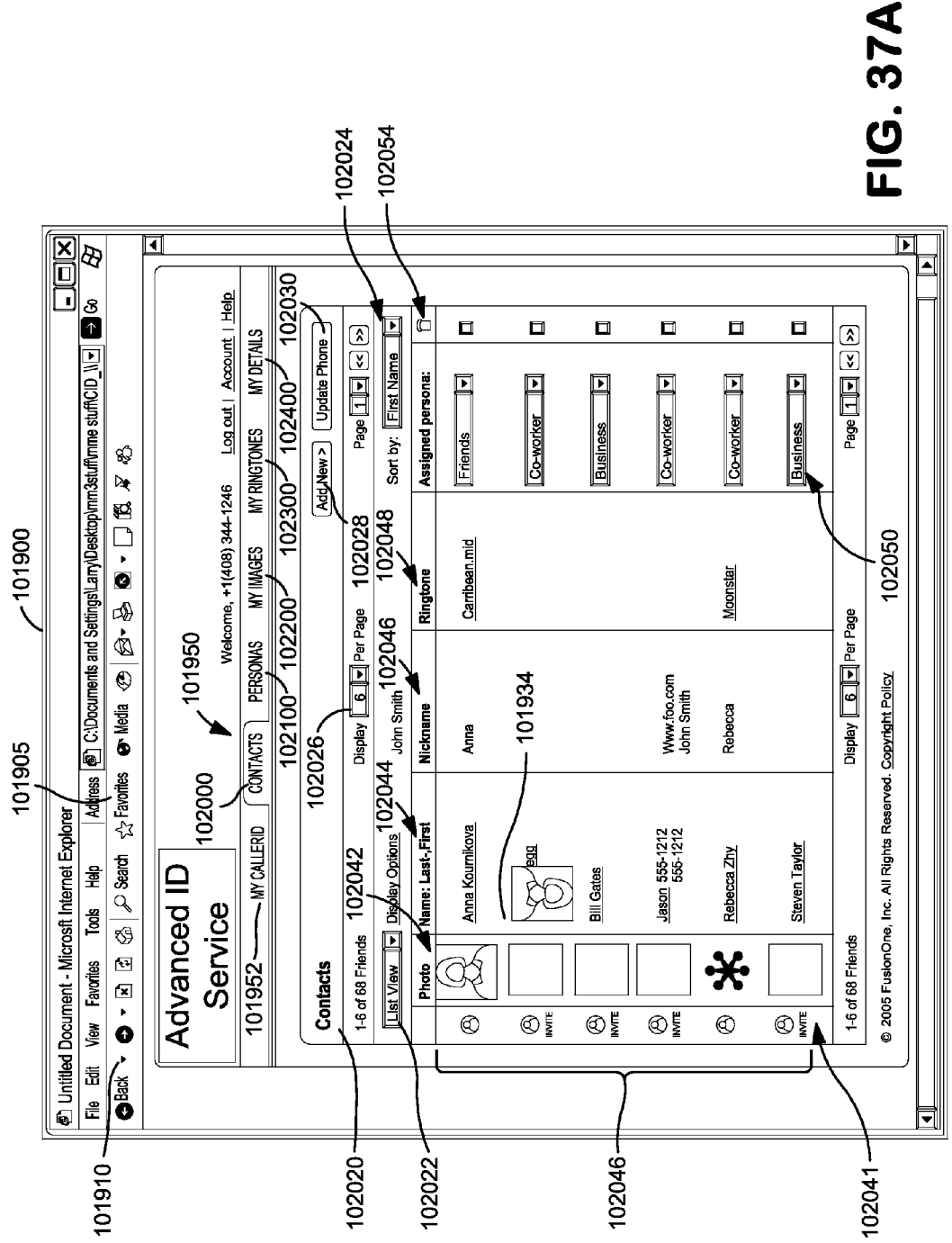
FIG. 37A is an exemplary user interface for managing contacts via a web browser provided by a server in accordance with the present invention.

Selection of the contacts link 102000 on the menu bar 101950 gives rise to the user interface 102000 shown in FIG. 37a which is suitable to allow the user to manage user's contacts in the system of the present invention. Contacts interface 102000 includes a contact display 102020 which provides a user a number of options for listing and editing contacts. A user can choose from any of a number of different types of use via a drop down box 102022. The view shown in FIG. 37a is that of a list view for a series of contact 101040. Each contacts includes a photo depiction in column 102042, a name display in column 102044, a nickname field in column 102046, the ringtone associated with that user in column 102048, the assigned persona which may be selected via drop down boxes in column 102050. Likewise, each user is associated with an invite link in column 102041 and tick boxes in column 102052 allow the user to select one or more contacts for immediate deletion via selection of the delete icon 102054. Selection of one of the hyperlinks of a user contact will cause the server 10180 to render an edit page allowing the user to edit information associated with that contact.

The functionality associated with the user interface in FIG. 37a on a web browser can likewise be provided on a screen on a phone. FIGS. 37b-37m depict the contact interface which is displayed on a user phone.

FIG. 37B shown an initial start-up screen displaying a "last successful synchronization" that the user has made, as well as status information, (all contacts, Advanced ID contacts, personas, images and ringtones) such as that depicted in FIG. 37a. Options provided to the user at this point by soft-key menu items allow the user to initiate a sync at 102062, or select different options at 102064.

FIG. 37C shows a menu 102066 resulting from selection of the "options" link in FIG. 37b allowing the user to select a contacts interface a personas interface, a sync now instruction, or more detailed settings.

At FIG. 37D, if the user has selected contacts in FIG. 37c, a list of contacts 102068 is displayed. The user can use the soft keys and any other input device on the phone to highlight a user in the display for selection. Selection of a contact opens a record for that contact. Optionally an options menu 102070 is displayed depending on whether the contact is an advanced ID contact or not.

At FIG. 37E, the user may display an options menu 102072 for an advanced ID contact by selecting the options button 102064 in FIG. 37D. This menu allows the user to open a contact, assign a persona to the contact, invite the contact into subscription with the system of the present invention, or disable caller ID for that particular contact. FIG. 37F shows the options interface if a contact which has been selected in FIG. 37D is not an advanced ID enabled contact. The only two options available for the user in FIG. 37F are to open the contact, or invite the contact into subscription with the system.

If an advanced ID contact is opened (from FIG. 37E), the screen of FIG. 37G is displayed. The depiction of FIG. 37G shows that for a particular contact and Anna K, she is a member of the co-workers persona, has a picture assigned entitled "Anna in NYC," is assigned the moonstar midi (moonstar.mid) ringtone, as a nickname "Anna" and has a work number and a home number associated with her contact information. Each of these items is selectable by moving a selection input on the phone and depressing an entry button. For example, pressing the Anna in NYC selection will result in the display shown in FIG. 37H wherein a graphic image associated with the contact is displayed. Selecting the moonstar midi ringtone will result in playing the ringtone in the depiction shown in FIG. 37I. Selecting the nickname will allow the user to change the nickname via an interface 37J displayed on the phone.

Selecting the persona brings up a change persona menu as shown in FIG. 37K. A change persona menu will display current personas which are associated with the user and allow the user to select one or more personas to change the particular user to. If the user selects, for example, the co-worker persona, a message such as that shown in FIG. 37L will be displayed indicating to the user that the co-worker persona has been assigned to Anna K. Finally, if the user selects to disable caller ID from the user, a warning message is displayed such as that shown in FIG. 37M.

Figure 38A:
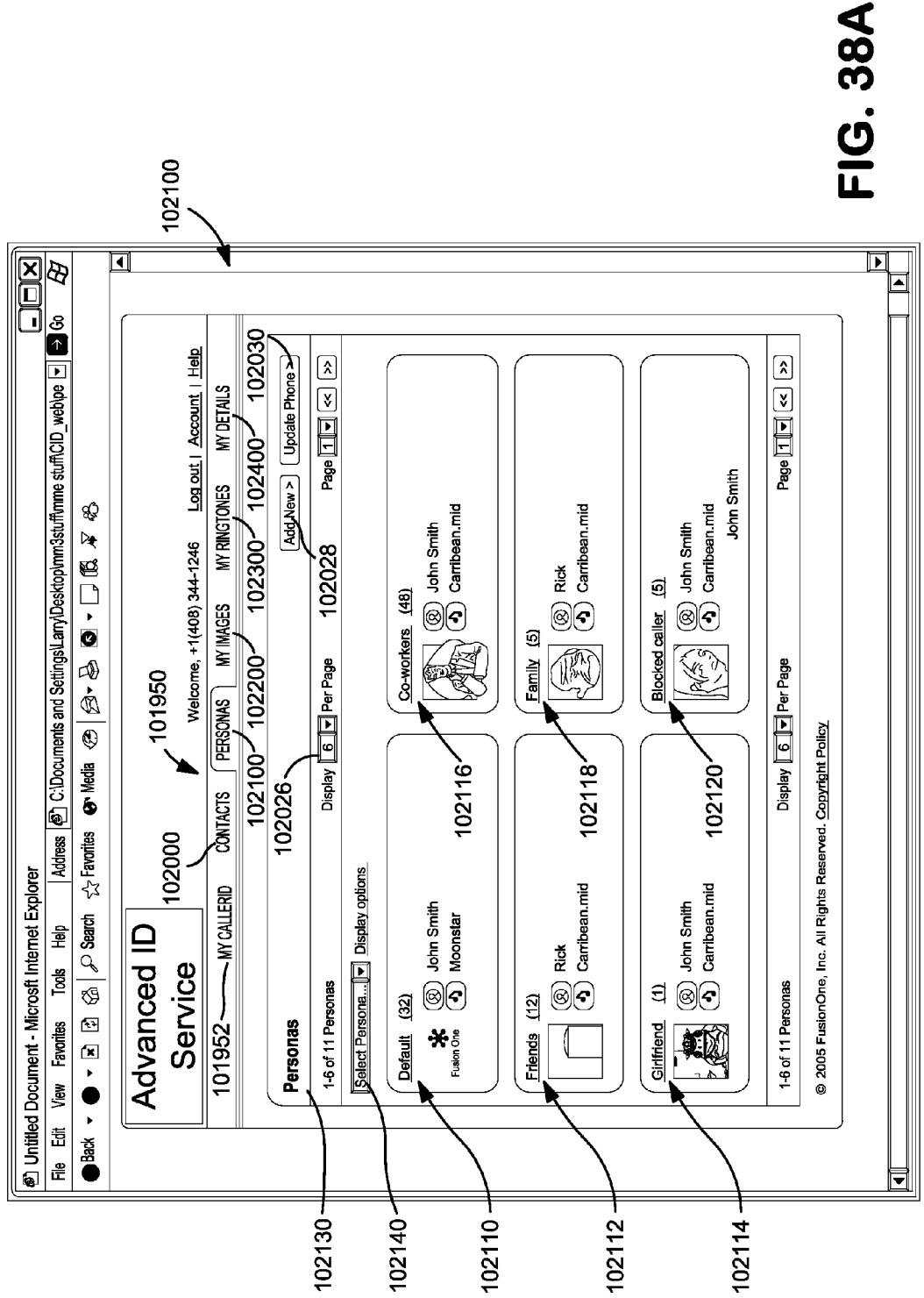
FIG. 38A is an exemplary user interface for managing personification information provided by a server on a web server in accordance with the present invention.

Pressing the "persona" menu item 102100 in menu bar 101950 in FIG. 36 displays a personas interface 1021000 shown in FIG. 38A.

As shown in FIG. 38A, the persona screen displays a number of personas 102110 and 102112, 102114, 102116, 102118, and 102120 which provide the user with a short display of name of the persona, the number of users to whom the persona is assigned in parentheses, and the image the user is displaying in the persona to others, the name the user's displaying to others and the ringtone the user is displaying to others. It should be recognized that components of the interface include additional components of the persona, or less components of the persona depending on the real estate available on the user interface on the web page.

FIGS. 38B-38N illustrate the same functionality provided in the interface 102100 on a phone device.

FIG. 38B shows a personas menu 102130 which includes links to each of the defined personas for a given user. In FIG. 38B these are "default" friends, co-worker, family, girlfriend, and blocked caller. Selection of the options soft key menu gives rise to a menu shown in FIG. 38C allowing the user to open, create a new persona, edit a current persona, or delete a current persona. If a user selects to open a persona such as the default persona, the display shown in FIG. 38D is shown. The display in FIG. 38D shows that for a given "default" persona, the name of the persona is displayed, the associated image "F1 logo" is displayed, the ringtone "moonstar.mid" is displayed, the nickname associated with the persona is displayed and a work number and home number associated with the persona is displayed. Selection of the persona name by navigating to the name and selecting using a phone input selection mechanism results in the display shown in FIG. 38E offering the user a selection changing the soft keys to "ok" and "assign." Selection of the assigned soft key results in the display shown in FIG. 38F, showing the users which have been assigned to this particular persona by the user. Current returning to FIG. 21C, selection of the "new" menu item results in a template shown in FIG. 38D. All the items in the template are blank, allowing the user to add via a soft menu selection button, the items for each of the entries depicted in FIG. 38D. The only menu entry which is pre-populated is the user's phone number as shown in FIG. 38G. Depressing the add name selection in FIG. 38D results in the display in FIG. 38H, allowing the user to enter via the phone's text entry method the name of the persona. FIG. 38I shows at selection of the "multitap" soft key at the base of the FIG. 38H allows the user several input methods for text such as multitap, numbers, T9 word entry, or symbols. Once the name has been specified in FIG. 38H the display of FIG. 38J illustrating the name of the persona is displayed. FIG. 38K results when the user has selected the add soft key in FIG. 38J and the associated entry with a selection to add a graphic. FIG. 38K displays those graphical or image entries which are "on the phone" and allows the user to select one of the displayed entries. If the user selects the "bird" entry the image that's displayed is shown in FIG. 38L. Likewise, FIG. 38M displays a list of ringtones available for the user, and FIG. 38M displays a user's availability to delete the ringtone.

Figure 39:
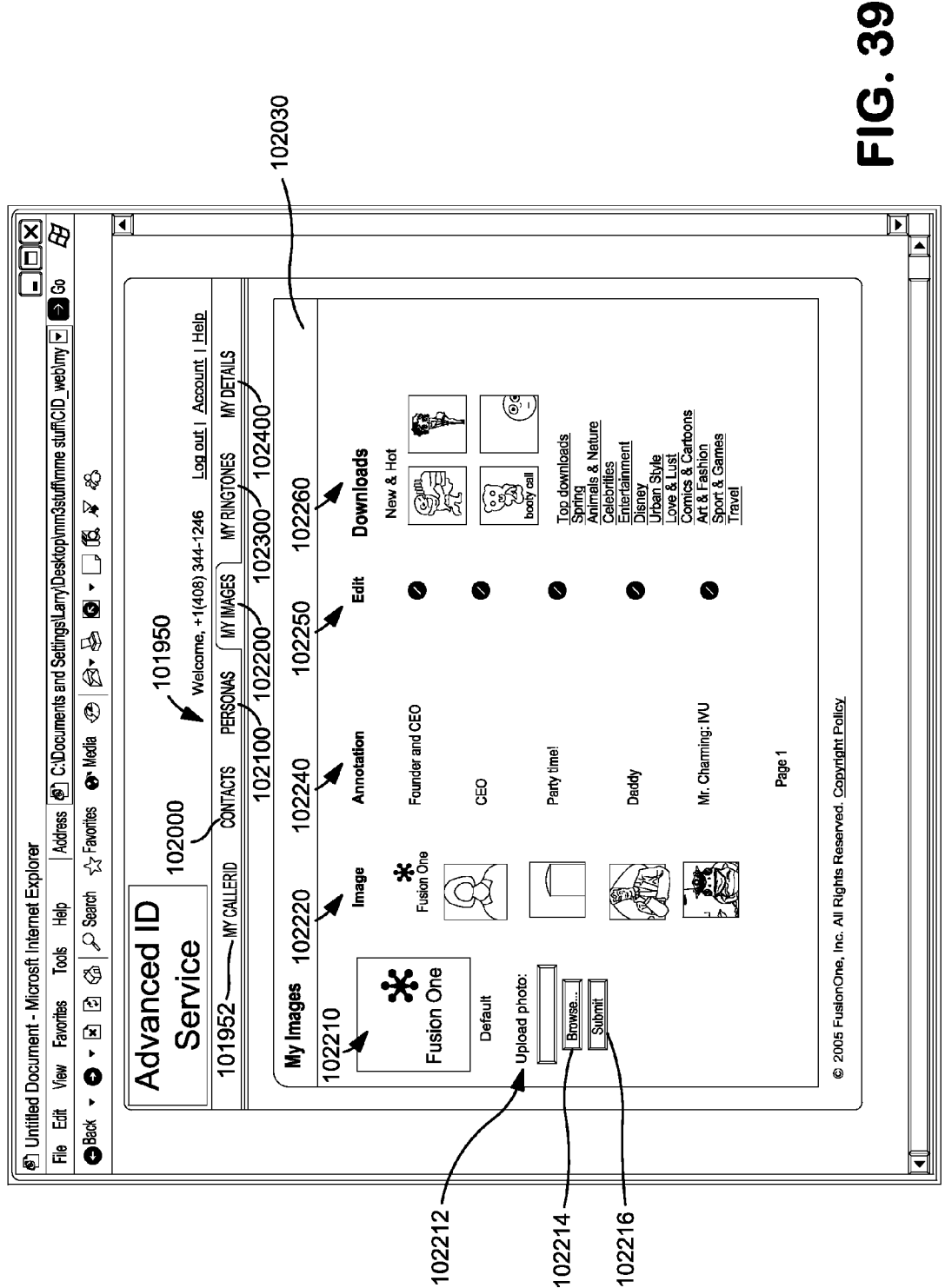
FIG. 39 is an exemplary user interface screen provided on a server allowing a user to manage images in accordance with the system of the present invention.

FIG. 39 is a graphical user interface displayed in web browser allowing the user to manage images in accordance with the present invention. Images available to the user are displayed in a column 1022/20, along with an associated nickname in column 1022/40, and an edit function hyperlink in column 1022/50. A default image for the user 102110 is displayed such that should the user create personas, the default image will be used. A upload interface 102212 including a browse selection button and a submit button 102216 are provided allowing the user to upload various images to their account. A premium downloads section 102660 offers the user links to value added service provider content to be downloaded and utilized by the user in accordance with the terms of the value added service provider.

Figure 40:
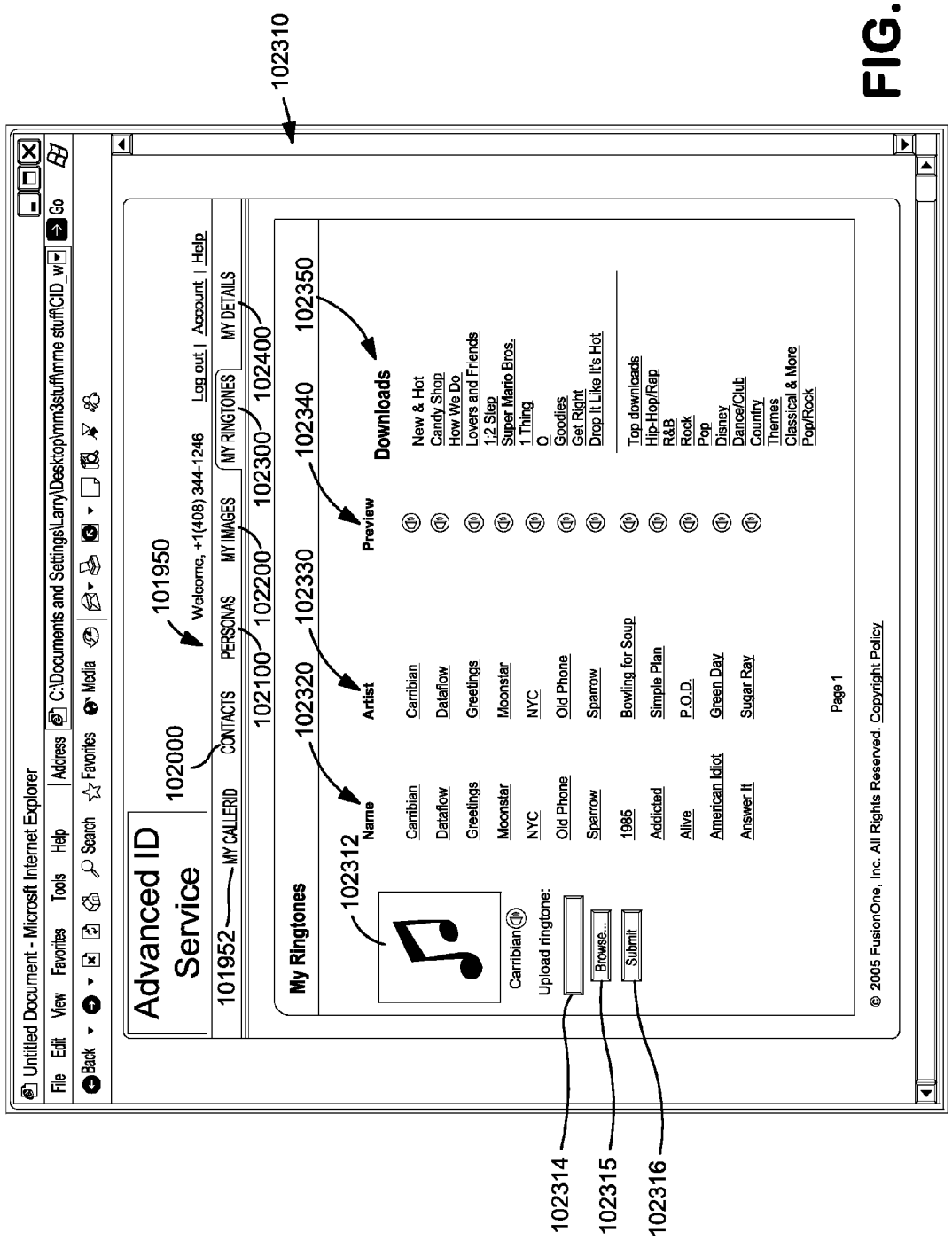
FIG. 40 is an exemplary user interface provided by a server in a web browser allowing a user to manage multimedia in accordance with the system of the present invention.

FIG. 40 illustrates an interface for managing ringtones in accordance with the present invention which provided in a user-interface and web browser by the web server 10180. A My Ringtones window 102310 includes a list of ringtones 102320 which have been uploaded or are available to the user via their account. The name of the ringtone is displayed in column 102320, the artist in column 102330 and a preview in hyperlink 102340. Likewise, default ringtone for the user is displayed at 102312 and an upload interface provided as in a manner somewhere to the image upload interface. Again, a value added download section 102350 can be provided to allow a digital content provider to provide value-added content downloadable by the user via this interface. An upload interface 102314 including a browse button 102315 and submit button 102316 allow a user to add to the ringtone selections for his account In a well known manner.

Figure 41:
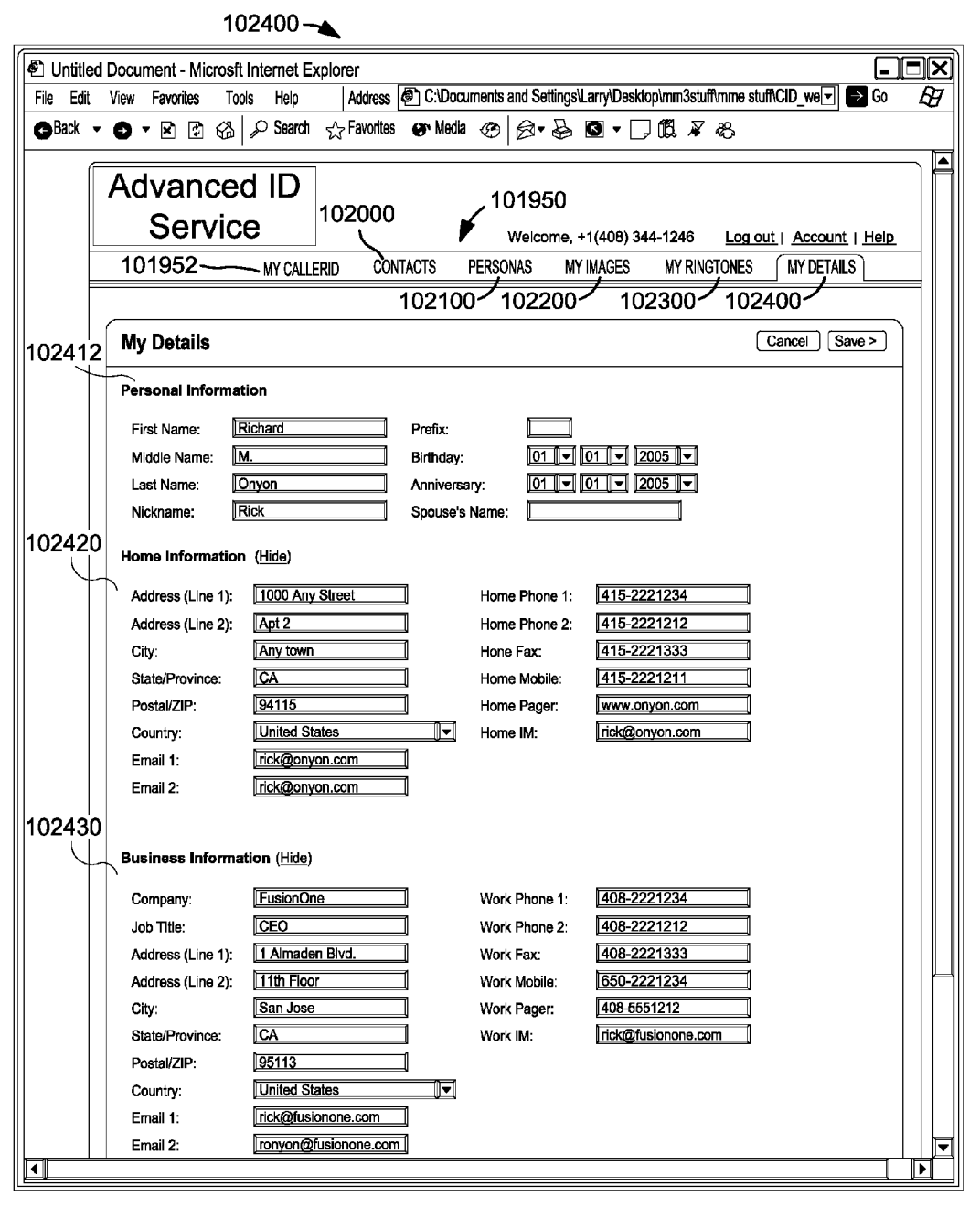

FIG. 41 displays a My Details interface 102400 upon selection of link 102400 in bar 101950 of FIG. 36. The interface 102400 allows the user to manage information associated with the user's account. A personal information section 102412 allows the user to input and change the user's first, middle and last name, as well as the user's nickname and detailed personal information, such as their birthday, anniversary and spouse's name. A home information and business information section 102420 and 102430 allow the user to specify a number of contact points and contact numbers for the user which are then used to allow the user to create personas in accordance with the foregoing description.

Figure 42:
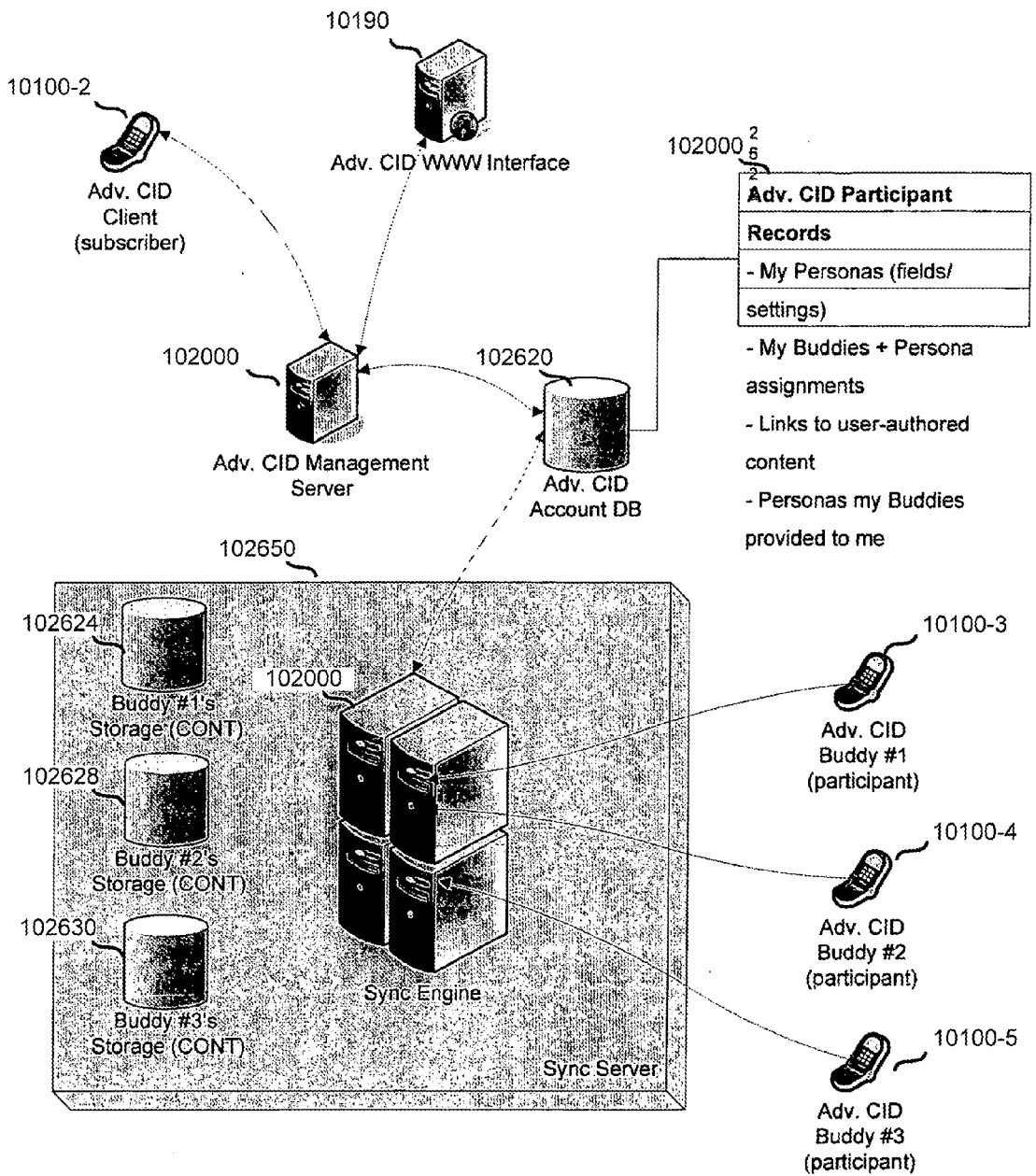
FIG. 42 is an alternative client server configuration utilizing the synchronization system disclosed in U.S. Pat. No. 6,671,757 to implement the system of the present invention.

As noted above, when the system is implemented in accordance with a synchronization system as shown and described with respect to U.S. Pat. No. 6,671,757, 6,694,336 or 6,757,696, additional elements other than those shown in FIG. 20 may be present. FIG. 42 is block diagram illustrating how the integration between a number of users and the synchronization server 102550 implemented in accordance with U.S. Pat. No. 6,671,757, 6,694,336 or 6,757,696 as used in to the present invention. An advanced ID management server 102510 may comprise a server 10160 or a sub-set of the elements of server 10160, but including at least a management application 10170 and a user info store 102520 to a persona database 102520 containing subscriber records 102522. The synchronization server 102550 is provided with sync account records 102524, 102528, 102530 for a number of buddies of a subscriber 10100-1. Synch server 102550 communicates the synchronization mechanism disclosed in U.S. Pat. No. 6,671,757, 6,694,336 or 6,757,696 with buddy users 10100-3, 10100-4, and 10100-5. Rather than directly communicating changes via a download and upload of data, the transaction data packages as disclosed in U.S. Pat. No. 6,671,757, 6,694,336 or 6,757,696 communicate persona information by distributing changed logs to the client 10100-3-10100-5. The user communicates with the system server 102510 via the phone interface or web interfaces as previously described.

Figure 43:
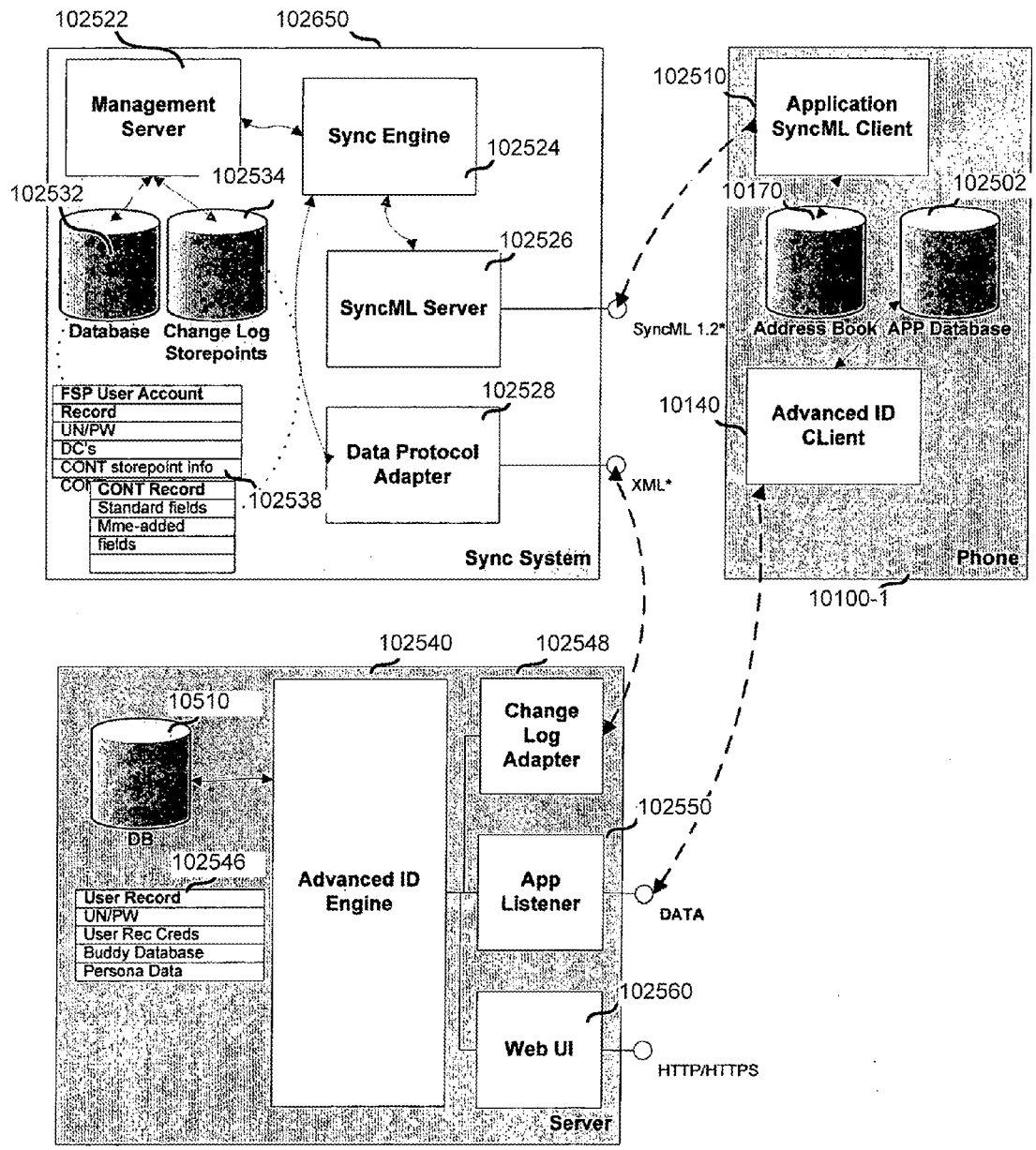
FIG. 43 is a depiction of the system of FIG. 42 integrated with multiple participants and subscribers in accordance with the system of the present invention.

FIG. 43 is a block diagram depicting a more detailed alternative configuration of a sync server system, advanced ID server and client system for implementing the present invention. In FIG. 19, the server system is depicted as a stand-alone device communicating with a client such as a phone 10100. In FIG. 43 a phone 10100-6 is depicted as including an application client 10140 as well as synchronization client 102610, such as that described with respect to U.S. Pat. No. 6,671,757. An advanced ID system server 102640 includes a database 10510 having a user content records 102646, which include personas stored for subscribers as previously described. Server 102640 also includes a web server 102660 providing the web based interface screens disclosed in the foregoing figures. A client listener engine 102650 communicates with the client application 102675 to allow the user to input changes directly to the server side of the system 102640. A change log adapter engine 102640 allows communication of changes to and from the synchronization server 102650. A synchronization server 102620 is also provided. The synchronization server communicates with the synchronization client 102610 via a SyncMO server 102626 and with the Advanced ID server 102640 via a data protocol adapter 102628. A management server 102622 as described in U.S. Pat. No. 6,671,757 communicates with a synchronization engine 102624 to control synchronization data packages stored in data store 102632. The system allows the user's information to be stored across any number of multiple devices, and allows users having accounts with the synchronization server to have their information incorporated into the subscriber's advanced ID system. Each user account with the advanced ID service in the present invention requires the creation of corresponding synchronization account of the user. The synchronization account is used to synchronize the user's contents between the device and the system server 102640. The system server 102640 modifies the appropriate contact in the user's persona and information.

The personal records may be represented in the synchronization system's content records by a specially added contact record field. When a change log describing a persona arrives at the listener engine 102640, advanced ID engine 102642 collects the affected buddies, finds the corresponding synchronization server record, and provides the contact modified transaction change log containing the new persona information back to the synchronization server. The synchronization server adds these modified transactions in accordance with the description of U.S. Pat. No. 6,671,757, 6,694,336 or 6,757,696 to the directly linked buddies' synchronization accounts. On such buddies' next synch, each party retrieves the updated contact record representing the persona that the user has assigned it to. Once the synchronization server 102650 contacts the system server 102640, the system server tracks which persona a given buddy is assigned to by adding a field to the contact record. Device 10100-6 incorporates a device sync client 102610 which syncs with the device's address book with change logs provided by the synchronization server 102650. Both the native database 10150 and the application ID database 102602 may be used to store records for the advanced ID system in accordance with the present invention.

Figure 44:
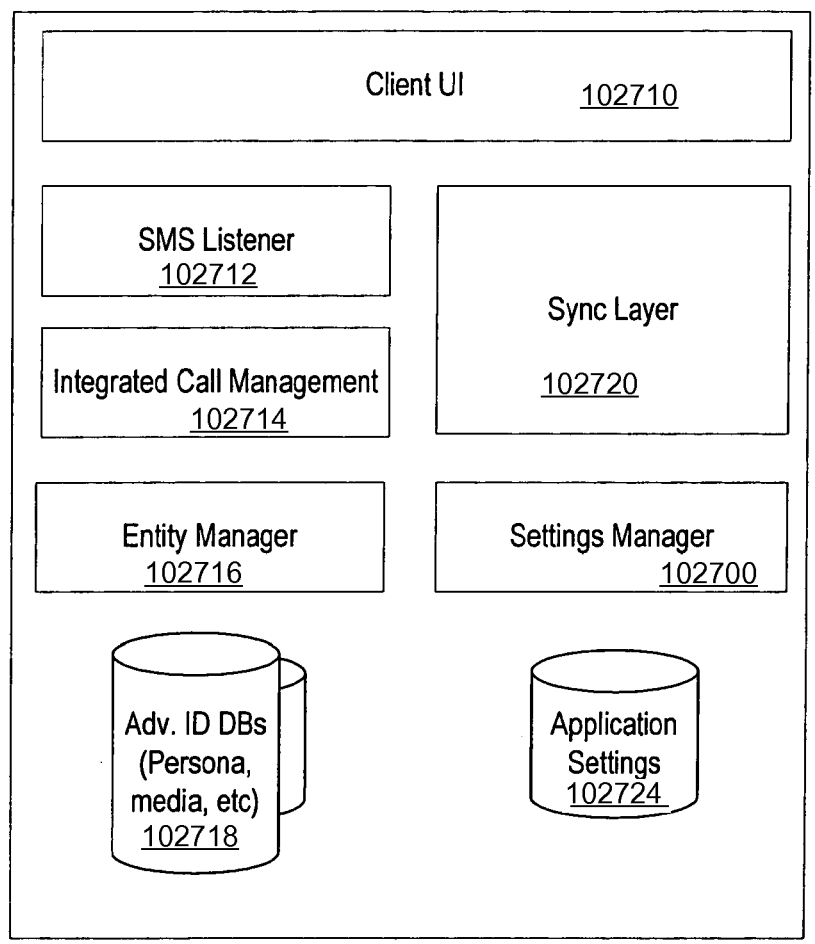
FIG. 44 is an exemplary client application structure suitable for use in accordance with the present invention.

FIG. 44 depicts a client side application including a number of subsystems. A client 102700 includes user interface 102710, an SMS listener 102712, integrated call management 102714, an entity manager 102716, a application database 102718, a synchronization layer 102720, (if utilized with the technology of U.S. Pat. No. 6,671,757, a settings manager 102722, and an application settings data store 102724. Client 102700 includes a user interface which displays the interface screens of the present invention as previously described. In various configurations, portions of the phone's native address book 10150 and an application specific, secondary data store 102718 store advanced ID information on the device. As noted above, when a subscriber contacts phone 10100-6, the application 102700 accepts the inbound call and depending on the robustness of the supported device and displays a custom user interface, including for example, the full screen image overlay with meta data, or a video clip. Integrated call management 102714 allows the user a variety of options to dispense with the call, such as answering, sending it to voice mail, or blocking the call to automatically populate the address book with the caller's public information. The entity manager maintains persona and buddy information on the client itself, as discussed below. The Sync layer 102720 supports synchronization with a sync server such as that described in U.S. Pat. No. 6,671,757. The settings manager 102722 maintains the user's preferences with respect to the application (such as application defaults and when the user may not want to be disturbed), which are stored in application settings store 102724.

Figure 45:
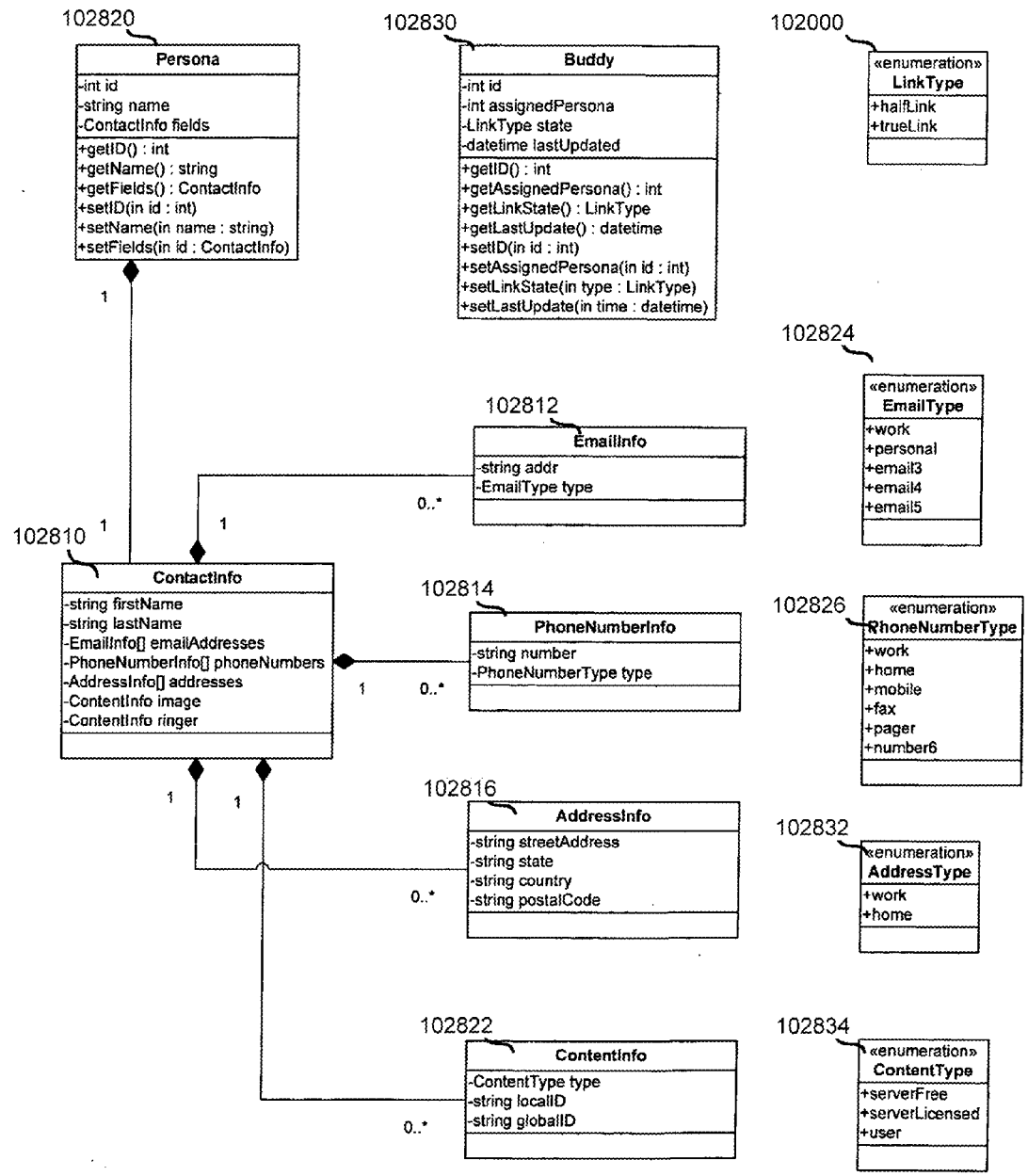
FIG. 45 is a static structure illustrating the information contained in a client-side database in accordance with the present invention.

FIG. 45 is a static illustration of the fundamental client objects utilized in the client database 102718 alone or in conjunction with a native database 10150. As shown in FIG. 45, for each instance 102810 of content information for a user, the instance may include email information 102812, phone number information 102814, address information 102816 and other content information 102822 such as a local ID 102822 and global ID. Each contact instance 102810 is associated with a persona 102820 and each persona identified by an identifier associated with the user. Buddy records 102830 include a buddy identifier, an assigned persona, what type of buddy they are (link type) and a filed indicating when the buddy information was last updated. Likewise, the e-mail information includes e-mail type enumeration 102824, phone number information 102814 includes phone number enumerations 102826, address information 102816 includes address enumerations 102832 (for work or home addresses), and content information 102822 includes for digital content, whether it is free or licensed information 102834.

Figure 46:
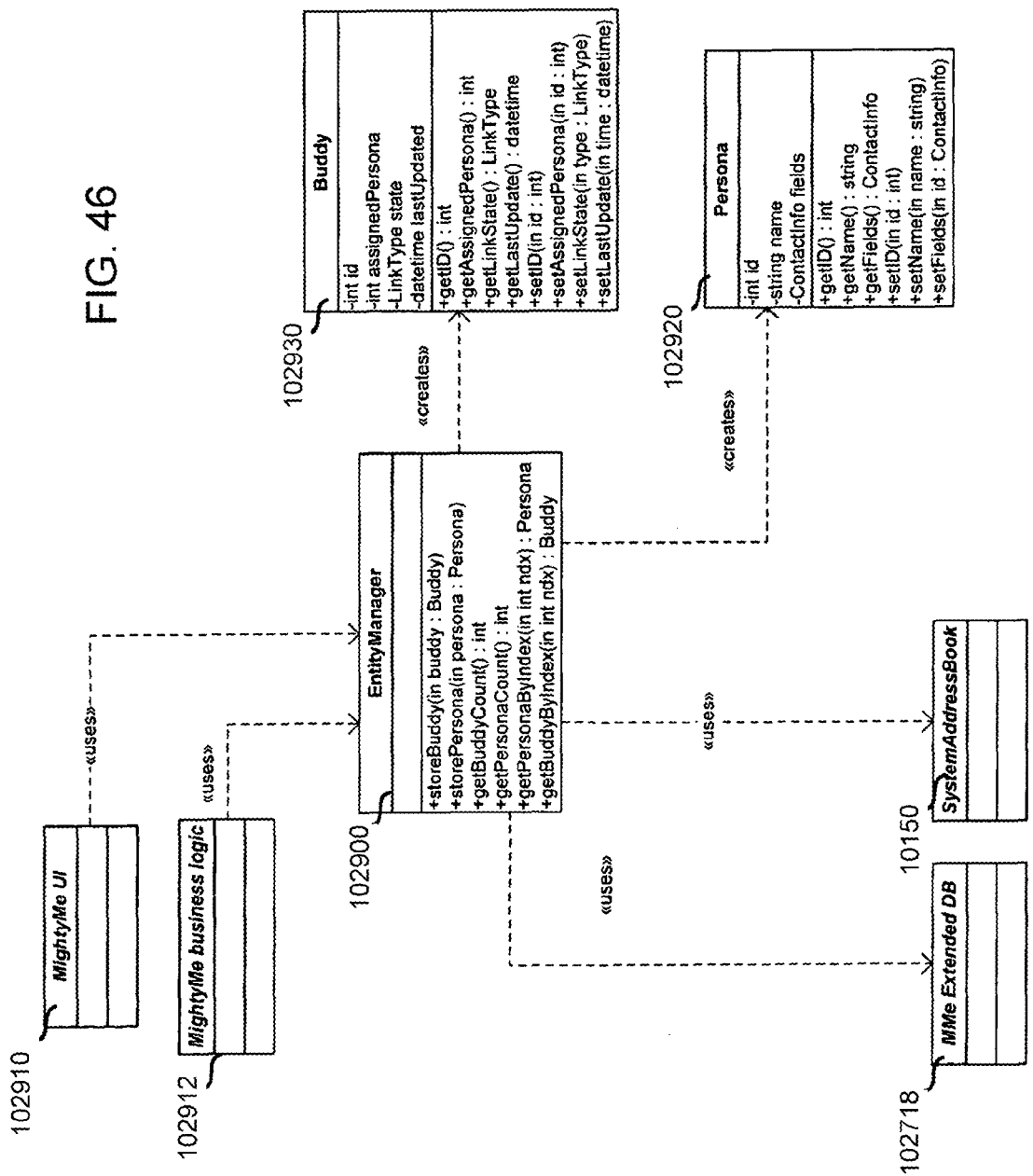
FIG. 46 is a static structure of an entity manager utilized on a client structure such as that shown in FIG. 45.

FIG. 46 is a depiction of the entity manager 102716 shown in FIG. 44. Personas and buddies are collectively referred to as entities and are handled by the entity manager 102900. As noted above, very few available devices support sufficiently robust address book data required for the implementation of the system in the present invention. To support the new data types required for this system, extended database 102718 depicted in FIG. 44 may be required. Entity manager 102900 controls the use of these two data stores. Due to the peculiarities at the particular platform in question, entity manager 102900 serializes the buddy and persona objections from the system address book and its additional databases. Entity manager 102900 gathers the serialization code in a central place and allows expansion of the data set to include additional fields. Entity manager 102900 manager creates a serialized a buddy and persona records 102830, 102820, respectively and uses the system address book, the user interface 102710 and business logic, which is then created by the user at 102912.

Figure 47:
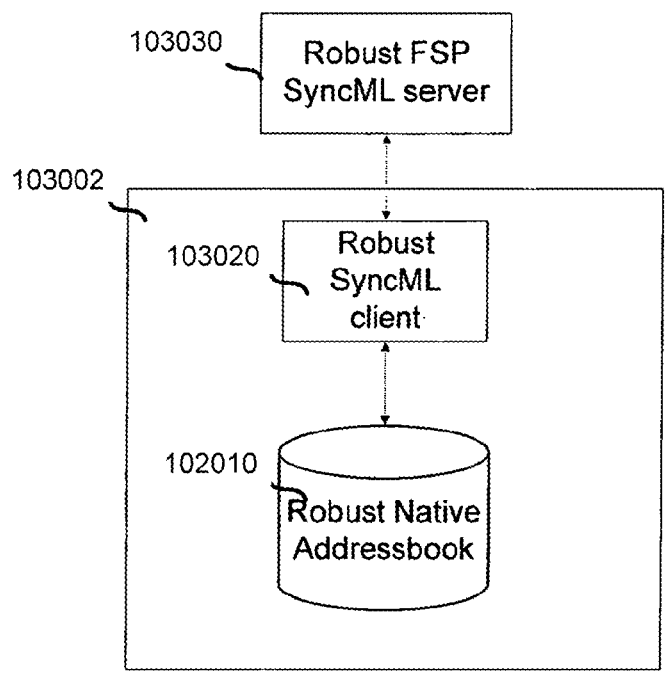
FIG. 47 an exemplary alternative configuration of a client application in accordance with the present invention.

FIGS. 47, 48, 49, 50, and 51 illustrate alternative configurations for the client shown in FIG. 44. An optimal configuration 103002 is shown in FIG. 47 wherein a native robust address book 103010, a robust SyncML client 103020, and a robust synchronization server 103030 are provided. In this configuration, there may be very little for the client application 103002 to do, other than managing multimedia content presenting user interface. Most of the management and push of persona information occurs on the server 103030.

Figure 48:
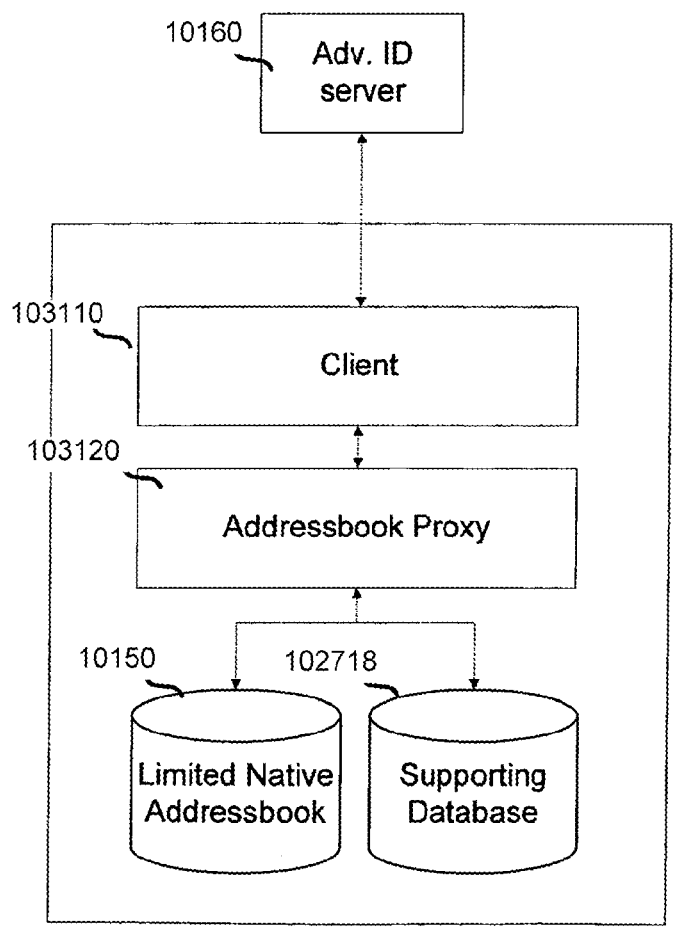
FIG. 48 is another alternative client configuration in accordance with the present invention.

Since most current clients do not include native robust address books and SyncML clients, FIG. 38 presents an alternative configuration allowing a client 103102 to communicate with an advanced ID server 10160. The server 10160 communicates with client 103102 via a shared communications protocol as shown in FIG. 48. Client 103102 includes a protocol engine 103110 being an address book proxy 103120 and utilizes both the limited native address book 10150 and supporting database 102718. An address book proxy 103120 (such as entity manager 102900 or some other form of proxy mechanism) manages communications and storage of information between the respective stores 102718 and 10150.

Figure 49:
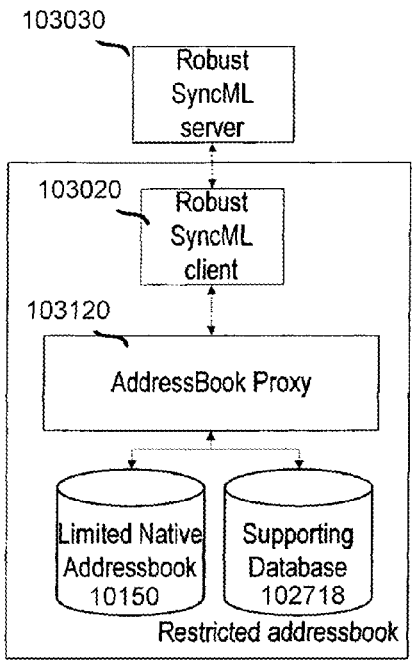
FIG. 49 is yet another alternative client configuration in accordance with the present invention.

Yet another alternative configuration is shown in FIG. 49. In FIG. 49, a robust SyncML server communicates with a robust SyncML client 103020, but utilizes an address book proxy 103120 to split information between the database 102718 and address book 10150.

Figure 50:
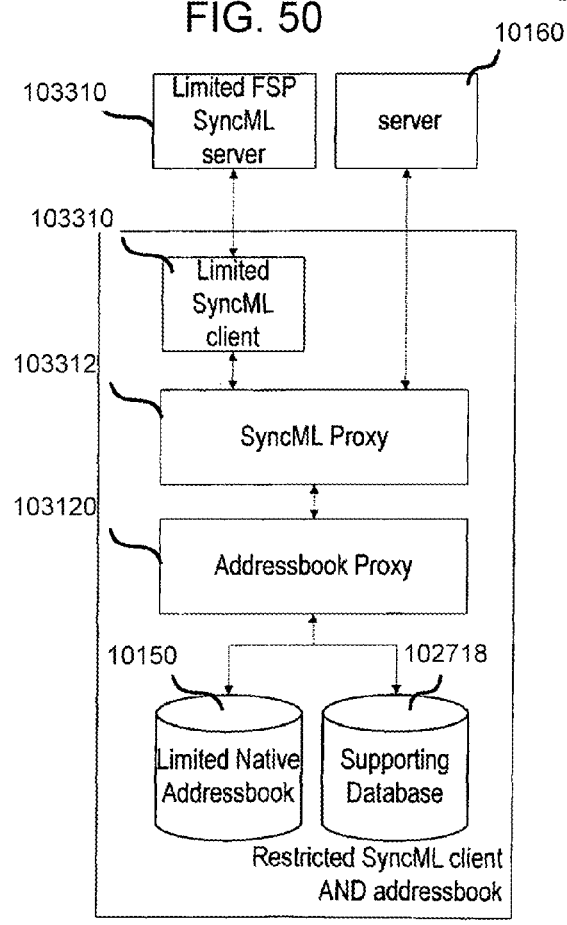
FIG. 50 is yet another alternative client configuration in accordance with the present invention.

In FIG. 50, a limited SyncML server provides support for some synchronization information required for the persona, but not all the necessary information required. Likewise the phone's SyncML client may only support limited synchronization or field support. For example, the server 10160 may support address and phone number synchronization but not downloading of movies and ringtones. In this embodiment, server 103310 cooperates with the systems server 10160 to communicate certain information via a limited SyncML client 103130, while other information is communicated directly to phone's proxy 103312. Multimedia information can be provided via the support applications 103310 and 103130, while more basic information is provided to proxy 103312. An address book proxy 103120 to split information between the database 102718 and address book 10150.

Figure 51:
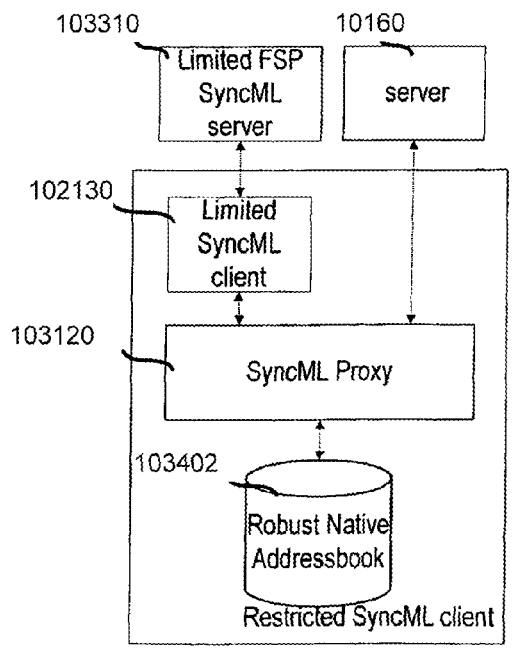
FIG. 51 is yet another alternative client configuration in accordance with the present invention.

In FIG. 51, the client is equivalent to FIG. 50 except that information is stored in a robust native address book 103402.

Figure 52:
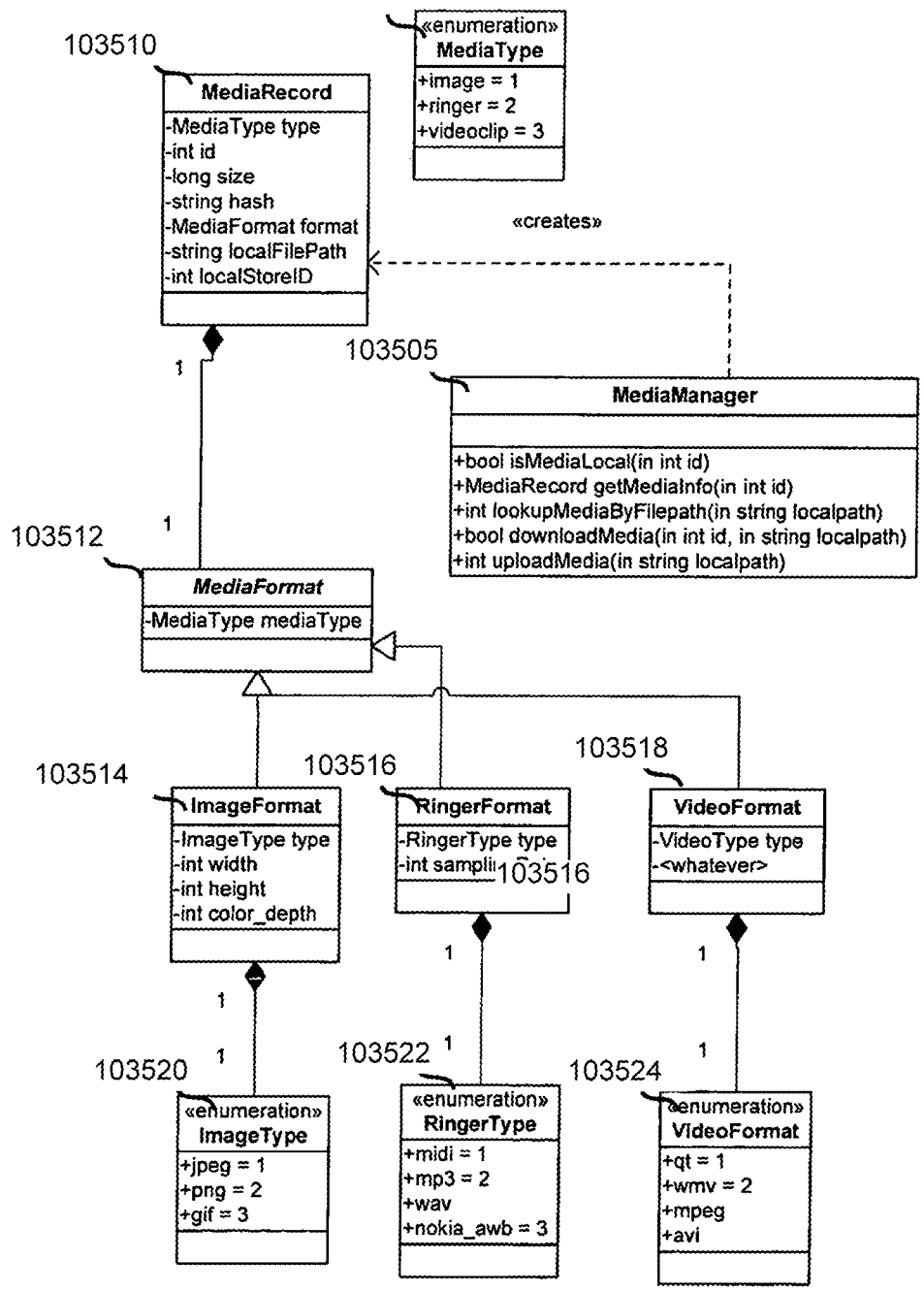
FIG. 52 is a structure illustrating the functions of the client side media manager in accordance with the present invention.

FIG. 52 illustrates a Media manager 103505 and the records associated with a piece of media information. The system supports digital rights media management. The MediaManger object provides an interface to the other client components which allows media uploading, media downloading, and retrieval of media information. Since each device has different capabilities, transcoding media objects from their original format is often required in order to support them on different devices. Transcoding refers to a process by which media in one format on one type of device or phone can be made available to other types of phones. For example, if a first user's phone creates pictures in JPG format, but a receiving user's phone only supports GIF, the system server can automatically convert the format of the image based on the server's knowledge of the receiving user's phone. This same process may be used to change the resolution of an image to fit properly on the target device's display, given its characteristics.

Transcoding can involve an actual conversion or may involve simply selecting an alternative version of the media it already knows about. For example, a value added service provider may supply ringtones in two or more formats, and selection of the appropriate format can be made and distributed to the receiving user. When requesting media requires the media object, the transcoding will be performed by the server; the transcoded media will be transmitted to the device automatically. Clients may query information related to the media they are about to download using a function supplied in the communications protocol. This function will return relevant information concerning the transcoded media available to the client. The server may also provide transcode-on-demand support for clients which need multiple formats of the same media (e.g., image) in different sizes (e.g., a thumbnail for the contact in the addressbook and a full screen picture).

FIG. 52 illustrates the digital rights media record format utilized in the client application and present invention. Media manager 103505 determines whether or not the information in any media utilized in the device, whether a jpeg, mp3 movie, or the like. This determines first determining whether the media is a locally implemented piece of media or media from a value added provider. The media manager maintains records of the media location, whether it is downloadable or up-loadable and the like.

The system supports digital rights management contained in the native applications, allowing value added providers to check any media uploaded or downloaded to or from the server or client device to determine whether the information contained therein is subject to digitalized management. The media record 103510 which contains a media record type (local or nor) and identifier, size, hash value, a formula identifier, and a location. The media format 103512 can be any of an image format 103514, a ringer format 103516, a video format 103518. The image format type includes jpegs, pngs and gifs, as indicated at 103520. The ringtone format can be a midi-type or an mp3 way or a special awp format. The video format can be an mpeg, wmp file, quicktime, or an avi. Additional formats for images, ringers, and videoclips may be easily added without requiring significant system modification.

The present invention also allows a user to wirelessly backup personal information stored on a cellular telephone using the wireless communication link, such as a wireless network, to which the phone can connect. The application results in a process which runs generally in the background of the user's phone application and therefore does not inhibit the user's use of the phone.

Figure 53:
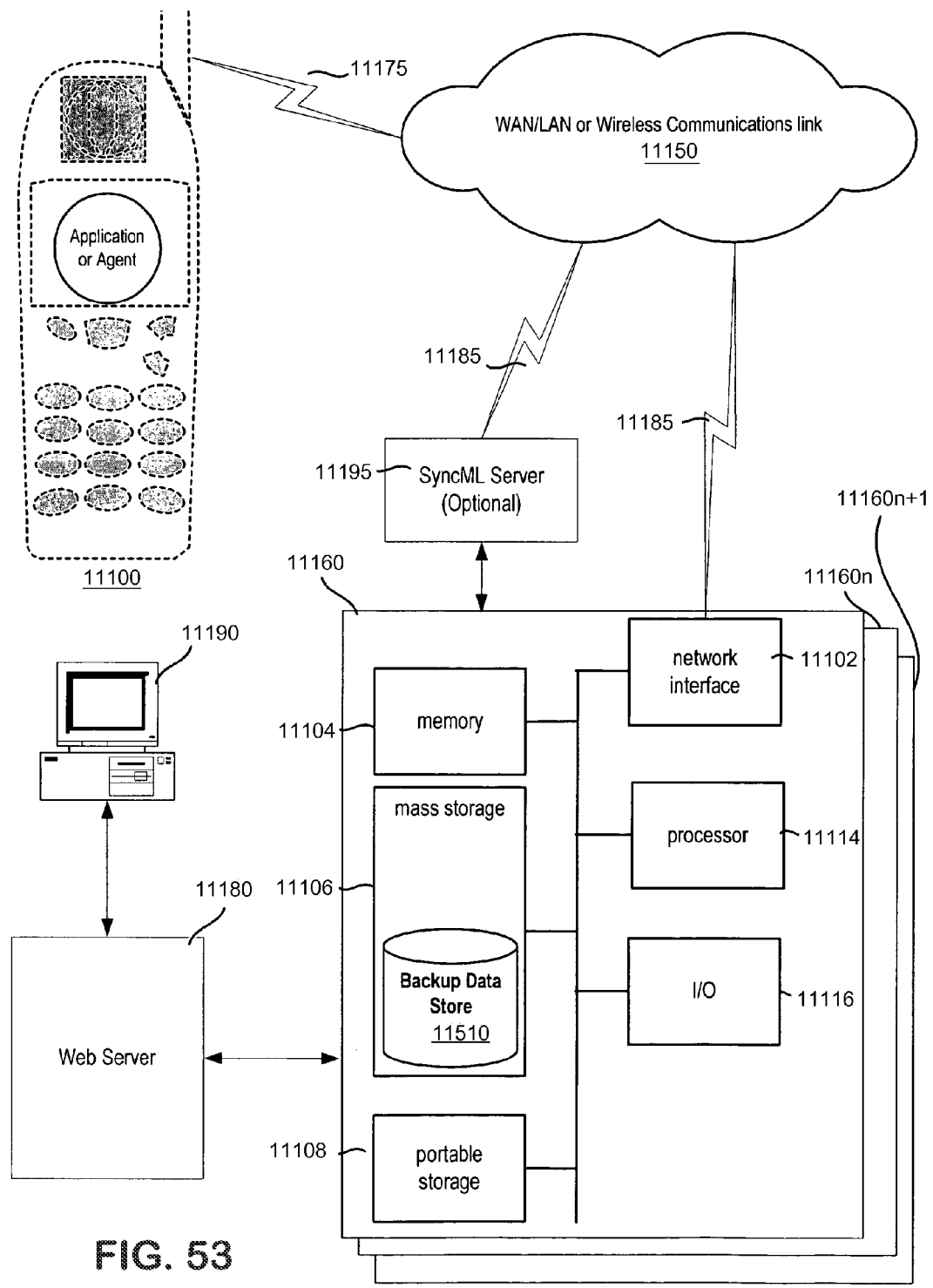
FIG. 53 is a block diagram illustrating the wireless telephone coupling to a backup server utilized in accordance with the present invention.

FIG. 53 illustrates a general overview of a system for implementing the present invention. As shown in FIG. 53, a wireless communication device, such as a phone 11100, is connected to a wireless communications link, such as a cellular network 11150, to transmit voice and data communications to other devices coupling to the wireless network. Data may be transmitted over the network in any number of known formats. A server 11160 is also provided which communicates via a wireless link 11185 with the telephone via wireless network 11150. Alternatively, server 11160 may communicate with phone 11100 via a SyncML server 11195. The backup system includes the agent 110, the backup store 11150 on server 11160, and methods implemented by the agent and server to perform the backup, restore and data integrity functions of the invention. Other components discussed herein may also be incorporated into the system in various embodiments.

Phone 11100 is provided with a backup application or agent 11110. Backup agent 11110 can be a SyncML communication client designed to interact with a SyncML server 195 in accordance with approved and proposed versions of the SyncML OMA DS specification, including proposed extensions, (available at http://www.openmobilealliance.org). Alternatively, agent 11110 can be an application designed to communicate with server 11160 using an existing SyncML client on the phone provided by the phone's manufacturer (as well as any custom extensions supported by such client), or an application specifically designed to communicate with server 11160 via another protocol, including a proprietary protocol. In one embodiment, the agent 11110 is a fully implemented SyncML client and server 11160 includes a SyncML server. In another embodiment, the application 11110 is a client application device sync agent such as that disclosed in U.S. Pat. No. 6,671,757. In yet another embodiment, the application 11110 is a client application responsive to control via a browser in the phone, with the application checking for changes to data on the phone and implements the processes described herein.

In general, a hardware structure suitable for implementing server 11160, webserver 11180 or SyncML server 11195 includes a processor 11114, memory 11104, nonvolatile storage device 11106, portable storage device 11110, network interface 11112 and I/O device(s) 11116. The choice of processor is not critical as long as a suitable processor with sufficient speed is chosen. Memory 11104 could be any conventional computer memory known in the art. Nonvolatile storage device 11106 could include a hard drive, CDROM, CDRW, flash memory card, or any other nonvolatile storage device. Portable storage 11108 could include a floppy disk drive or another portable storage device. The computing system may include one or more network interfaces 11112. An example of a network interface includes a network card connected to an Ethernet or other type of LAN. I/O device(s) 11114 can include one or more of the following: keyboard, mouse, monitor, display, printer, modem, etc. Software used to perform the methods of the present invention are likely to be stored in nonvolatile storage 11106, portable storage media 11110 and/or in memory 11104. The computing system also includes a database 108, which can be stored in nonvolatile storage 11106. In alternative embodiments, database 108 is stored in memory 11104, portable storage 11110 or another storage device that is part of the system of FIG. 53 or is in communication with the system of FIG. 53. Other alternative architectures can also be used that are different from that depicted in FIG. 53. Various embodiments, versions and modifications of systems of FIG. 53 can be used to implement a computing device that performs all or part of the present invention. Examples of suitable computing devices include a personal computer, computer workstation, mainframe computer, handheld computer, personal digital assistant, pager, cellular telephone, smart appliance or multiple computers, a storage area network, a server farm, or any other suitable computing device. There may be any number of servers 11160*n*, n+1 managed by a system administrator providing a back up service in accordance with the present invention.

Also provided on server 11160 is a backup data store 11510. The backup data store is provided in the non-volatile memory space of server 11160. While only one backup data store computer is shown, it should be recognized that the store may be replicated to or stored over a plurality of computers (11160*n*, 11160*n*+1) to ensure that the data thereon is protected from accidental loss. It should be understood that the representation of the SyncML server 11195 and web sever 11180 need not require that such servers be provided on different physical hardware than the backup server 11160.

In accordance with the invention, application agent 11110 communicates personal information and changes made to the personal information stored in the data store of the telephone 11100 to server 11160 via the wireless network. Communication of user data from the device may take several forms. Where the client is a SyncML client in communication with the server 11160, communication may take place using the standards set forth in the SyncML specification. Changes are transmitted on a record-by-record basis or field-by-field basis. Alternatively, communication may occur via another protocol. In an alternative embodiment, agent 11110 is a self-supporting application designed to run as a JAVA or BREW agent, or any other device or operating system specific agent (such as an agent operable on the Symbian Operating system). This agent can either include its own SyncML client, or interact with an existing SyncML client on the telephone. Changes can occur at field level or byte level. Alternative embodiments can communicate via alternative protocols via the wireless communications link to store information on the backup data base 11510.

The server 11160 stores user data in the backup store in a manner which associates the data with the user of the phone. In one embodiment the data is stored in bulk—that is all records and information for the user are stored in simple text form, or a copy of the entire database from the phone is stored on the server. In this embodiment, the server may store any number of copies of the data on a date-identified basis. Alternatively, the server 11160 translates this information into change logs, in one embodiment, in accordance with the teachings of U.S. Pat. No. 6,671,757. This information is stored in backup data store 11510 on server 11160. This information is stored in the data store using a unique identifier (UID) associating the data with the individual user. The identifier may be any randomly selected identifier, so long as the user is uniquely identified, and the data is associated with the user. In a further aspect, this user UID may be a universally unique identifier (UUID), created in a manner described in the aforementioned U.S. Pat. No. 6,671,757 or other manners to create a single ID for a given user.

Data store 11150 can be any form of data storage for the user data. In one embodiment, the data store is a simple copy of the information stored on the device 11100. In another embodiment, the data store is a database, such as an object database or a relational database. In yet another embodiment, the data store is simply a storage container for change logs created in accordance with U.S. Pat. No. 6,671,757.

A web server 11180 allowing a user on a computer or other device 11190 having a web browser may optionally be provided to allow a user to configure aspects of the system of the invention. Server 180 may have a hardware configuration similar to computer 11160 and may comprise one or more physical computers. Additionally, web server 11180 may be integrated with server 11160.

In general, a first embodiment of the system described below presents a system whereby certain aspects of the backup system of the present invention are configured via a phone interface. In each case where a phone interface is used, the system can alternatively be configured by a user via a web interface provided by the web server 11180 via the user device 11190.

Figure 54:
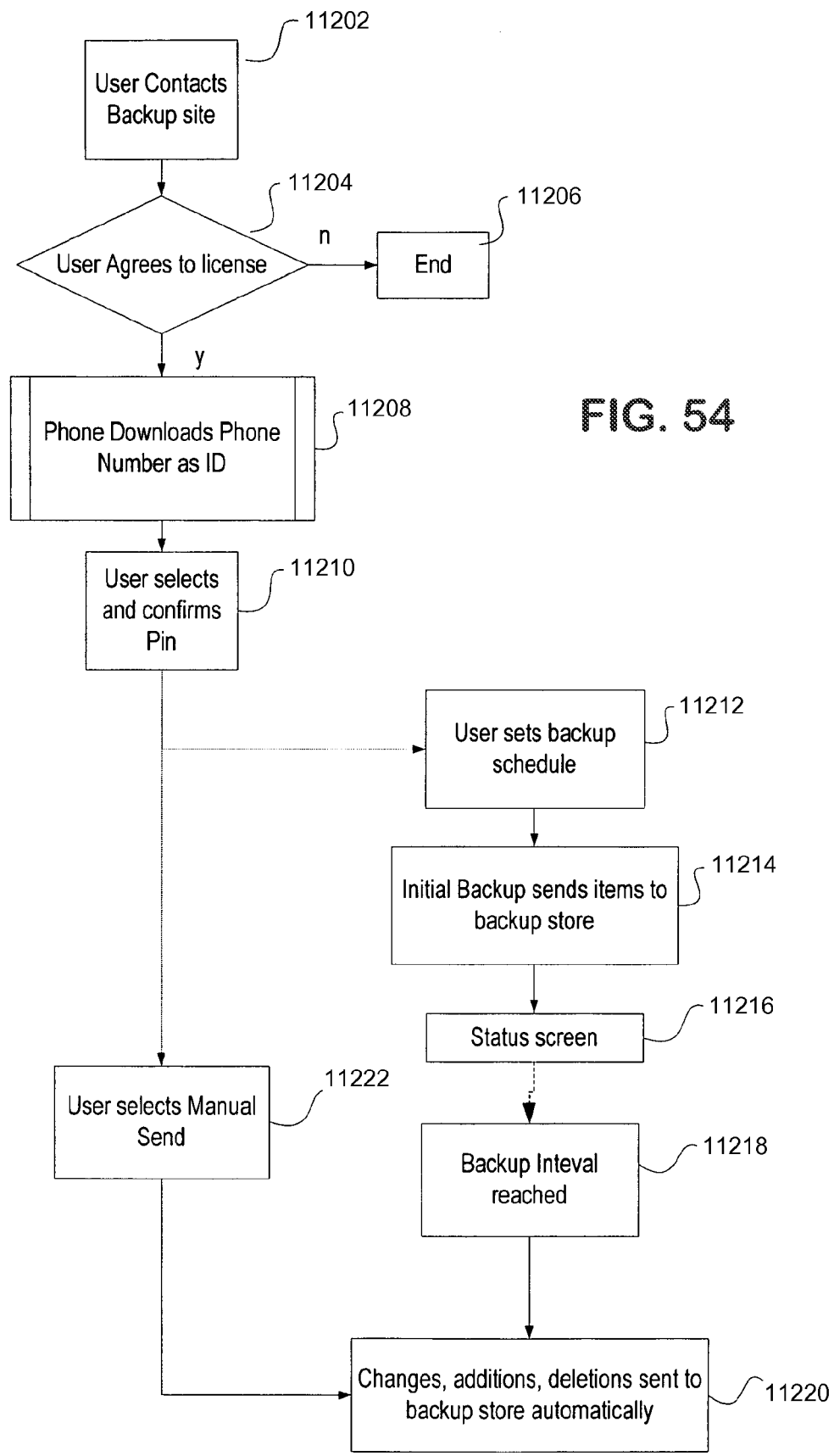
FIG. 54 is a flow chart illustrating how a user might sign up for and initially backup data using the system and the present invention.

FIG. 54 illustrates how a user interacting with the system on the present invention for the first time would install the application and sign up for the backup service provided by a system administrator using the backup server 11160 and the user's phone 11100. In the embodiment of FIG. 54, a user signs up for a backup service provided by a system administrator using the user's telephone and the application 11110. An alternative sign-up process may be implemented by having the user initiate service by going to a World Wide Web site administered by the system administrator and interacting with or being provided by the system server 11160. Still another method for sign up would be to allow the user to sign up via a specially formatted Wireless Application Protocol site which can be accessed by a WAP browser on the phone 11100. (Another approach, discussed below with respect to FIGS. 62-64 involves the automatic creation of a user account using a phone unique identifier.)

The system administrator controls and maintains the server 11160, and provides the agent 11110 for the phone. Alternatively, the agent may be provided by a phone manufacturer and designed to communicate with server 11160 (directly or thought SyncML server 11195). The agent may be pre-loaded on the phone prior to distribution by the manufacturer or wireless service carrier, or provided for download by the administrator via the wireless network. In the latter embodiment, a user initially downloads the application from a system administrator via the communication link 11185. In general, wireless carriers now provide many forms of downloadable applications for intelligent telephones having the ability to run the applications in a BREW or JAVA. BREW (Binary Runtime Environment for Wireless) is an open source application development platform for wireless devices equipped for code division multiple access (CDMA) technology. Likewise, JAVA or J2ME (Java 2 Micro Edition) are similar platforms from Sun Microsystems.

Once the application is installed, at step 11202 in FIG. 54, the user contacts the backup site 11160 using the phone 11100 and application 11110. The manner in which this might be presented to the user is illustrated in FIGS. 55*a* and 55*b*. A welcome screen is shown in FIG. 55*a* prompting the user select button 11302 on wireless phone 11300 to move to the "next" screen shown in FIG. 55*b*.

As will be understood by those of average skill in the art, a cellular telephone 11300 shown in FIGS. 55*a* through 55*q* includes "soft" buttons 11302 and 11304. The menu items appearing at the lower portion of the screen indicated by reference numerals 11306 and 11308 are the commands which change relative to the display and are controlled by the application 11110 (and other types) running on the cellular telephone 11300. In FIG. 55*a*, a "next" button and a "cancel" button are shown. Buttons 11302 and 11304 control the "next" and "cancel" functions, respectively.

Once the user agrees to connect to the site, as shown in FIG. 55*b*, the user is presented with a screen illustrating the phone is connecting to the wireless network. The user's mobile number as shown at reference numeral 11312 is displayed.

Returning to FIG. 54, at step 11204, the user may be prompted to agree to a software license and license for using the service. This is illustrated in FIG. 55*c*. If the user does not agree at step 11206, the process ends. If the user agrees, then at step 11208, the phone downloads the user number as an ID. At step 11210, the user selects and confirms a PIN. This is illustrated in FIGS. 55*d* through 55*f*. In FIG. 55*d*, the user enters a registration PIN into the phone and selects the next command by depressing soft button 11302. In FIG. 55*e*, the phone displays the enter PIN and prompts the user to save the pin code. The user moves on to the next screen by depressing soft button 11302. This screen in shown in FIG. 55*f* prompting the user to select an option for the service to return the PIN to the phone should the user forget the PIN.

Returning to FIG. 54, following completion of step 11210 in FIG. 54, the user is prompted to set a backup schedule at step 11212. This setup process is shown in FIGS. 55*g* through 55*j*. In FIG. 55*g*, the user is prompted to set the schedule by depressing the soft button 11302. In FIG. 55*h*, four options are displayed for the user to select a regularly recurring schedule. These options are "every day", "week days", "weekly", or "unscheduled". When the user selects the next button in FIG. 55*h*, the daily backup screen is shown in FIG. 55*i*. The daily backup allows the user to set a specific time for the regularly scheduled backups. If the user selects a weekday schedule, this time can also occur at the same interval every day. The weekly schedules (selection 3 in FIG. 55) function in a similar manner. The "unscheduled" backup option allows the user to manually backup information on the phone by manually initiating the application and sending changes to the backup store as illustrated at step 11222 in FIG. 54. In yet another embodiment, the scheduling can be to provide backup data to the server every time the user changes information on the phone.

In yet another embodiment, scheduling is at least partially controlled by the server 11160. In this embodiment, when the user attempts to set a scheduling time, the server 11160 checks a separately kept record of the backup transmission schedules of other users to ensure that load balancing of the transmissions of various users occurs on the server. If, for example, a user desires to send backup data every day at 8 AM, and a number of users desire the same time, the system can instruct the application 11110 to alter its schedule in a manner which does not significantly impact the schedule for the user. This change can ensure that the server 11160 has sufficient communications bandwidth and processing power to handle concurrent requests which may be occurring at or near the same scheduling time as the user's selected time.

In another embodiment, backup scheduling is controlled entirely by the server. In this aspect, the user is not provided with an interval selection, and the server can schedule interval backups (at regular, irregular or arbitrary times). In yet another embodiment, backup data is transmitted at some point after each change to the phone's data store.

Again returning to FIG. 54, once the backup scheduled has been set at step 11212 in FIG. 54, the initial backup information must be stored on the server 11160. This occurs at step 11214 and is illustrated in FIGS. 55*j* through 553*m*. In FIG. 55*j*, once the setup is complete, the user is prompted to press the "next" soft button 11302 to begin the initial backup process. Upon depressing the "next" soft button 11302 as shown in FIG. 55*k*, the phone connects to the backup server 11160, and at FIG. 55*l* the information is transmitted to the backup server. The items field 11320 shown in the screen in FIG. 55*l* keeps a running count of the items being sent to backup server 11160. When the backup is complete, FIG. 55*m* shows the status screen displayed by the phone upon completion of the backup process.

At this point, at the lower portion of the screen, soft buttons 11302 and 11304 present the user with a "backup now" option, allowing the user to manually send information to the phone as indicated at step 11222 in FIG. 54, and a "options" button. The "options" button allows the user to select various administrative functions in accordance with the backup process. For example, the options might allow the user to change the schedule of the backup process, due to the user's mobile number account which is identified to the backup system 11160, change the user PIN, access the help feature, or access information about the agent 11110.

Returning to FIG. 54, once the status screen is shown in step 11216, the user may continue to use this telephone in the manner that the user is normally accustomed to. At a later point and time as indicated by the dashed interval between steps 11216 and 11218, the backup interval set by the user's schedule will be reached. At this point, changes and additions and deletions will be sent to the backup store. This is illustrated in FIGS. 55*n* through 55*q*. In FIG. 55*n*, the application may display a status screen to the user, in FIG. 55*o* display that it is connecting to the backup server 11160, in FIG. 55*p* display the items being backed up, and in FIG. 55*q* display the status of the backup as completed. It should be recognized that the interval 11218 may in fact comprise a manually initiated event as shown at step 11222.

It should be further recognized that steps 11218 and 11220 may occur in the background, and no indication may be provided to the user. That is, once the backup interval is reached, the phone may simply download additions, deletions or changes to the user and keep a record of when it performed its last backup so the user can check to ensure that the backup process is running on a regular basis. The matter of interaction between the application and the user (e.g. how much information the application provides to the user about its activities) can be selected by the user. In an alternative embodiment, an indicator such as a "pop-up" information message may be provided to the user at competition of the backup. Users can select whether and how often to receive information messages.

Figure 56:
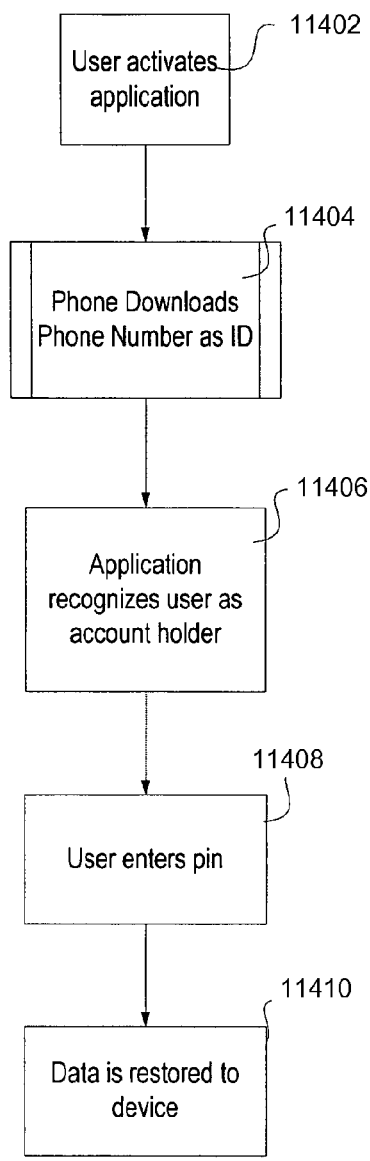
FIG. 56 is a flow chart illustration a restore process utilized in accordance with the present invention.

FIG. 56 shows a flow chart overview of the restore process utilized in accordance with this present invention. FIGS. 57*a* through 57*e* illustrate the steps which a user might view at a user interface during the restore process. At step 11402, the user activates the application. This may occur, for example, when a user obtains a new telephone or the memory of the user's current telephone is wiped out for some unknown reason. Once the user activates the application, a status screen as shown in FIG. 57*a* is displayed.

Returning to FIG. 56, at step 11404, the device agent transmits the user's unique identifier to the server. In step 11406, the identifier is indicated as being the user's phone number and this identifies the user to the backup system. Alternatively, the method may prompt the user to indicate whether the user has previously set up an account with the system administrator and request the user's original identifier and PIN. As this is an initial use of the application on a phone containing no user data, in one embodiment, the server can recognize that no data is present in the phone and prompt the user to do a restore, the application will promptly recognize the user as an account holder at step 11406. The application will then prompt the user to enter a PIN at step 11420. This is illustrated in FIG. 57*c*.

Once the user enters the PIN at step 11408, data will be restored to the device in step 11410. This is illustrated in FIG. 57*d* which indicates to the user that the application is "restoring" the information to the phone. FIG. 57*e* shows a status screen displaying to the user that the information has in fact been returned to the user's phone.

Alternative embodiments of the restore process may be utilized as well. In one alternative, the restore process may include providing information to a phone which has had information entered on it more recently than the backup store's state of the user's data. Suppose, for example, a user may has an account created with information in the backup store which creates a backup state, for example "state 1", at a given time. If the user needs to perform a restore—such as if the user looses a phone and purchases a new one—the restore process could simply provide the state 1 information to the device. If, however, the user manually enters information on to the device thereby creating a discordance between the state 1 information in the backup store and the more recently entered phone data.

In this discordance case, in one alternative, the state 1 information can be provided to the phone while ignoring any new information entered by the user on the phone (thereby making the backup store the primary information container and ignoring changes on the phone). In a second alternative, the agent can recognize that the phone is not equivalent to the phone used by the user to create the state 1 information (using for example a unique identifier for the phone, such as that discussed below, or some other means of identifying the new phone state—such as a user selection). Once the phone's state is established, the user's personal information stored in the phone is sent to the backup store, a process running on the server can resolve discrepancies or duplicates, and then write the new state of the user's data to the phone. In another alternative, the information on both the device and the backup store can be merged. In this latter alternative, a possibility of duplicate entries exists, and a mechanism for dealing with such duplicate entries (such as identifying them to the user and requesting which of the duplicates to keep) may be provided. Selection between such options may be given to the user during the setup process or under the options menu in the application or during restore, or on the web.

Additionally, the system can provide additional options allowing the user to roll back the user's personal data to a particular date and time. This functionality can be implemented in a number of ways, but is particularly suited to use in the system of the present invention as implemented using the backup technology disclosed in U.S. patent application Ser. Nos. 09/641,028, 09/642,615 and U.S. Pat. No. 6,671, 757. The numerous advantages of the data backup technology in the U.S. Pat. No. 6,671,757 are discussed therein. However, it will be recognized that using such technology, one can re-create user data back to a particular date. Using such technology, the system starts with a first change-log or data package identified with a user and sequentially performs the actions defined therein on the data stored therein, searching for the change or date in question. When such change is reached, the item is "rolled back." In this embodiment, a bookkeeping log may be kept in order to remove future changes for this object from later change logs associated with the user, or one could note the state of the record in its rolled-back state and add a new "modify" change-log to the datastore using the pre-rollback "current version" as the base. Alternatively, this feature may also be implemented using any number of other technologies, such a technology which stores all changes associated with the user, and during restore function only returns the most recent changes or recent setup data to the user. Alternatively, the data store may store a complete set of data for each backup the user makes, though this often provides a relatively data intensive scheme.

Figure 58:
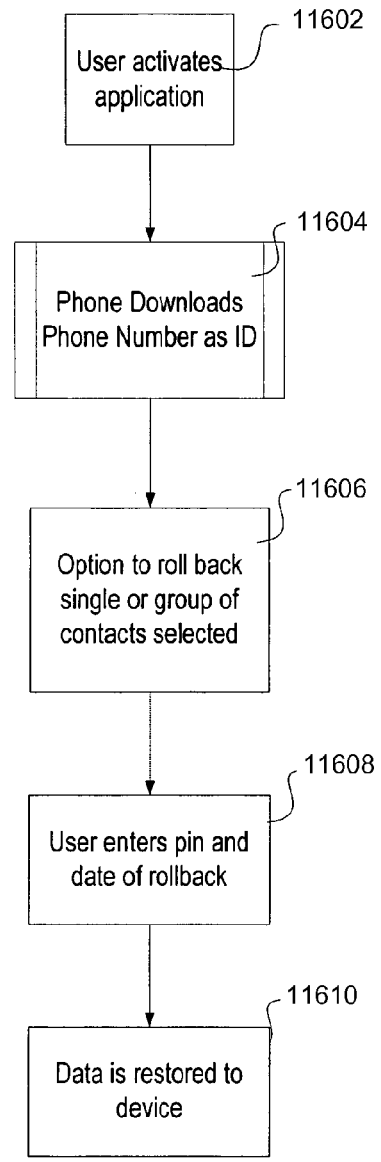
FIG. 58 is a flow chart illustrating a rollback feature utilized in accordance with the present invention.

This rollback option as illustrated in FIG. 58, once the use activates the application in step 11602, the phone sends the unique identifier of the user (in one embodiment, the phone number) as the user identifier to the backup store 11510 at step 11660. At step 11608, the application presents the user with an option to rollback a single or a group of contacts for a particular date. As step 11608, once the user enters the PIN and the date of the rollback, and selects a single or group of contacts to be rolled back, the application restores the data from the storage server at step 11610. Alternatively, the state of the data just prior to the performance of the rollback can itself be stored prior to the rollback function being performed. In a further embodiment, the agent can provide a "remember PIN" option, and store the PIN locally so the user does not need to re-enter the pin for each rollback or other identification function.

In alternative embodiments of the invention, a web-interface may allow access to the backup store and the user may implement the rollback function via the web interface. For example, the interface can display a list of dates of each sync and the number of records or fields synced, and allow the user to roll back an individual or collective dated group of contacts to their state on a particular date. This interface can also be implemented via a WAP specific interface for the phone 11100.

FIG. 59 and FIG. 60 show yet another embodiment of the present invention when a user can optionally modify the data in the backup store using a separate interface. In one embodiment, the interface is a World Wide Web-based personal information manager which uses as its data source the backup store information or a mirror of such information which synchronizes to the backup store to modify the data in the backup store.

In FIG. 59, the user, at step 11702 accesses a web-based interface to the backup information data in the backup database. At step 11704, the user modifies records which are initially generated from the user's wireless phone 11100 using the web interface and the changes are stored in the backup database. At some point in the future, as indicated by the dashed line between steps 11704 and 11706, the user (or scheduler, in automated or controlled scheduling embodiments) activates the application on the phone 11100 and at step 11708, the phone transmits the user identifier such as the phone number to the system. Once the system server 11160 recognizes that the particular user is a member of the system, the option to upload new and changed contacts which have been changed by the web access at step 11702 is presented to the user. After the user enters a personal information number at step 11702, and confirms the upload process, data is installed on the device at step 11712. Alternatively, the upload need not be confirmed, may be prompt-less, or optionally prompt the user. In another embodiment, changes to the data store 11150 can be made by using any of a number of commercially available products which allow data access to a users software personal information manager application, such as that described in U.S. Pat. No. 6,671,757. Such products extract information from personal information managers such as Microsoft Outlook and transfer it to alternative formats which can be read by other applications.

FIG. 60 shows an alternative embodiment of the process in FIG. 59. Steps 11702 and 11704 occur as in the process illustrated in FIG. 59. In this embodiment, the application is active in the background on the phone and does not present the user with an option until the phone receives an SMS message at step 11808 indicating to the application that changes to the data on the server have occurred. SMS (Short Message Service) is a service for sending messages of up to 160 characters (224 characters if using a 5-bit mode) to mobile phones. Following step 11808, two optional processes may occur. At step 11810, the user may be presented with an option to retrieve new and changed contacts from the server 11160, and the information may be sent upon entry of the user's PIN at step 11812 and confirmation of the upload process. When this occurs, data is installed in the device at step 11814. Alternatively, as shown by line at 11816, once the phone receives the SMS message indicating that changes to the data have occurred on the server, the agent will intercept the SMS message and retrieve changes made to the data store via the web interface automatically; the data may be installed on the device without any user intervention. Whether the application takes the manual route indicated by process line 11818 or the automatic route indicated by process line 11816 may be an option which user selects in a setup process which was not heretofore described in the setup of the application, or which is configured by the user administrator.

In a still further embodiment, the phone agent 11100 may not wait for an SMS message but may simply periodically poll the server to determine whether changes have occurred to the backup store.

In yet another embodiment, the polling may determine whether changes have occurred on the phone relative to the backup data store, and transmit those changes to the data store. This embodiment is shown in FIG. 61. As shown therein, if a user modifies a record on the phone at step 11902 and subsequently modifies a record on the backup store using the web interface at step 11904, both before any changes on either the store or the phone are exchanged with the respective other device, the two states (state 1 and state 2) will be out of sync. At some time after the modifications at steps 11902 and 11904 as indicated by the dashed line between step 11902, 11904 and 11908, with the application active in the background of the phone, some indication of the changes will occur. This is represented at step 11908 and may occur when the phone receives an SMS message indicating changes have occurred, the polling of the server discussed above occurs, or the timed backup interval is reached. At this step 11808, changes between the phone and the backup store are exchanged. As in FIG. 60, the data may be exchanged with user intervention (steps 11910 and 11912) or without (11914). In addition, the conflict state discussed above with respect to the discordance case may occur, and the resolutions discussed above may likewise be implemented in this embodiment.

In a still further embodiment, the SMS message may instruct the phone to download any changes made to the phone since it's last backup transmission to the backup store.

A still further embodiment of the invention provides automation of the sign-up, account access and backup processes based on a unique phone identifier or phone UID which allows the system to determine more detailed functional information about the phone. In this embodiment, a phone UID may be associated with a user UID. In a further embodiment, the phone UID may be a universally unique phone ID (or phone UUID). In one embodiment, the phone UUID may comprise an IMEI or ESN. Each GSM phone contains an IMEI—International Mobile Equipment Identity number. This is a unique identifier assigned to all GSM devices. The IMEI is like a serial number and is used by the network to identify the handset (in conjunction with the SIM ID). The SIM ID is provided on a Subscriber Identity Module which is a small, stamp-size "smart card" used in a GSM phone. The SIM card contains a microchip that stores data that identifies the caller to the network service provider. The data is also used to encrypt voice and data transmissions, making it nearly impossible to listen in on calls. The SIM can also store phone book information—phone numbers and associated names.

CDMA phones also have an individual identification number, the ESN. This number can be found on the back of a handset under the battery and is usually eight digits long, combining letters and numbers.

The GSM Association (GSMA) has the role of the Global Decimal Administrator allocating International Mobile Equipment Identity Numbers (IMEI) to manufacturers for use in GSM. IMEI numbers are assigned to individual phones by the manufacturer and can identify the type, nature and characteristics of the phone to which they are assigned.

A method for using a phone UID associated with the user's data is shown at FIG. 62. In some point prior to the phones being distributed to a user at step 111002, a phone UID is assigned to a user's phone. The phone UID may comprise an IMEI or other ID such as an ESN number as discussed above. Subsequently, at step 111004, the user acquires the phone and depresses a "backup" option on the phone. The backup option may be provided in an application agent as discussed above, or in an application specifically tailored for use on the phone, also discussed above. Initiating the backup function on the phone in step 111004 will begin a backup process in accordance with any of the aforementioned embodiments, but will allow a backup account to be automatically created using a phone UID and a user UID. At step 11806, using the phone UID, the system can determine the characterization (the type, features, and functionality) of the phone based on the phone UID. This is particularly true in cases of GSM phones using an IMEI number. It will be further recognized that in step 111004, the user UID can be the SIM ID which is provided by the SIM in a GSM phone. Alternatively, the user UID may be the phone number or any other unique identifier for the user.

At step 11808, once both the phone UID and the user UID are known, a backup account can be automatically set up by the system without the need to know additional information from the user. Alternatively, additional authentication information may be required by the system, such as entry of a PIN.

At step 11808, each time the user stores backup information to the backup data store, the phone UID specifying the phone from which the information is obtained can be recorded. Hence, the backup data store will know when the user uses an alternative phone having a different phone UID to store information.

At step 11810, which may be separated in time from step 11808 as indicated by the dash line between steps 11808 and 11810, the user initiates a backup data transmission using a new phone UID. This may occur, for example, when the user moves a SIM to a new phone in the GSM technology, or otherwise authenticates using his user UID any authentication required by the system. The authentication step 11812 may be optional in cases where authentication is provided by the SIM ID or may be optionally disabled by the user.

Once the system's detects, at step 11810, that the user has provided a new phone UID, at step 11814, the system records the new phone UID at step 11816 and the system can automatically perform the system data restore transmitting changes to the new phone. In the situation shown in steps 11810 through 11816, because the user has switched the phone UID, it will be known to the system that the most recent backup state came from a different phone and the new phone UID will have a data state which is not current.

Again, as in the discordance data state case discussed above, the user may enter data onto the new phone prior to performing initiation of the backup at step 11810. In this case, the performance or data handling discussed above with respect to the discordance case can again be applied.

Figure 63:
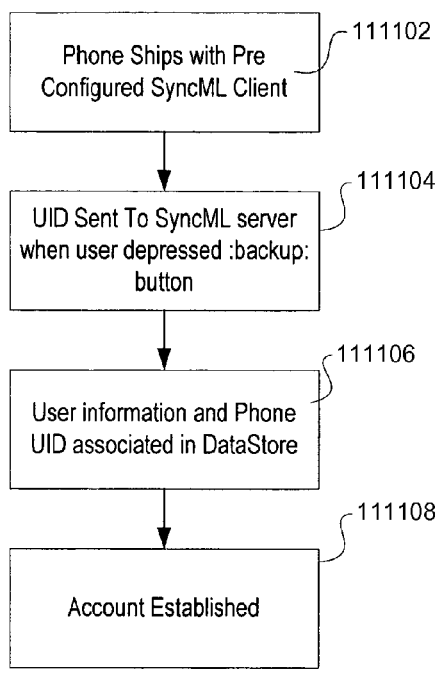
FIG. 63 illustrates a method for using a pre-provisioned manufacturer provided SyncML client on a phone to communicate with the backup server.
Figure 64:
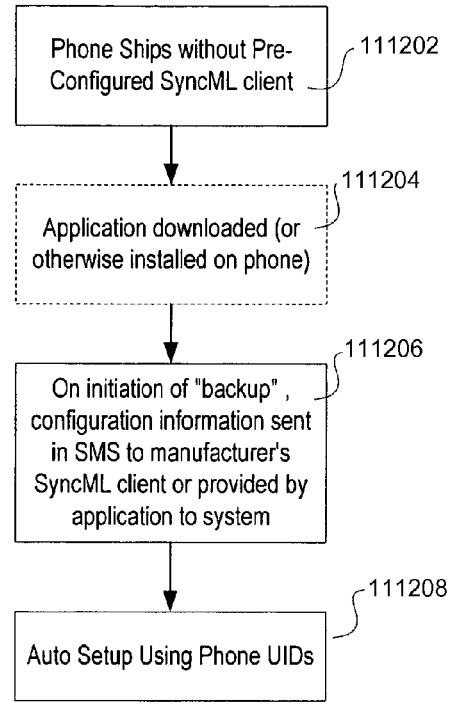
FIG. 64 illustrates a method for provisioning a manufacturer provided SyncML client on a phone to communicate with the backup server.

FIGS. 63 and 64 show two alternatives to the manner in which step 111004 is performed. In accordance with the present invention, any communication between the phone and the serve 11160 holding the backup store may occur though any number of protocols. In one embodiment, SyncML is used and in such embodiment, the agent 11110 may have an integrated SyncML client or the manufacturer's SyncML client normally provided in the phone may be used. FIGS. 63 and 64 show methods for using the manufacturer's SyncML client.

In FIG. 63, at step 111004, the phone is assumed to have shipped with a preconfigured SyncML client. By preconfigure, the SyncML client on the phone is shipped such that by depressing the backup (or sync) option in the agent, the phones' manufacturers sync agent has the identification information to access the SyncML server 11495 shown in FIG. 53. At step 111102, where the phone ships with a preconfigured SyncML client, the phone UID and user UID are sent to the SyncML server when the user depresses the backup button on the phone. At step 111106, the user information and phone UID are associated in the backup data store, and an account is established at step 111108.

At FIG. 64, the phone ships without a preconfigured SyncML client at step 111202. This is at 111204, optionally, the agent may need to be downloaded and installed on the phone at step 111204. At step 111206, upon initiation of the backup option in the phone application, configuration information can be sent via an SMS message to the phone manufacturer's SyncML client providing configuration provisioning information to the SyncML client. This allows the SyncML client on the phone to address the SyncML server 11195 in FIG. 53. Next, the account establishment process at step 111208 begins using the phone UID and user UID.

In the embodiment discussed with respects to FIGS. 62 through 64, user experience can be relatively unobtrusive. For example, the user need only press a "backup" soft button on the phone to have the account establish information transmitted to the backup data store. Any loss or change in the SIM to a different phone will result in the restore process being performed without any additional user intervention.

Additionally, the administrator of the backup data store can make determinations about how much data to provide to the phone. For example, if the phone is identified based upon the phone UID is known to be a feature rich device, the administrator can backup all settings which are available on the phones such as the calendar, task, and phone book. If, upon switching phone UID's, the user moves to a less feature rich phone, the provider can determine that, for example, the new phone has only an address book, and provide only the address book data in the restore function. The user need not provide any configuration information to the administrator during this process.

The foregoing detailed description of the invention has been presented for purposes of illustration and description. It is not intended to be exhaustive or to limit the invention to the precise form disclosed. Many modifications and variations are possible in light of the above teaching. For example, tasks performed by the agent on the phone may be performed by the server as the result of a call to a code on the server instructing the server to perform the method and return data to the server. In addition, where authentication is required by the system, the user may be provided with the option to store the authenticating information in the phone or agent and not manually enter the authentication each time required. Still further, authentication can be transmitted by means of exchanged SMS messages. The functions described herein may be assigned to the server or a phone agent or application based on the processing power available on the phone. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The many objects and advantages of the present invention will be readily apparent to one of average skill in the art. All such objects and advantages are intended to be within the scope of the invention as defined by the written description and drawings presented herein.

The invention claimed is:

1. A method comprising:
receiving, by a service system, mobile device information of a mobile device, wherein the mobile device automatically uploads the mobile device information to the service system upon a modification of the mobile device information on the mobile device; and
providing, by the service system, the mobile device information to a computing device, a user of the mobile device being associated with the computing device, to facilitate the user in viewing, interacting, or viewing and interacting with the mobile device information via the computing device, wherein the mobile device, the service system, and the computing device are separate and distinct from each other.

2. The method of claim 1, wherein the receiving comprises receiving the mobile device information from the mobile device.

3. The method of claim 1, wherein the mobile device information includes at least one of emails, messages, a call history, photos, music, videos, a calendar, and mobile device settings.

4. The method of claim 1, further comprising requiring, by the service system, authentication of the user before performing said providing.

5. The method of claim 1, further comprising receiving from the computing device, by the service system, an indication of one or more user interactions with the mobile device information.

6. The method of claim 5, further comprising, in response, performing, by the service system, an action on behalf of the mobile device.

7. The method of claim 6, wherein the action is one or more of initiating a Voice over IP (VoIP) call, sending an email, posting a photo or video for sharing, or sending a text message, on behalf of the mobile device.

8. The method of claim 5, further comprising, in response, updating, by the service system, the mobile device information or directing, by the service system, the mobile device to perform an action.

9. The method of claim 8, wherein the action is one or more of initiating a VoIP call, sending an email, posting a photo or video for sharing, sending a text message, or changing a mobile device setting.

10. The method of claim 1, further comprising providing, by the service system, a mobile device client to the mobile device to facilitate the mobile device in providing the mobile device information to the service system.

11. A service system comprising:
one or more processors; and
a service to be operated by the one or more processors to provide, to a computing device, mobile device information of a mobile device, wherein the user of the mobile device is associated with the computing device, wherein the mobile device information is automatically uploaded to the service system in response to a modification to the mobile device information on the mobile device and wherein the mobile device, the service system, and the computing device are separate and distinct from each other, receive, from the computing device, an indication of one or more user interactions with the mobile device information, and in response, update the mobile device information, perform a first action on behalf of the mobile device, or direct the mobile device to perform a second action.

12. The service system of claim 11, wherein the service is further to be operated to receive the mobile device information from the mobile device.

13. The service system of claim 11, wherein the mobile device information includes at least one of emails, messages, a call history, photos, music, videos, a calendar, and mobile device settings.

14. The service system of claim 11, wherein the service is further to be operated to require authentication of the user before performing said provide.

15. The service system of claim 11, wherein the service is further to be operated to notify the mobile device of the updated mobile device information or the performed action.

16. The service system of claim 11, wherein the first action is one or more of initiating a Voice over IP (VoIP) call, sending an email, posting a photo or video for sharing, or sending a text message, on behalf of the mobile device.

17. The service system of claim 11, wherein the second action is one or more of initiating a Voice over IP (VoIP) call, sending an email, posting a photo or video for sharing, sending a text message, or changing a mobile device setting.

18. The service system of claim 11, wherein the service is further to provide a mobile device client to the mobile device to facilitate the mobile device in providing the mobile device information to the service system.

19. The service system of claim 11, wherein the mobile device information does not include user initiated commands.

20. A method comprising:
receiving, by a computing device, from a service system, mobile device information wherein the mobile device information is automatically uploaded to the service system in response to a modification of the mobile device information on the mobile device, wherein a user of the mobile device is associated with the computing device, and wherein the mobile device, the service system, and the computing device are separate and distinct from each other;

facilitating, by the computing device, the user in viewing, interacting, or viewing and interacting with the mobile device information;

receiving, by the computing device, one or more user interactions with the mobile device information; and in response, providing, by the computing device, an indication of the one or more interactions to the server system.

21. The method of claim 20, wherein at least one of said receiving, said facilitating, said receiving, and said providing is performed by a plug-in to a browser of the computing device.

22. The method of claim 20, wherein the mobile device information includes at least one of emails, messages, a call history, photos, music, videos, a calendar, and mobile device settings.

23. The method of claim 20, wherein the facilitating includes providing, by the computing device, a user interface having icons/glyphs associated with modules for handling different categories of the mobile device information.

24. The service system of claim 20, wherein the mobile device information does not include user initiated commands.

25. A method comprising:
receiving, by a service system, mobile device information of a mobile device, wherein the mobile device information was sent to the service system in response to the mobile device information being changed on the mobile device and wherein the mobile device information does not include user initiated commands; and providing, by the service system, the mobile device information to a computing device, a user of the mobile device being associated with the computing device, to facilitate the user in viewing, interacting, or viewing and interacting with the mobile device information via the computing device, wherein the mobile device, the service system, and the computing device are separate and distinct from each other.

26. A method comprising:
receiving, by a service system, mobile device information of a user associated with a mobile device, wherein the mobile device automatically uploads the mobile device information to the service system upon a modification of the mobile device information on the mobile device; and providing, by the service system, the mobile device information to a computing device, the user of the mobile device being associated with the computing device, to facilitate the user in viewing, interacting, or viewing and interacting with the mobile device information via the computing device, wherein the mobile device, the service system, and the computing device are separate and distinct from each other.

27. A system comprising:
a server comprising one or more processors and a memory, wherein the server automatically receives from a mobile device mobile device information of a user associated with the mobile device upon a modification of the mobile device information on the mobile device, wherein the user of the mobile device is associated with a computing device, wherein the computing device receives from the server the mobile device information to facilitate the user in viewing, interacting, or viewing and interacting with the mobile device information via the computing device, and wherein the mobile device, the server, and the computing device are separate and distinct from each other.

* * * * *